United States Patent [19]
Kawakami et al.

[11] Patent Number: 6,005,984
[45] Date of Patent: Dec. 21, 1999

[54] PROCESS AND APPARATUS FOR EXTRACTING AND RECOGNIZING FIGURE ELEMENTS USING DIVISION INTO RECEPTIVE FIELDS, POLAR TRANSFORMATION, APPLICATION OF ONE-DIMENSIONAL FILTER, AND CORRELATION BETWEEN PLURALITY OF IMAGES

[75] Inventors: Susumu Kawakami; Yusuke Yasukawa; Fumi Hasegawa; Yasushi Inamoto; Toshihiko Morita; Hiroaki Okamoto, all of Kawasaki, Japan

[73] Assignee: Fujitsu Limited, Kawasaki, Japan

[21] Appl. No.: 07/987,954

[22] Filed: Dec. 11, 1992

[30] Foreign Application Priority Data

Dec. 11, 1991 [JP] Japan .................................. 3-327722
Dec. 11, 1991 [JP] Japan .................................. 3-327723
Apr. 22, 1992 [JP] Japan .................................. 4-103137
May 26, 1992 [JP] Japan .................................. 4-133744
Sep. 18, 1992 [JP] Japan .................................. 4-249956

[51] Int. Cl.$^6$ .................................................. G06K 9/36
[52] U.S. Cl. .................................................. 382/276
[58] Field of Search ................................ 382/16, 22, 41, 382/49, 94, 199, 276, 281, 293, 302; 395/94

[56] References Cited

U.S. PATENT DOCUMENTS

| | | | |
|---|---|---|---|
| 3,069,654 | 12/1962 | Hough | 382/41 |
| 4,267,573 | 5/1981 | Chaikin et al. | 364/515 |
| 4,736,436 | 4/1988 | Yasukawa et al. | 382/16 |
| 4,868,752 | 9/1989 | Fujii et al. | 382/41 |
| 4,884,225 | 11/1989 | Fogarty et al. | 382/6 |
| 4,965,844 | 10/1990 | Oka et al. | 382/44 |
| 5,063,604 | 11/1991 | Weiman | 382/170 |
| 5,063,684 | 11/1991 | Winters | 33/653 |
| 5,070,465 | 12/1991 | Kato et al. | 395/141 |
| 5,173,948 | 12/1992 | Balckham et al. | 382/44 |
| 5,185,667 | 2/1993 | Zimmermann | 358/209 |
| 5,193,126 | 3/1993 | Matsuki | 382/44 |
| 5,220,615 | 6/1993 | Ishii et al. | 382/43 |
| 5,430,810 | 7/1995 | Saeki | 382/281 |

FOREIGN PATENT DOCUMENTS 3-52106  8/1991  Japan .

OTHER PUBLICATIONS

*Dictionary of Mathematics*, McGraw Hill—5th Edition, Sybil P. Parker, Editor in Chief; 1997; pp. 188–191.

*Fundamental Concepts of Geometry*, Bruce E. Meserve, Dover Publications, Inc., New York, 1983 (originally published by Addison–Wesley Publishing Company in 1959), pp. 134–141.

(List continued on next page.)

Primary Examiner—Leo H. Boudreau
Assistant Examiner—Bhavesh Mehta
Attorney, Agent, or Firm—Staas & Halsey

[57] ABSTRACT

An image processing process wherein an image is divided into small areas, a polar transformation is applied to the image in each of the small areas, and image processing is performed based on the result of the polar transformation. Further, each of a plurality of images is divided into small areas, a polar transformation is applied to the image in each of the small areas for each of the plurality of images, and correlation is obtained between the results of the polar transformation for the plurality of images. One-dimensional filter processing is applied to the polar-transformed output.

25 Claims, 109 Drawing Sheets

OTHER PUBLICATIONS

*The Penguin Dictionary of Mathematics,* John Daintith and R. D. Nelson, Penguin Books, 1989, pp. 66–69 and 76–77.

*Fundamental Concepts of Geometry,* Bruce E. Meserve, Dover Publications, Inc., New York, 1983 (originally published by Addison–Wesley Publishing Company in 1959), pp. 134–141.

*Geometry Revisited,* H. S. M. Coxeter and S.L. Greitzer, The Mathematical Association of America, vol. 19, 1967, "Chapter 6—An Introduction to Projective Geometry," pp. 132–187.

"*Proektivnaya Geometriya*(Projective Geometry)", written by Grevic, Grigorii Borisivisch, b., published in Russian language by Gosudarstv. Izdat. Fiz.–Mat. Lit., Moscow, 1960 (partial English language translation provided of document as translated into Japanese by K. Yamanchi and K. Izeki and published in Japan by Tokyo Tosho K.K. in 1962).

S. Kawakami et al., "A Model for Inter–connections of Hypercolumn", Technical Report of the Institute of Electronics, Information and Communication Engineers, NC91–95, Jan. 18, 1992.

S. Kawakami et al., "A Model for Inter–connecting of Hypercolumn II", Technical Report of the Institute of Electronics, Information and Communication Engineers, NC91–104, Mar. 18, 1992.

S. Kawakami et al., "A Model for Inter–connecting of Hypercolumn III", Technical Report of the Institute of Electronics, Information and Communication Engineers, NC92–13, May 27, 1992.

H. Okamoto et al., "A Model for Inter–connections of hypercolumn IV", Technical Report of the Institute of Electronics, Information and Communication Engineers, NC92–14, May 27, 1992.

S. Kawakami et al., "A Model for Inter–connecting of Hypercolumn V", Technical Report of the Institute of Electronics, Information and Communicatin Engineers, NC92–16, Jun. 24, 1992.

S. Kawakami et al., "A Model for Inter–connecting of Hypercolumn VI", Technical Report of the Institute of Electronics, Information and Communication Engineers, NC92–47, Sep. 1992.

S. Kawakami et al., Japanese Unexamined Patent Publication (Kokai), No. 59–184973, Oct. 20, 1984, and Abstract in English.

Hugh R. Wilson, Quantitative Characterization of Two Types of Line–Spread Function Near the Fovea, Vision Resaearch, vol. 18, pp. 971–981, Pergamon Press Ltd. 1978, Printed in Great Britain.

"Webster's New World Guide to Punctuation" Douglas and Strumpf, p. 75, 1988.

Martin Levine, "Vision in Man and Machine", 1985, pp. 176–180.

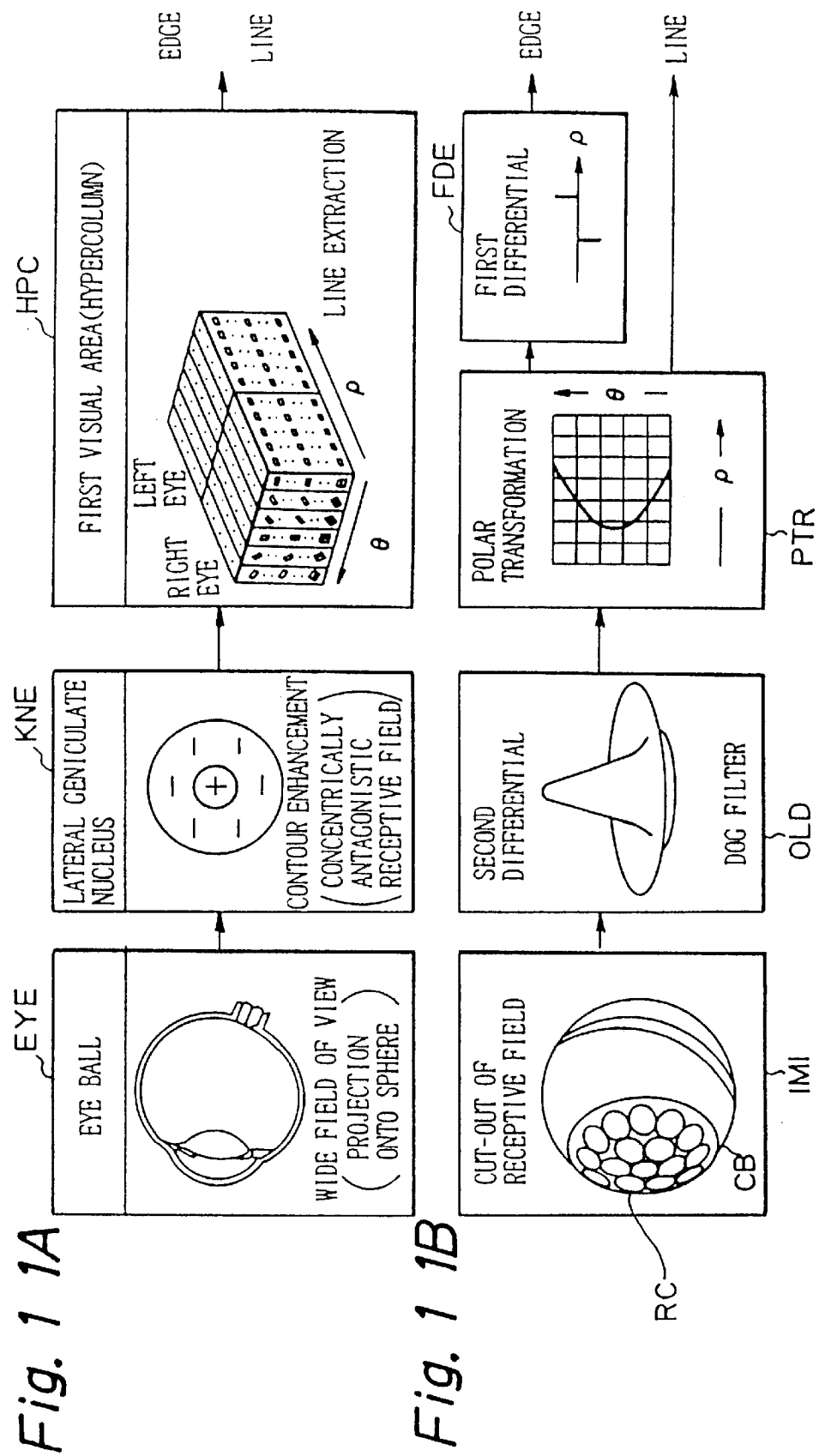

POLAR TRANSFORMATION

DEVELOPMENT ON PLANE

ORIENTATION OF LINE($\theta$)

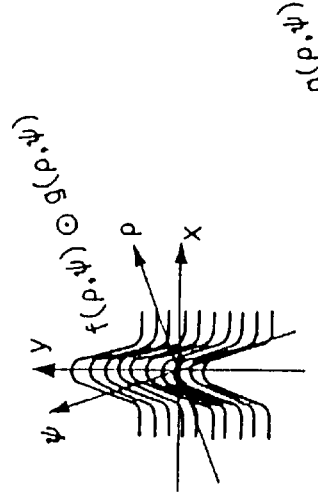
Fig. 28A
ORIGINAL IMAGE
$f(\rho,\psi)$
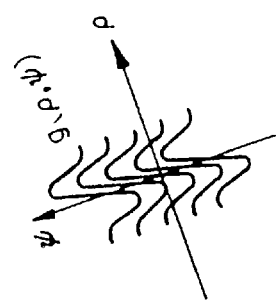
Fig. 28B
$g(\rho,\psi)$
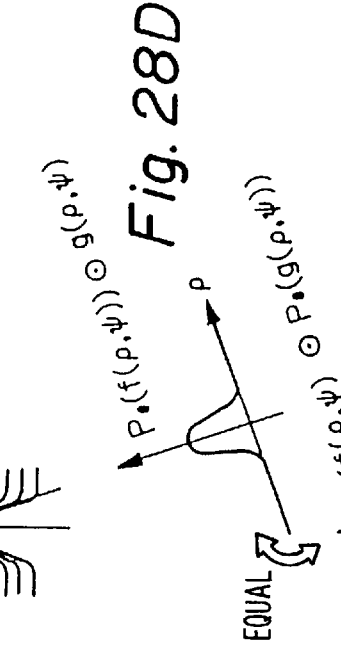
Fig. 28C
$f(\rho,\psi) \odot g(\rho,\psi)$
Fig. 28D
$P_\theta(f(\rho,\psi)) \odot g(\rho,\psi))$
EQUAL
$P_\theta(f(\rho,\psi)) \odot P_\theta(g(\rho,\psi))$
Fig. 28E
$P_\theta(f(\rho,\psi))$
Fig. 28F
$P_\theta(g(\rho,\psi))$
Fig. 28G
$P_\theta(f)$ IS PROJECTION IN THE $\psi$-DIRECTION

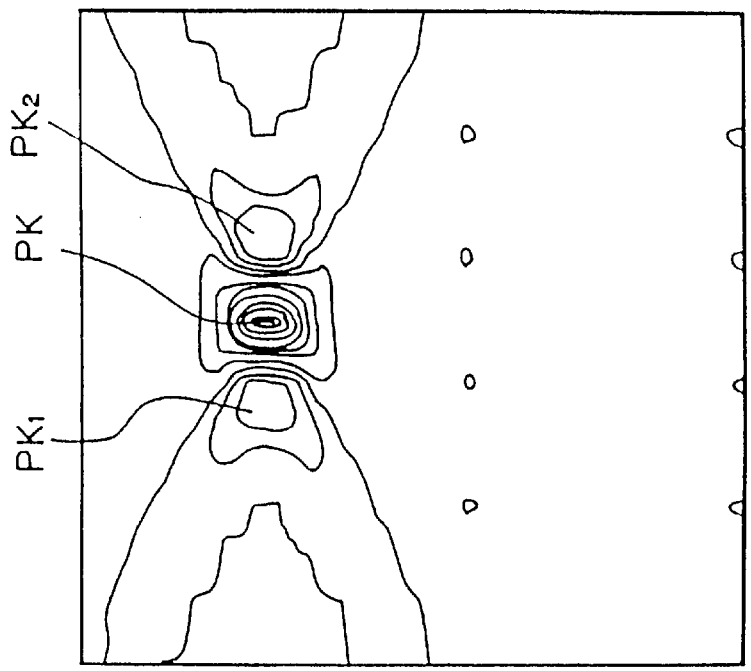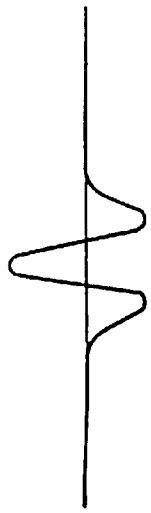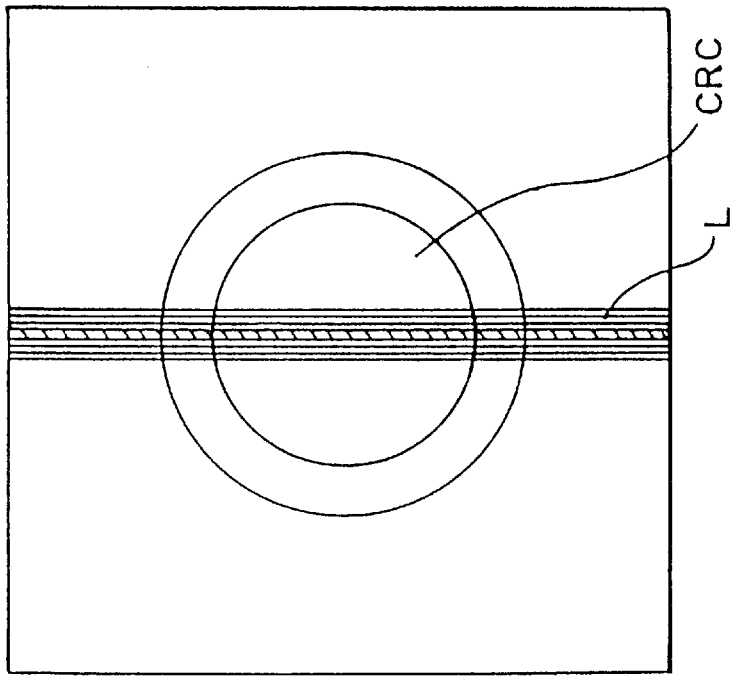

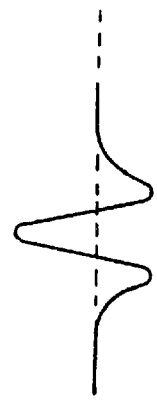
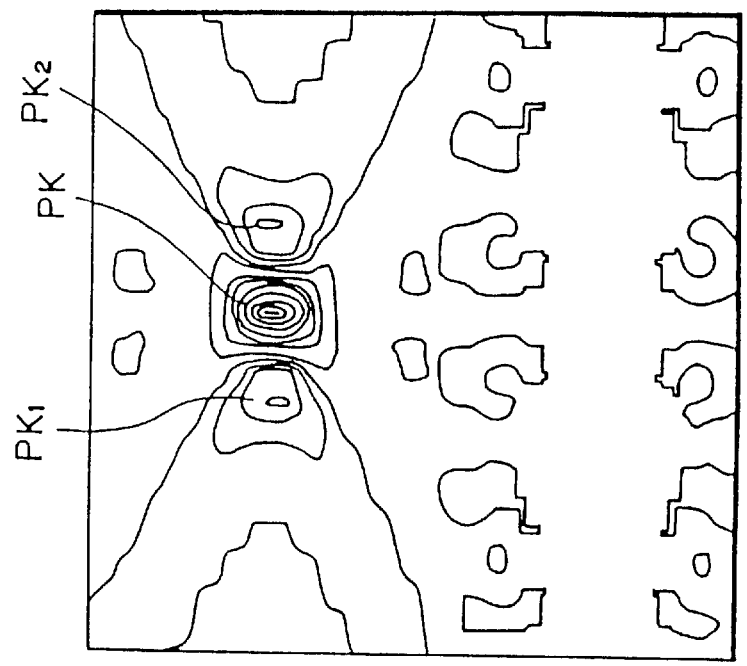
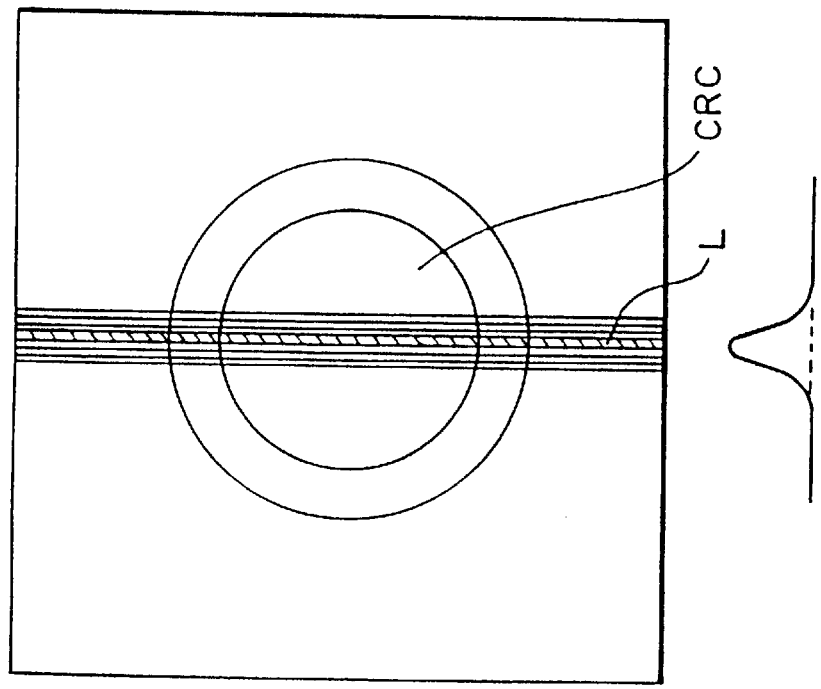

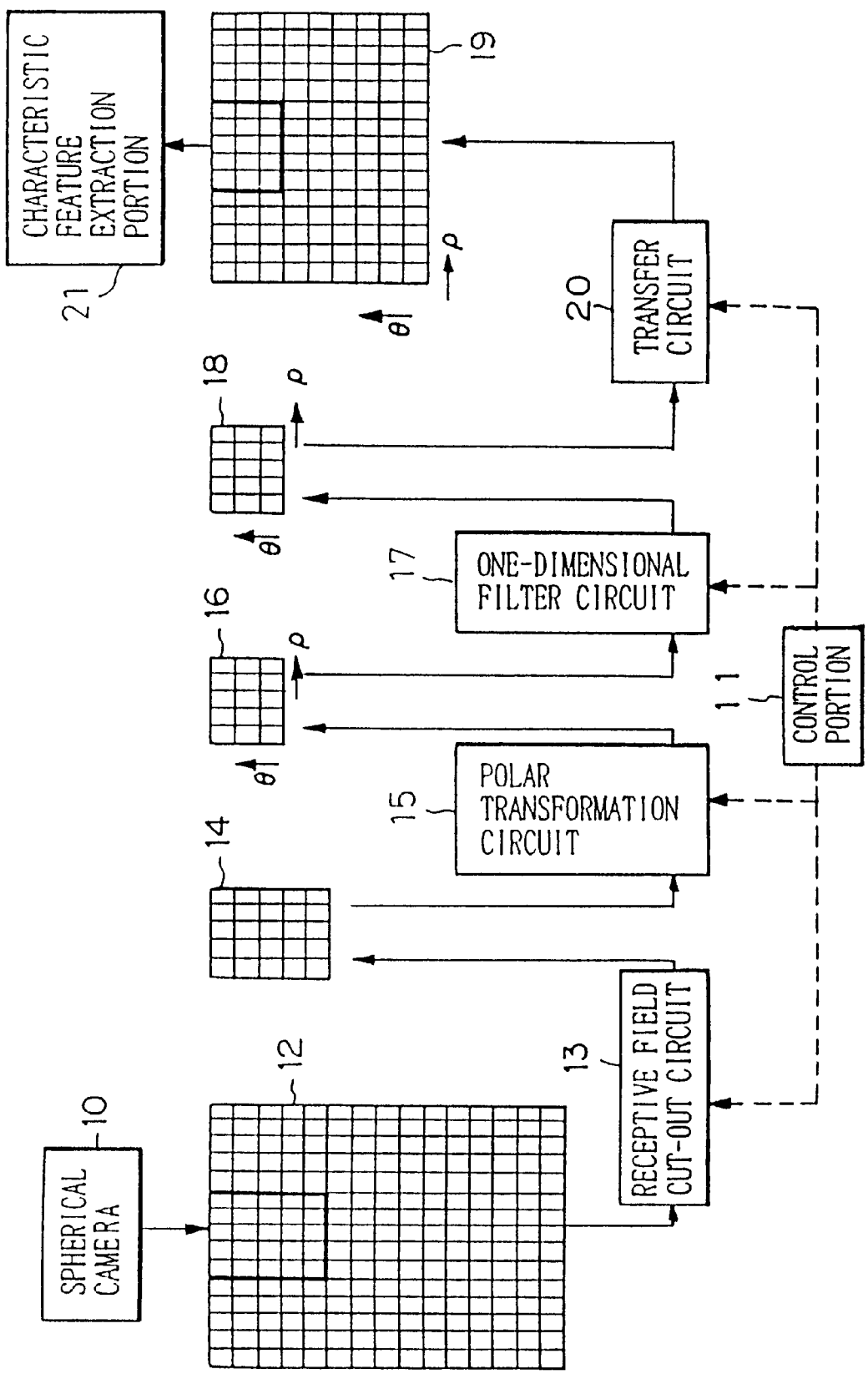

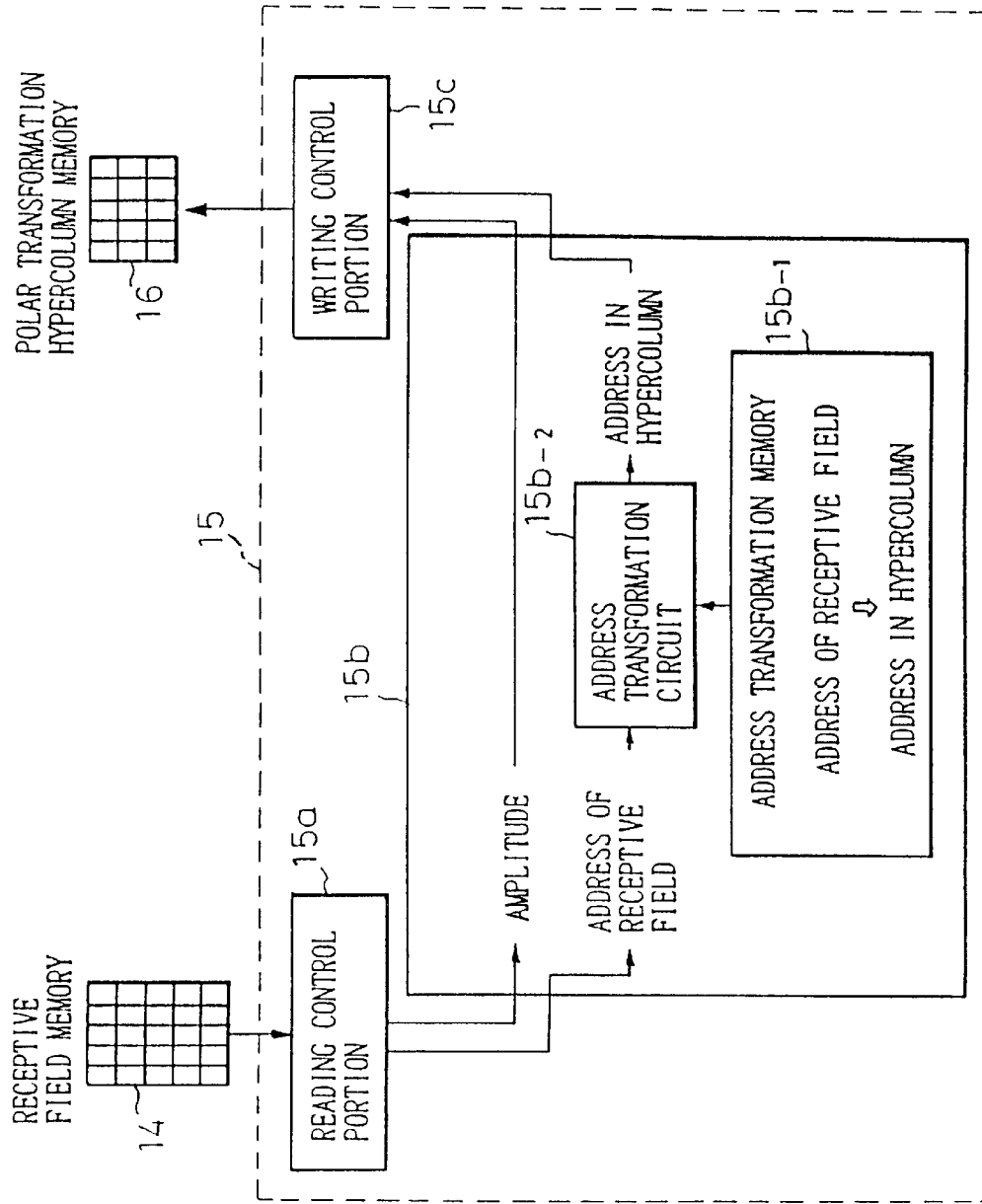

EDGE INPUT

ONE-DIMENSIONAL
FIRST DIFFERENTIAL
FILTER CHARACTERISTIC

OUTPUT RESPONSE
(FIRST DIFFERENTIAL)

EDGE INPUT

TWO-DIMENSIONAL
SECOND DIFFERENTIAL
FILTER CHARACTERISTIC

OUTPUT RESPONSE
(SECOND DIFFERENTIAL)

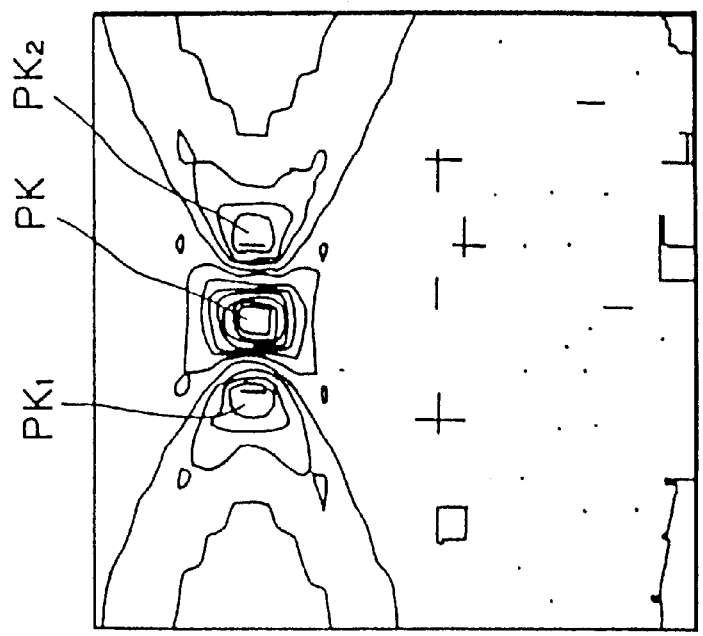
Fig. 37C
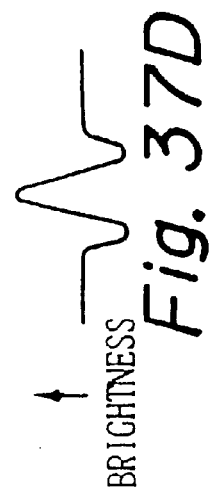
Fig. 37D
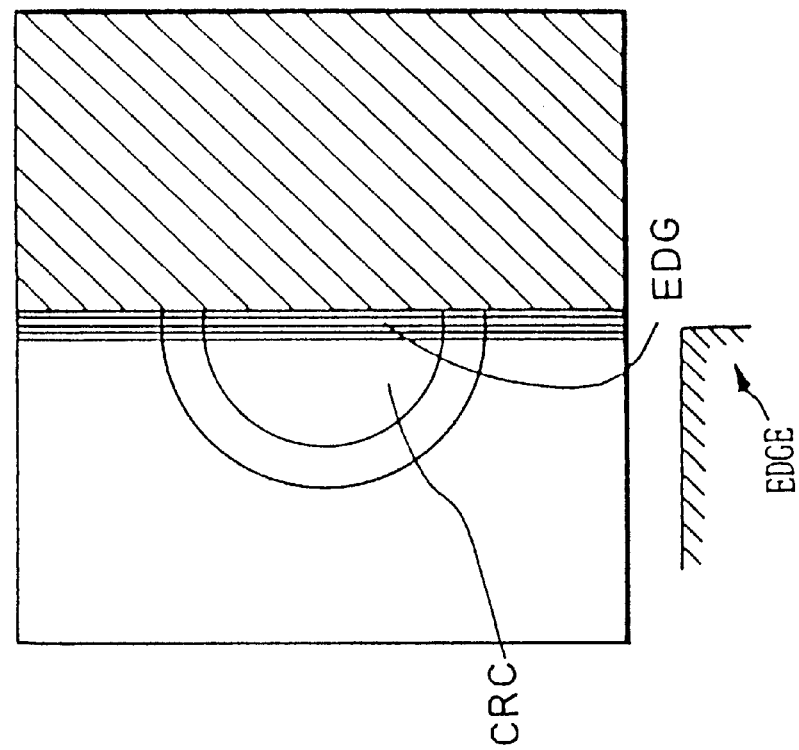
Fig. 37A
Fig. 37B

BRIGHTNESS

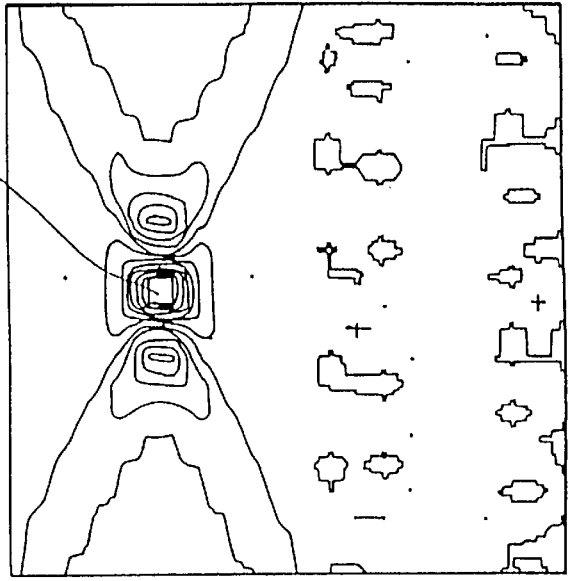
Fig. 41A
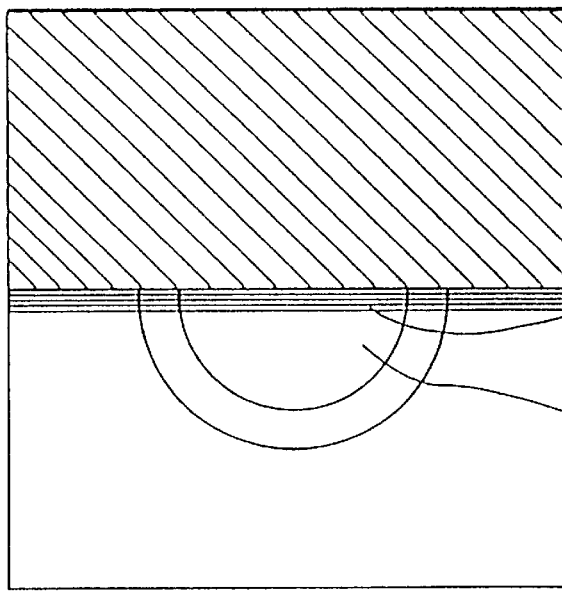
Fig. 41B
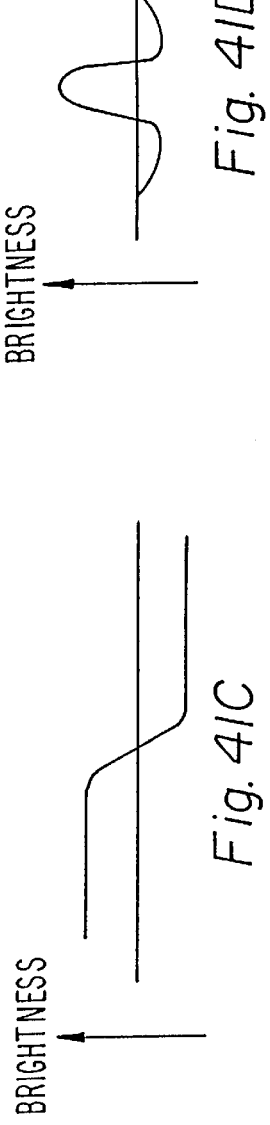
Fig. 41C
Fig. 41D

FIRST DIFFERENTIAL SKELETON FILTER WITH WIDTH a : $gr_0$ OR $gr$

SECOND DIFFERENTIAL SKELETON FILTER WITH WIDTH a : $gas_0$ OR $gas$

SECOND DIFFERENTIAL RING WITH DIAMETER a : $gas_0$ OR $2gas$

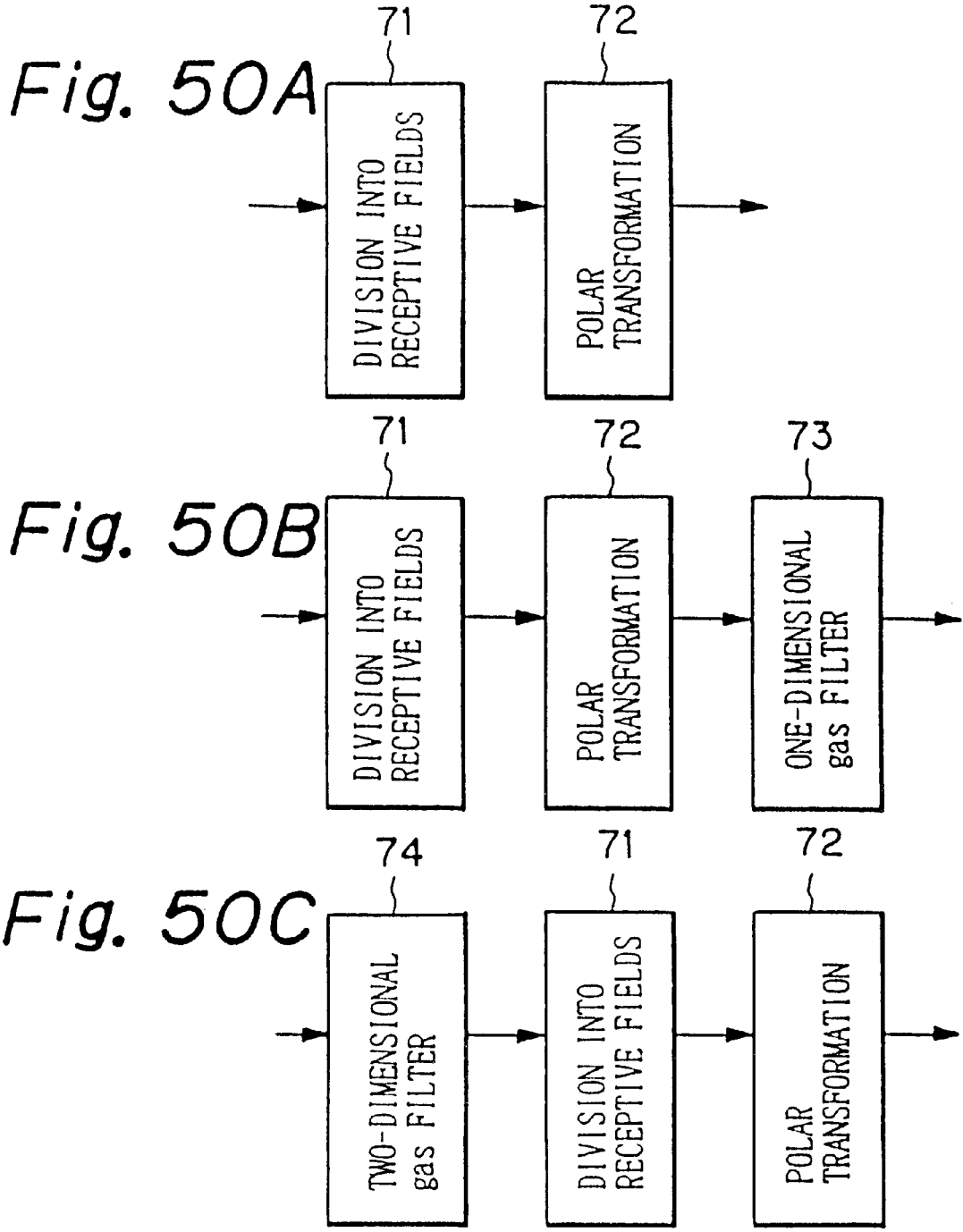

Fig. 52A
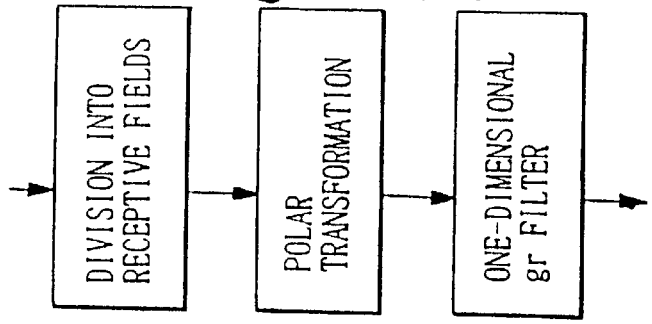
Fig. 52B
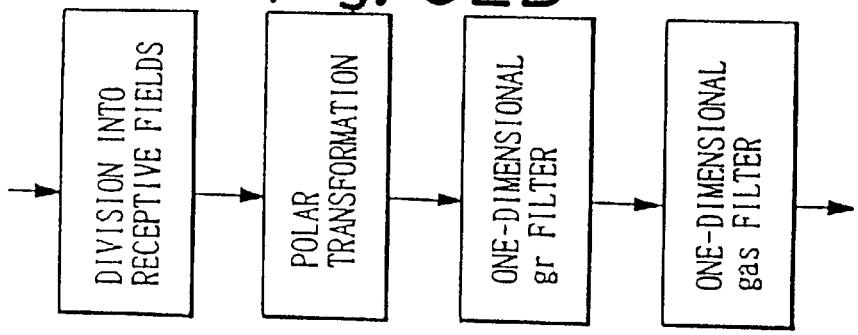
Fig. 52C
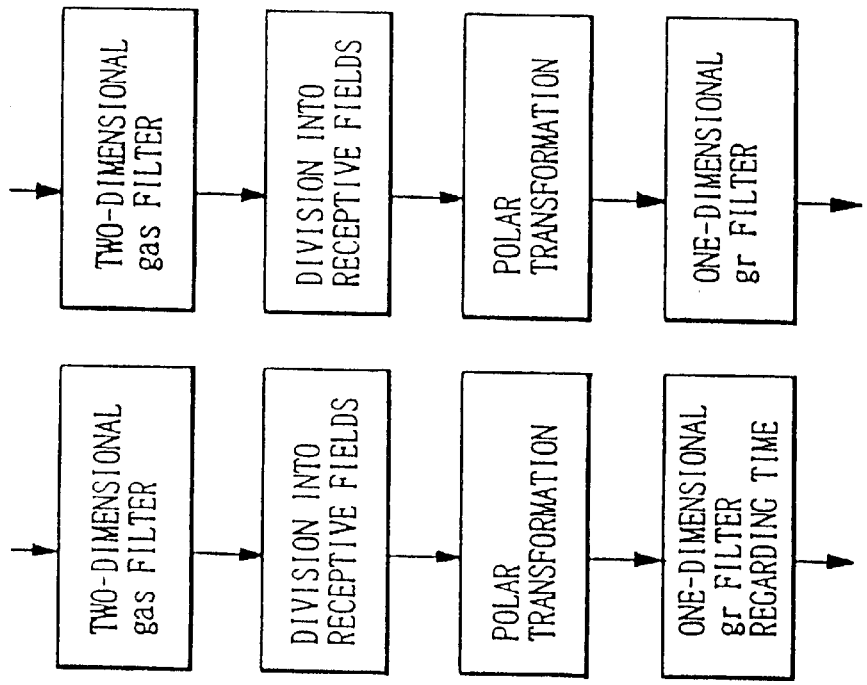
Fig. 52D

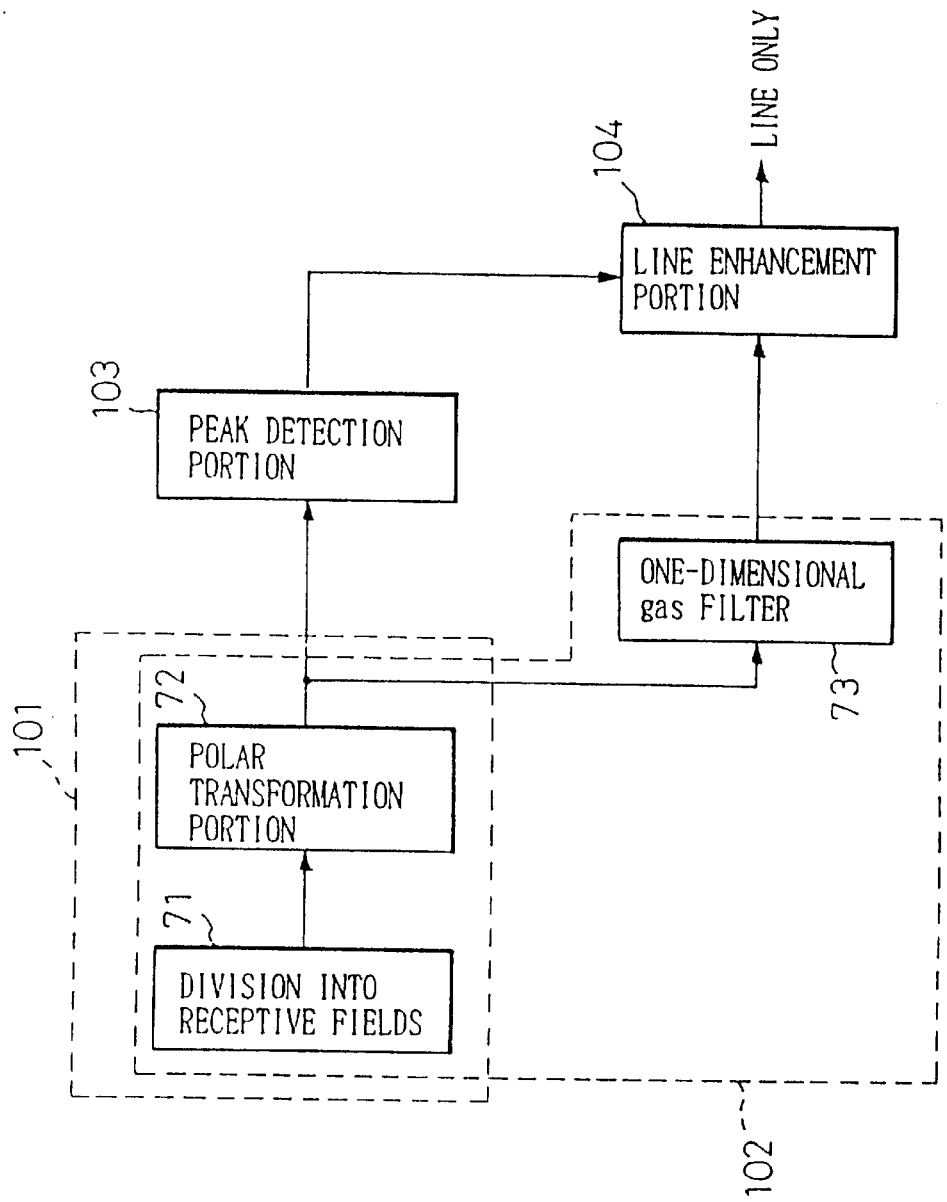

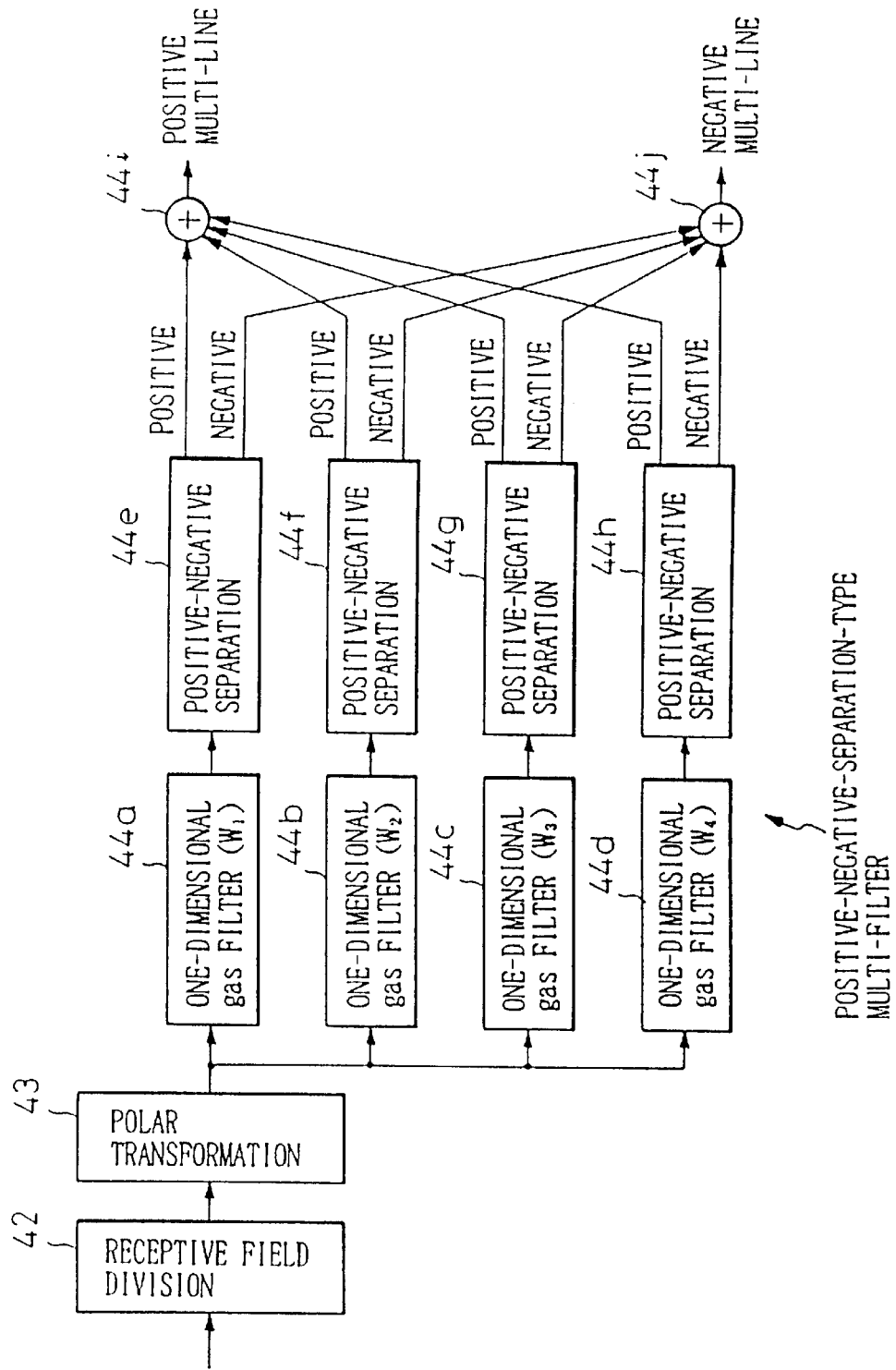

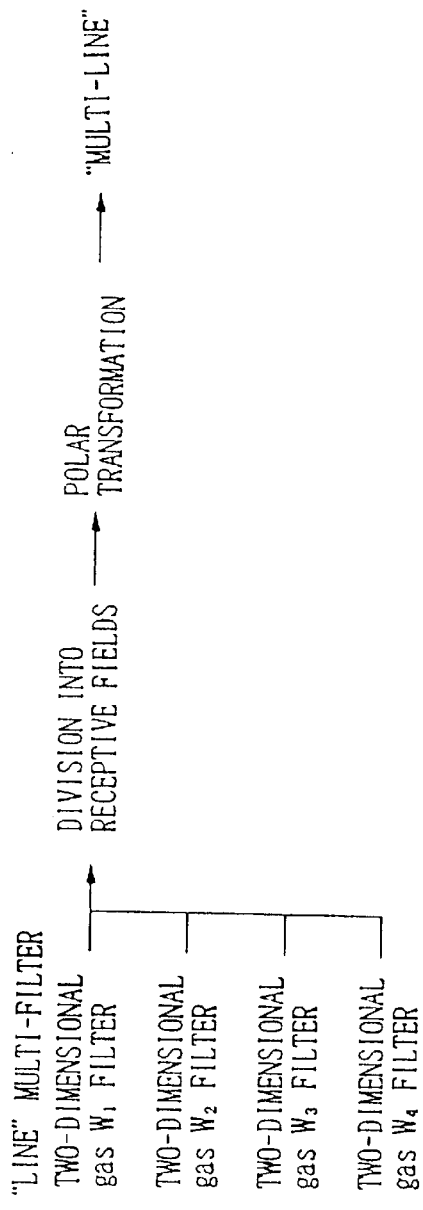
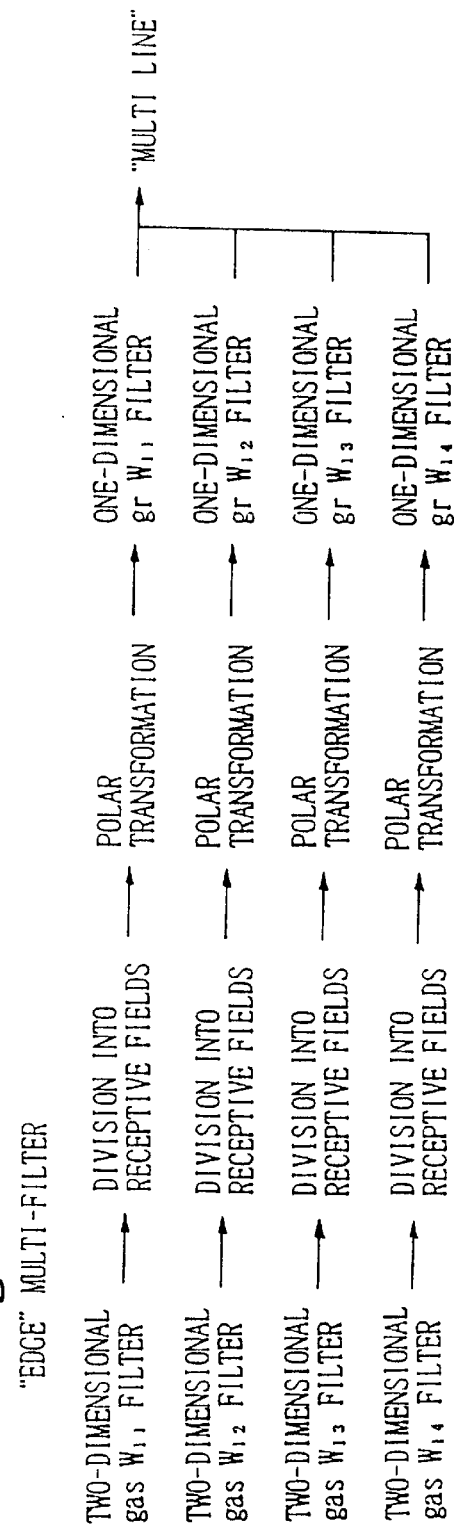

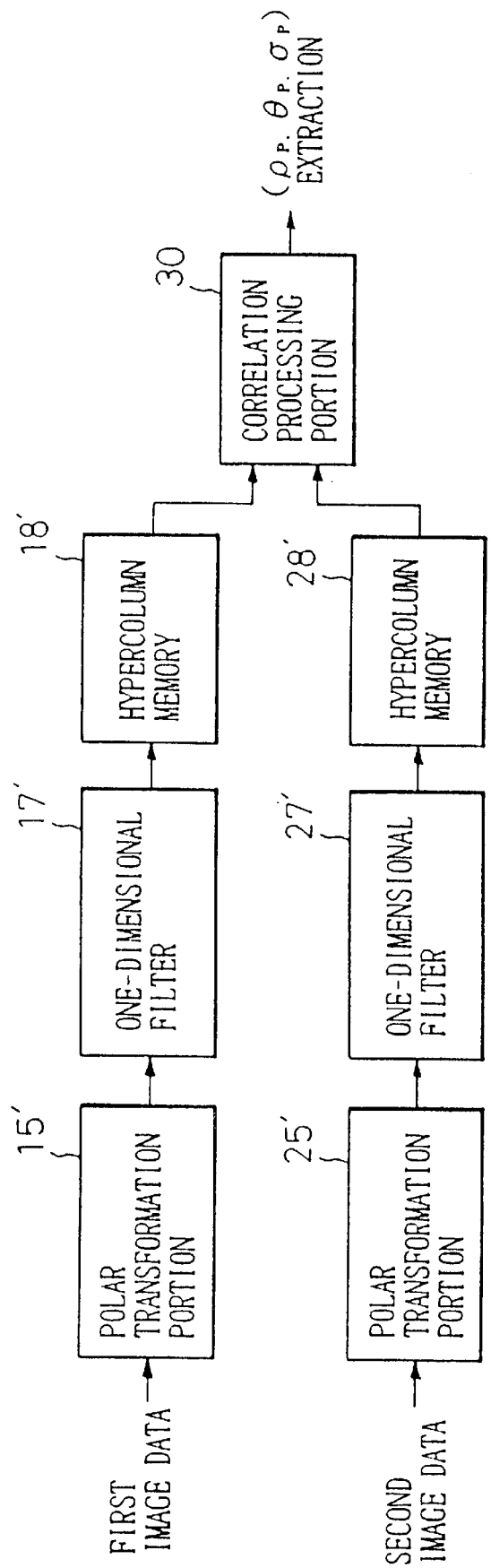

Fig. 72A  DIVISION INTO RECEPTIVE FIELDS
LEFT EYE
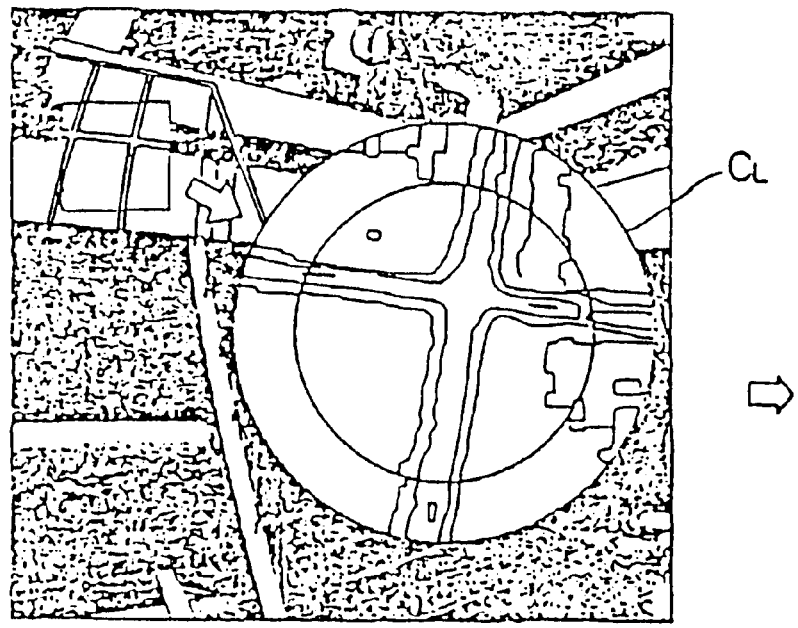
Fig. 72B
RIGHT EYE
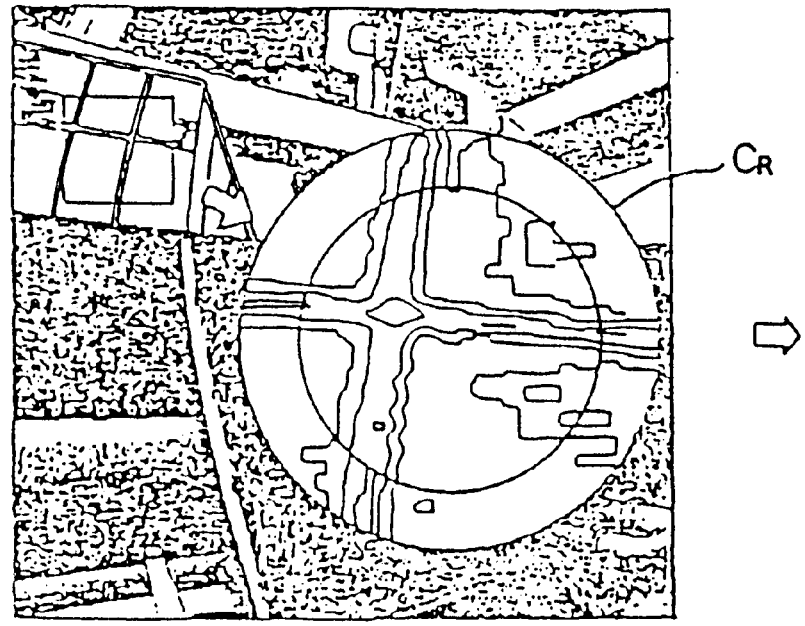

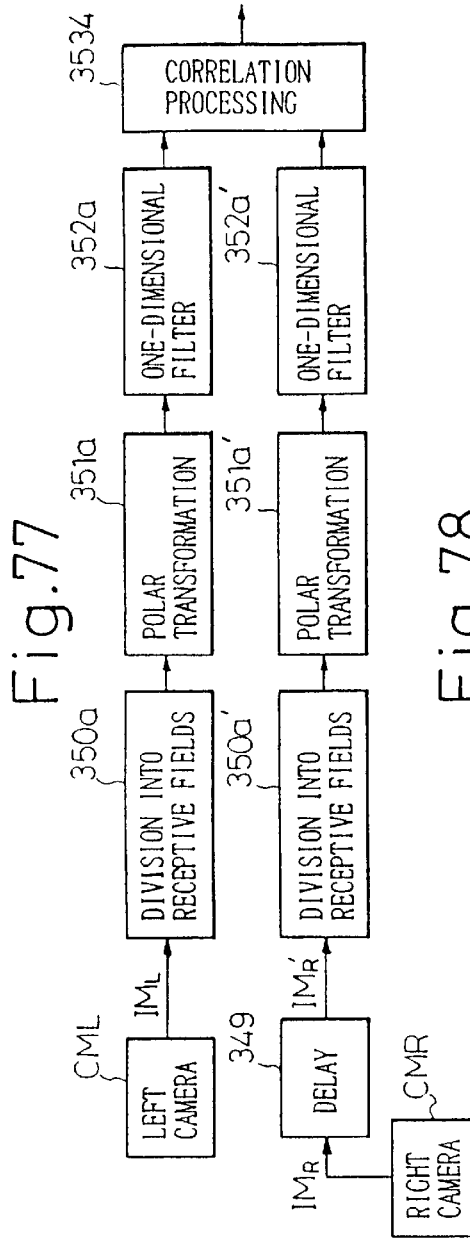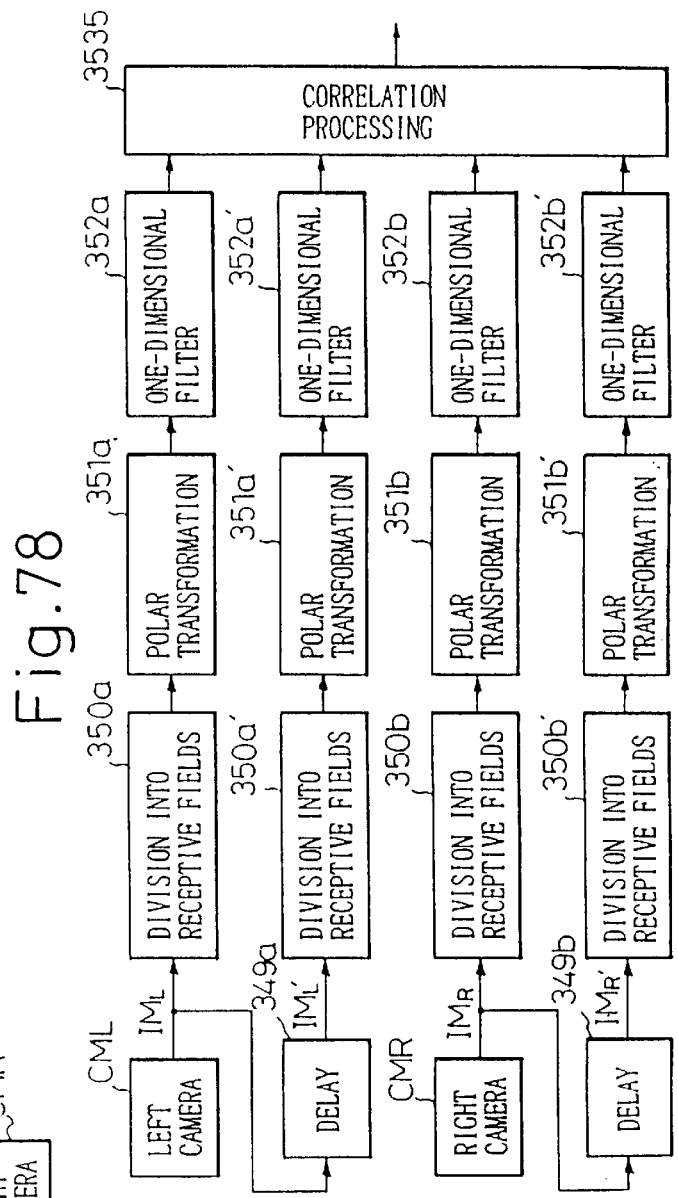

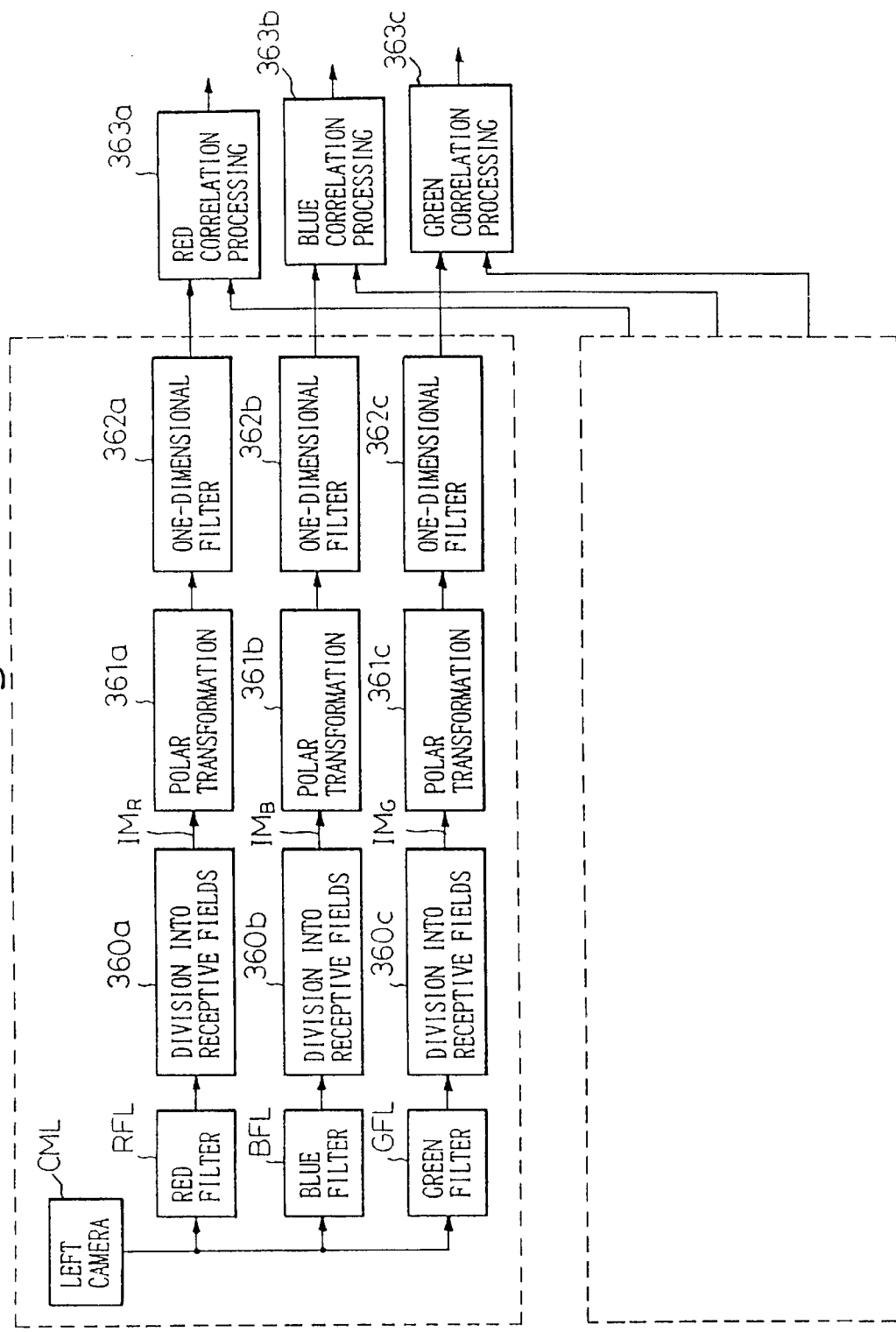

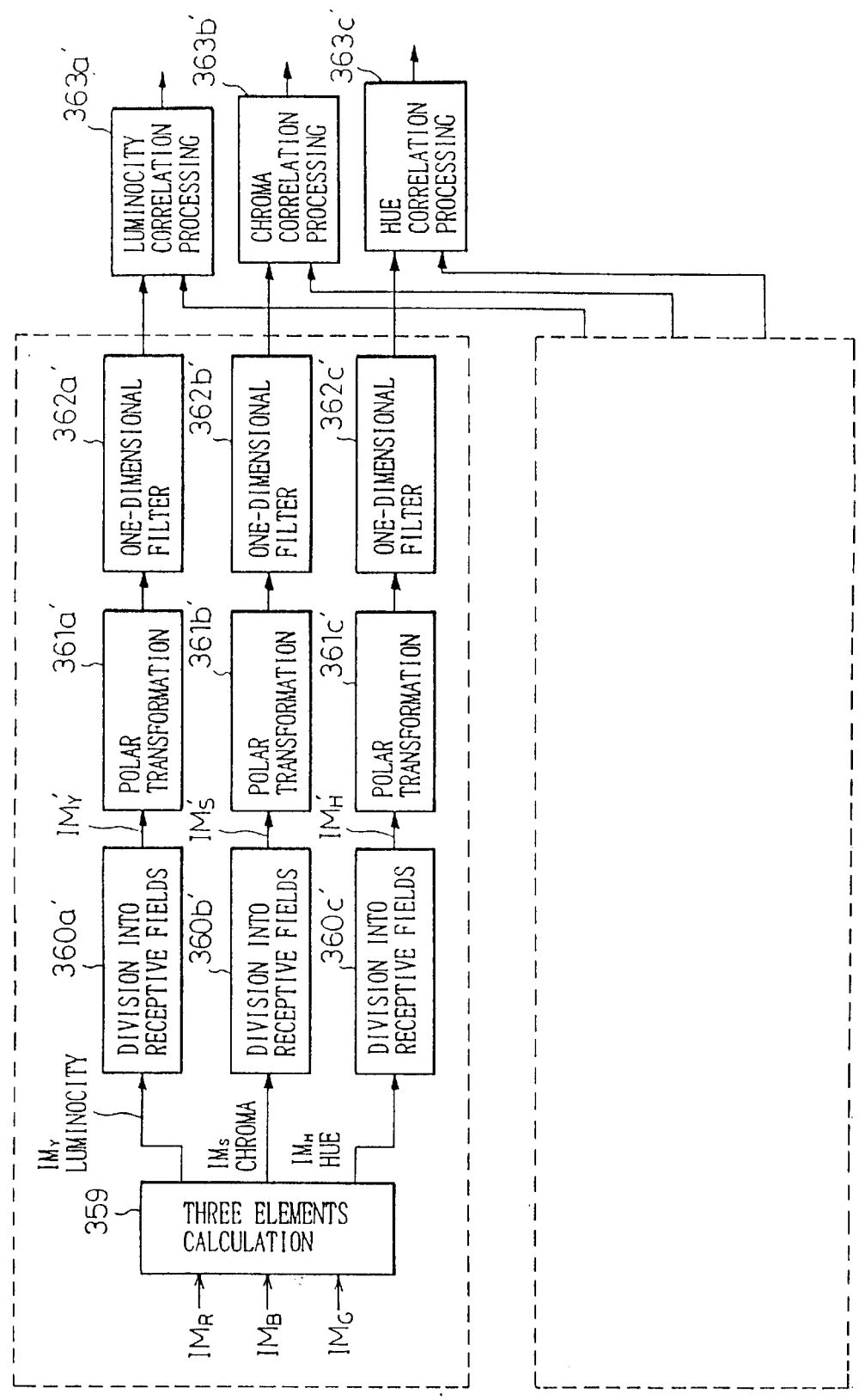

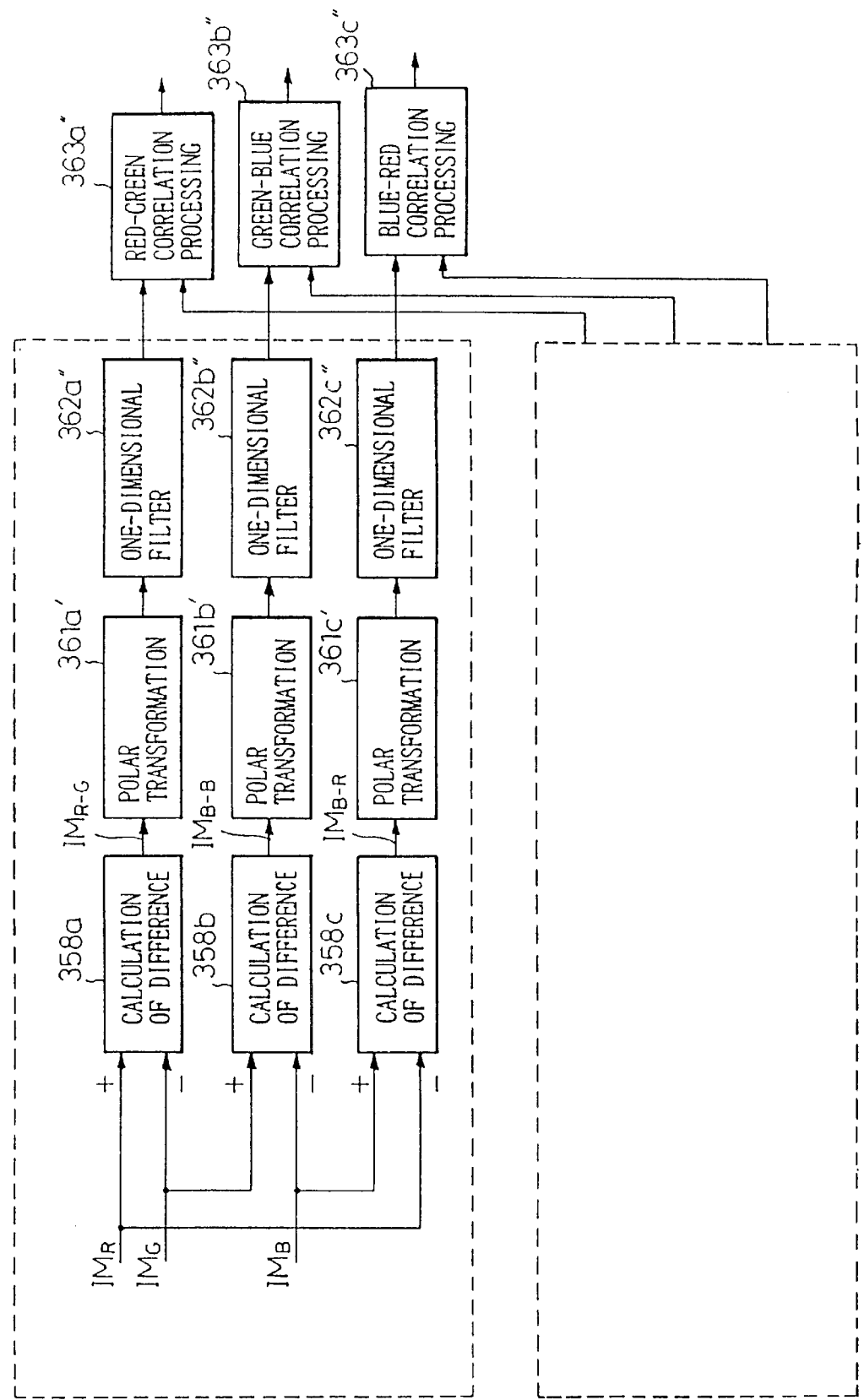

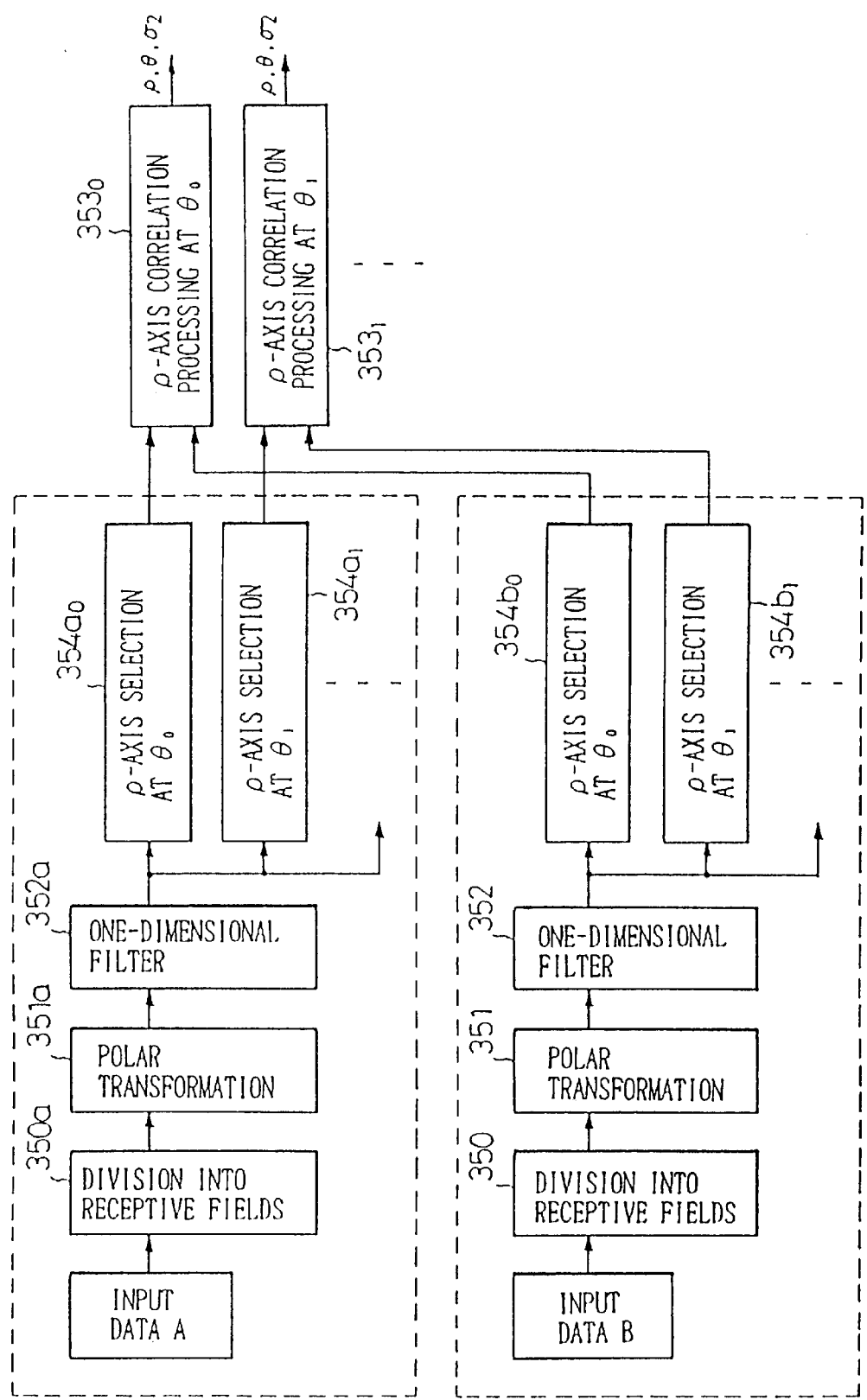

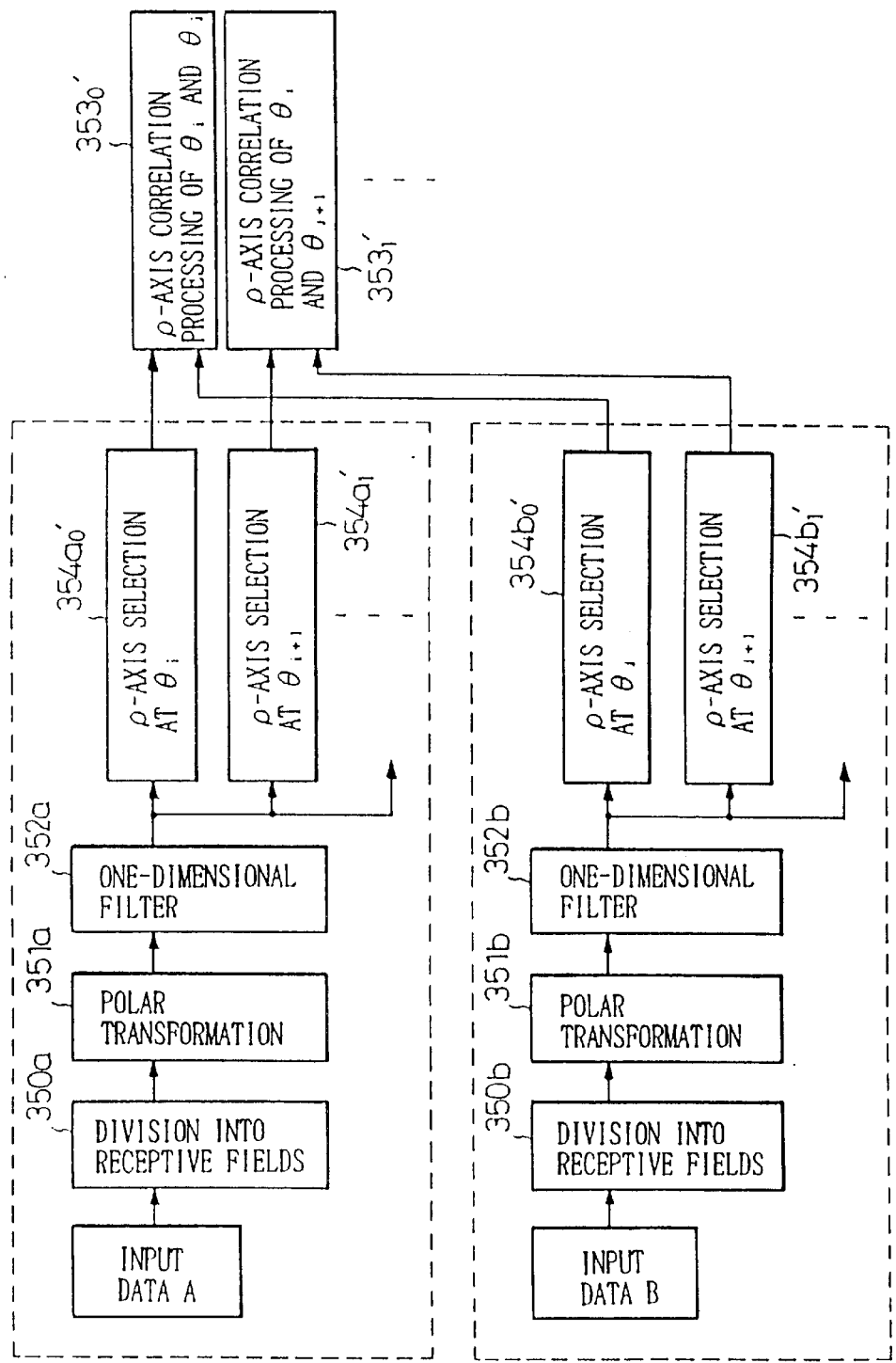

Fig. 86A  Fig. 86B
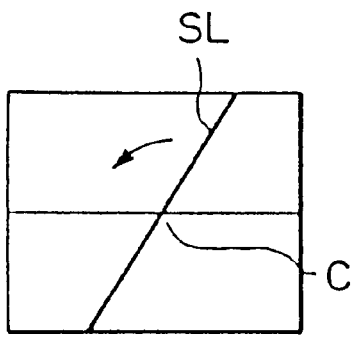
INPUT DATA A
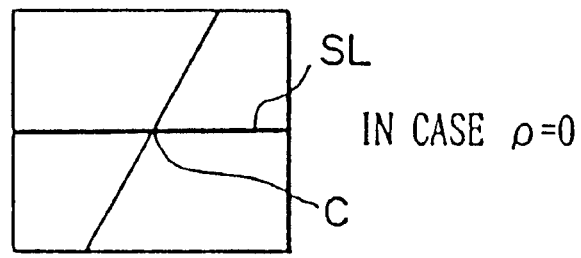
IN CASE $\rho = 0$
INPUT DATA B
Fig. 86C  Fig. 86D
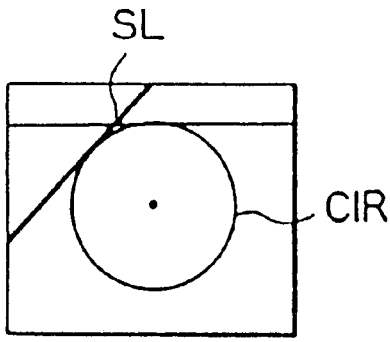
INPUT DATA A
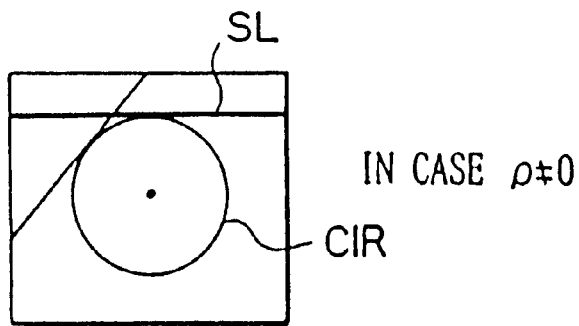
IN CASE $\rho \neq 0$
INPUT DATA B

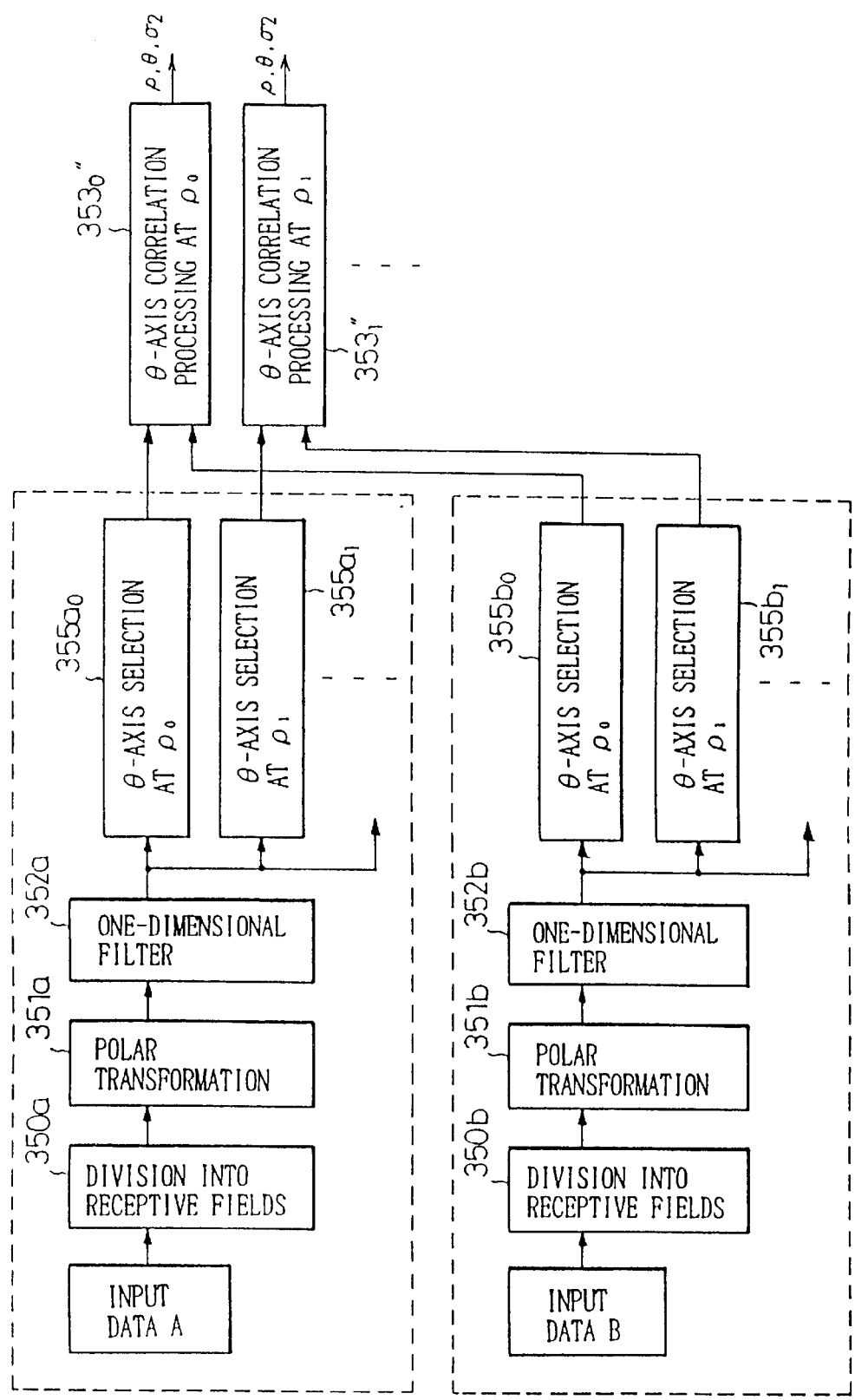

LEFT EYE

RIGHT EYE

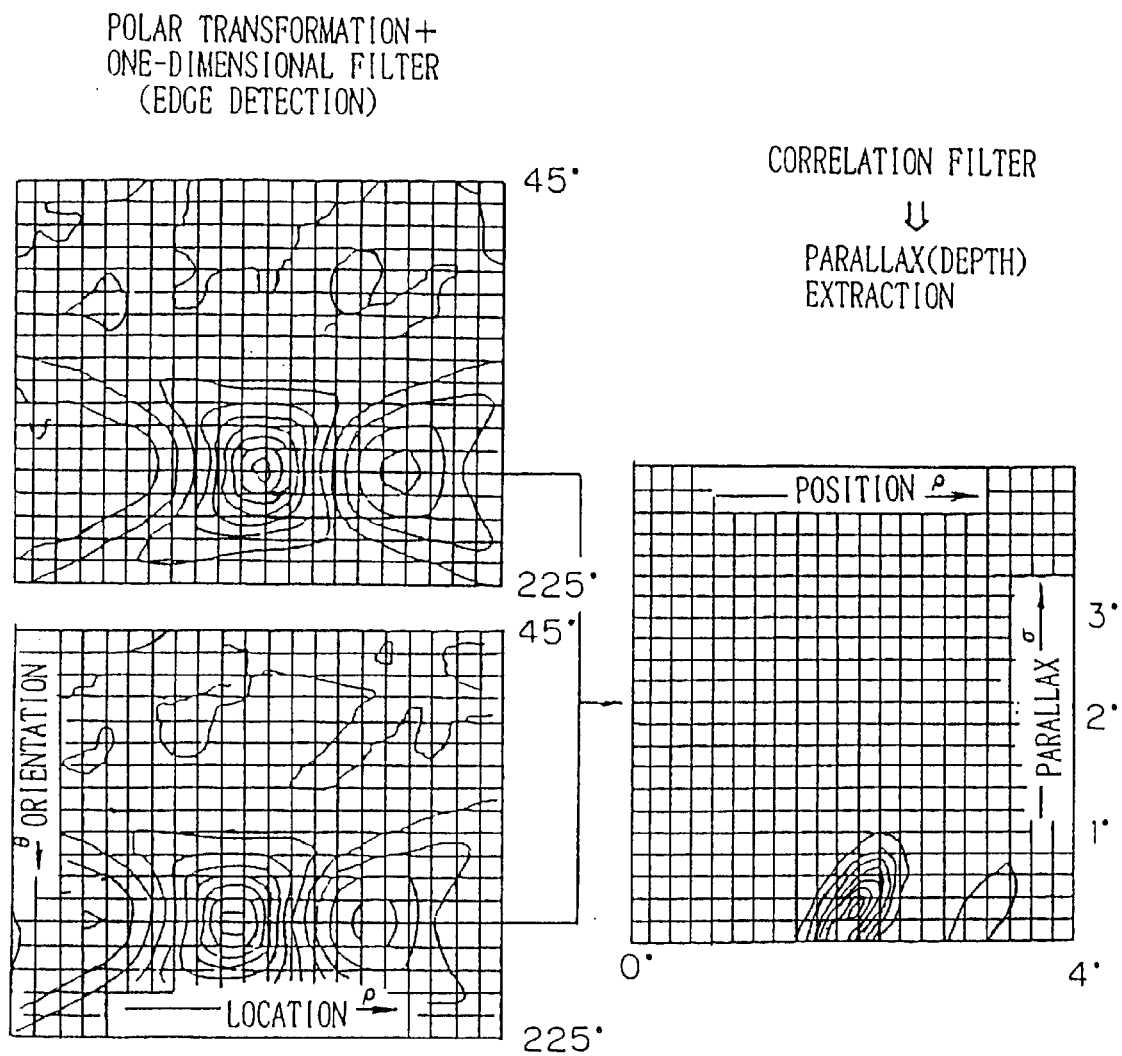

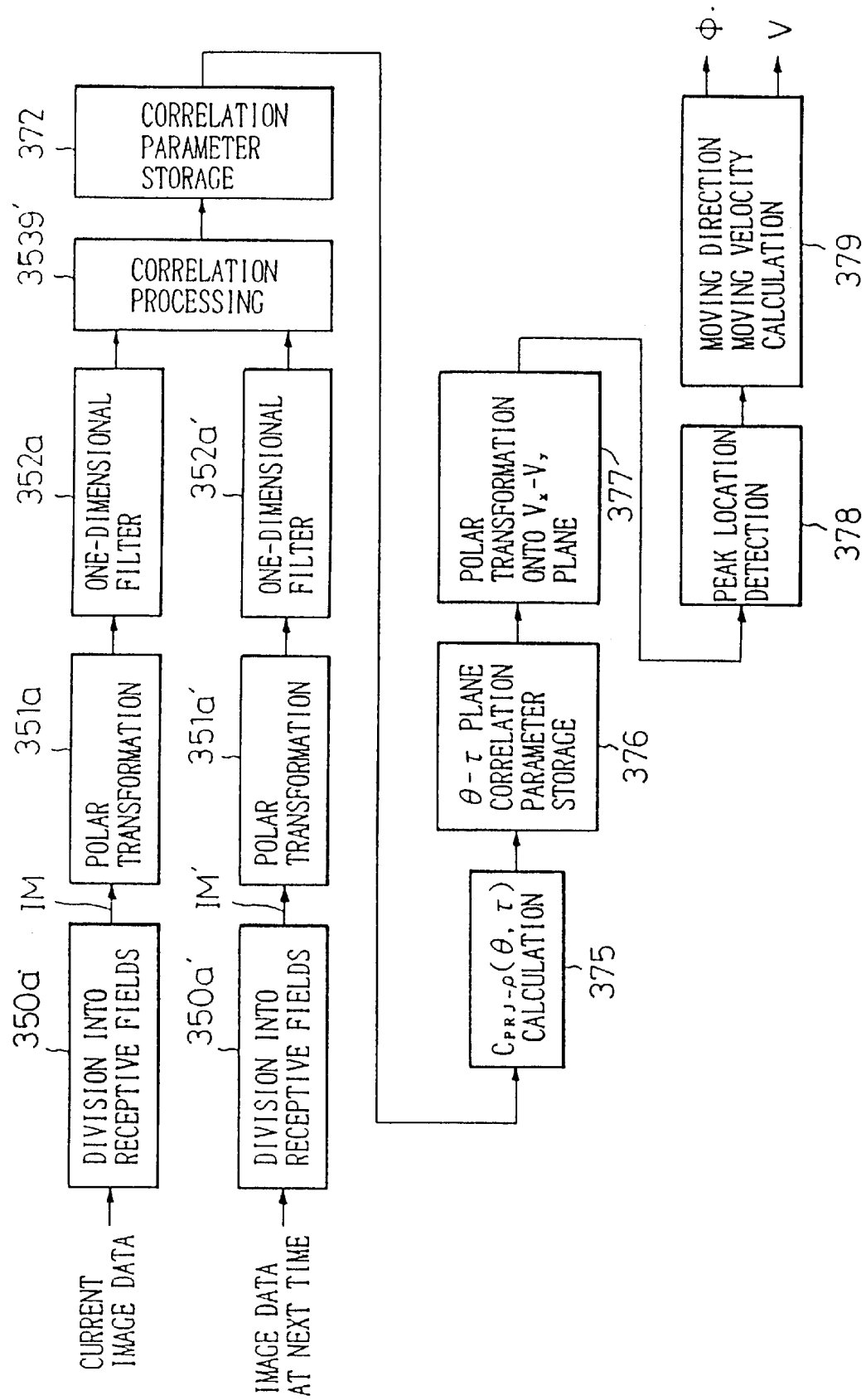

POINT IMAGE

LINE IMAGE

IM

IM'

HCIM'

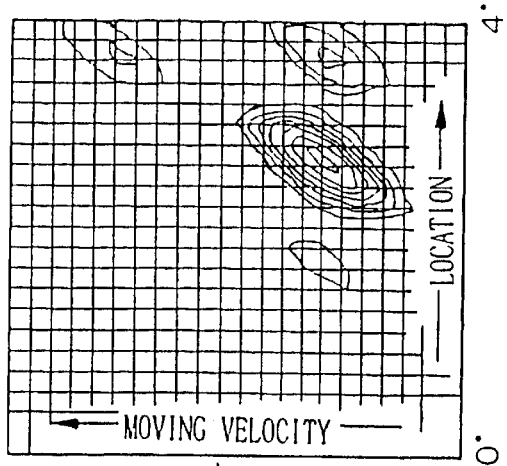
Fig. 105E
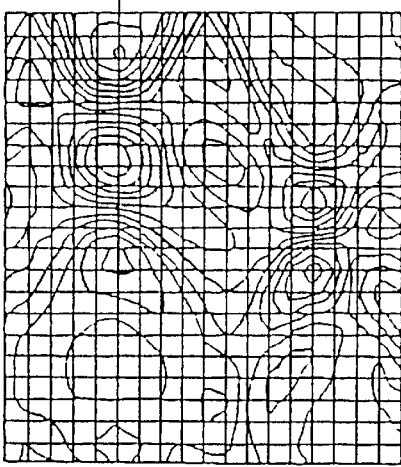
Fig. 105C
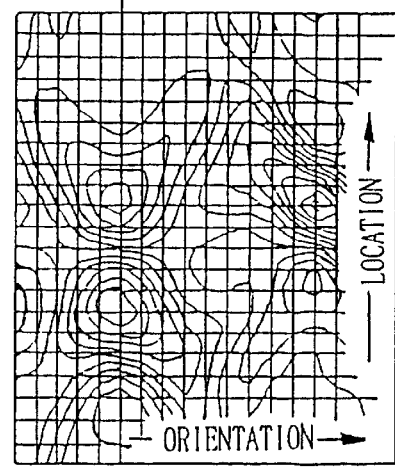
Fig. 105D
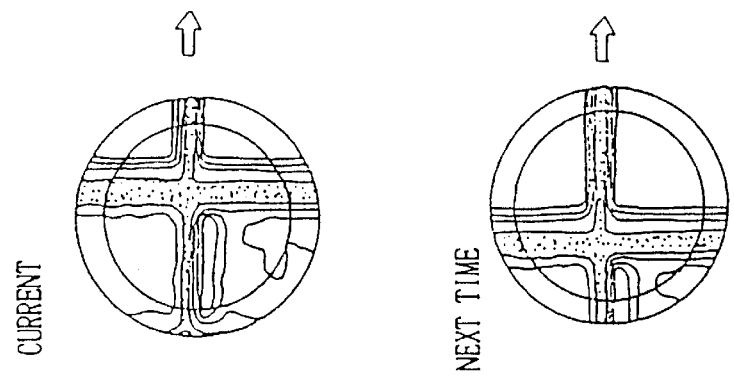
Fig. 105A
Fig. 105B

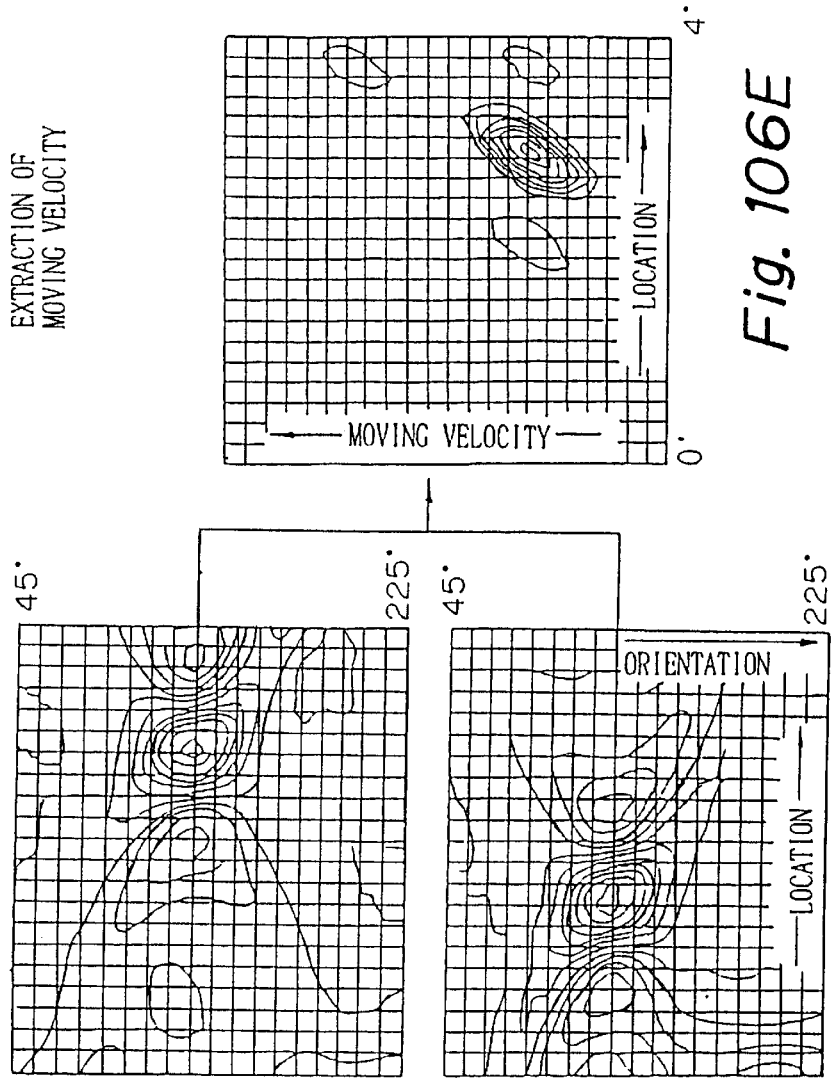

Fig. 108A LEFT EYE RIGHT EYE
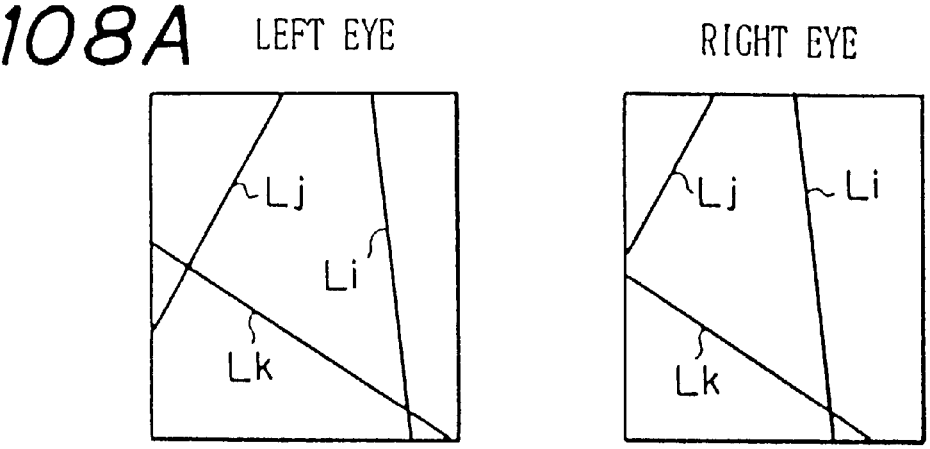
Fig. 108B
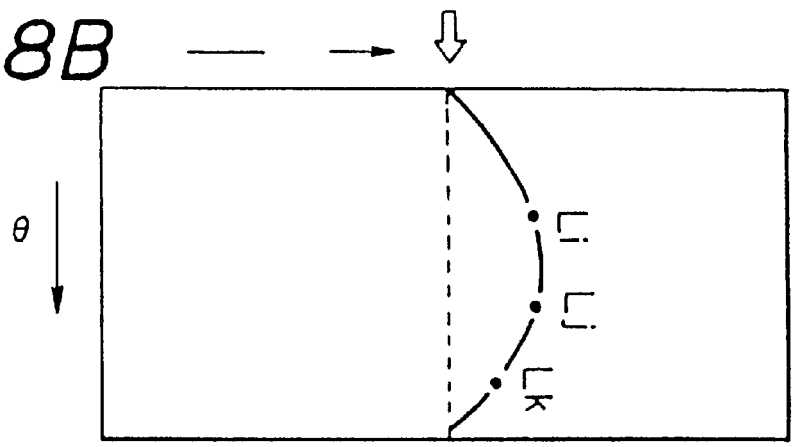
Fig. 108C ⇩ POLAR TRANSFORMATION
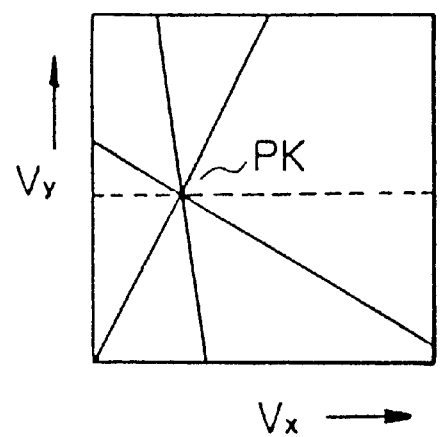

Fig. 111A
LEFT EYE
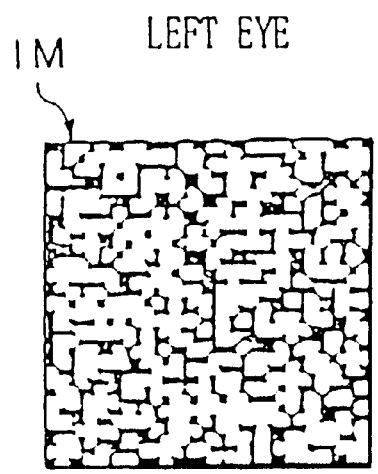
IM
Fig. 111B
RIGHT EYE
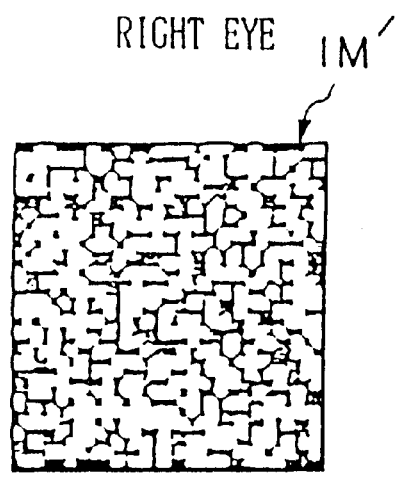
IM'
$\longrightarrow \rho \longrightarrow$
$\theta \downarrow$
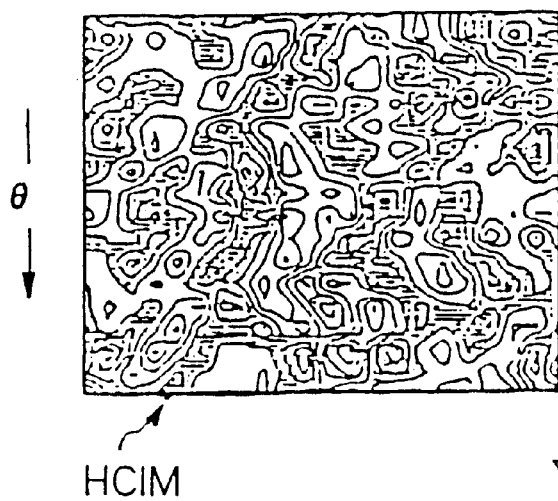
HCIM
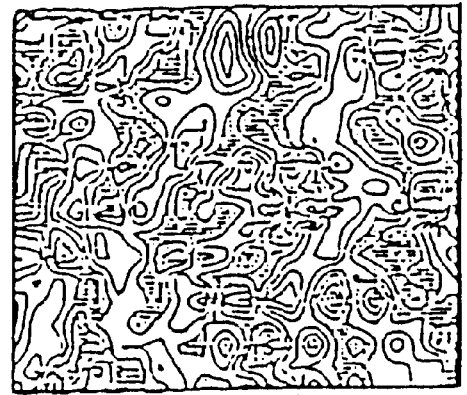
HCIM'
Fig. 111C
Fig. 111D Fig. 112A
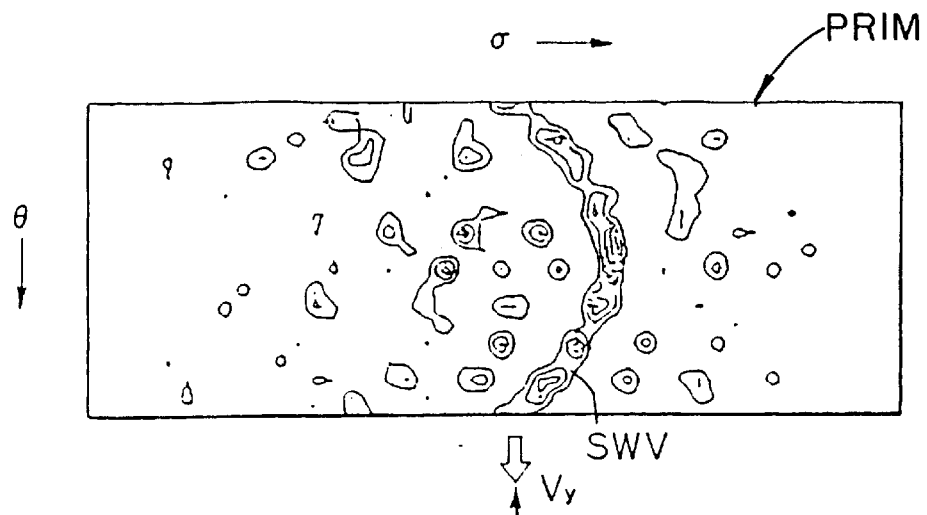
Fig. 112B
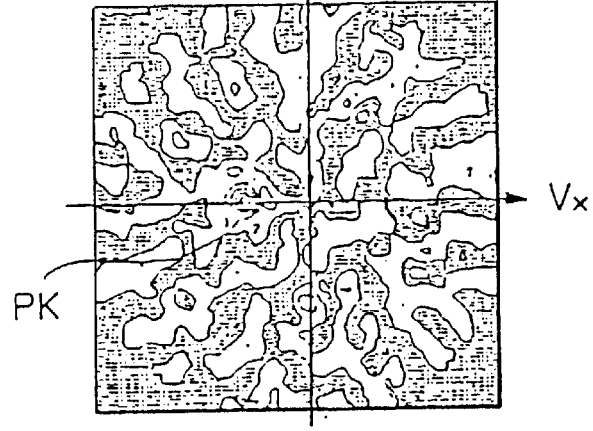
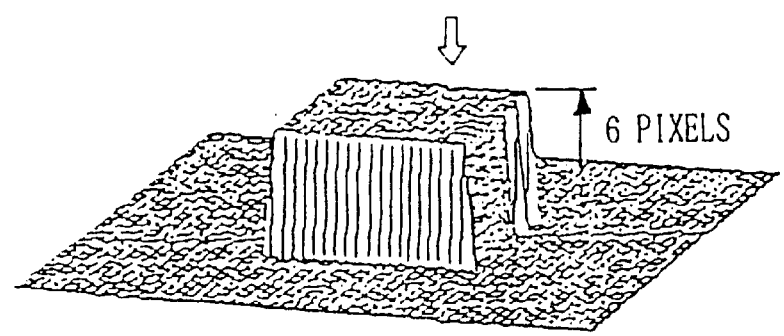
Fig. 112C

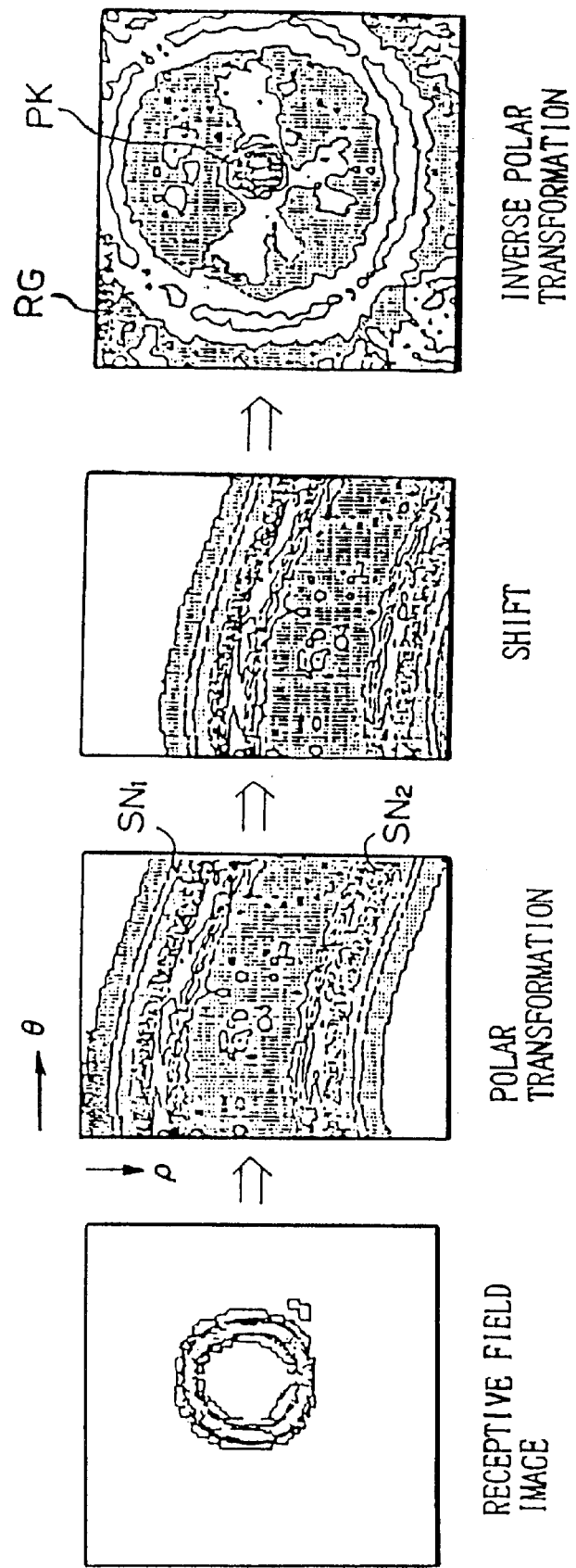

PROCESS AND APPARATUS FOR EXTRACTING AND RECOGNIZING FIGURE ELEMENTS USING DIVISION INTO RECEPTIVE FIELDS, POLAR TRANSFORMATION, APPLICATION OF ONE-DIMENSIONAL FILTER, AND CORRELATION BETWEEN PLURALITY OF IMAGES

BACKGROUND OF THE INVENTION

1. Field of the Invention

The present invention relates to an image processing process for extracting three-dimensional features of an object.

It is necessary to spatially measure a distance to an obstacle or an object when a robot moves to avoid the obstacle or precisely manipulate the object.

The range (50 degrees) of sight of the conventional robots is not enough, in particular, when the robots move in a narrow environment such as in an industrial plant or in a warehouse. It is necessary to perform three-dimensional measurement recognizing the environmental conditions with a field of view comparable to the range (180 degrees) of the human eye. A fisheye lens is used for performing the measurement with a wide field of view. However, the images obtained through the fisheye lens are distorted, and therefore it is difficult to precisely process the distorted images, and a special image processing is required.

Since almost all the objects to be manipulated and the environmental conditions in an industrial plant or in a warehouse are artificial, they are constituted basically by straight lines and cylinders for ease in manufacture. Therefore, the objects are imaged as straight lines on an input screen. Thus, preprocessing of an image for precisely extracting a line segment is indispensable for movement or operations of the robots. The robots can perform operations such as avoiding an obstacle or approaching an object by using the line segment as a clue.

The function for precisely extracting a line segment from an image of a wide field of view (fisheye lens image) is indispensable for movement or operations of the robots in a narrow environment such as in an industrial plant or in a warehouse.

2. Description of the Related Art 2.1 The applicants have already invented and proposed a three-dimensional (stereoscopic) moving view (see for example, the Japanese Examined Patent No. 3-52106, or Kawakami in Kagaku Asahi, June 1987). In the kinetic stereopsis, a three-dimensional (stereoscopic) perception is obtained based on the motion parallax caused by movement, and the image obtained when moving a fisheye lens camera is processed on a sphere to perform three-dimensional (stereoscopic) measurement of a line segment, a point, a cylinder, and the like. Thus, a line segment can be three-dimensionally (stereoscopically) measured over the range of human sight (180 degrees).

FIGS. 1A and 1B are diagrams for explaining a spherical mapping. The image input through a fisheye lens is equivalent to an image obtained by the projection on a sphere, and is distorted. Therefore, an operation called a spherical mapping (which is precisely denoted as a polar transformation or a dual transformation on a sphere) is required. The spherical mapping is an operation wherein an arbitrary point P on a sphere is transformed to a great circle R (a largest circle on a sphere corresponding to an equator) having a pole thereof at the point P, as indicated in FIG. 1A. When drawing great circles R1, R2, R3, . . . respectively having their poles at points P1', P2', P3', . . . , where the points P1', P2', P3', . . . are respectively obtained by projecting points P1, P2, P3 onto the sphere, . . . which constitute a line segment L, the great circles necessarily cross at a point S, as indicated in FIG. 1B. The intersecting point S is a characteristic point having a one-to-one correspondence to the line segment L. The longer the line segment L is, the larger the number of the points in the line segment L, the larger the number of the great circles, and therefore the higher the degree of superimposition of the great circles at the point S. Thus, a line segment is extracted as a point corresponding to the line segment on a sphere, and the length of the line segment can be measured by obtaining a histogram of the degree of superimposition of the great circles at respective points. The point S corresponding to the line segment L can be expressed in geometry as "a pole having as a polar line (great circle) a projection L' of a line segment L onto a sphere".

FIG. 2 is a diagram illustrating the construction of a system for performing three-dimensional (stereoscopic) measurement by a kinetic stereopsis using a spherical mapping. When an image IMG is input from a fisheye lens built in the spherical camera 1, the contour extracting portion 2 extracts a contour, compresses information, and writes the information in a spherical mapping image memory 2a built in the contour extracting portion 2. The contour of an object can be extracted by detecting with differentiation points where the brightness in the image is maximized.

Next, the line segment extracting portion 3 extracts a line segment on the sphere (hereinafter called a great circle) by concentrating the line segment into a point in the spherical mapping process. The process for extracting a line segment is an important process in the three-dimensional (stereoscopic) measurement system, and the major portion of processing time is spent for the process. For example, to extract the line segment, the polar transformation portion 3a transforms each contour to a great circle by the spherical mapping, and writes information on each great circle into the mapping memory 3b. The address of the mapping memory 3b is given by the longitude $\alpha$ and latitude $\beta$ indicating a point P on a sphere CB as indicated in FIG. 3. Each cell designated by the address in the mapping memory 3b is constituted by, for example, a counter, and the counter is incremented by one every time a writing operation is carried out. After all the contour points are transformed to great circles by the spherical mapping, the S point detection portion 3c scans the respective cells in the mapping memory 3b, and obtains a peak position of the count values. The peak position is the pole (point S) of the line segment as explained with reference to FIG. 1B. Thus, a line segment is extracted.

Based on the "point" data extracted by the concentration of a line segment as explained above, the three-dimensional measurement thereafter is easily carried out (cf., for example, the international laid-open WO90/16037 by Morita et al.). When the "point" data is input into the line segment measurement portion 4, the three-dimensional data (orientation and distance) of a straight line portion in a screen is output. For example, the spherical camera 1 is moved in a straight direction when measuring an orientation of a line segment. The above-mentioned operation of extracting a line segment is repeated for the successively obtained images. FIG. 4 is a diagram illustrating relative locations of the line segment and the camera when the spherical camera 1 is moved in a straight direction. The poles S, S', S", . . . on the sphere, corresponding to the relatively moved line segment L, L', L" . . . , line up on a great circle. When performing the spherical mapping for the respective points, and drawing great circles R, R', R", . . . , the intersecting point Ss of the great circles is a pole of a great circle on which the poles S, S', S", . . . lie. The vector directed from the center of the sphere to the point Ss is parallel to the actual line segment L. Thus, an orientation of the line segment is obtained. Geometrically, the point Ss is a point generated by projecting a vanishing point at infinity on the line segment L onto the sphere. Namely, the orientation of the line segment is determined based on theory of the perspective projection method. The extracted poles S, S', S", . . . are respectively transformed to great circles by the spherical mapping, and the information on the great circles are written in the mapping memory. The mapping memory is scanned to obtain a peak position of the count values as a vector of an orientation of the line segment. As understood from FIG. 4, the point Ss corresponds to a group of parallel lines The principle of measuring a depth to the object is explained below. First, a process of measuring a distance from a camera to a point P on a two-dimensional plane is explained with reference to FIG. 5A. When the camera is moved as $C^0$, $C^1$ $C^2$, . . . , the direction in which the point P is viewed varies as $Sk^0$, $Sk^1$, $Sk^2$, . . . . When drawing straight lines in the directions in respective timings, these lines cross at a point P. Therefore, when the intersecting point P is obtained, the distance from the initial position $C^0$ of the camera to the point P of the object is given by the length of the line segment $C^0P$. An operation similar to the above is carried out on a sphere. In FIG. 5B, the plane on the right side corresponds to FIG. 5A, and placed in perpendicular to the line segment OΣ. The correspondence between the plane and the sphere is indicated by dashed lines, and the direction of the movement of the camera is indicated by V. It is assumed that the point P is viewed as $P^0$, $P^1$, $P^2$, . . . , and is projected on the sphere as $Sk^0$, $Sk^1$, $Sk^2$ when the camera is moved by a pitch $\Delta x^0$. The point Σ is a pole of the great circle R generated by mapping the trace of the point P, and is obtained as an intersecting point of a group of great circles obtained from the points $Sk^0$, $Sk^1$, $Sk^2$ by the spherical mapping. A time axis (τ-axis) is assumed on a quarter circle from the point Σ to the end point v of the vector V on a circle R' passing through the points v and Σ, and the point Σ is assumed to correspond to τ=0, i.e., $C^0$. The points the lengths (expressed by angles) on the sphere to which from the point $C^0$ are equal to τ=arctan (iη) (i=1, 2, . . . ) are denoted by $C^1$, $C^2$, . . . , where η=Δx0/R0. This operation means to plot the points $C^0$, $C^1$, $C^2$, . . . with a pitch of 1/R0 on the plane on the right side in FIG. 5B. As understood by making i→∞ in the above equation of τ, the end point v corresponds to a point at infinity.

Next, considering that a straight line on a plane corresponds to a great circle on a sphere, the point $C^0$ and the point $Sk^0$, the point $C^1$ and the point $Sk^1$, the point $C^2$ and the point $Sk^2$, . . . , are connected by great circles, respectively. The great circles thus obtained cross at a point Q. Thus, the distance from the initial position $C^0$ of the camera to the point P is given by the product of R0 and a tangent of the length of the arc $C^0Q$, where lengths on the sphere are expressed by angles.

Next, the above "point" data is input into the cylinder measurement portion 5, the three-dimensional data (an orientation, a distance, and a diameter) is output therefrom. As explained before, parallel lines are obtained, the cylinder and the diameter thereof can be obtained from the parallel lines, and the orientation and the distance are also obtained in the same way as the case of the line segment.

Although almost all of the environmental conditions can be measured by the straight lines and the cylinders as above in the artificial environment such as an industrial plant, raw "point" data may be input into the point measurement portion 6 (shown in FIG. 2) to perform three-dimensional measurement the location of each point in the space when it is required to recognize environmental conditions other than the above.

2.2 The above three-dimensional measurement system contains the following problems. One of the problems is to increase the speed of the operation and to reduce the size of the system, and the other is to suppress interference.

As explained above, the major portion of the processing time is spent for the process of extracting a line segment in the three-dimensional measurement using the fisheye lens. The major reason is that each point of an input image is transformed by the spherical mapping to extract the line segment, i.e., each point in the input image is transformed to a great circle on a sphere increasing the dimension. When the size of the input image is assumed to be N×N, the spherical mapping is required to transform each point to a great circle having a length N. The amount of processing to $N^3$, which is N times the data amount $N^2$ in the input image, is required to transform each point to a great circle having a length N, and this makes increasing the speed of the operation difficult. Although parallel provision of hardware may increase the speed, this increases the hardware size. Thus, both the increase in speed and reduction of hardware size are required at the same time.

In the case where another great circle exists in an orientation near the direction of the great circle corresponding to the object under measurement, in the operation of extracting a line segment by the spherical mapping, the accuracy of the extracted line segment is deteriorated due to interference of the two great circles. For example, in the case where ridge-lines AL and BL of solid bodies A and B cross at an angle near 180° as indicated in FIG. 6, these ridge-lines interfere with each other, and are detected as an obscure line. Namely, precise line detection is impossible. To perform precise measurement of an object in a complicated environment, the extraction of a line segment with suppressed interference is required together with the increase in speed and reduction of size.

2.3 It is necessary to recognize three-dimensional conditions of the environment of a robot when the robot moves or controls an automatic operation thereof. There are two methods for recognizing three-dimensional conditions of the environment. One method is the "binocular stereopsis" whereby the depth is measured in accordance with the principle of trigonometrical survey using the binocular parallax between the right and left eyes, and the other is the "kinetic stereopsis" whereby the three-dimensional (stereoscopic) perception is obtained using the motion parallax generated by moving of a viewer. The "binocular stereopsis" has been developed for years. Although it is necessary to extract corresponding portions in the images obtained by right and left eyes, the extraction of the corresponding portions is difficult by the conventional technique.

FIG. 7 is a diagram for explaining the principle of the "binocular stereopsis". In FIG. 7, it is assumed that objects are placed at the two points A and B on a plane. Although only the directions toward the objects A and B from the two eyes can be recognized, respectively, the depth to each of the objects A and B is recognized as an intersecting point at which the directions of the two eyes cross. Namely, as indicated in FIG. 8, the depth D is obtained by the following equation, $$D = d/(\tan \rho_L + \tan \rho_R)$$

where d denotes a distance between two eyes, $\rho_L$ and $\rho_R$ denote angles between the direction perpendicular to the line on which the two eyes lie, and the lines of sight by the left and right eyes, respectively.

However, the directions of the two eyes cross at other points. Namely, the direction of the left eye seeing the object A crosses with the direction of the right eye seeing the object B at the point β. The point β is an untrue (false) point. Similarly, an untrue point α may be generated. These untrue points must be eliminated in the "binocular stereopsis".

Since the capability of recognizing a shape of an object is developed in a human cerebrum, a human being can easily eliminate the untrue points. However, in the conventional technique of the "binocular stereopsis", it is difficult to precisely recognize the corresponding points, and therefore the development of the technique of precisely recognizing the corresponding points is required.

SUMMARY OF THE INVENTION

A first object of the present invention is to provide an image processing process and apparatus wherein the processing speed is increased and the size thereof can be reduced.

A second object of the present invention is to provide an image processing process and apparatus whereby a line segment can be precisely extracted without interference with another line segment.

A third object of the present invention is to provide an image processing process and apparatus wherein the amount of filter processing can be reduced, thereby filtering with a large mask is possible, and a line segment can be precisely extracted from an obscure image.

A fourth object of the present invention is to provide an image processing process and apparatus whereby an edge can be extracted, and a line and a gap can be prominently extracted.

A fifth object of the present invention is to provide a correlation processing process and apparatus wherein the corresponding points in a plurality of images can be determined with a simple procedure and a small amount of processing, and the function of the binocular stereopsis can be realized.

A sixth object of the present invention is to provide an image processing process and apparatus whereby a moving object can be traced based on correspondence between images at different times, and the direction and the velocity of the movement can be measured.

A seventh object of the present invention is to provide a correlation processing process and apparatus which can be applied to a texture analysis for examining a degree of similarity of a pattern.

An eighth object of the present invention is to provide a correlation processing process and apparatus whereby the binocular stereopsis, the pursuit of a moving object, and the texture analysis can be certainly performed by carrying out color correlation by using three primary colors, three essential color elements, or the like.

A ninth object of the present invention is to provide a correlation processing process and apparatus whereby corresponding tangential lines (a line, a gap, and an edge) in a plurality of figures can be obtained, and the location, the orientation, the parallax, and the velocity can be quantitatively obtained.

A tenth object of the present invention is to provide a correlation processing process and apparatus wherein precise filtering can be performed, and the process and apparatus can be applied to the "extraction of a feature which is seen as the same by the left and right eyes", the "pursuit of the same feature as the preceding image", and the like.

An eleventh object of the present invention is to provide a correlation processing process and apparatus whereby the binocular stereopsis and the pursuit of an object having an obscure contour are carried out by using gradual variations of brightness and hue, and the like as a clue.

According to the first aspect of the present invention, there is provided an image processing process containing: a first step for dividing an original image into small areas; a second step for applying polar transformation to the original image in each of the small areas; and a third step for performing image processing on the result of the polar transformation.

Stated in more detail, there is provided an image processing process containing: a first step for dividing an original image into small areas; a second step for obtaining a curve on a predetermined dual plane corresponding to each pixel in the original image in each of the small areas; a third step for obtaining a polar-transformed image on the dual plane by accumulatively storing in a memory having a storage area for each pixel on the dual plane, a value of each pixel in the original image, as a value of each pixel through which the curve obtained by the polar transformation passes on the dual plane; and a fourth step for performing image processing on the polar-transformed image on the dual plane for each of the small areas.

Stating more in detail, there is provided an image processing process containing: a first step for dividing an original image into small areas; a second step for obtaining a curve on a predetermined dual plane corresponding to each pixel in the original image in each of the small areas; a third step for obtaining a polar-transformed image on the dual plane by accumulatively storing in a memory having a storage area for each pixel on the dual plane, a value of each pixel in the original image, as a value of each pixel through which the curve obtained by the polar transformation passes on the dual plane; and a fourth step for performing image processing on the polar-transformed image on the dual plane for each of the small areas.

According to the second aspect of the present invention, there is provided an image processing process containing: a first step for dividing an original image into small areas; a second step for applying polar transformation to the original image in each of the small areas; a third step for applying one-dimensional filtering to the result of the polar transformation; and a fourth step for performing image processing on the result of the third step.

Stated in more detail, there is provided an image processing process containing: a first step for dividing an original image into small areas; a second step for obtaining by a predetermined polar transformation a curve on a predetermined dual plane corresponding to each pixel in the original image in each of the small areas; a third step for obtaining a polar-transformed image on the dual plane by accumulatively storing in a memory having a storage area for each pixel on the dual plane, a value of each pixel in the original image, as a value of each pixel through which the curve obtained by the polar transformation passes on the dual plane; a fourth step for applying one-dimensional filtering on the polar-transformed images for each of the small areas; and a fifth step for performing image processing on the dual plane in which the one-dimensional filtering has been applied.

Stated in more detail, there is provided an image processing process containing: a first step for dividing each of a plurality of original images into small areas; a second step for obtaining a curve on a predetermined dual plane corresponding to each pixel in the original image in each of the small areas, for each of a plurality of original images; a third step for obtaining a polar-transformed image on the dual plane by accumulatively storing in a memory having a storage area for each pixel on the dual plane, a value of each pixel in the original image, as a value of each pixel through which the curve obtained by the polar transformation passes on the dual plane; and a fourth step for obtaining correlation between the polar-transformed images obtained in the third step for the plurality of original images.

According to the third aspect of the present invention, there is provided an image processing process containing: a first step for dividing each of a plurality of original images into small areas; a second step for applying polar transformation to the original image in each of the small areas, for each of the plurality of original images; and a third step for obtaining correlation between the results of the polar transformation obtained in the second step for the plurality of original images.

Stated in more detail, there is provided an image processing process containing: a first step for dividing each of a plurality of original images into small areas; a second step for obtaining a curve on a predetermined dual plane corresponding to each pixel in the original image in each of the small areas, for each of a plurality of original images; a third step for obtaining a polar-transformed image on the dual plane by accumulatively storing in a memory having a storage area for each pixel on the dual plane, a value of each pixel in the original image, as a value of each pixel through which the curve obtained by the polar transformation passes on the dual plane; and a fourth step for obtaining correlation between the polar-transformed images obtained in the third step for the plurality of original images.

Further, the third aspect of the present invention includes the following aspects.

(1) An image processing process containing: a first step for dividing each of first and second original images into small areas; a second step for obtaining first and second polar-transformed images on the original images by applying polar transformation to each of the small areas in each of the first and second original images; a third step for obtaining a shifted image by shifting one or more coordinates among a plurality of coordinates determining a location of each pixel on the dual plane for one of the first and second polar-transformed images; a fourth step for obtaining a correlation value between the other of the first and second polar-transformed images and the shifted image, varying shift value(s) of the one or more coordinates within predetermined range(s), respectively; and a fifth step for obtaining shift value(s) and the plurality of coordinates which maximize the correlation value.

(2) An image processing process containing: a first step for dividing each of first and second original images into small areas, where the first original image is shot at a first time, and the second original image is shot at a second time; a second step for obtaining first and second polar-transformed images on the original images by applying polar transformation to each of the small areas in each of the first and second original images; a third step for obtaining a shifted image by shifting one or more coordinates among a plurality of coordinates determining a location of each pixel on the dual plane for one of the first and second polar-transformed images; a fourth step for obtaining a correlation value between the other of the first and second polar-transformed images and the shifted image, varying shift value(s) of the one or more coordinates within predetermined range(s), respectively; and a fifth step for obtaining shift value(s) and the plurality of coordinates which maximize the correlation value.

(3) An image processing process containing: a first step for dividing an original image into a plurality of small areas; a second step for obtaining a polar-transformed image by applying polar transformation to the original image in each of the small areas; a third step for obtaining a shifted image by shifting one or more coordinates among a plurality of coordinates determining a location of each pixel on the dual plane for the polar-transformed image for a first small area among the plurality of small areas; a fourth step for obtaining a correlation value between the polar-transformed image obtained in the second step for a second small area and the shifted image obtained in the third step for the first small area, varying shift value(s) of the one or more coordinates within predetermined range(s), respectively; a fifth step for obtaining shift value(s) and the plurality of coordinates which maximize the correlation value; and a sixth step for performing the operations of the third to fifth steps, varying the combination of the first and second small areas.

(4) An image processing process containing: a first step for separating first and second color original images into first, second, and third original images respectively comprised of intensity distributions of three elements determining a color image; a second step for dividing each of first, second, and third original images into small areas; a second step for obtaining a polar-transformed image on the original images by applying polar transformation to each of the small areas in each of first, second, and third original images; a third step for obtaining a shifted image by shifting one or more coordinates among a plurality of coordinates determining a location of each pixel on the dual plane for one of the first and second polar-transformed images; a fourth step for obtaining a correlation value between the other of the first and second polar-transformed images and the shifted image, varying shift value(s) of the one or more coordinates within predetermined range(s), respectively; and a fifth step for obtaining shift value(s) and the plurality of coordinates which maximize the correlation value.

(5) An image processing process containing: a first step for separating first and second color original images into first, second, and third original images respectively comprised of intensity distributions of three elements determining a color image; a second step for dividing each of first, second, and third original images into small areas; a second step for obtaining a polar-transformed image on the original images by applying polar transformation to each of the small areas in each of first, second, and third original images; a third step for obtaining a shifted image by shifting one or more coordinates among a plurality of coordinates determining a location of each pixel on the dual plane for one of the first and second polar-transformed images; a fourth step for obtaining a correlation value between the other of the first and second polar-transformed images and the shifted image, varying shift value(s) of the one or more coordinates within predetermined range(s), respectively; and a fifth step for obtaining shift value(s) and the plurality of coordinates which maximize the correlation value.

(6) An image processing process containing: a first step for dividing an original image into a plurality of small areas; a second step for obtaining a polar-transformed image by applying polar transformation to the original image in each of the small areas; a third step for obtaining a shifted image by shifting one or more coordinates among a plurality of coordinates determining a location of each pixel on the dual plane for the polar-transformed image for a first small area among the plurality of small areas; a fourth step for obtaining a correlation value between the polar-transformed image obtained in the second step for a second small area and the shifted image obtained in the third step for the first small area, varying shift value(s) of the one or more coordinates within predetermined range(s), respectively; a fifth step for obtaining a summed correlation value by summing the correlation value for the shift value(s) and the one or more of the plurality of coordinates other than at least one of the shift value(s) and the one or more of the plurality of coordinates; and a sixth step for obtaining the at least one of the shift value and the plurality of coordinates which maximize the summed correlation value (7) An image processing process containing: a first step for dividing into small areas each of first and second original images among a plurality of original images which are respectively made by shooting an object at a plurality of times, where the first original image is shot at a first time, and the second original image is shot at a second time; a second step for obtaining first and second polar-transformed images on the original images by applying polar transformation to each of the small areas in each of the first and second original images; a third step for obtaining a shifted image by shifting one or more coordinates among a plurality of coordinates determining a location of each pixel on the dual plane for one of the first and second polar-transformed images; a fourth step for obtaining a correlation value between the other of the first and second polar-transformed images and the shifted image, varying shift value(s) of the one or more coordinates and the time difference between the first and second times within predetermined ranges, respectively; and a fifth step for obtaining a summed correlation value by summing the correlation value for the shift value(s) and the one or more of the plurality of coordinates other than at least one of the shift value(s), the time difference, and the one or more of the plurality of coordinates; and a sixth step for obtaining the at least one of the shift value, the time difference, and the plurality of coordinates which maximize the summed correlation value.

(8) An image processing process containing: a first step for dividing an original image into a plurality of small areas; a second step for obtaining a polar-transformed image by applying polar transformation to the original image in each of the small areas; a third step for obtaining a shifted image by shifting one or more coordinates among a plurality of coordinates determining a location of each pixel on the dual plane for the polar-transformed image for a first small area among the plurality of small areas; a fourth step for obtaining a correlation value between the polar-transformed image and the shifted image in a parameter space, varying shift value(s) of the one or more coordinates within predetermined range(s), respectively, where the shift value(s) and the plurality of coordinates determining the location are parameters in the parameter space; a fifth step for obtaining a summed correlation value by summing the correlation value for a predetermined point in the parameter space; and a sixth step for obtaining the at least one of the shift value and the plurality of coordinates which maximize the summed correlation value, where the at least one of the shift value and the plurality of coordinates correspond to the point in the parameter space.

(9) An image processing process containing: a first step for dividing into small areas each of first and second original images among a plurality of original images which are respectively made by shooting an object at a plurality of times, where the first original image is shot at a first time, and the second original image is shot at a second time; a second step for obtaining first and second polar-transformed images on the original images by applying polar transformation to each of the small areas in each of the first and second original images; a third step for obtaining a shifted image by shifting one or more coordinates among a plurality of coordinates determining a location of each pixel on the dual plane for one of the first and second polar-transformed images; a fourth step for obtaining a correlation value between the other of the first and second polar-transformed images and the shifted image in a parameter space, varying shift value(s) of the one or more coordinates and the time difference between the first and second times within predetermined ranges, respectively, where the shift value(s), the time difference, and the plurality of coordinates determining the location are parameters in the parameter space; and a fifth step for obtaining a summed correlation value by summing the correlation value for a predetermined point in the parameter space; and a sixth step for obtaining the at least one of the shift value, the time difference, and the plurality of coordinates which maximize the summed correlation value, where the at least one of the shift value, the time difference, and the plurality of coordinates correspond to the point in the parameter space.

BRIEF DESCRIPTION OF THE DRAWINGS

In the drawings:

FIGS. 11A and 11B are diagrams for explaining visual information processing by a mammalian and a simulation model thereof;

FIGS. 28A, 28B, 28C, 28D, 28E, 28F, and 28G are diagrams for explaining a principle of a one-dimensional filter according to the second aspect of the present invention;

FIGS. 29A, 29B, 29C, and 29D are diagrams indicating a result of a simulation by a two-dimensional convolution+the receptive field method;

FIGS. 30A, 30B, 30C, and 30D are diagrams indicating a result of a simulation by the receptive field method+a one-dimensional convolution;

FIG. 32 is a diagram illustrating an embodiment of the second aspect of the present invention;

FIG. 33 is a diagram illustrating a construction of the polar transformation circuit;

FIGS. 37A, 37B, 37C, and 37D are diagrams indicating the results of simulations by the two-dimensional second differential filters+the polar transformation+the one-dimensional differential filter;

FIGS. 41A and 41B are diagrams illustrating the result of extraction of an edge by a construction using a skeleton filter;

FIGS. 41C and 41D are cross-sectional views of the contouring maps of FIGS. 41A and 41B, respectively;

FIGS. 50A, 50B, and 50C are diagrams for illustrating the constructions of various line extraction filters;

FIGS. 52A, 52B, 52C, and 52D are diagrams for illustrating the constructions of various edge extraction filters;

FIG. 58 is a diagram illustrating a construction of a line-only extraction filter;

FIG. 61 is a diagram illustrating a construction of a positive-negative-separation-type multi-filter for extracting a line;

FIGS. 66A and 66B are diagrams for explaining a multi-filter having a construction comprised of a two-dimensional gas-filter+one-dimensional gr-filter;

FIG. 68 is a diagram for illustrating the basic construction of the third aspect of the present invention;

FIGS. 72A and 72B are first diagrams for explaining a result of a simulation;

FIG. 77 is a block diagram of correlation filtering between images different in time;

FIG. 78 is a block diagram of correlation filtering between images different in time and space;

FIG. 81 is a block diagram illustrating the correlation filtering between different color images (three primary colors);

FIG. 82 is a block diagram illustrating the correlation filtering between different color images (three color elements);

FIG. 83 is a block diagram illustrating the correlation filtering between different color images (color difference signals);

FIG. 84 is a block diagram of ρ-axis correlation filtering for the same θ;

FIG. 85 is a block diagram of ρ-axis correlation filtering for different θ's;

FIGS. 86A, 86B, 86C, and 86D are diagrams for explaining correlation in the θ-direction;

FIG. 87 is a block diagram of θ-axis correlation filtering for the same ρ;

FIGS. 95A and 95B are second diagrams indicating a result of a simulation (the three-dimensional view of an edge by two eyes);

FIG. 101 is a block diagram for measuring a moving direction and velocity;

FIGS. 105A, 105B, 105C, 105D, and 105E are diagrams for explaining a result of a simulation (moving direction and velocity of a line);

FIGS. 106A, 106B, 106C, 106D, and 106E are diagrams for explaining a result of a simulation (moving direction and velocity of an edge);

FIGS. 108A, 108B, and 108C are diagrams for explaining the three-dimensional view of an edge of an arbitrary figure by two eyes;

FIGS. 111A, 111B, 111C, and 111D are diagrams for explaining a result of a simulation by the three-dimensional view of a random dot image by two eyes;

FIGS. 112A, 112B, and 112C are diagrams for explaining a result of a simulation by the three-dimensional view of a random dot image by two eyes;

FIGS. 117A, 117B, 117C, and 117D are diagrams for explaining a result of a simulation of the detection of a circle.

DESCRIPTION OF THE PREFERRED EMBODIMENTS

1. First Aspect of Present Invention 1.1 Basic Construction of First Aspect of Present Invention FIG. 9 is a diagram illustrating the basic construction of the first aspect (the receptive field method) of the present invention.

Figure 9:
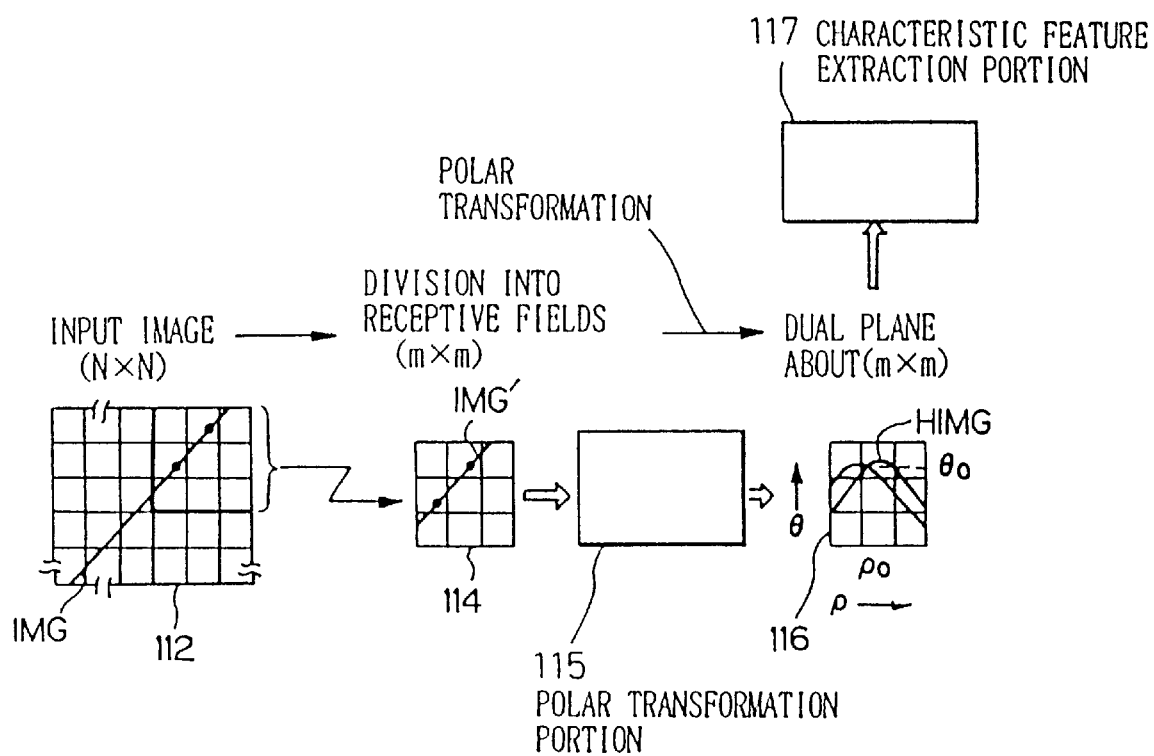
FIG. 9 is a diagram illustrating the basic construction of the first aspect of the present invention.

In FIG. 9, reference numeral 112 denotes an input memory for storing an image (input image) IMG of an object of a size equal to N×N, where the image is projected on a predetermined input plane. Reference numeral 114 denotes a receptive field memory for storing an image in each receptive field when the input plane is divided into receptive fields which are small areas of a size equal to m×m. Reference numeral 115 denotes a polar transformation portion for applying polar transformation to the image (receptive field image) in each receptive field, 116 denotes a hypercolumn memory for storing an image (hypercolumn image) on a polar-transformed dual plane (hypercolumn plane), and 117 denotes a characteristic feature extraction portion for extracting characteristic feature such as a line, a cylinder, a point, and the like.

The input plane of the image IMG of the object, having a size equal to N×N, is divided into receptive fields (IMG') which are small areas of a size equal to m×m, the polar transformation is applied to each receptive field image, and image processing is performed based on an output (hypercolumn image) of the polar transformation to extract a characteristic feature. The polar transformation may be polar transformation on a sphere (spherical mapping), polar transformation on a cylinder, polar transformation on a plane, or polar transformation on the other arbitrary surface. Since the polar transformation is required to be applied only to the image within the receptive field of the size equal to m×m, and in the polar transformation on a sphere, it is required to draw only a great circle having a length equal to m for each pixel in the receptive field of the size equal to m×m, so the amount of processing becomes m×$N^2$. Namely, the amount of processing is remarkably reduced compared with the conventional case wherein a great circle of a length equal to N is drawn (and the required amount of processing to $N^3$), and the size of the hardware can also be reduced. In addition, since each receptive field can be processed independent of the processing for the other receptive field, interference can be suppressed. Further, since threshold values can be set independently for each receptive field, a dark portion and a portion at which brightness gradually varies, can be detected.

When an object is caught with an arbitrary lens by dividing an image projected on a predetermined projection plane, for example, a sphere (fisheye lens), a cylinder (cylindrical lens), or a plane (standard, telephoto) into receptive fields which are small areas, applying the polar transformation to the image in each receptive field, and performing image processing based on the polar-transformed output, high speed processing and downsizing are possible, and interference can be suppressed.

1.2 Division into Receptive Fields

Since, in retinae and cerebra of mammals, the length of synapse which extends from each neuron is small (less than a few millimeters), an image is processed with the image divided into small areas. Each divided area in a retina is called a receptive field, and each receptive field contains about one thousand retinal cells. Each retinal cell in the receptive field is connected to the visual area in the cerebrum to perform processing to extract a line segment. The visual area is divided into unit areas corresponding to the receptive fields, and each unit area is called a hypercolumn. The "processing with a unit-divided structure" is not specific to the eye or the hypercolumn, and is a general structure of the cerebrum. It is considered that this shows the efficiency of the nature to reduce the total amount of synapses which are required to perform the processing.

Figure 10:
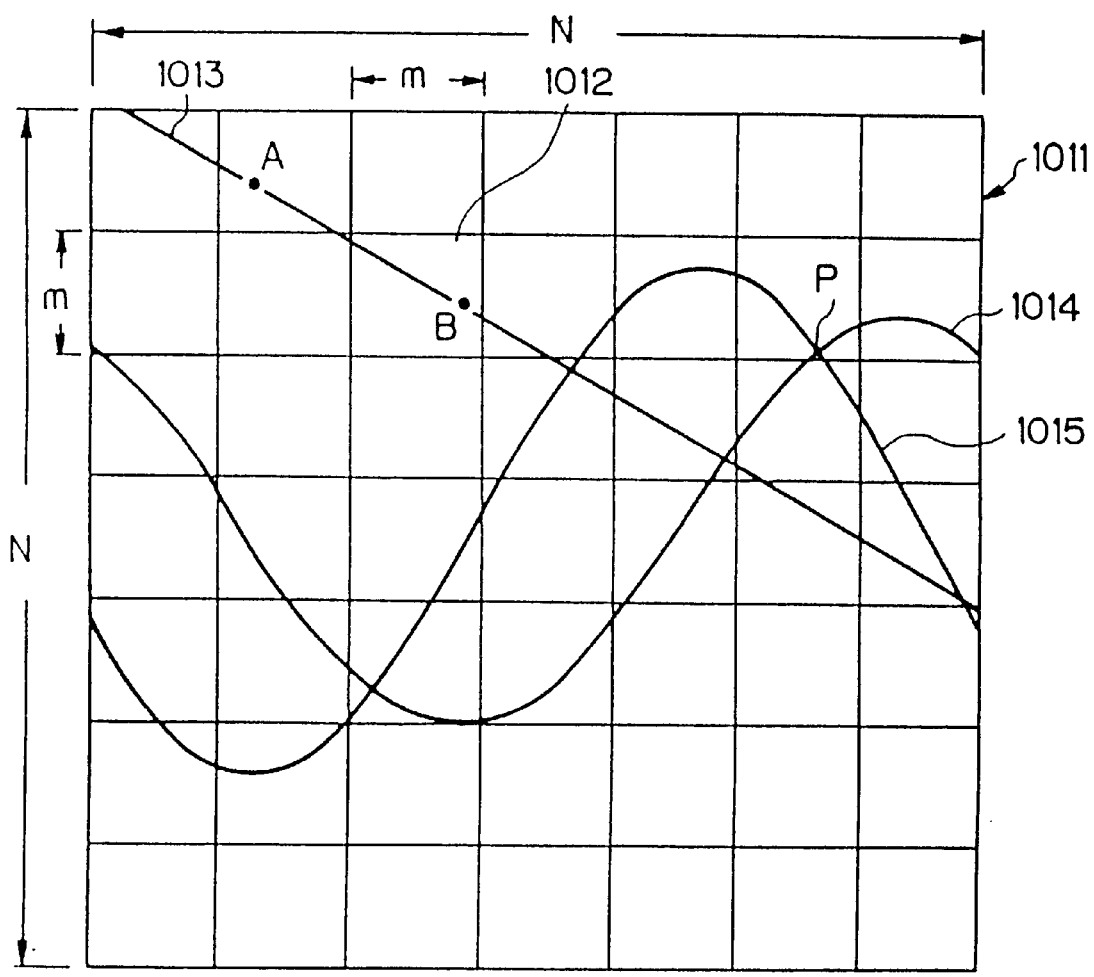
FIG. 10 is a diagram for explaining a division into receptive fields.

Taking a hint from the above, the amount of processing for extraction of a line segment is considered below for the case where an image input into a camera, containing N×N pixels, is divided into units of m×m pixels. FIG. 10 is a diagram for explaining the division into receptive fields.

In FIG. 10, an input is projected onto a plane, and polar transformation is performed on a cylinder. This is the simplest polar transformation. Reference numeral 1011 denotes a plane mapping memory of N×N pixels, 1012 denotes a receptive field (indicated by a small square) of m×m pixels, 1013 denotes a line segment projected on a plane, and 1014 and 1015 each denote a sine wave obtained by polar transforming on a cylinder two points A and B on the line segment. The two sine waves cross at a point P, and the line segment 1013 is detected as the crossed point by the polar transformation on the cylinder.

Since great circles (approximated as sine waves) are drawn for the number of the input pixels in the case where the receptive field division is not performed (m=N), the amount Pm=N of the processing in the case is given as below.

$$Pm=N = \text{(the number of the input pixels)} \times \quad (1)$$

$$\text{(the length of a great circle)}$$

$$= N^2 \times N = N^3$$

On the other hand, when the image memory area of N×N pixels is divided into squares 1012 where the length of a side thereof is equal to m, a great circle is drawn in each hypercolumn, and therefore, the amount of processing becomes $$Pm=m = \text{(the number of the input pixels in a receptive field)} \times \quad (2)$$

$$\text{(the length of a great circle drawn in a hypercolumn)} \times$$

$$\text{(the number of hypercolumns)}$$

$$= \{(m^2) \times (m)\} \times \{(N/m)^2\}$$

$$= m \times N^2$$

$$= Pm=N / (N/m). \quad (3)$$

Namely, the amount of processing is reduced by 1/(N/m).

Hereinafter, the above method wherein the input image is divided and the spherical mapping (precisely the polar transformation or a dual transformation on a sphere) is performed, is denoted as a receptive field method or a hypercolumn method. According to the conventional method wherein the division of the input image is not performed, a great circle is drawn over the whole sphere. Since a line having an infinite length is obtained when inversely projected into the three-dimensional space, the conventional method is denoted as an infinite receptive field method. To make the difference between the hypercolumn method (the receptive field method) and the conventional method clear, the hypercolumn method (the receptive field method) may be called a "finite receptive field method". The reason why the receptive field method is named as the hypercolumn method is that the structure and the function thereof greatly resembles the hypercolumn in the primary visual cortex in the cerebrum.

1.3 Basics of Receptive Field Method 1.3.1 In Case of Plane Projection Input+Polar Transformation on Cylinder The concrete procedure of the receptive field method according to the present invention is explained below for "the plane projection input+the polar transformation (explained later) on a cylinder", where the plane projection input+the polar transformation on a cylinder is the simplest polar transformation. The procedure can be described such that "pixels in each receptive field which is generated by dividing an input image into areas of m×m pixels (generally, the division is made so that there is no gap between adjacent areas), are polar-transformed on a cylinder, and curves (sine waves in the case of the polar transformation on a cylinder) obtained by the polar transformation are drawn on a dual plane". In FIG. 9, reference IMG denotes an image (input image) of an object projected onto a plane, having a size of N×N pixels, IMG' denotes an image of a receptive field (receptive field image) generated by dividing the input image into small areas (receptive fields) of m×m pixels, and HIMG denotes an image on a dual plane (hypercolumn plane) generated by applying polar transformation on a cylinder to the receptive field images (pixels A, B, . . . ).

1.3.2 In Case of Sphere Projection Input+Polar Transformation on Sphere

In the case of "the sphere projection input+the polar transformation on a sphere", the above sine waves as the curves can be changed to great circles. The basic steps are explained below.

(a) An image projected on a sphere is divided into small areas (receptive fields);

(b) Each pixel in the receptive field is polar-transformed on a sphere (a great circle corresponding to each pixel is drawn); and (c) The whole receptive field is polar-transformed to a band on the sphere. Since the size of the receptive field is generally small, the band is developed on a plane. This is the dual plane (hypercolumn plane) corresponding to each receptive field.

The polar transformation in (b) can be approximated as "pixel→sine wave", and the polar transformation between the receptive field and the hypercolumn can be expressed as "each pixel in a receptive field is transformed to a corresponding sine wave on a hypercolumn". The respective axes in the hypercolumn are provided so that a location ρ and an orientation θ of a line in a receptive field can be indicated. A line segment in an image plane (receptive field) is detected as an intersecting point of the sine waves, and the coordinate $\rho_0$, $\theta_0$ of the intersecting point indicates the location and the orientation of the line segment in the receptive field. As explained later, the above flow can be applied in the general polar transformation, and speed-up in processing and suppression of interference are effected.

1.4 Cerebral Visual Cortex Model

A procedure similar to the above is operating in a primary visual cortex in a mammalian. FIG. 11A is a diagram for explaining visual information processing by a mammalian and FIG. 11B for a simulation thereof. The flow of the visual information processing in the mammalian primary visual cortex, from the division into receptive fields on a round eyeball, to the transformation to the hypercolumns, can be understood as follows.

(a) A scene is projected inside of the round eyeball to obtain a wide range of visual area almost up to 180 degrees (input of an image);

(b) Second differentiation is performed in the retina and the concentric antagonistic receptive field in the lateral geniculate nucleus (corpus geniculatum laterale) KNE, and a contour of the image is emphasized. The receptive field can be expressed by connections diverging in directions forming a cone (enhancement of a contour); and (c) In the first visual area (hypercolumn), a line segment (a line, an edge, and a gap) in the image can be extracted for orientations with a pitch of about ten degrees (extraction of a line segment).

Each neuron extends thousands of synapses, and receives signals from thousands of synapses. Mathematically, it is considered as a multi-valued mapping. Since the multi-valued mapping is accompanied by expansion and reduction of a dimension, the multi-valued mapping cannot be expressed by a usual transformation such as a linear mapping. However, for extraction of a line segment, the multi-valued mapping can be expressed by polar transformation, and a point (zero dimension) and a line (one dimension) can be transformed to each other varying their dimensions by the polar transformation.

Thus, the modeled processor of visual information in a mammal is indicated in FIG. 11B. In FIG. 11B, reference IMI denotes an image input portion which divides an image projected on a sphere CB into receptive fields RC, where pitches of the centers of the receptive fields and the diameters of the receptive fields are respectively equal to 16 and $16\sqrt{02}$ pixels. Reference OLD denotes a contour extraction portion which is assumed to comprise a two-dimensional DOG filter (σ=2 pixels) of the S channel (see Wilson et al., "Quantitative Characterization of Two Types of Linespread Function Near the Fovea", Vision Research, 18, 971–981, 1978) as expressed by the equation below, and the contour extraction portion calculates a sum of products of the filter function and an input image to emphasize a contour.

$$f(r)=\exp(-r^2/\sigma^2)-0.326 \exp(r^2/(1.75\sigma)^2)$$

Reference PTR denotes a polar transformation portion. The receptive field image in which the contour is emphasized is input into the polar transformation portion. The "polar transformation between the outside knee-like body KNE and the hypercolumn cells (the receptive field method)" and "the principle of extraction of a line segment", are explained below with reference to FIGS. 12A, 12B and 12C.

Figure 12A:
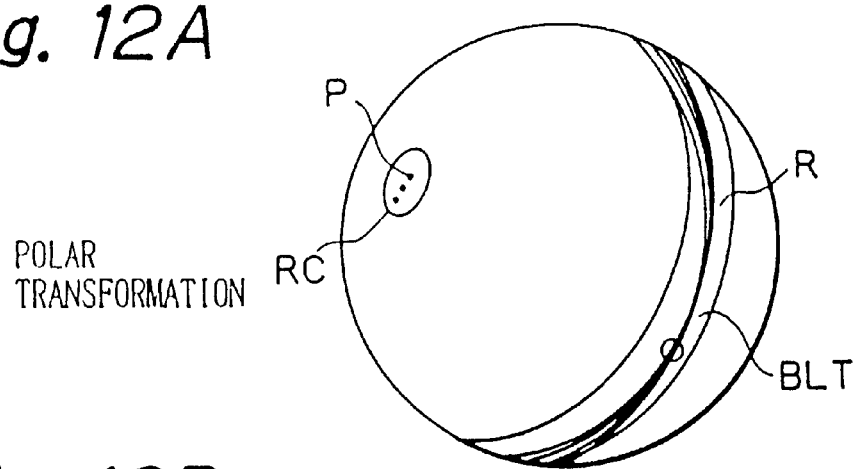
FIGS. 12A, 12B, and 12C are diagrams for explaining a receptive field and a polar transformation in a hypercolumn.
Figure 12B:
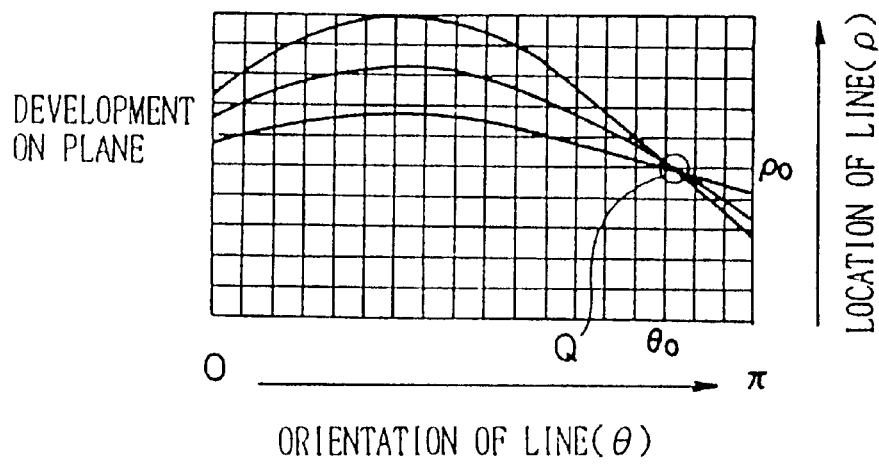
Figure 12C:
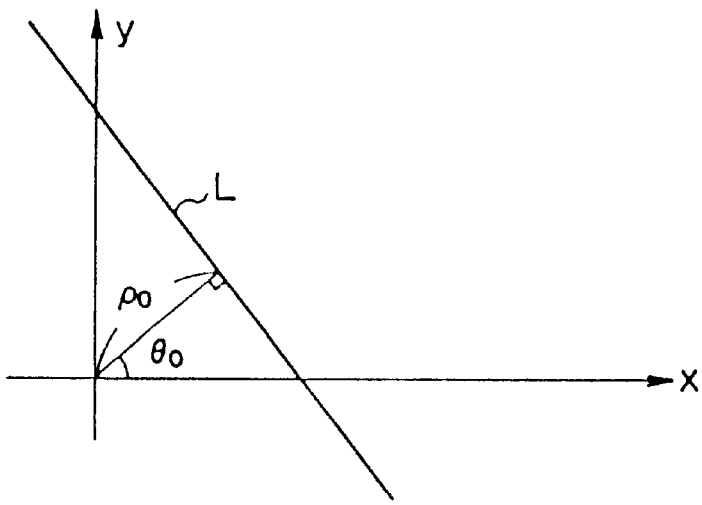

A point P in a receptive field RC is mapped into a great circle (straight line) R by the polar transformation increasing the dimension. By repeating the above process, the whole receptive field is mapped onto a band BLT on a sphere (FIG. 12A). By developing the band on a plane (FIG. 12B), a rectangular lattice having coordinate axes corresponding to the orientation θ and the location ρ of a line, is obtained. This is the mathematical structure of the hypercolumn, where the band BLT corresponds to the hypercolumn, and the lattice points correspond to the hypercolumn cells.

Next, the principle of the extraction of a line segment in the receptive field is explained below. Each cell in the receptive field is multi-valued mapped to a plurality of lattice points (sinusoidal) in the hypercolumn. By repeating this operation, a line segment in the receptive field is extracted as an "intersecting point of sine waves" generated by polar transformation of a point series constituting the line segment. Namely, the intersecting point Q is generated by concentration of a line segment L (FIG. 12C) in the receptive field, and the coordinate values $\theta_0$, $\rho_0$ on the θ- and ρ-axes indicate an orientation and a location of a line segment.

Going back to FIGS. 11A and 11B, reference FDF denotes a first differentiation portion. Although a "narrow line" is detected by the above operation (the DOG filter→polar transformation), "edges (brightness variation portion)" which appear frequently in an image, cannot be detected by the above operation. In order to detect the "edge", a calculation of a sum of products with a first differential filter in the ρ-direction should be applied after the above operation. A multi-filter (with a filter width/ρ-cell pitch=1, 2, 4, 8) is used for detecting an edge at which the variation of brightness is small.

Figure 13:
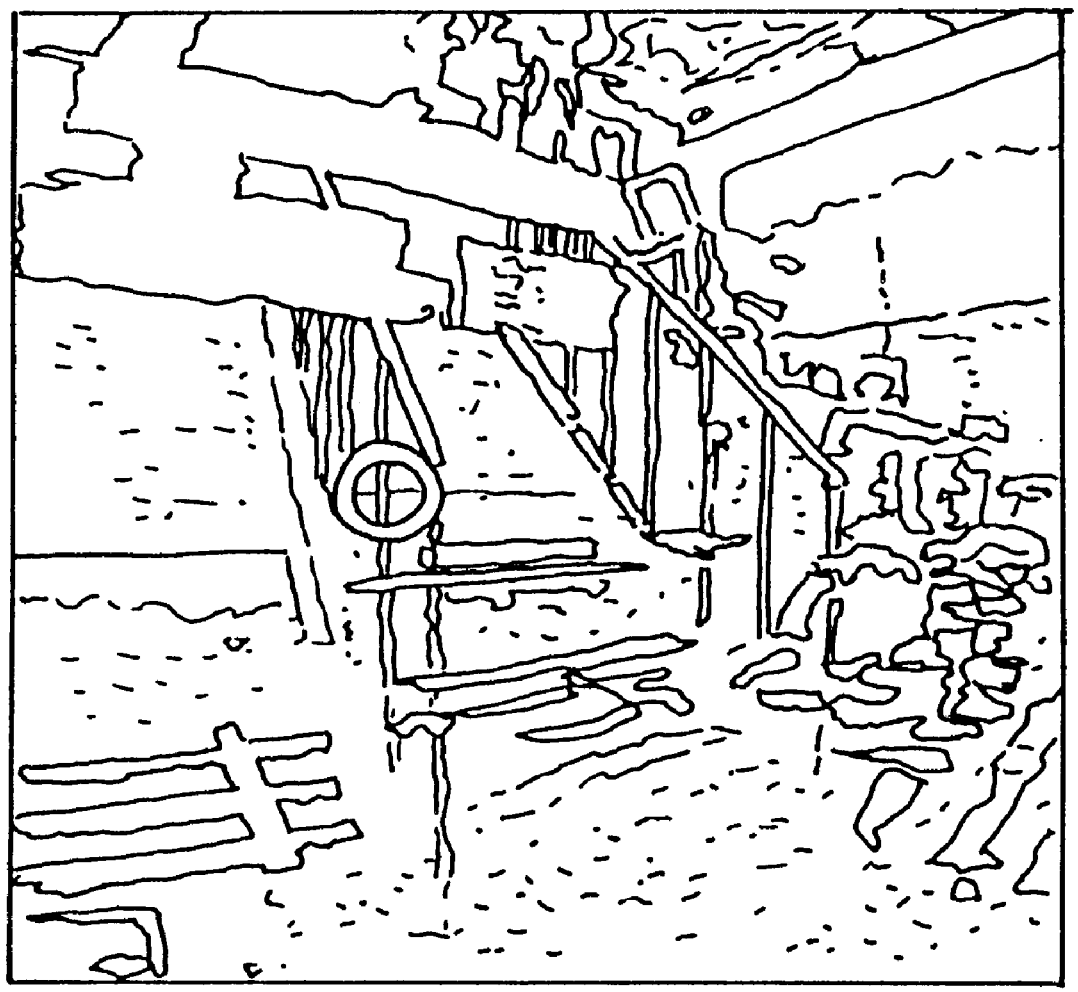
FIG. 13 is a diagram indicating an original image used in a simulation based on the model of the visual cortex of a mammal.
Figure 14:
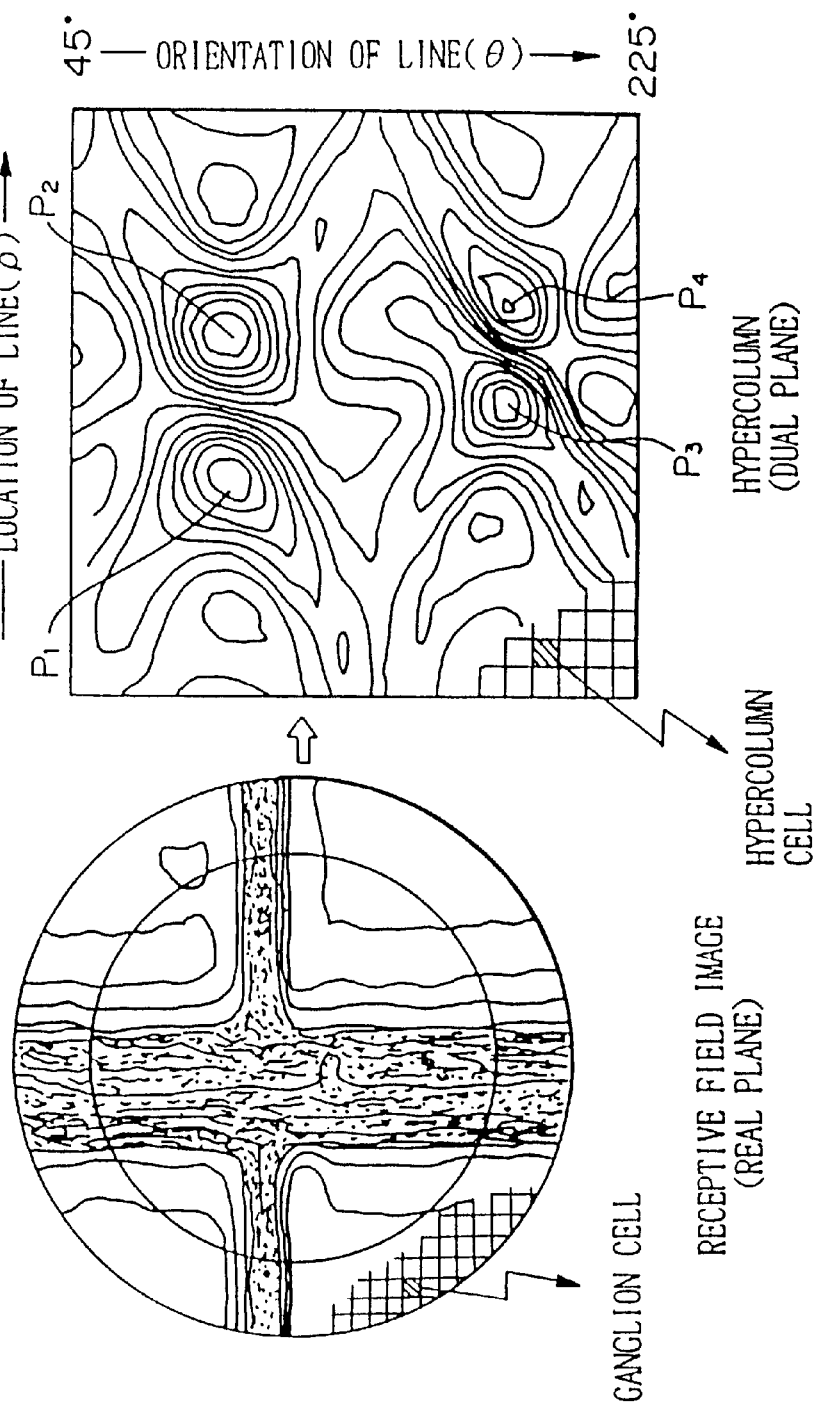
FIGS. 14A and 14B are diagrams for explaining the result of the simulation (an example of a response in a receptive field)

When performing a simulation wherein the size of the input image is 512×512 pixels, and the size of the hypercolumn is 22 cells in the θ-direction and 22 cells in the ρ-direction, based on the above model; the following result is obtained. The response of the hypercolumn cell, obtained by applying "the DOG filter→the polar transformation→the first differentiation" to the receptive field image in the circle in the original image of FIG. 13 (the enlarged image thereof is indicated in FIG. 14A), is obtained as indicated in FIG. 14B. Four edges in the receptive field are extracted as four prominent peaks $P_1$ to $P_4$.

Figure 15:
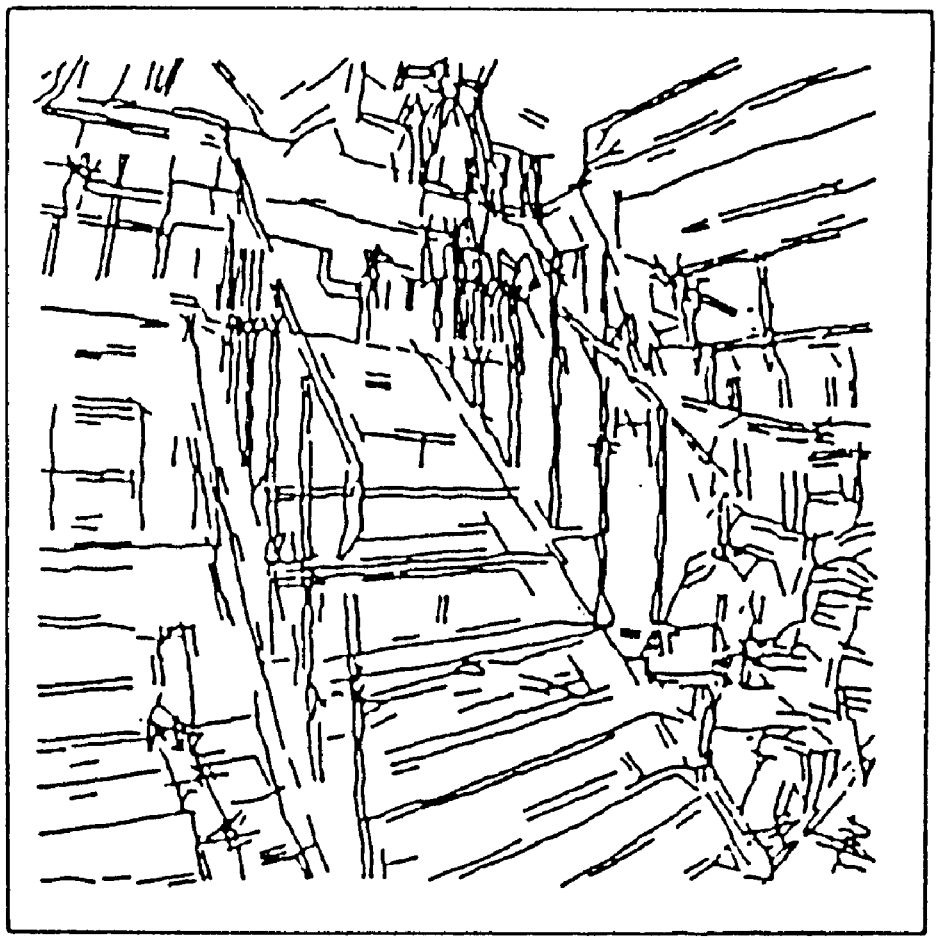
FIG. 15 is a diagram indicating a regenerated image obtained by the simulation.

When extracting all peaks in the whole hypercolumn, angles, locations and lengths of line segments corresponding to the peaks are obtained. Thus, the line segments are obtained, and the image as indicated in FIG. 15 is obtained. In FIG. 15, edges in the whole image are precisely extracted. Although the original image contains portions wherein the variations of the brightness are small, these edges are extracted due to the application of a multi-filter as explained later.

1.5 Expansion to Various Polar Transformations

In the above, only the spherical mapping (polar transformation on a sphere) is explained to simplify understanding. However, the scope of the present invention is not limited to spherical mapping, and general polar transformation can be applied to the present invention. By dividing an arbitrary input plane into small areas, and applying various polar transformations thereto as explained below, the above explained advantages can be expected. The various variations of the polar transformation are explained below.

1.5.1 Polar Transformation in Two-Dimensional Projective Space

As long as the image processing is in consideration, an input is in a two-dimensional surface, and polar transformation in the two-dimensional projective space is utilized. The polar transformation is transformation between "a plane containing an origin of a three-dimensional Affine space" and "a vector (point) passing through the origin and perpendicular to the plane". The transformation in the two dimension can be expressed by assuming an arbitrary surface and expressing an intersecting point with the surface, where a "line" in a broad sense and a point are transformed to each other, expanding/reducing the dimension. A sphere, a cylindrical surface, a plane, and the like are considered as the above arbitrary surface.

1.5.1.1 Polar Transformation on Sphere (spherical mapping)

Figure 16:
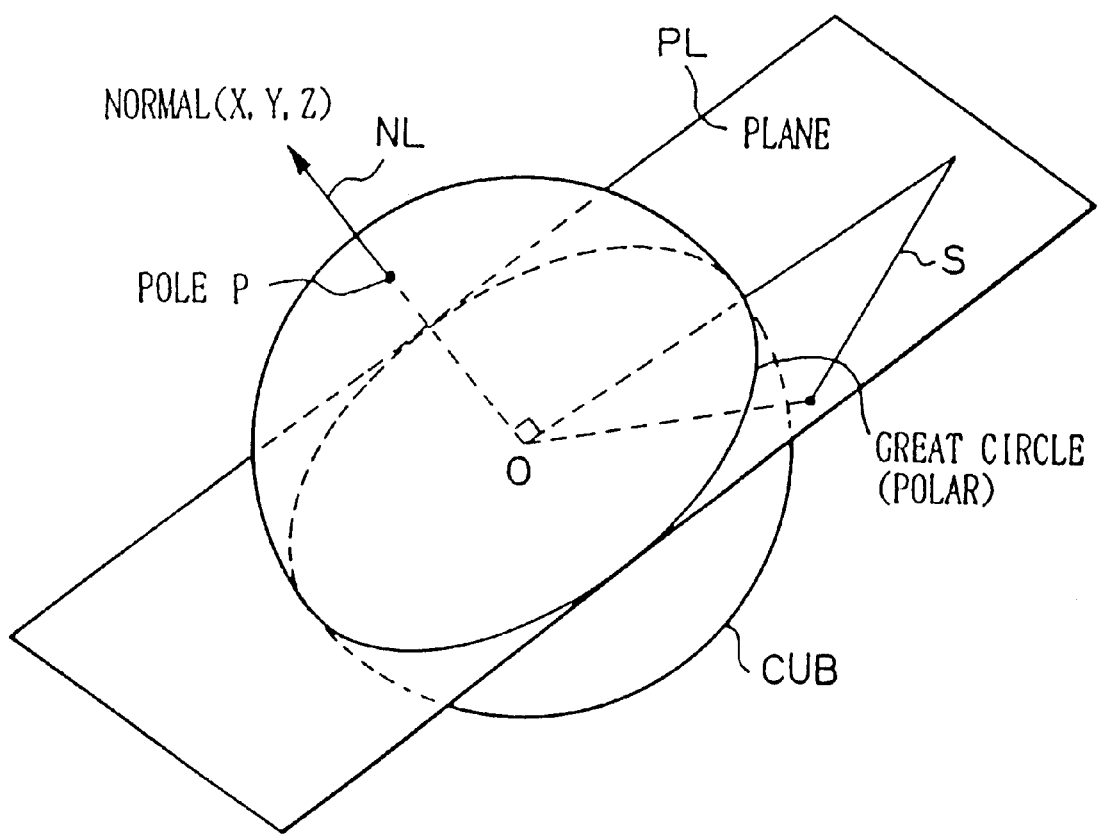
FIG. 16 is a diagram for explaining a polar transformation on a sphere.

As indicated in FIG. 16, in "the polar transformation on a sphere (spherical mapping)", representation is made by an intersecting point of the vector and a unit sphere CUB having an origin O at the center, and a straight line (great circle) and a point are transformed to each other. Namely, the great circle (polar line) CIR generated by mapping onto the sphere a straight line S on a plane PL containing the origin O, is polar-transformed to a pole P which is an intersecting point of the sphere and the normal line NL of the plane PL, and the pole P inversely polar-transformed to the great circle CIR. In this transformation in two-dimensional projective space, relationships are expressed by cyclic angles.

Figure 1A:
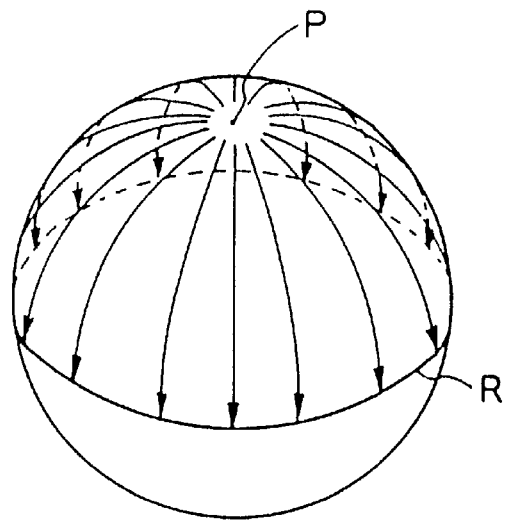
FIGS. 1A and 1B are diagrams for explaining a spherical mapping (polar transformation on a sphere)
Figure 1B:
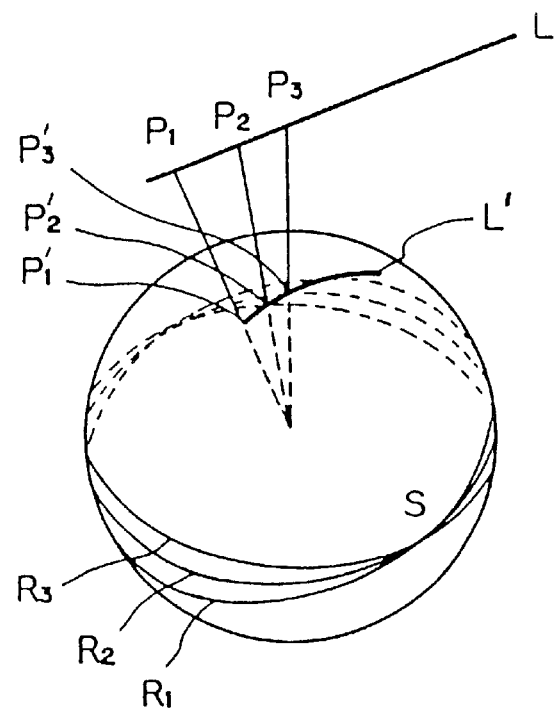
Figure 2:
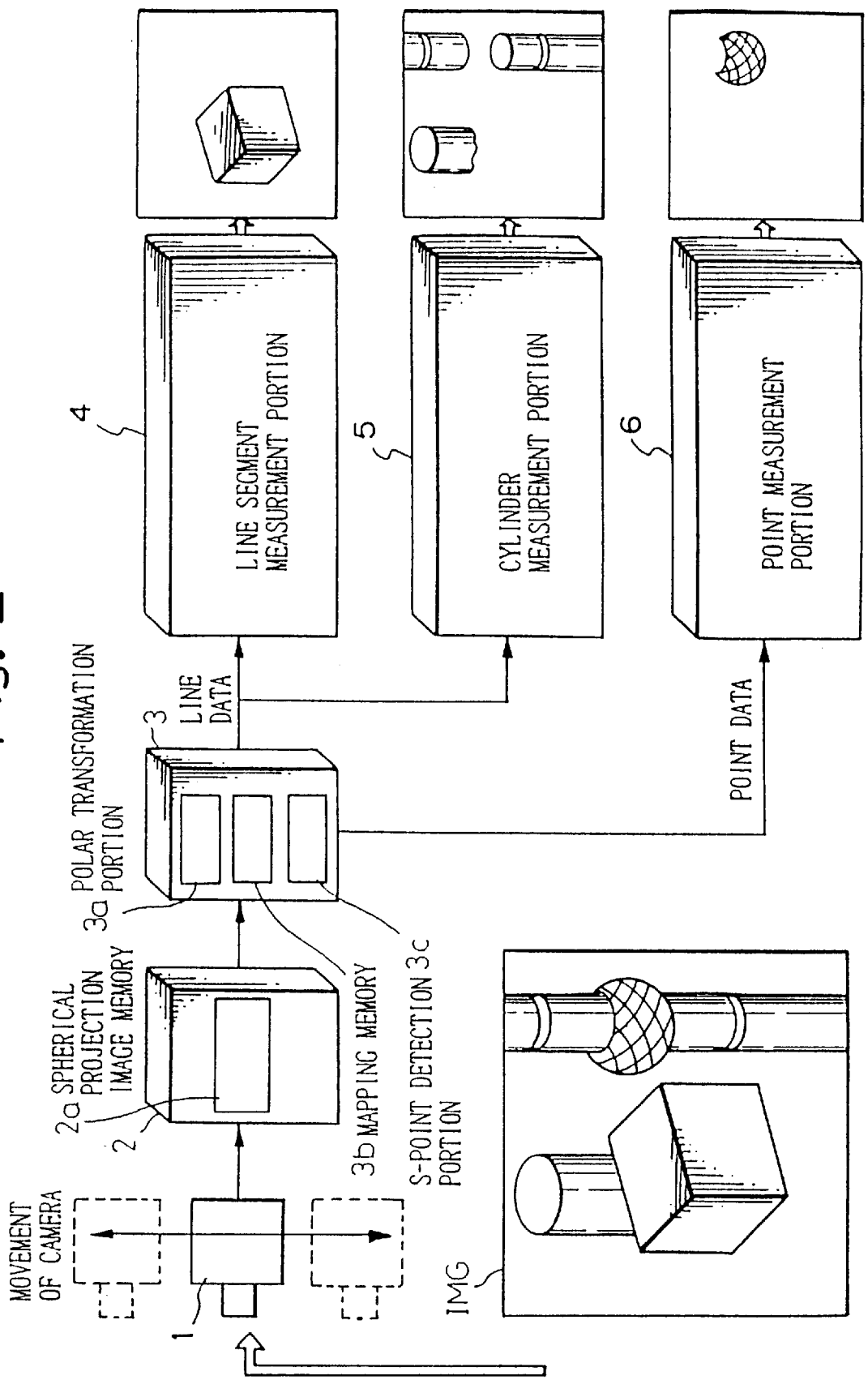
FIG. 2 is a diagram illustrating a three-dimensional measurement system.
Figure 3:
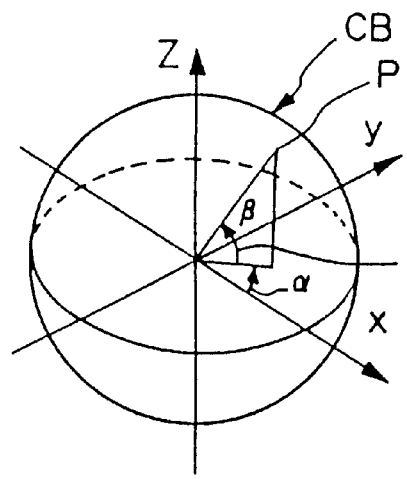
FIG. 3 is a diagram for explaining an address in the mapping memory.
Figure 4:
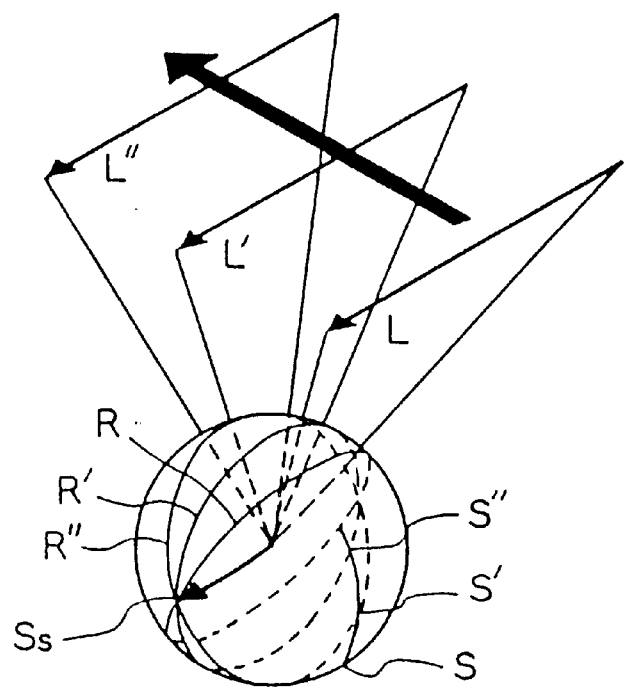
FIG. 4 is a diagram for explaining a three-dimensional orientation of a line segment.
Figure 5A:
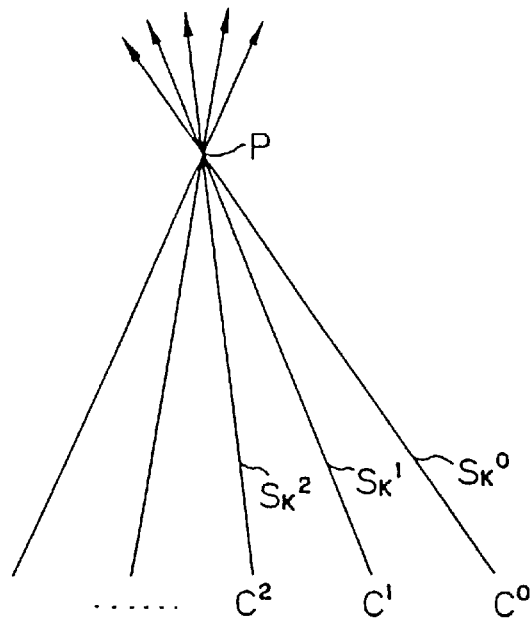
FIGS. 5A and 5B are diagrams for explaining a depth to an objective point.
Figure 5B:
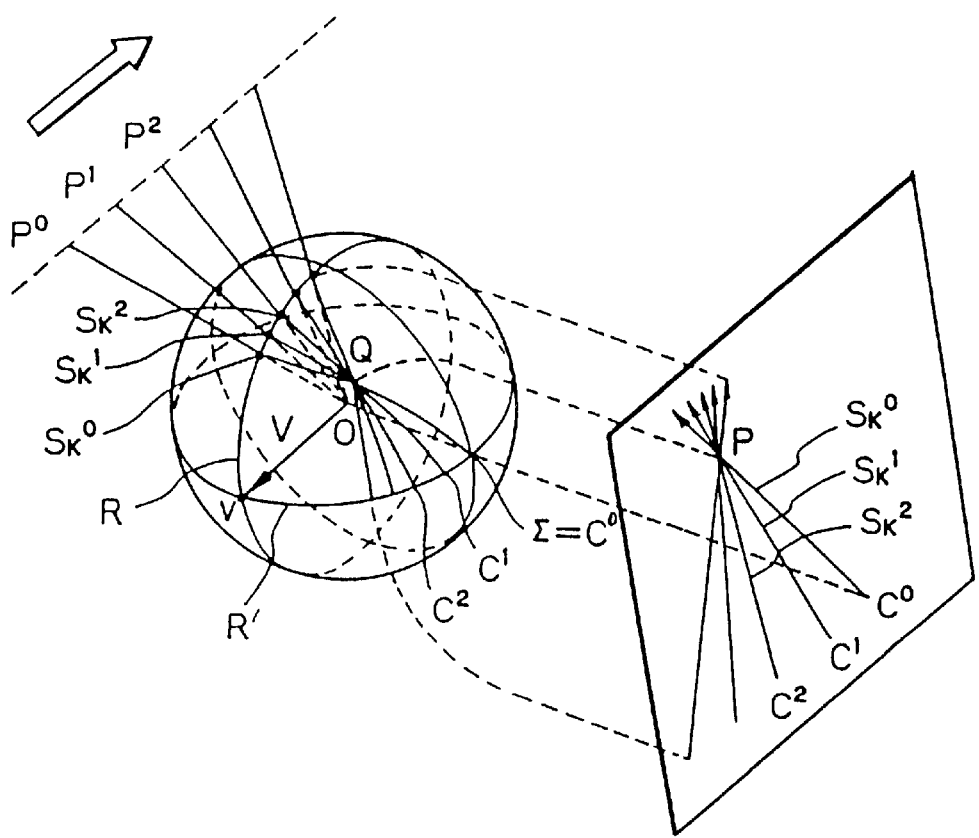
Figure 6:
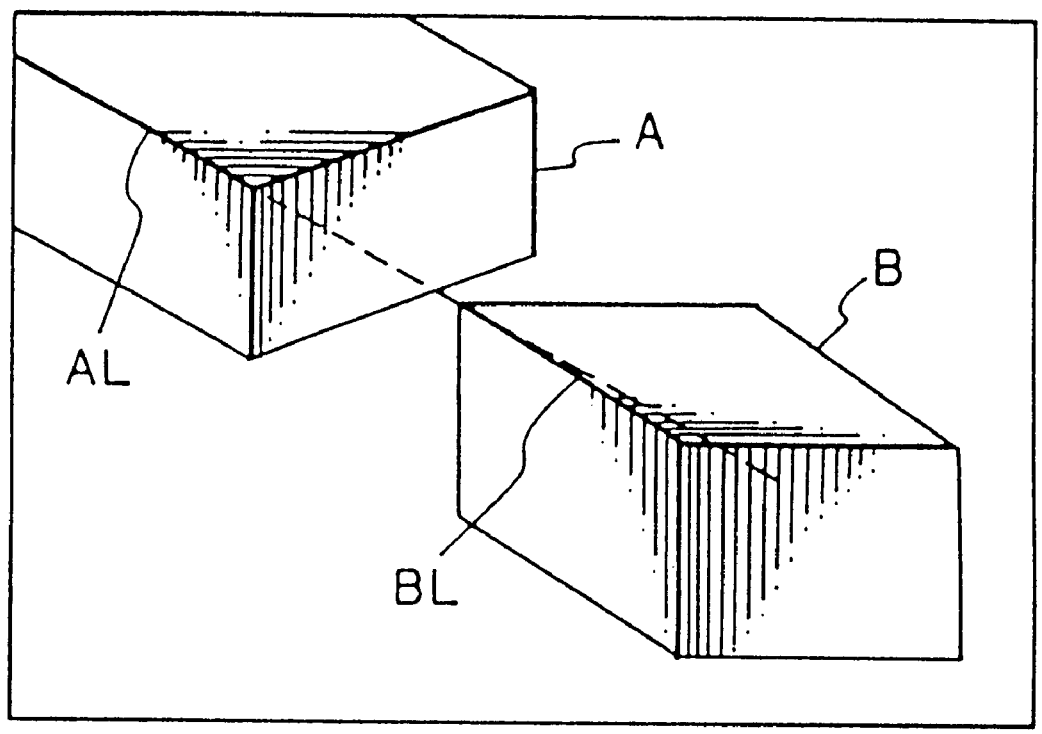
FIG. 6 is a diagram for explaining interference with a background.
Figure 7:
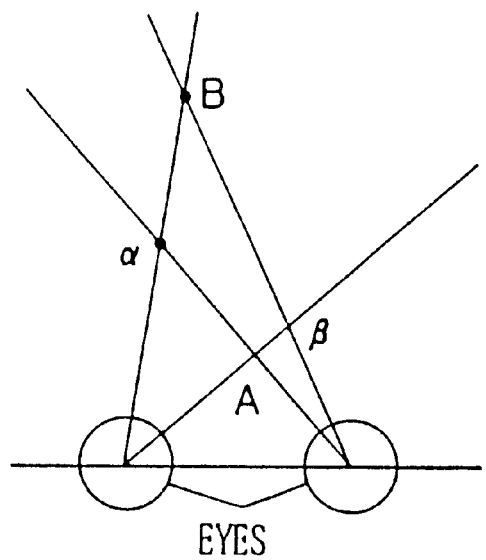
FIG. 7 is a diagram for explaining a problem in the binocular stereopsis.
Figure 8:
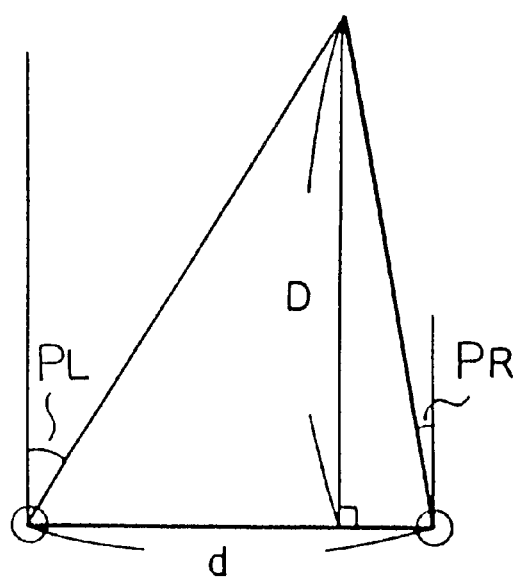
FIG. 8 is a diagram for explaining a calculation of a depth in the binocular stereopsis.

The aforementioned (FIG. 2) kinetic stereopsis is a method for three-dimensional measurement paying attention to the polar transformation on a sphere, and the receptive field method explained as above has a great advantage in the speed-up of processing and the suppression of interference since a sphere as an input plane is divided into receptive fields, and polar transformation is applied to each receptive field image.

1.5.1.2 Polar Transformation on Cylinder

Figure 17:
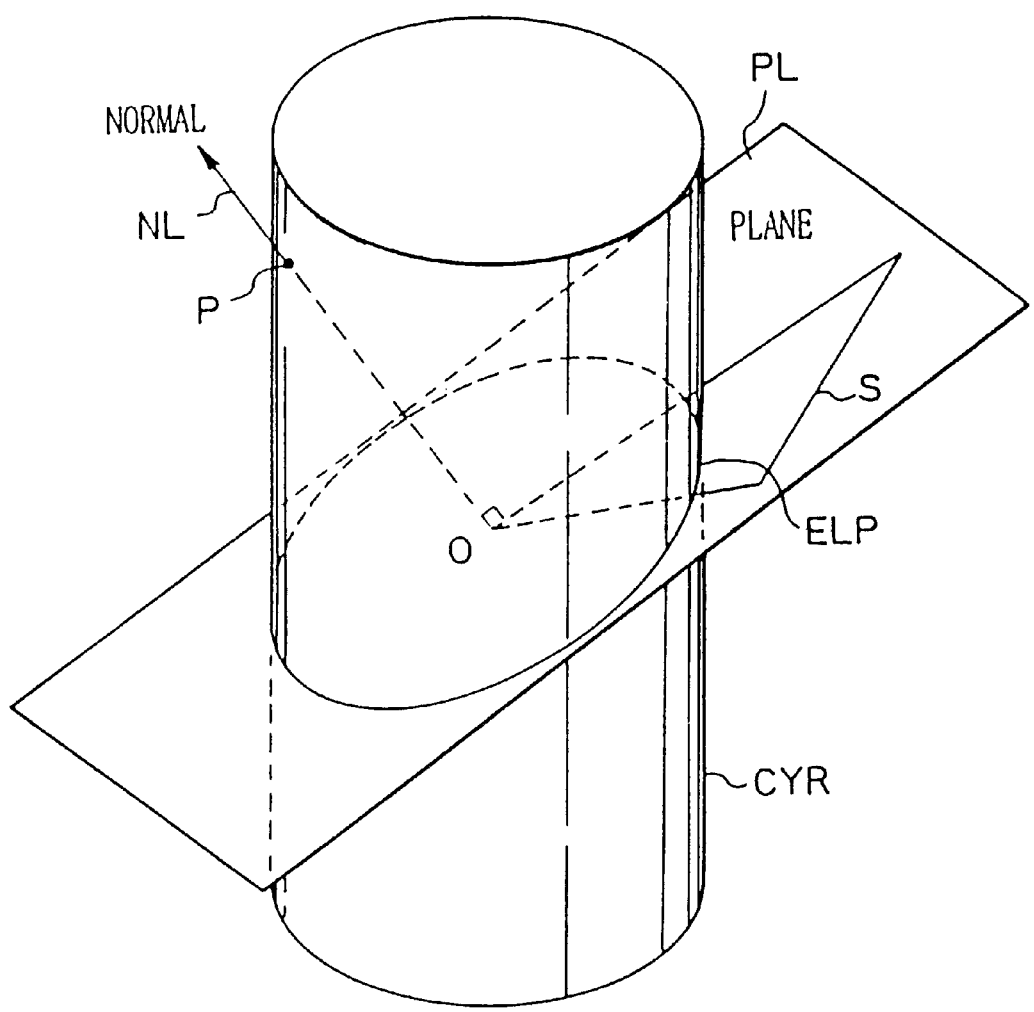
FIG. 17 is a diagram for explaining a polar transformation on a cylinder.

As indicated in FIG. 17, representation is made by an intersecting point of the above vector and a cylinder CYR having the origin O in the center line thereof in "the polar transformation on a cylinder", where a straight line (an intersecting line with an ellipse) and a point are transformed to each other. Namely, the ellipse (polar line) ELP generated by mapping onto the cylinder a straight line S on the plane PL containing the origin O, is polar-transformed to a pole P which is an intersecting point of the cylinder and a normal line NL of the plane PL, and the pole P is polar-transformed to the polar line ELP.

The cylinder can be developed in parallel to the axis thereof on a plane. On the plane, a straight line (sine wave) and a point are transformed to each other, and the polar transformation on the cylinder is different from the polar transformation on a plane which is explained next.

1.5.1.3 Polar Transformation on Plane

Figure 18:
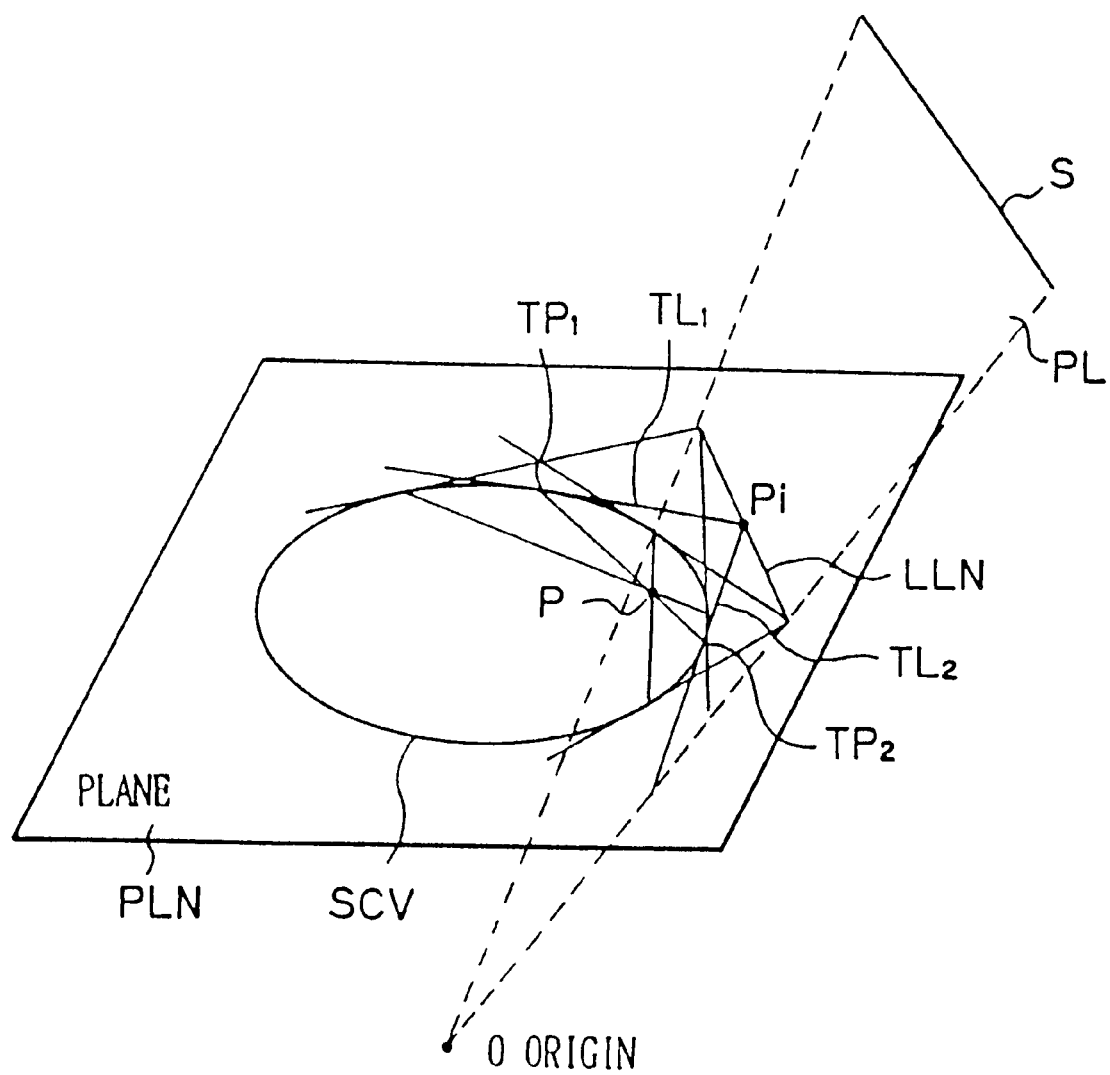
FIG. 18 is a diagram for explaining a polar transformation on a plane.

As indicated in FIG. 18, representation is made by an intersecting point with a plane PLN which is apart from the origin O by a unit length in the "polar transformation on a plane", and a straight line and a point are transformed to each other. Namely, the straight line (polar line) LLN generated by mapping onto the plane PLN a straight line S on a plane PL containing the origin O is polar-transformed to a pole P when an arbitrary conic SCV is set on the plane PLN, and the pole P is inversely polar-transformed to the polar line LLN. Further, when two tangential lines $TL_1$ and $TL_2$ of the conic SCV, respectively passing though an arbitrary point Pi on the polar line LLN, are obtained, and the contacting points $TP_1$, $TP_2$ are connected to each other with a line, the connecting lines for a plurality of points Pi on the polar line LLN intersect at one point. The intersecting point is the pole of the straight line LLN.

Inversely, the polar line LLN is obtained by chaining intersecting points of pairs of tangential lines which make contact with the conic SCV at two points at which arbitrary straight lines passing through the pole P intersect with the conic SCV. An ellipse (conic), a circle, a parabola, and the like are examples of the conic SCV. The transformation between the pole and the polar line with the conic as indicated in FIG. 18, is the most famous polar transformation.

1.5.1.4 Polar Transformation on Arbitrary Surface

In the above paragraphs, an explanation is given for a sphere, a cylinder, and a plane as concrete polar transformation surfaces, that "a line segment can be extracted as a point, and the division into receptive fields has a great advantage in the speed-up in processing of the polar transformation". This is also true when the polar transformation surface is an ellipsoid of revolution (which is made by rotating an ellipse around the axis thereof), a hyperboloid of revolution (which is made by rotating a hyperbola), a paraboloid of revolution (which is made by rotating a parabola), and other arbitrary surfaces.

1.5.2 Polar Transformation In N-dimensional Projective Space

In the above paragraphs, explanations are given for the polar transformation in the two-dimensional projective spaces, but the receptive field methods according to the present invention can be applied to general n-dimensional projective spaces. The polar transformation in an n-dimensional projective space is a transformation between "an n-dimensional hyperplane containing an origin in an (n+1)-dimensional Affine space" and "a vector (point) passing through the origin and perpendicular to the n-dimensional hyperplane".

The vector (zero dimension) passing through the origin is multi-valued mapped to a group of all vectors (points) passing through the origin, on the n-dimensional hyperplane containing the origin, increasing the dimension. This polar transformation corresponds to the above-mentioned transformation between a point and a polar line. Inversely, all vectors (points) passing through the origin on the n-dimensional hyperplane are transformed to the vector passing through the origin and perpendicular to the n-dimensional hyperplane. In the procedure of the inverse transformation, the respective points on the n-dimensional hyperplane are multi-valued mapped to all points in planes perpendicular to vectors connecting the respective points with the origin. Since the intersecting line of the plane is a vector passing through the origin, the n-dimensional hyperplane is mapped into a vector passing through the origin, decreasing the dimension.

1.5.3 Synthetic Polar Transformation Combining Input Projection Surface and Polar Transformation Type The above polar transformation can be applied to arbitrary types of inputs. When treating inputs from cameras, there are three projection types of image inputs in addition to the above variations of polar transformation, and various types of synthetic polar transformation exist.

1.5.3.1 Type of Input Projection Surface and Lens

An input image is made by cutting lines of sight from a center of the camera on each of various projection planes. As the various projection planes, spherical projection, cylindrical surface projection, and plane projection, and various types of lenses corresponding to the projection planes, are used. Table 1 indicates a relationship between the lens and the projection surface.

Since projection onto a sphere is performed in the spherical projection, an image which is equivalent to that is obtained by the spherical projection can be obtained by a fisheye lens. The widest field of view can be obtained by the fisheye lens, which is similar to that used by animals and fish.

The projection onto a cylindrical surface is performed in the cylindrical surface projection, an image which is equivalent to that is obtained by the cylindrical surface projection can be obtained by a cylindrical lens. A wide field of view can be obtained in the angular directions although the field of view in the direction of the axis is limited.

The projection onto a plane is performed in the plane projection, so that an image which is equivalent to that is obtained by the cylindrical surface projection can be obtained by a standard/telephoto lens. Since a straight line in a space corresponds to a straight line according to the plane projection different from the above other types of projection, the plane projection is widely used. However, the range of the plane projection is narrowest.

1.5.3.2 Combination of Projection Type and Polar Transformation Type

The combinations of three polar transformation surfaces (a sphere, a cylinder, and a plane) and various transformation types are possible. A line segment in a broad sense can be extracted through the combinations. The various combinations are indicated in Tables 2 to 4.

1.5.3.2.1 Combination of Plane Projection and Polar Transformation

Table 2 is a table for explaining characteristics of various types of polar transformation which can be applied to the extraction of a line segment from an (plane projected) image through a standard/telephoto lens. The types of polar transformation include (a-1) polar transformation on a plane, (a-2) polar transformation on a cylinder, (a-3) polar transformation on a sphere, and (a-4) synthesized inversion transformation on a plane.

Figure 19:
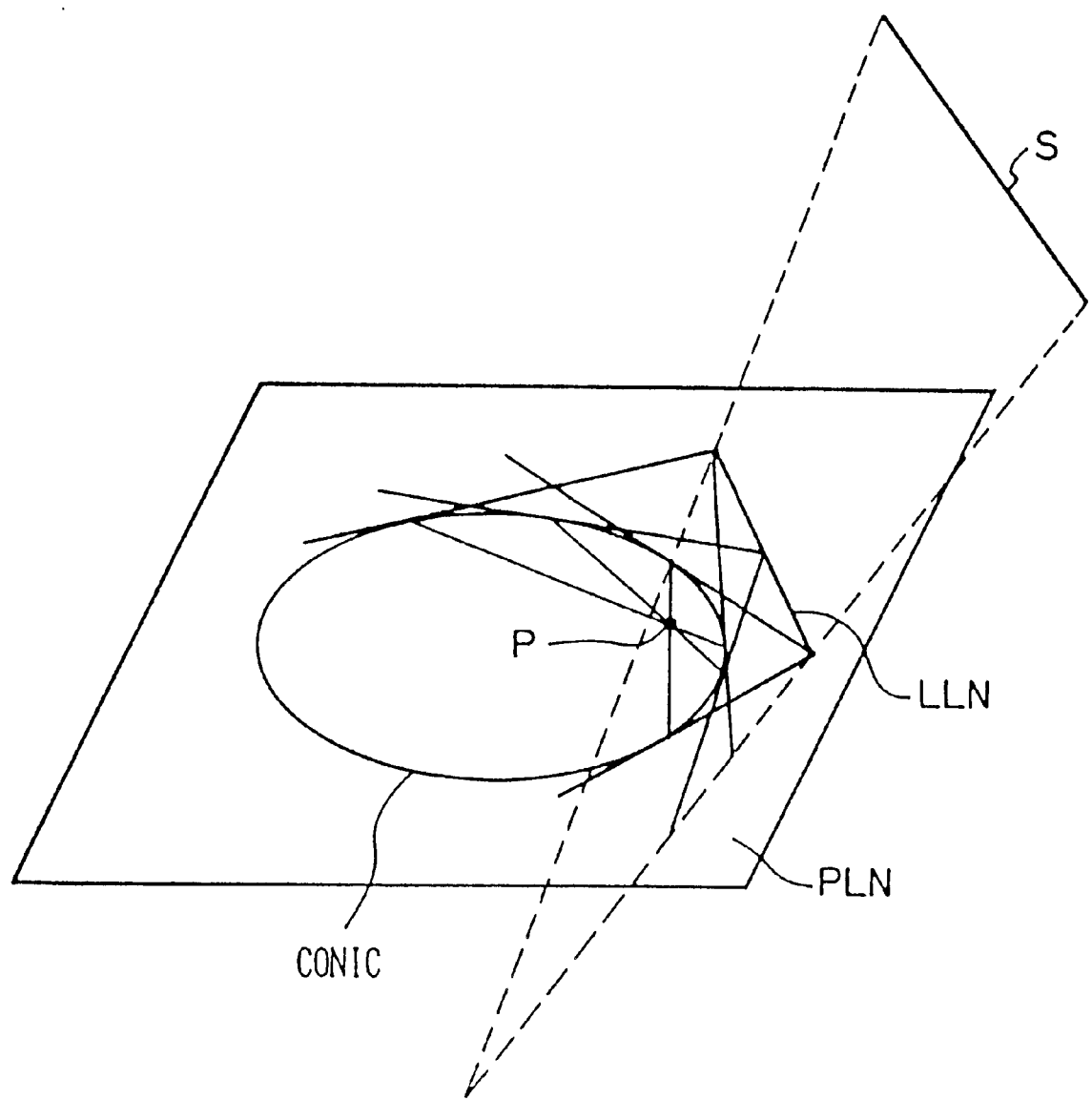
FIG. 19 is a diagram for explaining a "plane projection & a polar transformation on a plane"

FIG. 19 is a diagram for explaining the "plane projection+ the polar transformation on a plane" of (a-1), wherein a straight line S is projected on a projection plane PLN, the projected straight line LLN is polar-transformed to a pole P, and the pole P is polar-transformed to a straight line LLN on the plane.

Figure 20:
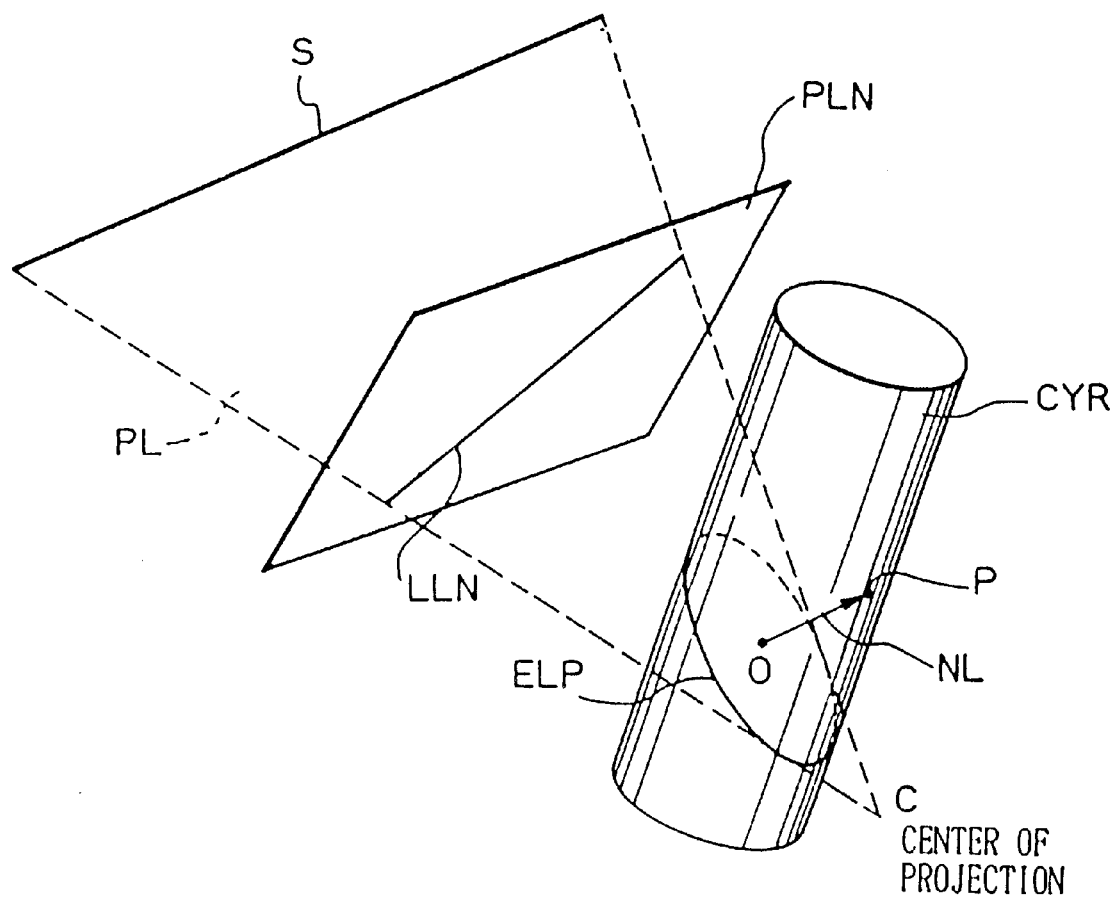
FIG. 20 is a diagram for explaining a "plane projection & a polar transformation on a cylinder"

FIG. 20 is a diagram for explaining the "plane projection+ the polar transformation on a cylinder" of (a-2), wherein a straight line S is projected on a projection plane PLN, an ellipse ELP (polar line) generated by mapping a projected straight line LLN on a plane PL (containing an origin O and the projected straight line LLN) onto a cylindrical surface CYR, is polar-transformed to a pole P which is an intersecting point of a normal line NL of the plane PL and the cylindrical surface CYR, and the pole P is inversely transformed to the polar line ELP.

Figure 21:
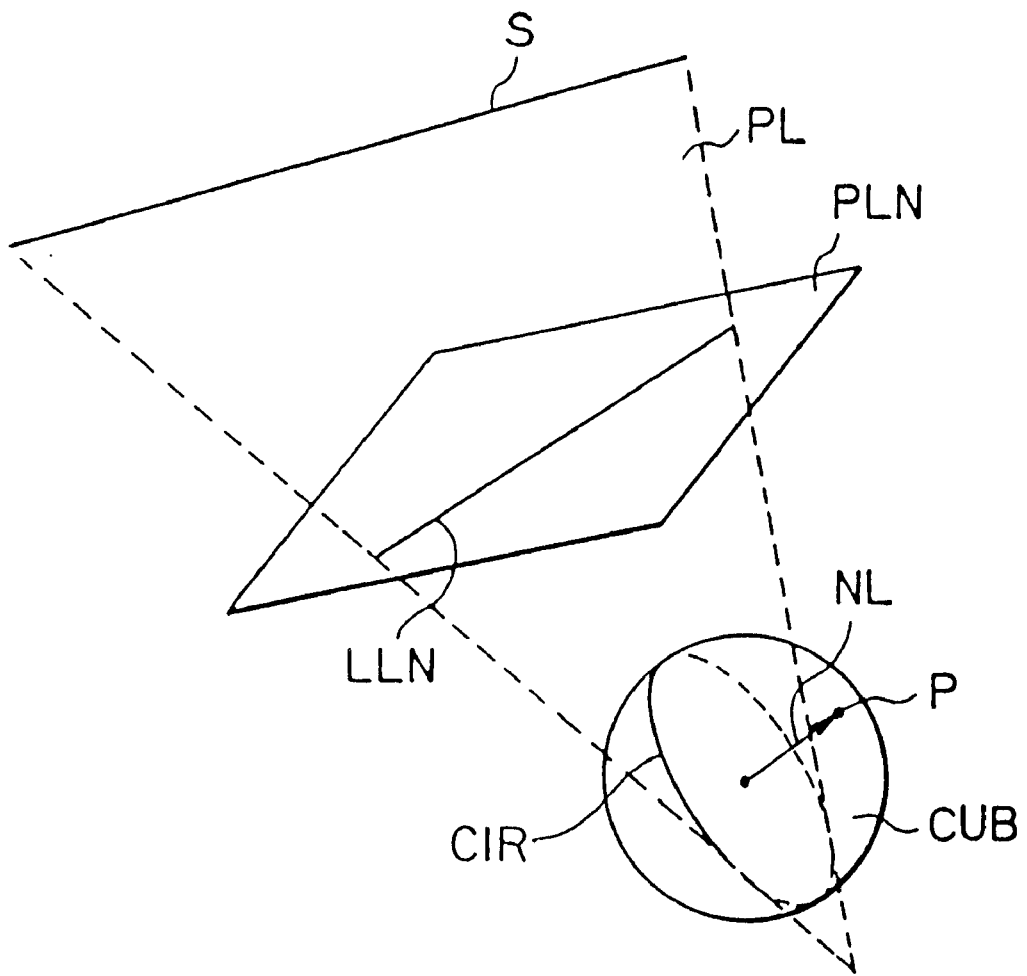
FIG. 21 is a diagram for explaining a "plane projection & a polar transformation on a sphere"

FIG. 21 is a diagram for explaining the "plane projection+ the polar transformation on a sphere" of (a-3), wherein a straight line S is projected on a projection plane PLN, a great circle CIR (polar line) generated by mapping a projected straight line LLN on a plane PL (containing an origin O and the projected straight line LLN) onto a sphere CUB, is polar-transformed to a pole P which is an intersecting point of a normal line NL of the plane PL and the sphere CUB, and the pole P is inversely transformed to the polar line CIR.

In the synthesized inversion transformation of (a-4), inversion transformation is further performed after the polar transformation, wherein polar transformation is made between "a circle passing through an origin" and a point.

1.5.3.2.2 Combination of Cylindrical Surface Projection and Polar Transformation Table 3 is a table for explaining characteristics of various types of polar transformation which can be applied to the extraction of a line segment from an (cylindrical-surface-projected) image through a standard/telephoto lens. The types of polar transformation include (b-1) polar transformation on a plane, (b-2) polar transformation on a cylinder, and (b-3) polar transformation on a sphere.

Figure 22:
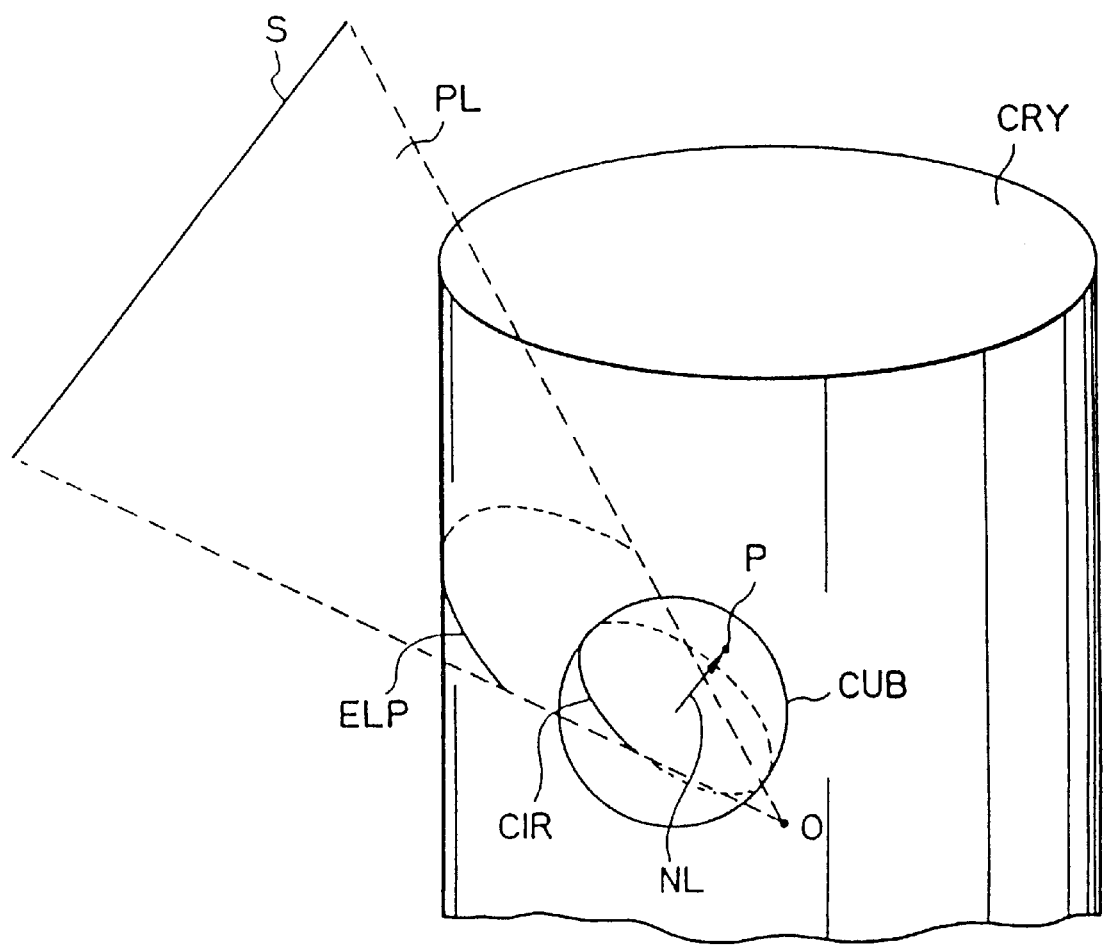
FIG. 22 is a diagram for explaining a "cylinder projection & a polar transformation on a sphere"

FIG. 22 is a diagram for explaining the "cylindrical surface projection+the polar transformation on a sphere" of (b-3), wherein a straight line S is projected on a cylindrical surface CYR as a projection surface, a great circle CIR (polar line) generated by mapping a projected ellipse ELP on a plane PL containing an origin O and the projected curve (ellipse) ELP onto a sphere CUB, is polar-transformed to a pole P which is an intersecting point of a normal line NL of the plane PL and the sphere CUB, and the pole P is inversely transformed to the polar line CIR.

1.5.3.2.3 Combination of spherical mapping and Polar Transformation

Table 3 is a table for explaining characteristics of various types of polar transformation which can be applied to the extraction of a line segment from an (spherically projected) image through a fisheye lens. The types of polar transformation include (c-1) polar transformation on a plane, (c-2) polar transformation on a cylinder, (c-3) polar transformation on a sphere, and (c-4) synthesized inversion transformation on the plane.

Figure 23:
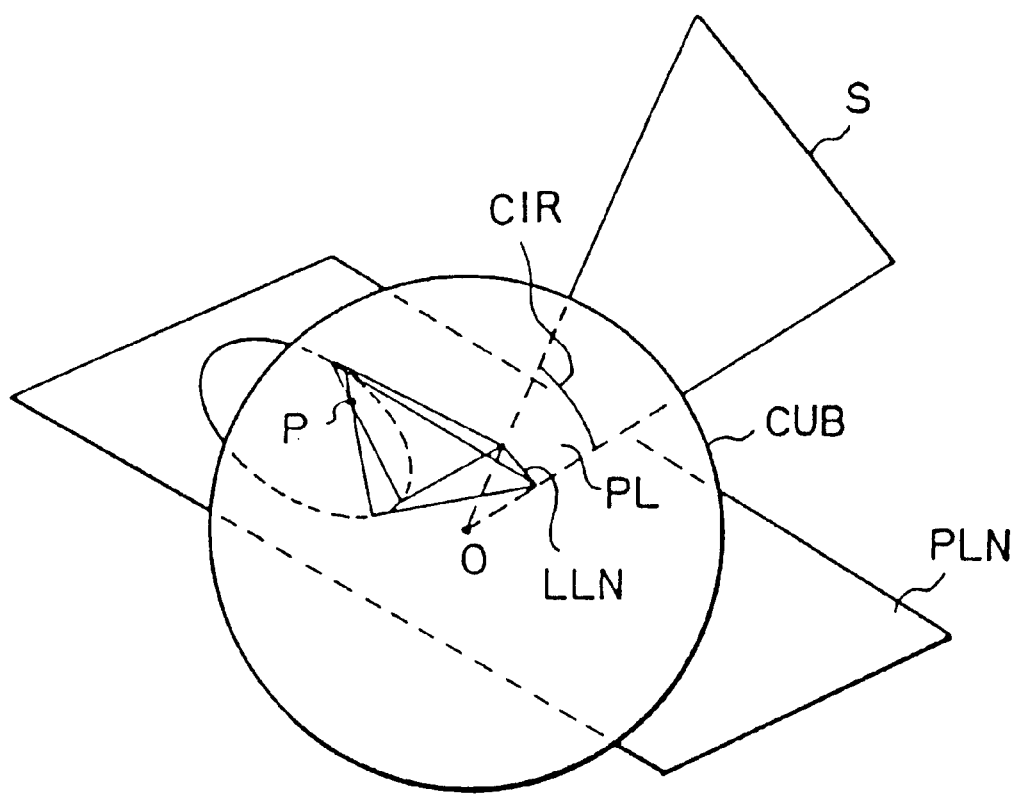
FIG. 23 is a diagram for explaining a "sphere projection & a polar transformation on a plane"

FIG. 23 is a diagram for explaining the "sphere projection+the polar transformation on a sphere" of (c-1), wherein a straight line S is projected on a projection plane PLN as a projection surface, the projected straight line LLN generated by mapping a great circle CIR on a plane PL containing an origin O and the projection curve (the great circle) CIR onto a sphere CUB is polar-transformed to a pole P, and the pole P is polar-transformed to a straight line LLN on the plane.

Figure 24:
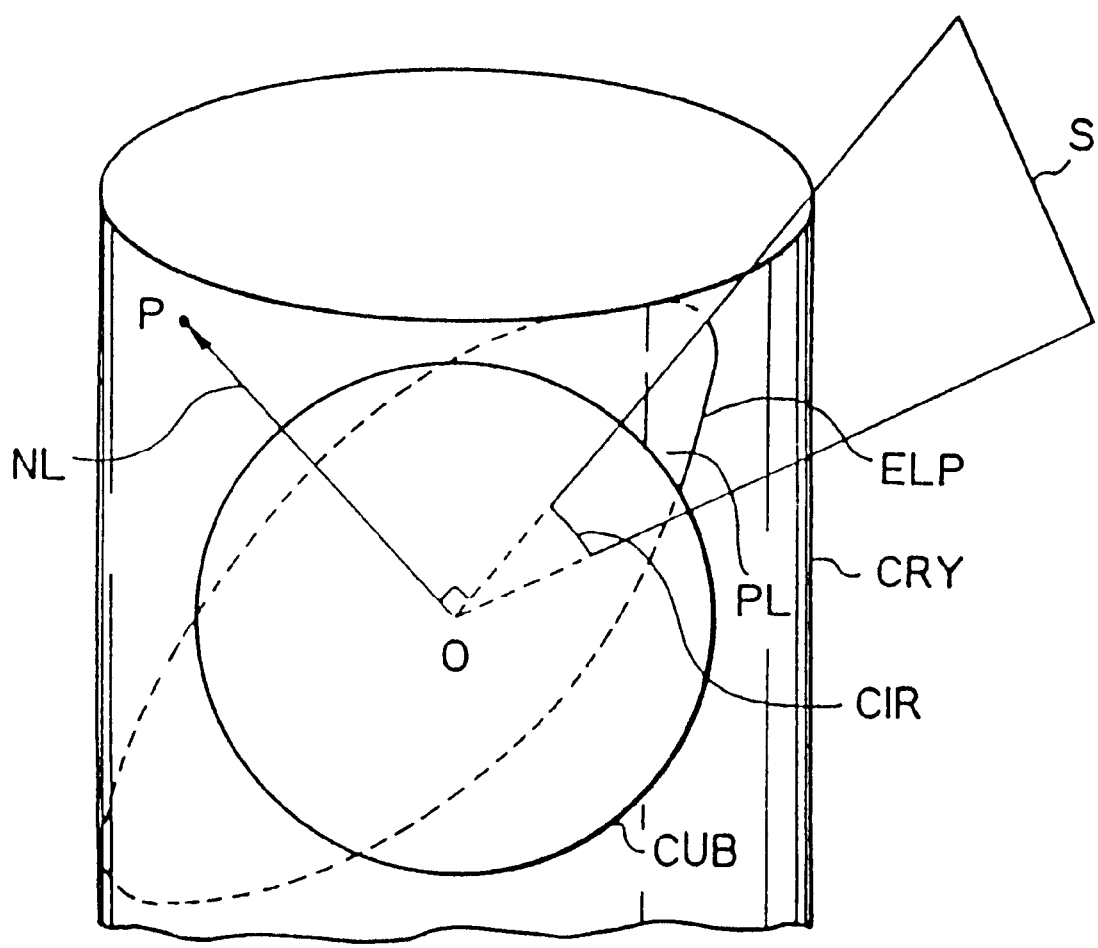
FIG. 24 is a diagram for explaining a "cylinder projection & a polar transformation on a sphere"

FIG. 24 is a diagram for explaining the "sphere projection+the polar transformation on a cylinder" of (c-2), wherein a straight line S is projected on a sphere CUB as a projection surface, an ellipse ELP (polar line) generated by projecting a projected great circle CIR on a plane PL (containing an origin O and the projected great circle CIR) onto a cylindrical surface CYR, is polar-transformed to a pole P which is an intersecting point of a normal line NL of the plane PL and the cylindrical surface CYR, and the pole P is inversely transformed to the polar line ELP.

In the synthesized inversion transformation of (c-4), inversion transformation is further performed after the polar transformation, wherein polar transformation is made between "a great circle passing through a fixed point on the sphere" and a point.

1.5.3.2.4 Line Segment Extraction from Arbitrary Projection Image

The above explanations are given for the case where the sphere, the cylindrical surface, and the plane are used as a projection surface, and it is explained that "a line segment can be extracted as a point, and the division into receptive fields has an advantage in the speed-up in the processing of the polar transformation". Further, this is also true when the projection surface is an ellipsoid of revolution, a hyperboloid of revolution, and other arbitrary surfaces.

The above explanations are summarized as follows.

A line segment in a broad sense can be extracted from an image in a broad sense by any synthetic polar transformation;

There exists a type of polar transformation which is suitable for a lens of a camera (See Table 5);

Advantages of the speed-up and the suppression of interference can be obtained by division into receptive fields with any type of polar transformation.

Table 5 is a table indicating suitability of a lens for various types of polar transformation surfaces. The standard/telephoto lens is suitable for the polar transformation on a plane, the cylindrical lens is suitable for the polar transformation on a cylinder, and the fisheye lens is suitable for the polar transformation on a sphere.

1.6 Evaluation of Receptive Field Method

The advantage of the improvement by the division into receptive fields are evaluated as follows.

1.6.1 Speed-up and Downsizing

1.6.1.1 Direct Advantage of Division into Receptive Fields

Assuming N=512 pixels, and m=16 pixels, the following equation is obtained from (3).

$$Pm=m/Pm=N=1/(N/m)=1/32. \quad (4)$$

Namely, the amount of processing for extracting a line segment is greatly reduced to 1/32 compared with the infinite receptive field method. This is because the amount of wiring is reduced by performing polar transformation within each receptive field only. In addition, interference can be suppressed since processing of each receptive field is independent of the other receptive fields. The same division is performed in the primary visual cortex in the cerebrum (the hypercolumn cell) of a mammal. The amount of wiring is greatly reduced and interference is avoided by limiting the wiring within each receptive field.

Conventionally, convolution filters are applied to original images for image emphasis. As explained later, it is possible to apply a one-dimensional filter after polar transformation instead of application of the convolution filter to an original image when the receptive field method is applied. The amount of processing when a one-dimensional filter is applied after polar transformation is compared below with the amount of processing when the convolution filter is applied. Since each point of an image is developed on a square having sides respectively equal to a, the amount $P_{2Dconv}$ of processing thereof is $$P_{2Dconv}=\text{(number of input elements)} \times \text{(filter size)}=N^2 \times a^2. \quad (5)$$

On the other hand, the amount $P_{RF+1Dconv}$ of processing when a one-dimensional filter is applied (division into receptive fields→polar transformation →one-dimensional filter) is $$P_{RF+1Dconv} = \text{(amount of processing of polar transformation)} + \quad (6)$$
$$\text{(amount of processing of one-dimensional filter size)}$$
$$= mN^2 \times aN^2$$
$$= (m + a)N^2$$

When compared with the equation (5), $$P_{RF+1Dconv}/P_{2Dconv}=(m+a)/a^2$$

To grasp the characteristic feature of the whole image (screen), it is necessary to extract a characteristic feature from an obscure portion, and it is desirable to be a=m. Therefore, $$P_{RF+1Dconv}/P_{2Dconv}=2/m. \quad (7)$$

As described above, there is a remarkable advantage that the amount of processing is smaller than the convolution filter which does not have a function of extracting a line segment other than a function of emphasizing an image. This is because only the one-dimensional development (in a great circle) is required in the application of a one-dimensional filter after the polar transformation while the two-dimensional development (in a square) is necessary in the convolution filter.

1.6.1.2 Speed-up by Parallel Processing

Further, parallel processing is required for speeding up of the processing. Since the size of a unit of the parallel processing is proportional to a length of a great circle, the size of hardware increases with the size of the receptive field. The maximum receptive field is the receptive field wherein m=N, and the size of unit hardware for the parallel processing is proportional to N, and is very large. In the finite receptive field method, the size of unit hardware for the parallel processing is very small due to the smallness of m, and is 1/(N/m) of that in the infinite receptive field method.

It is required to form the unit hardware for the parallel processing in a large scale integrated circuit (LSI). However, the unit hardware for the parallel processing is too large to mount in a large scale integrated circuit (LSI) by the current LSI technology. On the other hand, the unit hardware in the finite receptive field method can be readily formed in a LSI since the size of the unit hardware is small in the finite receptive field method as explained above. Further, since the total amount of processing for all the receptive fields is small, i.e., is equal to $m^3$, it may be possible to form the hardware for all the receptive fields in a LSI. Summarizing the above, the receptive field is suitable for forming the hardware by LSI technology, the processing can be made parallel without increasing hardware size, and the processing speed can be increased by a factor m.

1.6.1.3 Synthetic Evaluation

The above factors for improvement in the speed-up and the downsizing, respectively contribute much thereto, and the synthetic effect of the factors is even greater. The respective factors are as follows:
1. Direct Effect: The amount of processing is reduced by 1/(N/m).
2. Speed-up By Parallel Processing: The amount of processing is reduced by 1/m.
3. High Speed Filtering by One-Dimensional Filter: The amount of processing is reduced by 2/m.

The synthetic amount of processing is now precisely evaluated, and is compared with the conventional method. In the comparison, it is assumed that "a two-dimensional filter of a size m×m is applied to an image, and a line segment is extracted by the infinite receptive field method" in the conventional method, and that "a line segment is extracted by the finite receptive field method, is made prominent by a one-dimensional filter, and is processed by LSI's with a degree of parallelism equal to m" in the synthetic improved method according to the present invention.

The respective amounts of processing of the conventional and improved methods are as follows.

(Amount of processing in the conventional method) =

(amount of processing in two-dimensional filter) +

(polar transformation in infinite receptive field)

$= m^2 N^2 + N^3.$

The amount of processing in the synthetic improved method=(amount of processing in polar transformation+amount of processing in one-dimensional filter)/(degree of parallelism).

Since the amount of processing in the polar transformation

= (number of receptive fields) ·

(amount of processing of polar transformation in a receptive field)

$= ((N/m)^2) \cdot (m^3)$ $= mN^2$, and the amount of processing in the one-dimensional filter = (number of receptive fields) · (8)

(processing of one-dimensional filter) · (number of orientations)

$= ((N/m)^2) \cdot (m \cdot m) \cdot (m)$ $= mN^2,$ the amount of processing $= (mN^2 + mN^2)/m$ $= 2N^2.$ Thus, the synthetic improvement ratio is (the amount of processing in the synthetic improved method)/(the amount of processing in the conventional method)

$= 2N^2/(m^2 N^2 + N^3)$ (9)

$= 2/(m^2 + N).$

Namely, the amount of processing is greatly reduced. In a practical case N=512 pixels and m=16 pixels, the synthetic improvement ratio amounts to 1/384. Although this is an upper limit of the reduction of the amount of processing, the advantage of the finite receptive field method is very great. The reduction in the amount of processing reduces the size of hardware in addition to the speed-up.

1.6.2 Suppression of Interference

The effect of the suppression of interference as the other advantage of the finite receptive field method is evaluated next.

The cause of the interference is that "when another great circle is located in a direction near a direction of a great circle corresponding to a line segment to be extracted by the spherical mapping, these great circles interfere with each other to deteriorate the accuracy of the extraction of the line segment".

Regarding the above object, no interference occurs according to the receptive field method because an input image is divided into receptive fields, and a great circle other than the great circle of interest is not contained in a receptive field of interest.

The advantage in the above "division into receptive fields+spherical mapping" also exists in the other arbitrary polar transformation other than the spherical mapping (polar transformation on a sphere).

1.6.3 Evaluation of Indirect Effect of Receptive Field Method

The speed-up due to the receptive field method contributes to improvement in the image processing function.

1.6.3.1. Processing of Obscure Image

Generally, input images may contain a line and an edge at which brightness gradually varies, and these line and edge may be important. However, it is difficult to detect a portion at which brightness gradually varies, by the conventional convolution filter since the conventional convolution filter is a two-dimensional filter, the amount of processing rapidly increases with the square of the size of the filter size, and the increase makes the processing by the filter of a large size difficult.

According to the receptive field method, "the effect of a two-dimensional filter can be obtained by the application of a one-dimensional filter". Therefore, a filter of a large size can be applied with a small amount of processing. The size of 5×5 pixels is a practical upper limit of the two-dimensional convolution filter, while filtering of a diameter up to 13 pixels can be applied with the same amount of processing.

Namely, a filter much greater than the size of the conventional filter can be applied to images, and therefore a portion at which brightness gradually varies, can be extracted precisely.

1.6.3.2 Processing of Image with Low Contrast

Generally, input images may contain a dark portion due to a lighting condition and a portion at which brightness gradually varies. According to the conventional image processing, a uniform threshold value is applied to the whole image. Therefore, the dark portion and the portion at which brightness gradually varies, are eliminated through the image processing.

According to the receptive field method, areas of m×m pixels are processed independently of each other, and a uniform threshold is not applied to the whole image. Therefore, the above drawback does not exist, and the dark portion and the portion at which brightness gradually varies, can be detected. Since each receptive field is small, the lighting condition can be considered to be uniform within each receptive field. Therefore, a uniform threshold value can be applied within each receptive field.

Namely, according to the receptive field method, when an input image contains a dark portion due to a lighting condition and a portion at which brightness gradually varies, these portions can be detected precisely, while the conventional threshold processing cannot detect these portions.

1.6.3.3 Insensitive Lighting Condition

In the conventional image processing, a characteristic feature extracted from an image is seriously affected when the intensity and the direction of lighting vary. This causes a serious problem when the function is equipped in a robot working outside, where the brightness is affected by weather. The problem is caused because representation of a threshold value independent of the variation of lighting is difficult in the conventional image processing.

Since an image is processed by being divided into small areas according to the present invention, a parameter (for example, a half value of a peak value of an output processed within an area) independent of lighting can be used as a threshold value, and therefore extraction of a characteristic feature which is not affected by the variation of lighting can be achieved. Thus, according to the receptive field method, characteristic features such as a line segment can be stably extracted when the intensity and the direction of the lighting vary.

1.7 Simulation

Figure 25A:
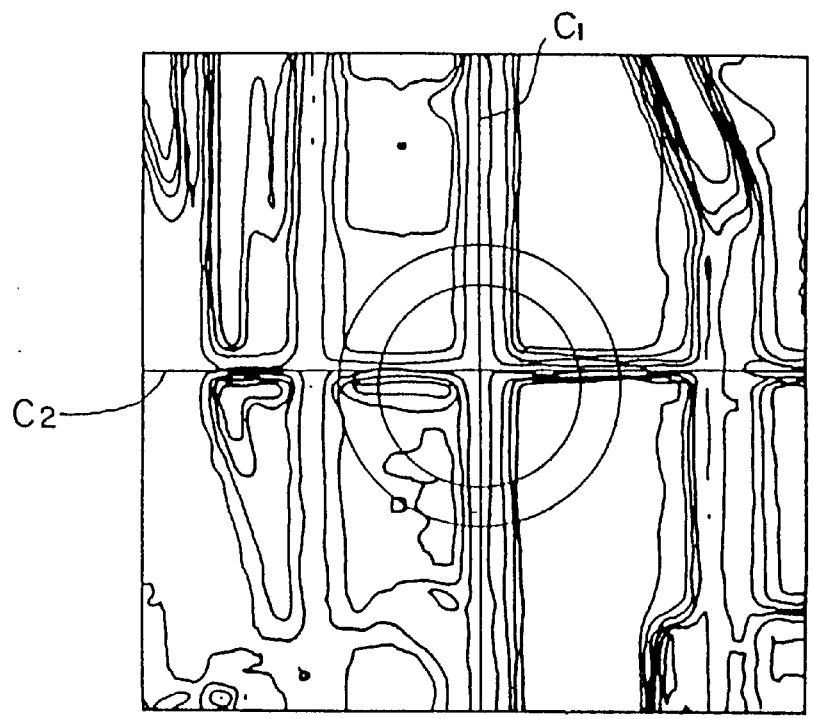
FIGS. 25A and 25B are diagrams for explaining a result of a simulation (an example of a response for element receptive field response)
Figure 25B:
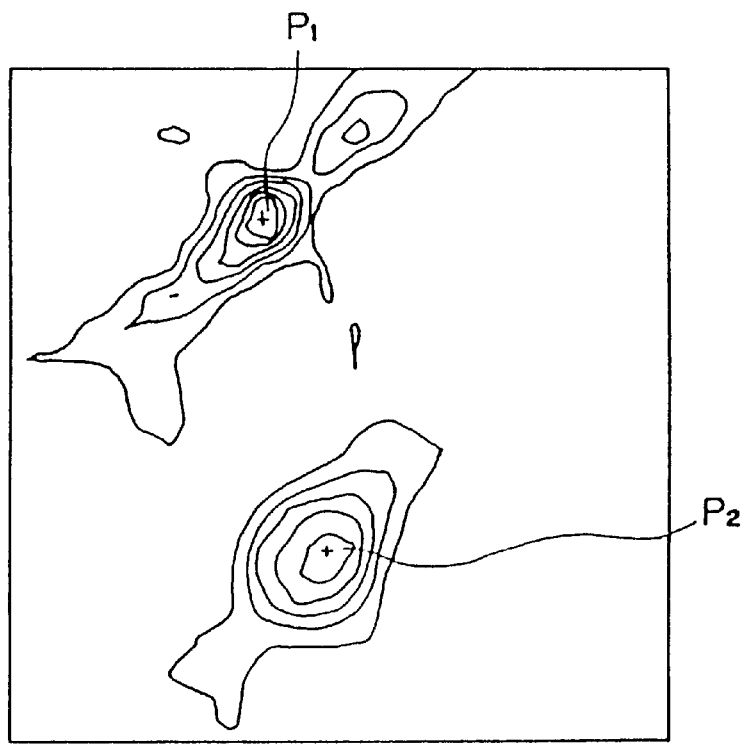
Figure 26:
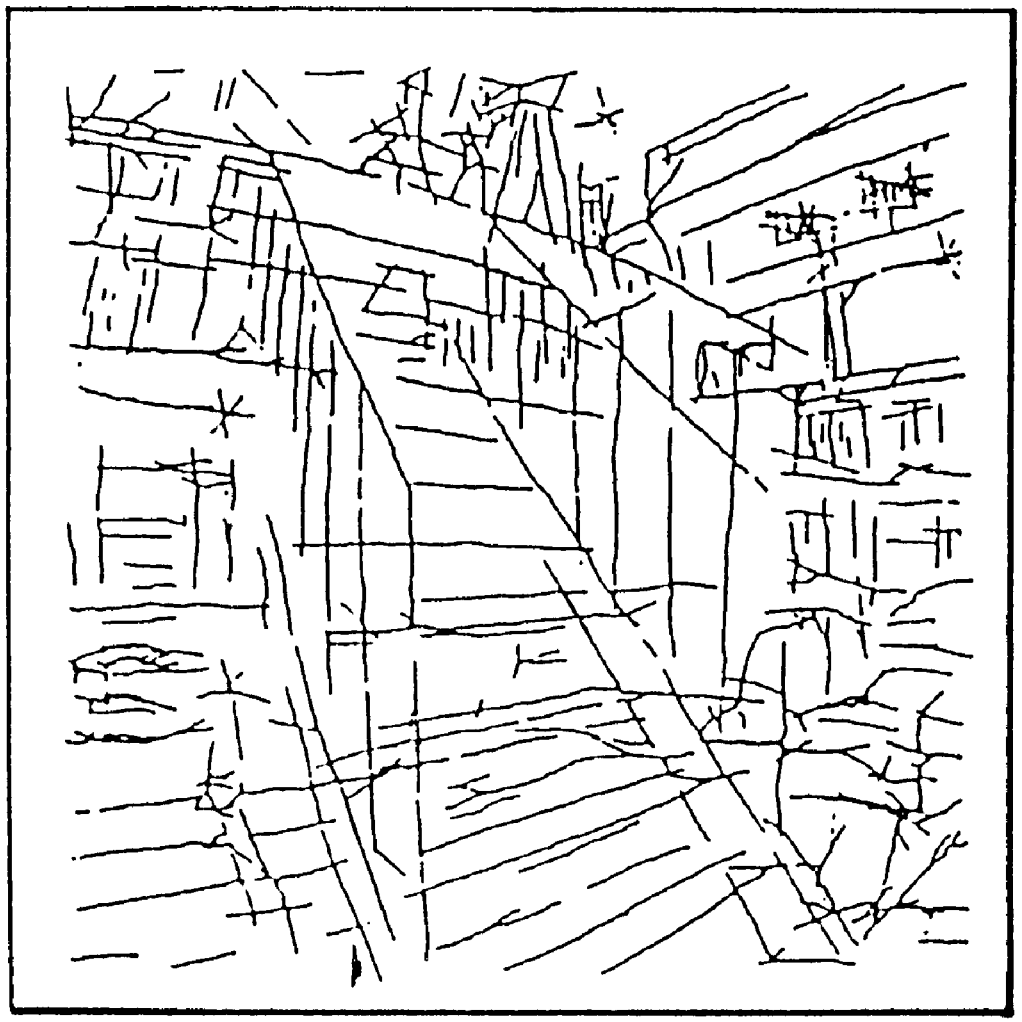
FIG. 26 is a diagram for explaining a result of a simulation (regenerated image)

FIGS. 25A, 25B, and 26 show a result of the simulation wherein a spherical mapping image (an image shot through a fisheye lens) of N×N pixels (N=512 pixels), spherically projected as in FIG. 16, is divided into receptive fields of m×m pixels (m=16) according to the receptive field method, polar transformation is applied on a sphere to each point in each receptive field by the polar transformation circuit 113, and a line segment in the receptive field is extracted by extracting a peak value from an output hypercolumn. The original image is the same as indicated in FIG. 13, FIG. 25A is a magnification of a portion which is encircled by a circle in FIG. 13, FIG. 25B shows responses in the element receptive field (hypercolumn) corresponding to the portion encircled by contour lines, and FIG. 26 shows responses of all of the receptive fields (regenerated image).

As indicated in FIG. 25B, two lines C1 and C2 (see FIG. 25A), respectively in the horizontal and vertical directions, are polar-transformed, and are respectively extracted as two sharp peaks P1 and P2 corresponding to the two lines in the hypercolumn memory.

Further, as indicated in FIG. 26, the whole image can be stably regenerated from peaks extracted in the respective receptive fields, and low contrast portion and obscure portions can be stably extracted.

Although, in the above explanations, an image input mainly through a camera or a lens, is divided into small areas, polar transformation is performed in each small area, and image processing is performed based on the result of the polar transformation, the present invention can be applied to arbitrary images. For example, the hypercolumn image may be further divided into small areas, polar transformation may be performed in each small area, and image processing may be performed based on the result of the polar transformation.

Although, in the above explanations, the density of pixels is assumed to be uniform, the sizes of the receptive fields may be varied according to the densities of pixels in the respective receptive fields when the density of pixels varies with the locations (at the center, near the periphery, and the like) in the image so that the numbers of the respective receptive fields can be the same. The hypercolumns of mammals are constructed in a manner similar to above.

1.8 Requirement for Filtering

Although a line segment can be extracted quickly from a wide field of view image by the receptive field method according to the present invention, there are the following requirements regarding the filtering when considering quality of the input image and the characteristic feature to be extracted.

1.8.1 Precise Extraction of Line Segment from Obscure Image

When moving in a narrow environment such as an industrial plant, a warehouse, or the like, it is necessary to recognize the whole environment with a wide field of view. In this case, it is difficult to obtain the whole image in focus due to the wide field of view, and therefore the image may contain an obscure portion. Further, objects are often chamfered for safety, and the chamfered ridge-line will appear as an obscure edge or line in the image.

However, information on the obscure portion is very important for moving or working surely, and therefore, the function of extracting features of both the sharp portions and obscure portions in the input image is required. Although filtering with a large mask size is necessary for extracting a line segment from an obscure image, it is impossible by the application of the conventional two-dimensional filter.

1.8.2 Recognition of Type of Line Segment

The term "line segment" used in the above explanations can have three different meanings: lines, edges, and gaps. In the mammalian cerebrum, cells for recognizing a line, an edge, and a gap, are provided, respectively.

1) Line: This is a luminous band.
2) Edge: This is a border between a luminous portion and a dark portion, and the edge is the major feature in actual images.
3) Gap: This is an inverse of the line, i.e., a dark band.

For example, the above three types of line segments may correspond to "piping of a small diameter", "steps", "a shadow portion of the piping of a small diameter", and the like in an industrial plant, and these are important features for moving and working therein. According to the spherical mapping method described above, the "line" and the "gap" can be extracted. Although filtering for emphasizing edges is necessary to extract the "edge", which is the major feature in the actual image, such filtering has not been realized at present. Further, it is desirable to apply filtering to the "line" and the "gap" for making these portions prominent. However, such filtering has not been realized because the application of a filter of a large size is difficult due to the necessity of the large amount of calculation and processing time.

The mammalian cerebrum has cells for extracting the above three types of line segments (lines, edges, and gaps) for precisely sorting and recognizing information necessary for movement.

1.8.3 Conventional Technique of Filtering

The above problems relate to the filtering, and are summarized as follows.

Filtering of a large size mask which is necessary for processing of obscure image; and Filtering for separately extracting the three types of line segments.

The conventional techniques for the above are as follows.

1.8.3.1 Conventional Filtering of a Large Size Mask

In the conventional image processing, the emphasizing of contours and extraction of the features are performed by applying a two-dimensional convolution filter to an image within a mask. The amount of processing is estimated to be $m^2 \times N^2$, which increases $m^2$, when the size of the mask is m×m, and the size of the image is N×N, since convolution calculation of $m^2$ is required for each pixel. Therefore, the upper limit of the mask size in the conventional technique is about 5×5 pixels from the point of view of the processing speed, while a mask of 10×10 pixels will be required for processing of the obscure image. Namely, the processing of the obscure image is difficult by the conventional technique.

1.8.3.2 Filtering Technique for Line Segment

Conventionally, the line segments are extracted by the Hough transformation or the projection method after applying the two-dimensional Gaussian filter. This method has the same problem as the above technique since the two-dimensional Gaussian filter is used, and the amount of processing rapidly increases with the square of the filter size.

Although, as an alternative, there is a method of applying small filters in series to synthesize a large filter, the total necessary amount of processing in this case is $m^2 \times N^2$ except for a case where the filter function is special, and the problem is essentially not solved.

As explained above, there is a problem that the amount of processing increases due to the filtering process in the process for extraction of a line segment.

In addition, the use of a large mask is impossible in the conventional technique due to the increase in the amount of processing, therefore the processing of an obscure image, which requires a large mask, is difficult, and the precise extraction of a line segment from the obscure image is impossible.

Further, the edge cannot be extracted by the conventional technique, and the lines and the gaps cannot be extracted as prominent features.

2. Second Aspect of Present Invention

2.1 Basic Construction of Second Aspect of Present Invention

Figure 27:
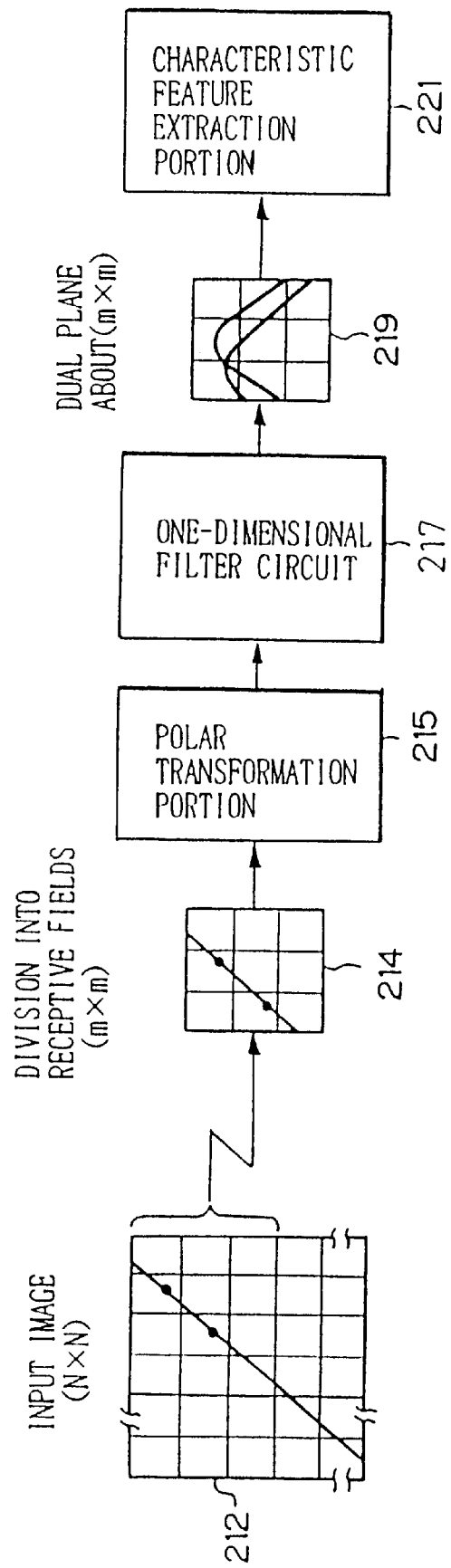
FIG. 27 is a diagram for illustrating the basic construction of the second aspect of the present invention.

FIG. 27 is a diagram illustrating the basic construction of the second aspect (the receptive field method +one-dimensional filtering) of the present invention.

In FIG. 27: reference numeral 212 denotes an input memory for storing an image of an object (input image) IMG having a size equal to N×N pixels and being projected on a predetermined input plane; 214 denotes a receptive field memory for storing an image (receptive field image) in each receptive field when the input plane is divided into receptive fields (small areas) of a size m×m; 215 denotes a polar transformation portion for applying polar transformation to each receptive field; 217 denotes a one-dimensional filter circuit for applying one-dimensional filter processing to an output of the polar transformation; 219 denotes a hypercolumn memory for storing an image on a dual plane (hypercolumn plane), to which the polar transformation and the one-dimensional filtering is applied; and 221 denotes a characteristic feature extraction portion for extracting a characteristic feature such as a line, an edge, and a gap in an image.

The image IMG of the object of the size equal to N×N pixels is divided into receptive field images of the size equal to m×m pixels, and the divided images are stored in turn in the receptive field memory 214. The polar transformation portion 215 performs polar transformation on each polar transformation image. The one-dimensional filter circuit 217 applies a predetermined one-dimensional filter processing to the output of the polar transformation, and stores the output of the processing (hypercolumn images) in the hypercolumn memory 219. The characteristic feature extraction portion 221 performs image processing based on the hypercolumn image to extract a characteristic feature such as a line, an edge, and a gap. Since only a one-dimensional filter is required to be applied in the present invention, the amount of processing is remarkably reduced compared with the conventional case wherein the two-dimensional filter is applied, a large filter which enables processing of obscure images and precise filtering, can be applied with the same amount of processing as the conventional case, and therefore a line segment can be precisely extracted from an obscure image.

In addition, an edge can be extracted while the extraction of an edge is difficult in the conventional two-dimensional filter method. Since the two-dimensional filter for extracting an edge is an odd-function filter, and different filters must be provided for the respective directions, the amount of processing is greatly increased compared with the amount of processing for extracting a line. According to the present invention, as explained later, arbitrary filtering can be realized by "a one-dimensional filter ($\rho$-direction) independent of $\theta$" after the polar transformation, and the extraction of an edge, for which an odd-function is required, can be performed with an amount of processing which is not so large. The one-dimensional filter is applied after the projection in all of the directions (polar transformation). Namely, the isotropic processing is already performed. The one-dimensional filtering applied after the polar transformation does not affect the isotropy, and therefore an arbitrary filter can be applied. Thus, a one-dimensional odd-function filter which is necessary for the extraction of an edge is applied as the one-dimensional filter, and an edge can be extracted while, conventionally, the edge cannot be detected.

Further, when the one-dimensional filter is constituted by a skeleton filter the characteristic of which can be represented by the Dirac's $\delta$-function, an edge can be extracted by a simple and fast calculation process.

As another variation, when a plurality of types of one-dimensional filter processing having different widths are applied to the output of the polar transformation at the same time, and the outputs thereof are synthesized (multi-filter), obscure portions and sharp portions which exist in the same image can be extracted at the same time to enable movement and working based on recognition of the whole image.

In addition, the image of an object is divided into receptive fields, polar transformation is performed on each receptive field image, and one-dimensional filter processing is applied to the polar-transformed output so that a line can be extracted. Further, a gap can be extracted by inversing the polarity of the output of the one-dimensional filtering, and an output of a one-dimensional Gaussian filter in a vicinity of a peak in the output of the polar transformation is selected, so that exclusive extraction of a line segment(s) becomes possible.

Further, when the image of an object is divided into receptive fields, polar transformation is performed on each receptive field image, and a one-dimensional gradient filter processing is applied to the output of the polar transformation, so that an edge can be extracted. Alternatively, when a one-dimensional Gaussian filter processing is applied in addition to the above one-dimensional gradient filter processing, the edge can also be extracted. Further, when a plurality of types of one-dimensional gradient filter processing having different widths are applied to the output of the polar transformation at the same time, and the outputs thereof are synthesized (multi-filter), obscure portions and sharp portions which exist in the same image can be extracted at the same time. Alternatively, a plurality of types of one-dimensional Gaussian filter processing may be applied in addition to the above plurality of types of one-dimensional gradient filter processing for extracting the edge.

As another variation, in a one-dimensional multi-stage filter which is constituted by connecting a one-dimensional gradient filter and a one-dimensional Gaussian filter in multiple stages, an output of each stage is separated into positive and negative signals to be subjected to the filter processing in the following stage(s). Thus, fine features such as a narrow band, dense lines, an edge, and the like, can be extracted while suppressing interference.

2.2 Outline of One-Dimensional Filter

It is desirable to precisely separate and extract the three types of line segments from obscure portions. However, since the convolution filter for extracting a line segment in the conventional technique performs two-dimensional calculations, the amount of processing increases with the square of the filter size, and therefore the provision of a large filter for extraction of an obscure portion is difficult. In the present invention, attention is directed to the receptive field method to perform the function of the two-dimensional filter by a one-dimensional filter (one-dimensional filter method). The essential points of the one-dimensional filter method are explained below. Namely, the principle of the one-dimensional filter method is based on the relationship that "to perform polar transformation after a two-dimensional convolution filter is applied" is equivalent to "to apply a one-dimensional filter after polar transformation is performed".

Due to the above relationship, the function of the two-dimensional filter can be performed by a one-dimensional filter, and the amount of processing is reduced to about 2/(the diameter of the convolution filter) as explained later. Thus, the function of the two-dimensional filter of 13×13 pixels can be performed with an amount of processing which is equal to the amount of processing of the two-dimensional filter of 5×5 pixels, and a filter which is large enough to perform the processing of obscure images and the fine filtering, can be realized.

The above important relationship that "the function of the two-dimensional filter can be performed by a one-dimensional filter" is derived from the "polar transformation" in the receptive field method. This relationship can be widely utilized in the image processing, such as for quickly emphasizing and extracting arbitrary variations of brightness, and the like. The basic flow of processing is: input image→the receptive field method (division into receptive fields→polar transformation)→one-dimensional filter.

2.3 Principle and Characteristic of One-Dimensional Filter Method

Although the receptive field method can be applied in general polar transformation, for ease in understanding the principle, the principle of the one-dimensional filter method is explained below in relation to the projection method which is a kind of polar transformation.

2.3.1 Principle of One-Dimensional Filter Method

FIGS. 28A, 28B, 28C, 28D, 28E, 28F, and 28G are diagrams for explaining a principle of the one-dimensional filter method in the present invention. First, symbols used in the explanation are explained. In the explanation, ψ denotes a projection axis which makes an angle θ to the y-axis of the x-y coordinate system, and ρ denotes a coordinate axis perpendicular to the projection axis ψ. When an original image is denoted by f(ρ,ψ), and the two-dimensional convolution filter is denoted by g(ρ,ψ), the output c(ρ,ψ) of the two-dimensional convolution filter is expressed as $$c(\rho,\psi) = \int\int g(\rho-\alpha,\psi-\beta)f(\alpha,\beta)d\alpha d\beta. \tag{11}$$

An output C(ρ,ψ) of the projection of c(ρ,ψ) in the ψ-direction is expressed as $$C(\rho,\psi) = \int\int\int g(\rho-\alpha,\psi-\beta)f(\alpha,\beta)d\alpha d\beta d\psi \tag{12}$$
$$= \int\int\left[\int g(\rho-\alpha,\psi-\beta)d\psi\right]f(\alpha,\beta)d\alpha d\beta$$
$$= \int\int\left[\int g(\rho-\alpha,\psi)d\psi\right]f(\alpha,\beta)d\alpha d\beta$$
$$= \int\left[\int g(\rho-\alpha,\psi)d\psi\right]\left[\int f(\alpha,\beta)d\beta\right]d\alpha.$$

When defining $$F(\rho,\psi) = \int f(\rho,\psi)d\psi, \text{ and} \tag{13}$$

$$G(\rho,\psi) = \int g(\rho,\psi)d\psi,$$

the output C(ρ,ψ) of the projection of the two-dimensional convolution in the ψ-direction is finally expressed as $$C(\rho,\psi) = \int G(\rho-\alpha)F(\alpha)d\alpha, \tag{14}$$

where F(ρ,ψ) and G(ρ,ψ) are projection results of the original image and the two-dimensional convolution in the ψ-direction, respectively. Therefore, from the equation (14), C(ρ,ψ)=one-dimensional convolution of "the projection component of the original image" and "the projection component of the filter", (15)

is derived. From the equation (14), the above-mentioned relationship that "to perform polar transformation after a two-dimensional convolution filter is applied" is equivalent to "to apply a one-dimensional filter after polar transformation is performed", (16)

is proved.

According to the above relationship, when the projection processing is performed preceding the filtering processing, the filtering process can be the application of a one-dimensional filter in the ρ-direction, and the increase in the amount of processing as in the two-dimensional convolution can be avoided. The image of the above mathematical transformation can be understood by FIGS. 28A–28G, where FIG. 28A indicates an original image, FIG. 28B indicates the filter characteristic of the two-dimensional convolution filter, FIG. 28C indicates the result of the application of the two-dimensional convolution filter to the original image, FIG. 28D indicates the output C(ρ,ψ) of the projection in the ψ-direction of the two-dimensional convolution, FIG. 28E indicates the projection component of the original image in the ψ-direction, FIG. 28F indicates the one-dimensional convolution filter (the projection component of the two-dimensional filter characteristic), and FIG. 28G indicates the result of the one-dimensional convolution of "the projection component of the original image" and "the projection component of the filter". The results of FIGS. 28D and 28G are equal, and this proves the relationship that "to perform polar transformation after a two-dimensional convolution filter is applied" is equivalent to "to apply a one-dimensional filter after polar transformation is performed". In FIGS. 28A to 28G, ⊙ denotes a convolution calculation, and P0( ) denotes a projection to the direction which makes an angle θ to the y-axis.

Although the above proof is based on the projection method for ease in understanding, the relationship exists for general polar transformation, where the "polar transformation" is a generalized concept of the "projection". Therefore, for general polar transformation, "to perform polar transformation after a two-dimensional convolution filter is applied" is equivalent to "to apply a one dimensional filter after polar transformation is performed". Thus, the filtering processing can be the application of a one-dimensional filter for general polar transformation, and the high speed processing with a filter of a large size is possible.

2.3.2 Limit of Two-Dimensional Convolution Filter

It is important to note that the object of the two-dimensional convolution filter is to filter the brightness of the input image, transform the brightness to a scalar quantity, and perform the emphasis of contours and the like. However, generally, the output of the equation (11) is transformed to a function of the angle θ as a parameter, in addition to ρ and ψ. Exactly, the equation (11) is expressed as $$c(\rho,\psi,\theta)=\int\int g(\rho-\alpha,\psi-\beta,\theta)f(\alpha,\beta)d\alpha d\beta \tag{17}$$

The filter function $g(\rho,\psi,\theta)$ is a function of the location $(\rho,\psi)$ of the pixel and the angle θ of the projection axis, and has three degrees of freedom. The equation (17) is a scalar only when the filter function $g(\rho,\psi,\theta)$ is not a function of θ, i.e., the filter function $g(\rho,\psi,\theta)$ is isotropic. In this case, the filter function is a "ring-like function" having a common center of the receptive field. As explained later in detail, there is a limit in that this ring-like function can perform two-dimensional differentiation of even order only.

Thus, it is understood that the two-dimensional convolution filters which can perform transformation of brightness, required in image processing, are limited to a combination of ring-like two-dimensional filters, and only the two-dimensional differentiation of the even order can be performed.

In the differentiation of the even order, there is a limit that the "edge (a border at which the variation of brightness is locally maximum)", which is an important feature, cannot be extracted. On the other hand, as explained later, an arbitrary filter can be applied in the one-dimensional filter method, and extraction of an "edge" is possible.

2.4 Actual Proof

The "equivalence of the two-dimensional filter to the one-dimensional filter" is proven by simulation as follows.

2.4.1 Two-Dimensional Convolution+Receptive Field Method

As "the two-dimensional convolution+the receptive field method", the flow of:

input image→the two-dimensional convolution→the receptive field method (division into receptive fields→polar transformation), (18)

is adopted, and the size of the receptive field=a diameter of 22 pixels, and the two-dimensional filter=two-dimensional convolution filter processed in the retina of the mammalian (σ=1 pixel)

$$g(r)=\exp(-r^2/\sigma^2)-0.236\exp(-r^2/(1.75\sigma)^2), \tag{19}$$

are used as parameters.

A response on the dual plane (hypercolumn plane), which is obtained by applying the processing of the flow of (18), to the receptive field image (see FIGS. 29A and 29B) in the round receptive field CRC cut out from the original image, is indicated by contour lines in FIGS. 29C and 29D, where a line L in the receptive field is extracted as a prominent peak PK in the dual plane. The curves in FIGS. 29B and 29D indicate brightness distribution in the horizontal cross-section in FIGS. 29A and 29C, respectively.

2.4.2 Receptive Field Method+One-Dimensional Convolution

As "the receptive field method+the one-dimensional convolution", the flow of:

input image→the receptive field method (division into receptive fields→polar transformation)→the one-dimensional convolution, (20)

is adopted, and the size of the receptive field=a diameter of 22 pixels, and the one-dimensional filter=one-dimensional filter (σ=1 pixel) generated by projecting the two-dimensional filter of (19) in the ψ-direction $$g(\rho)=\exp(-\rho^2/\sigma^2)-0.57\exp(-\rho^2/(1.75\sigma)^2), \tag{21}$$

are used as parameters.

A response on the dual plane (hypercolumn plane), which is obtained by applying the processing of the flow of (20), to the receptive field image (see FIGS. 30A and 30B) in the round receptive field CRC cut out from the original image, is indicated by contour lines in FIGS. 30C and 30D, where a line L in the receptive field is extracted as a prominent peak PK in the dual plane.

When comparing the simulation result of the "the two-dimensional convolution+the receptive field method" (FIGS. 29A to 29D) with the simulation result of "the receptive field method+the one-dimensional convolution" (FIGS. 30A to 30D), it is understood that there is no significant difference between these results. Namely, the above relationship explained before as the principle of the one-dimensional filter method is proven.

2.5 Amount of Processing and Processing System

Next, the amount of processing is estimated in comparison with the two-dimensional convolution filter.

2.5.1 Amount of Processing of "Division into Areas+Polar Transformation+One-Dimensional Filter"

When a denotes a width of a one-dimensional filter, m denotes a size of the receptive field, and N denotes a size of an image, the amount of $P_{1D}$ of processing is $P_{1D}$={amount of processing of polar transformation}+{amount of processing of one-dimensional filter}.

Since the amount of processing $$= \text{(number of receptive fields)} \cdot \text{(amount of process of polar transformation in the receptive field)} \tag{22}$$

$$= ((N/m)^2) \cdot (m^3)$$

$$= mN^2, \text{ and}$$

the amount of processing of the one-dimensional filter $$= \text{(number of receptive fields)} \cdot \text{(amount of processing of the one-dimensional filter)} \cdot \text{(number of directions)} \tag{23}$$

$$= ((N/m)^2) \cdot (am) \cdot (m)$$

$$= aN^2$$

-continued $$P_{1D} = mN^2 + aN^2 \qquad (24)$$
$$= (m+a)N^2$$

Further, since a has a size near m, "the amount of processing of the polar transformation is approximately the same as the amount of processing of the one-dimensional filter". In addition, since the filter size does not exceed m, $$P_{1D} \leq 2mN^2. \qquad (25)$$

2.5.2 Amount of Processing of "Two-Dimensional Filter+ Division into Areas+Polar Transformation"

When the diameter is denoted by a, the amount $P_{2D}$ of processing of "two-dimensional filter+division into areas+polar transformation" is expressed as $$P_{2D} = \{\text{amount of processing of two-dimensional filter}\} + \qquad (26)$$
$$\{\text{amount of processing of polar transformation}\},$$
where the amount of processing of two-dimensional filter
$$= (\text{total number of pixels}) \cdot (\text{amount of processing of two-dimensional filter})$$
$$= (N^2) \cdot (a^2)$$
$$= a^2 N^2.$$

Since the amount of processing of polar transformation= the equation $(22)=mN^2$, $$P_{2D} = a^2 N^2 + mN^2 \qquad (27)$$
$$= (a^2 + m)N^2, \text{ and}$$

the filter size a does not exceed m, $$P_{2D} \leq (m^2+m)N^2 \qquad (28)$$
$$\approx m^2 N^2. \qquad (29)$$

2.5.3 Comparison of Amounts of Processing
2.5.3.1 Total Comparison of Amounts of Processing
From the equations (14) and (17), $$P_{2D}/P_{1D}=(a^2+m)/(m+a). \qquad (30)$$

The amounts are equal when a=1, and the ratio increases with a. At the maximum filter width a=m, $$P_{2D} / P_{1D} = (m^2 + m) / (m + m) \qquad (31)$$
$$= (m+1)/2$$
$$\approx m/2. \qquad (32)$$

Therefore, a great contribution is obtained in that the one-dimensional filter can perform the processing of a large filter equivalent to the two-dimensional filter of $(m^2/2)\times(m^2/2)$ with the amount of processing of the two-dimensional filter m×m when the filter width is equal to the maximum (a=m).

2.5.3.2 Comparison of Amounts of Processing
From the equations (23) and (26), $$F_{2D}/F_{1D}=a \qquad (34)$$

is obtained, and the amount of processing increases in proportion to the filter width a. The reason is because the amount of processing in the two-dimensional filter increases with the square of the diameter of the filter while the amount of processing in the one-dimensional filter increases in proportion to the filter length, and "the processing of a large one-dimensional filter of a size $a^2 \times a^2$ can be performed with the amount of processing of the two-dimensional filter of a size a×a". (35)

2.5.4 Processing System

Figure 31A:
FIGS. 31A, 31B, 31C, and 31D are diagrams illustrating various processing methods.
Figure 31B:
Figure 31C:
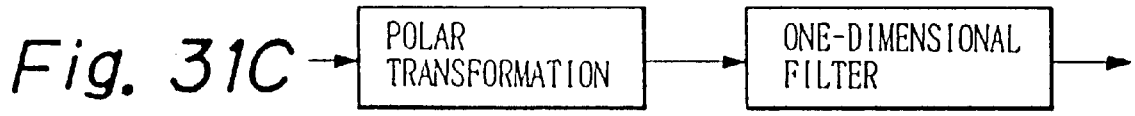
Figure 31D:

The above processing can be performed in accordance with the following four types of flows. FIGS. 31A, 31B, 31C, and 31D are block diagrams illustrating constructions performing these processing flows, where FIG. 31A is a block diagram for the case of "performing the polar transformation and the one-dimensional filter in the same processing apparatus"; FIG. 31C is a block diagram for the case of "performing the polar transformation and the one-dimensional filter in different processing apparatuses"; FIG. 31B is a block diagram for the case of "performing the two-dimensional filter and the polar transformation in the same processing apparatus"; and FIG. 31D is a block diagram for the case of "performing the two-dimensional filter and the polar transformation in different processing apparatuses".

In Table 6, these four-types of processing systems are compared with regard to the processing time and the hardware size, where the comparison is made for the maximum filter size (a=m). Although the hardware size for the case where the polar transformation and the one-dimensional filter are performed in the same processing apparatus is half of the hardware size for the case where the polar transformation and the one-dimensional filter are performed in different processing apparatuses, the processing time in the case where the polar transformation and the one-dimensional filter are performed in the same processing apparatus is two times the processing time in the case where the polar transformation and the one-dimensional filter are performed in different processing apparatuses since the filter processing and the polar transformation cannot be performed at the same time in the latter case. It is understood that the one-dimensional filter method is superior to the two-dimensional filter method in both the cases where the above processing is performed in the same apparatus and in different apparatuses.

2.6 Construction of Line Segment Extraction System
2.6.1 Overall Construction

FIG. 32 is a diagram illustrating a construction of a line segment extraction system as an embodiment of the second aspect of the present invention, where the line segment extraction is performed as: an input image→the receptive field method (division into receptive fields→polar transformation)→the one-dimensional convolution. The construction of FIG. 32 is also a construction of a line segment extraction system as an embodiment of the first aspect of the present invention.

In FIG. 32: reference numeral 10 denotes a camera for inputting an image; 11 denotes a control portion for controlling the overall system for line segment extraction; 12 denotes an input memory for storing an image of an object (input image) having a size equal to N×N pixels and being projected on a predetermined input plane; 13 denotes a receptive field cutting-out circuit for cutting out in turn images (receptive field image) in the respective receptive fields which are obtained by dividing the input plane into small areas of a size m×m; 14 denotes a receptive field memory for storing an image (receptive field image) in each receptive field; 15 denotes a polar transformation circuit for applying polar transformation in each receptive field; and 16 denotes a hypercolumn memory for storing an image (hypercolumn image) on a dual plane (hypercolumn plane) obtained by the polar transformation. The hypercolumn memory 16 is constituted by storage-area hypercolumn cells containing $\rho_{max}$ cells in the $\rho$-direction and $\theta_{max}$ cells in the $\theta$-direction and $\rho_{max} \times \theta_{max}$ cells as a total.

Reference numeral 17 denotes a one-dimensional filter circuit for applying one-dimensional filter processing to the hypercolumn image obtained by the polar transformation; 18 denotes an element hypercolumn memory for storing a hypercolumn image to which the filter processing is applied; 19 denotes a total hypercolumn memory for storing a total hypercolumn image; 20 denotes a transfer circuit for transferring the hypercolumn image in the element hypercolumn memory 18 to a predetermined storage area in the total hypercolumn memory 19; and 21 denotes a characteristic feature extraction portion for extracting a feature of a line segment such as a line, an edge, and a gap in an image.

The polar transformation circuit 15 performs the polar transformation on each pixel in the receptive field, i.e., transforms each pixel to a great circle or the like, corresponding to the pixel, and stores the great circle in the polar transformation hypercolumn memory 16. In practice, the polar transformation is approximated as "transformation from a pixel to a sine wave" due to small size of the receptive field, and each pixel in the receptive field is transformed to a sine wave, corresponding to the pixel, on the hypercolumn, and stores the sine wave in the polar transformation hypercolumn memory 16.

The one-dimensional filter circuit 17 is provided for performing the extraction of a line, edge, and gap with a small amount of processing. Conventionally, for emphasizing a contour, image data is filtered by the two-dimensional convolution filter, and is then polar-transformed. However, according to the convolution method, the amount $a^2$ of processing is necessary when the filter size is equal to a, and the amount of processing increases with the increase in the filter size. However, since "two-dimensional convolution filter+polar transformation" is equivalent to "application of a one-dimensional filter in the $\rho$-direction after polar transformation", the one-dimensional filter is applied after the polar transformation in the embodiment of FIG. 32. Thus, the amount of processing is reduced about 2/a of the amount of processing in the convolution method.

2.6.2 Polar Transformation Circuit

As indicated in FIG. 33, the polar transformation circuit comprises: a reading control portion 15a for reading out the brightness of the receptive field image (amplitude) pixel by pixel from a corresponding address in the receptive field memory 14; a polar transformation portion 15b for performing the polar transformation for each pixel (transformation from the address of the pixel to an address for the sine wave); and a writing control portion 15c for writing the amplitude read as above at a plurality of storage positions in the polar transformation hypercolumn memory 16, where the storage position is indicated by the address of the sine wave obtained by the polar transformation.

The polar transformation portion 15b comprises: an address transformation memory 15b-1 which provides correspondence between a pixel address of the receptive field memory 14 and a plurality of addresses in the polar transformation hypercolumn memory 16; and an address transformation circuit 15b-2 which transforms the address in the receptive field memory 14 to an address in the polar transformation hypercolumn memory 16. The address transformation table stored in the address transformation table memory 15b-1 is provided for applying polar transformation to each point in the receptive field to transform the point to a sine wave on the hypercolumn plane. That is, the address transformation table memory 15b-1 transforms an address corresponding to the point in the receptive field to a plurality of addresses on the polar transformation hypercolumn memory, where a series of points constituting the sine wave is located in the plurality of addresses.

The reading control portion 15a reads amplitude data from the first address in the receptive field memory 14, and inputs the amplitude data and the address data (the first address) into the polar transformation portion 15b. The polar transformation portion 15b transforms the first address in the receptive field memory to a plurality of addresses in the polar transformation hypercolumn memory 16 for the series of points of the sine wave, and outputs the addresses and the amplitude. The writing control portion 15c adds the amplitude data input thereto to the content (the initial value thereof is equal to zero) of each address in the polar transformation hypercolumn memory 16, where the address is input thereto at the same time as the amplitude data, and writes the added data in the address. Thereafter, the above processing is performed for all the addresses in the receptive field memory 14 to complete the polar transformation for the receptive field image.

2.6.3 One-Dimension Filter Circuit

Figure 34:
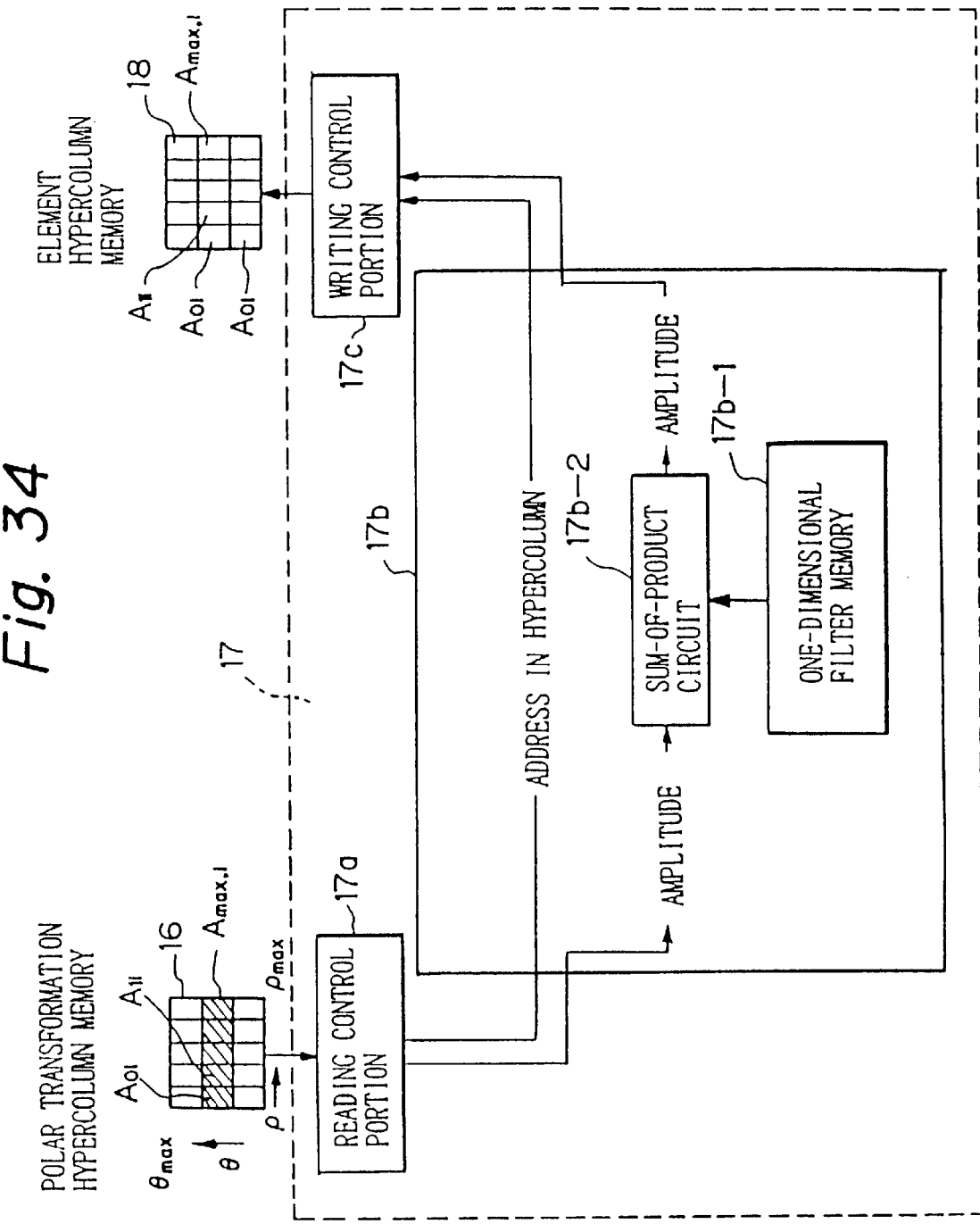
FIG. 34 is a diagram illustrating a one-dimensional filter circuit.

As indicated in FIG. 34, the one-dimensional filter circuit 17 comprises: a reading control portion 17a for reading out amplitudes from addresses (for example, as indicated in the hatched portion in FIG. 34) for a constant $\theta$ in the polar transformation hypercolumn memory 16, where the number of the addresses equals $\rho_{max}$, and outputting the amplitudes; a one-dimensional filter portion 17b for applying one-dimensional filter processing to the respective amplitudes read out as above; and a writing control portion 17c for writing the result of the one-dimensional filter processing into a storage area of the element hypercolumn memory 18.

Figure 35A:
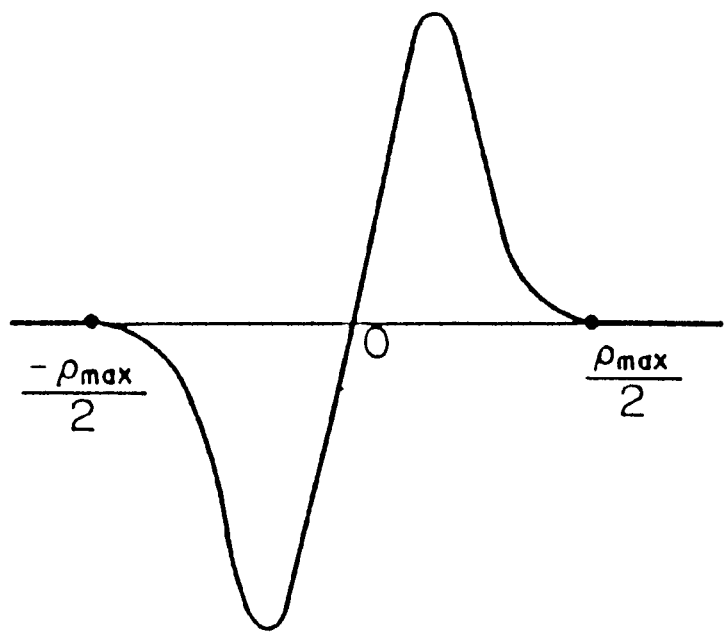
FIGS. 35A and 35B are diagrams for explaining the storing operation in the one-dimensional filter memory.
Figure 35B:
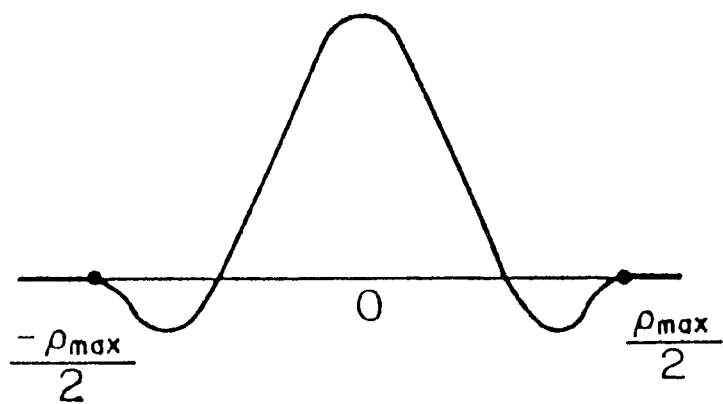

The one-dimensional filter portion 17b is constituted by a one-dimensional filter circuit 17b-1 and a sum-of-product circuit 17b-2. In the one-dimensional filter circuit 17b-1, the characteristic of the one-dimensional filter is stored in the form of discrete values, wherein the $\rho$-axis is used as a horizontal axis. Namely, the filter characteristic values are stored for the respective locations $-\rho_{max}/2 \sim \rho_{max}/2$ on the $\rho$-axis in the one-dimensional filter circuit 17b-1. For example, in the case where the one-dimensional filter is a one-dimensional first differential filter, the characteristic values on the curve as indicated in FIG. 35A are stored, and in the case where the one-dimensional filter is a one-dimensional second differential filter, the characteristic values on the curve as indicated in FIG. 35B are stored. The width and values of the filter are appropriately determined as needed. The sum-of-product circuit 17b-2 multiplies the $\rho_{max}$ values of amplitudes read out as above by the corresponding $\rho_{max}$ characteristic values stored in the one-dimensional first memory 17b-1, respectively to output a sum of the products (as an amplitude), and performs a similar calculation of sums of products for the cases wherein the correspondence between the pixels in the values of amplitudes and the pixels of the characteristic values are shifted, to output the results thereof.

For example, $\rho_{max}$ values of amplitudes are read out from all addresses ($\rho_{max}$ values of addresses) in the polar transformation hypercolumn memory 16 for the orientation $\theta_i$ (the initial value is $_i$=1). Next, the location of the filter characteristic value for ρ=0 is made to correspond to the address $A_{0i}$ located at the left end among the $ρ_{max}$ values of addresses. Then, the multiplication operations of the corresponding values of the amplitudes and the characteristic values are performed, and a sum of the products is obtained by calculation to write the sum in the address $A_{0i}$ in the element hypercolumn memory 18 by the writing control portion 17c.

When the above operation is completed, the location of the filter characteristic value for ρ=0 is made to correspond to the address $A_{1i}$ located at the second from the left end among the $ρ_{max}$ values of addresses. Then, the multiplication operations of the corresponding values of the amplitudes and the characteristic values are performed, and a sum of the products is obtained by calculation to write the sum in the address $A_{1i}$ in the element hypercolumn memory 18 by the writing control portion 17c. A similar operation is performed thereafter until the location of the filter characteristic value for ρ=0 is made corresponding to the address $A_{max,i}$ located at the right end among the $ρ_{max}$ values of addresses. Then, the index $_i$ is shifted to $_i$+1 to repeat the above calculation of the sum of products for the one-dimensional filtering.

The above calculation of the sum of products is expressed by equations as follows.

Among the area Aρi in the hypercolumn memory, data in the row corresponding to the orientation $θ_i$ are denoted by $A(0-ρ_{max}/2,i), A(1-ρ_{max}/2,i), \ldots A(ρ,i), \ldots A(ρ_{max}/2,i)$, and the content of the one-dimensional filter memory is denoted by $g(0-ρ_{max,i}), g(1-ρ_{max,i}), \ldots g(ρ,i), \ldots g(ρ_{max-1},i), g(ρ_{max},i)$, the output in each orientation $θ_i$ from the one-dimensional filter portion is given as $$OUT(ρ,θ_i)=Σ_k A(k,i)g(ρ-k,i)$$

where the range of the accumulation is $0~ρ_{max}+1$.

2.7 Evaluation of "Receptive Field Method+One-Dimensional Filter"

2.7.1 Speed-up of Large Mask Filter

By the "receptive field method+one-dimensional filter", the function of the two-dimensional filter can be performed by a one-dimensional filter, and processing of a large mask can be performed at high speed. When the filter size of the conventional method is assumed to be m×m, the amount of processing is reduced to 2/m, and the greater the effect of the reduction of the amount of processing is, the larger the filter size is. For example, processing of a two-dimensional filter having a size of 13×13 pixels can be effectively performed with the same amount of processing of the conventional two-dimensional filter of a size of 5×5 pixels. Namely, the effect is great. Due to the fast processing of the large size filter, the following problems are solved.

2.7.1.1 Fast Processing of Obscure Image

As explained above, it is understood that processing of the two-dimensional filter having an effective size of 13×13 pixels can be effectively performed with the capability of the conventional hardware. This size is about the same as that of a receptive field, and therefore a line segment can be extracted from an extremely obscure image which covers a receptive field. Thus, the problem of the fast processing of the obscure image is solved.

2.7.1.2 Fine Filtering of Line Segment

Although precise sorting and extraction of three types of line segments (line, edge, and gap) are required, this requirement is satisfied by an algorithm which is based on the fast processing with the one-dimensional filter, and is explained later. The above two effects are just an example of the present invention, and the following new filter can be realized based on the speed-up due to the feature that "the function of a two-dimensional filter can be performed by a one-dimensional filter". In addition, the "one-dimensional filter method" can exist in the same way as above in an arbitrary input projective plane and an arbitrary type of polar transformation. Namely, the present invention can benefit many applications.

2.7.2 Filtering Impossible with Two-Dimensional Filter (Odd-Function Filter)

In addition to the speed-up of processing, filtering which is impossible with the conventional two-dimensional filter is made possible with use of the one-dimensional filter.

2.7.2.1 Projection of Two-Dimensional Filter Generates One-Dimensional Even Function Filter There is a requirement for the two-dimensional filter that "the filter function per se must be isotropic". This is because, when the filter function is unisotropic, only a line segment in a specific direction is emphasized, and the extracted image becomes unnatural. Due to the requirement of isotropy, the two-dimensional filter is limited to be a "g(r)-type filter which depends on the distance r from the center only". Although the emphasis of a contour by using a two-dimensional filter having a diameter of about 30 elements is performed in the retina and the lateral geniculate nucleus in the mammalian, the two-dimensional filter is an isotropic g(r)-type filter.

When the g(r)-type filter is made into a one-dimensional filter as explained in the item of the principle of the one-dimensional filter method, the one-dimensional filter becomes an "even-function G(ρ) which is symmetric about the center". Namely, the two-dimensional filter becomes a one-dimensional even-function filter when the two-dimensional filter is projected, and an odd-function filter is not realized. Thus, the type of filters generated by projecting a two-dimensional filter is limited.

2.7.2.2 Arbitrary Function Filter is Possible by "Receptive Field Method+One-Dimensional Filter"

On the other hand, according to the "receptive field method+one-dimensional filter" in the present invention, isotropic filtering is possible with an arbitrary function including the odd-function. The essential point is the application of a one-dimensional filter after being "mapped to all directions (polar transformation)". Since the isotropic processing is already applied by the projection, the application of the one-dimensional filter is not affected by the isotropy, and this is the reason why an arbitrary filter can be applied.

From the above explanation, the following fact is understood. The explanation that "the processing of a two-dimensional filter can be performed by a one-dimensional filter" is not sufficient. That is, the statement that "the processing of a one-dimensional filter can be performed by a two-dimensional filter" is not necessarily true. Describing more precisely, "polar transformation+one-dimensional filter" which gives the same output as "two-dimensional filter+polar transformation" necessarily exists. However, the inverse is not true. That is, "polar transformation+two-dimensional filter" which gives the same output as "one-dimensional filter+polar transformation" exists only when the one-dimensional filter is an even-function type.

An arbitrary filter is possible in the processing of "polar transformation+one-dimensional filter", and the possible arbitrary filter includes a filter which is impossible in the processing of "two-dimensional filter+polar transformation" (such as an odd-function filter, a skeleton filter, and the like).

2.7.2.3 Characteristic of Odd-Function (Even-Function) Realizes a Differential Filter of Odd (Even) Order The "one-dimensional odd-function filter", which is not possible by the conventional two-dimensional filter, and becomes possible according to the present invention, is an important filter which is indispensable for extraction of an "edge".

There is the following relationship between the odd-even symmetry of a filter and a differential operation.

The one-dimensional filter has a differential operation of an odd order when the one-dimensional filter is an odd-function type.

The one-dimensional filter has a differential operation of an even order when the one-dimensional filter is an even-function type.

Considering that the filtering is performed by convolution, the reason why the above relationship exists can be understood below.

2.7.2.3.1 In Case of Odd-Function $$\int_{-a}^{a} f(\rho-\alpha) \cdot g(\alpha) d\alpha = \int_{0}^{a} f(\rho-\alpha) \cdot g(\alpha) d\alpha + \int_{-a}^{0} f(\rho-\alpha) \cdot g(\alpha) d\alpha$$

$$= \int_{0}^{a} f(\rho-\alpha) \cdot g(\alpha) d\alpha - \int_{-a}^{0} f(\rho-\alpha) \cdot g(\alpha) d\alpha$$

$$= \int_{0}^{a} \{f(\rho-\alpha) - f(\rho+\alpha)\} g(\alpha) d\alpha$$

As indicated above, the convolution becomes a form of a difference of the first order, and a first differentiation is performed. When the function $g(\alpha)$ contains a characteristic of an odd function of a higher order, the differentiation is performed about the center of the symmetry thereof. Summarizing the above, it is understood that "a one-dimensional filter of an odd-function performs differentiation of an odd order".

When the filter is not a complete odd-function in the above, that is $$g(\alpha) = -\eta(\alpha) \cdot g(-\alpha),$$

the function to be integrated becomes $$\{f(\rho-\alpha) - \eta(\alpha) \cdot f(\rho+\alpha)\} g(\alpha)$$

to generate an offset component. However, the differentiation of the first order is still performed. Therefore, the operation of differentiation of the first order is performed when the filter function is not a complete odd-function as long as the function contains an odd-function component.

2.7.2.3.2 In Case of Even-Function $$\int_{-a}^{a} f(\rho-\alpha) \cdot g(\alpha) d\alpha = \int_{0}^{a} f(\rho-\alpha) \cdot g(\alpha) d\alpha + \int_{-a}^{0} f(\rho-\alpha) \cdot g(\alpha) d\alpha \quad (a)$$

$$= \int_{0}^{a} f(\rho-\alpha) \cdot g(\alpha) d\alpha + \int_{-a}^{0} f(\rho-\alpha) \cdot g(\alpha) d\alpha$$

$$= \int_{0}^{a} \{f(\rho-\alpha) + f(\rho+\alpha)\} g(\alpha) d\alpha$$

When the integration is replaced with a difference in the above equation, and defining $g_a(0) = g(0)/N_a$ and $\Delta a = 1/N_a$, $$\sum_{i=0}^{Na} \Delta a [2 \cdot f(\rho) \cdot g_a(0) + \{f(\rho-\alpha_i) + f(\rho+\alpha_i)\} \cdot g(\alpha_i)] \quad (b)$$

-continued $$= \sum_{i=0}^{Na} \Delta a [\{f(\rho) \cdot g_a(0) + \{f(\rho-\alpha_i)\} \cdot g(\alpha_i)\} + \quad (c)$$

$$\{f(\rho) \cdot g_a(0) + f(\rho+\alpha_i)\} \cdot g(\alpha_i)\}].$$

Each term in the above sum of products is sorted according to the state of the function $g(\alpha_i)$. The term in which $g(\alpha_i)$ is positive corresponds to an average operation as understood from the equation (b), and therefore the term functions as a low-pass filter. The term in which $g(\alpha_i)$ is negative corresponds to an operation of differentiation of the second order since the contents of the parentheses { } in the equation (c) are in the form of a difference of the first order, and the difference operates in two stages. When $g(\alpha)$ contains a characteristic of an even-function of a higher order, the above differentiation and the low-pass filter operates about the center of symmetry thereof. Summarizing the above, it is understood that "a one-dimensional filter of an even-function performs differentiation of the even order". The above low-pass filter can be considered as a differentiation of the order zero. Similar to the above case of the odd-function, when the function form of the filter is not a complete even-function, the filter has a function of differentiation of even order as long as the filter has the following characteristic of the even-function.

$$g(\alpha) = \eta(\alpha) \cdot g(-\alpha)$$

From the above consideration, it is understood that the two-dimensional filters generally used are equivalent to even-function one-dimensional filters, and therefore the operations thereof are limited to differentiation of an even order, and the differentiation of an odd order, which is necessary for extraction of an "edge", cannot be performed by the two-dimensional filters.

2.7.2.4 Odd-function Filter is Necessary for Extract of Edge

Figure 36A:
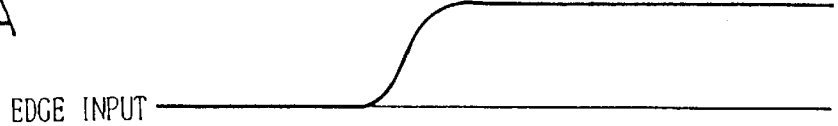
FIGS. 36A, 36B, 36C, 36D, 36E, and 36F are diagrams for explaining responses to an edge by even and odd function filters.
Figure 36B:
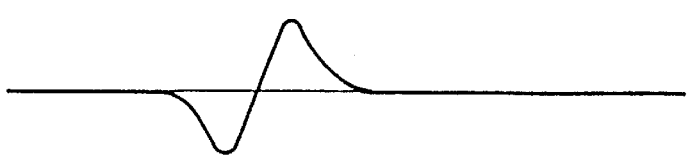
Figure 36C:
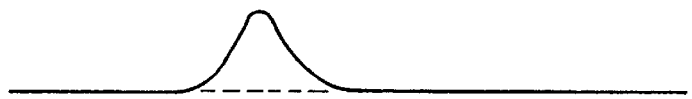

The characteristic which most frequently appears in an input image, and which is most credible, is a border between a luminous portion and a dark portion. This border is called an edge. For extracting the border, an operation of extracting a portion at which variation of brightness is maximum, is necessary, and mathematically, spatial differentiation of an odd order must be performed. FIGS. 36A, 36B, and 36C are output response diagrams for a case when a one-dimensional first differential filter is applied to an input image of an edge, where the output response indicates a peak at the center of the edge, and therefore an edge can be easily extracted.

Figure 36D:
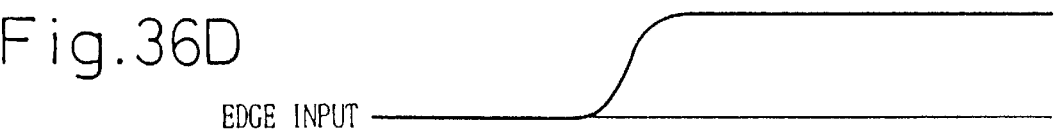
Figure 36E:
Figure 36F:
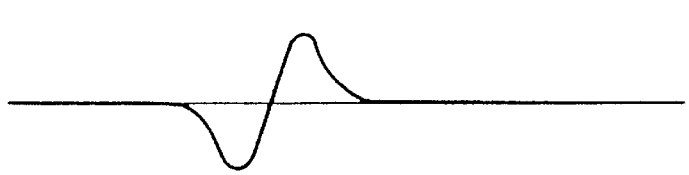

On the other hand, according to the conventional two-dimensional filter, an odd-function filter cannot be applied, and therefore the edge cannot be extracted. Therefore, conventionally, an indirect method is used. That is, a two-dimensional Gaussian filter (even-function) is applied to an input image, and differentiation of the second order is performed. Due to the differentiation of the second order, the output response becomes zero at the center (border) thereof where the variation of brightness is maximum. Therefore, the "zero-cross point" is extracted as an "edge" through troublesome processing. FIGS. 36D, 36E, and 36F are output response diagrams for a case when a two-dimensional second differential filter is applied to an input image of an edge, and the output response is equal to zero at the center of the edge. However, since the "portion of zero" is weak against noise, it is difficult to precisely extract the edge.

As explained above, according to the one-dimensional filter method in the present invention, the differentiation of an odd order is possible, and therefore a maximum output is obtained at the "border", and the extraction of an edge can be stably performed. Further, the primary visual cortex in the cerebrum of a mammalian contains cells (hypercolumn) for extracting an edge, are regularly arranged in rows, and a maximum response is obtained at the location of an edge. This indicates that a filter for differentiation of an odd order is realized therein. This operation of the primary visual cortex in the cerebrum of a mammalian can be modeled, and the flow of the operation is expressed as "two-dimensional second differential filter→polar transformation→first differential filter", which realizes a third differential filter as a whole to enable the extraction of an edge.

2.7.2.5 Result of Simulation

A result of a simulation, wherein the above model of the visual information processing by the mammalian is simulated for a real image, is indicated in FIGS. 37A, 37B, 37C, and 37D. FIGS. 37A and 37B are a contour map and a schematic diagram of an edge as a real image, respectively. FIGS. 37C and 37D indicate a response (brightness) of the hypercolumn by contour lines, FIG. 37C indicates a response (brightness) of the hypercolumn by a contour map, and FIG. 37D indicates a cross-section of the contour map. The edge EDG in the round receptive field CRC is extracted as a prominent peak PK on the hypercolumn plane of FIGS. 37C and 37D, and it is understood that the above odd-function filter is necessary to extract an "edge".

Figure 38A:
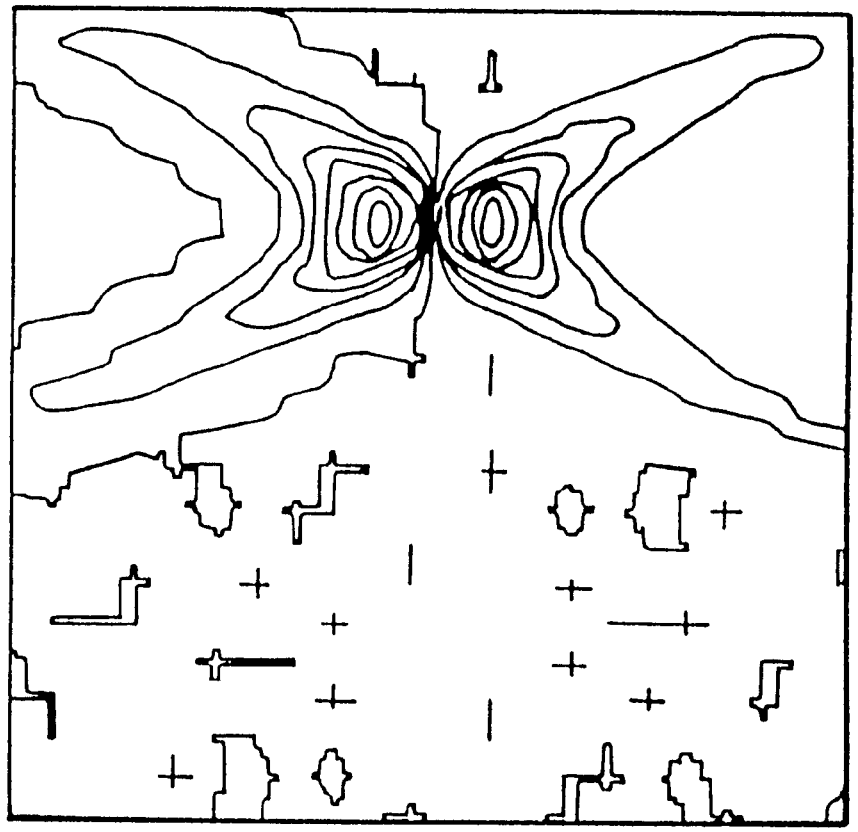
FIGS. 38A and 38B are diagrams indicating a result of a simulation by the conventional two-dimensional second differential filter+the polar transformation.
Figure 38B:
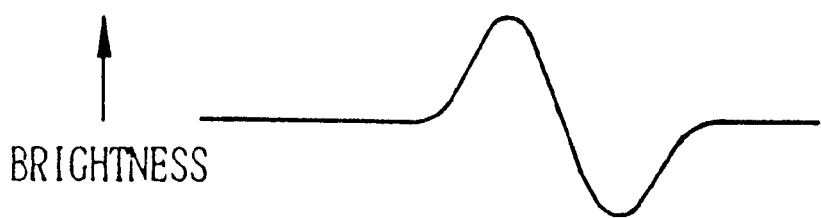

For comparison, a result of a simulation by the conventional two-dimensional filter method "the two-dimensional second differential filter+the polar transformation", is indicated in FIGS. 38A and 38B. A twin-peak output without a main peak appears in FIGS. 38A and 38B, wherein the output is zero at the location of an edge.

In the above simulation, a two-dimensional second differential filter is applied first for comparison with the visual information processing in the mammalian. However, this can be replaced with application of a one-dimensional second differential filter after the polar transformation to obtain the same output as above. Similar to the case explained before in the items of the speed-up, the amount of processing of filtering is greatly reduced by the replacement. In the visual cortex of a mammalian it seems that the one-dimensional filtering after the polar transformation, which minimizes the amount of wiring, is not performed in order to be commonly used for control of eyeballs and preprocessing of colors, the outputs in which contours are enhanced.

2.7.3 Filtering Process Impossible by Two-Dimensional Filter (Skeleton Filter)

2.7.3.1 Skeleton Filter

Figure 39A:
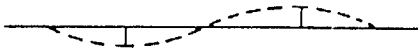
FIGS. 39A and 39B are diagrams illustrating the characteristic of a skeleton filter.
Figure 39B:
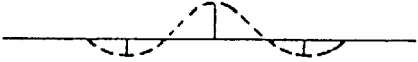

According to the one-dimensional filter method, a filtering process which is impossible by the conventional two-dimensional filter becomes possible by using a filter other than the above odd-function filter. The filter is called a skeleton filter. As indicated in FIGS. 39A and 39B, the skeleton filter is a filter represented by Dirac's δ-functions. FIG. 39A indicates a skeleton-type one-dimensional first differential filter, and FIG. 39B indicates a skeleton-type second differential filter. The values of the skeleton-type one-dimensional first differential filter of FIG. 39A, at the portions which are indicated by solid lines, are δ(0) and δ(0), respectively; and the values of the skeleton-type one-dimensional second differential filter of FIG. 39B, at the portions which are indicated by solid lines, are −δ(0), +2δ(0), and −δ(0), respectively. The values of the skeleton-type one-dimensional first differential filter and the skeleton-type one-dimensional second differential filter, at the portions other than the above portions corresponding to the solid lines, are zero. The values of the skeleton-type one-dimensional first differential filter, are −1, and 1, at the positions indicated by solid lines in FIG. 39A, respectively. The values of the skeleton-type one-dimensional second differential filter, are −1, 2, and −1, at the positions indicated by solid lines in FIG. 39B, respectively.

When the width of the filter is equal to 2a, the skeleton-type one-dimensional first differential filter is expressed as $$G(\rho)=\delta(\rho-a)-\delta(\rho+a),$$

and the skeleton-type second differential filter is expressed as $$G(\rho)=2\delta(\rho)-\delta(\rho-a)-\delta(\rho+a).$$

2.7.3.2 Convolution Calculation by Skeleton Filter

According to the skeleton filter, the integration in the convolution calculation becomes a simple sum of products. When the polar-transformed im data is expressed by F(ρ), in the case of the skeleton-type one-dimensional first differential filter, the convolution output C(ρ) is expressed as $$C(\rho) = \int F(\rho - \xi)G(\xi)d\xi$$
$$= \int F(\rho - \xi)\{\delta(\xi - a) - \delta(\xi + a)\}d\xi$$
$$= F(\rho - a) - F(\rho + a).$$

In the case of the skeleton-type second differential filter, the convolution output C(ρ) is expressed as $$C(\rho) = \int F(\rho - \xi)G(\xi)d\xi$$
$$= \int F(\rho - \xi)\{2\delta(a) - \delta(\xi + a) - \delta(\xi - a)\}d\xi$$
$$= 2F(\rho) - F(\rho + a) - F(\rho - a), \text{ and}$$

the integration can be expressed by a simple combination of the input data F(ρ) to greatly reduce the amount of processing.

2.7.3.3 Embodiment of Skeleton Filter

Figure 40:
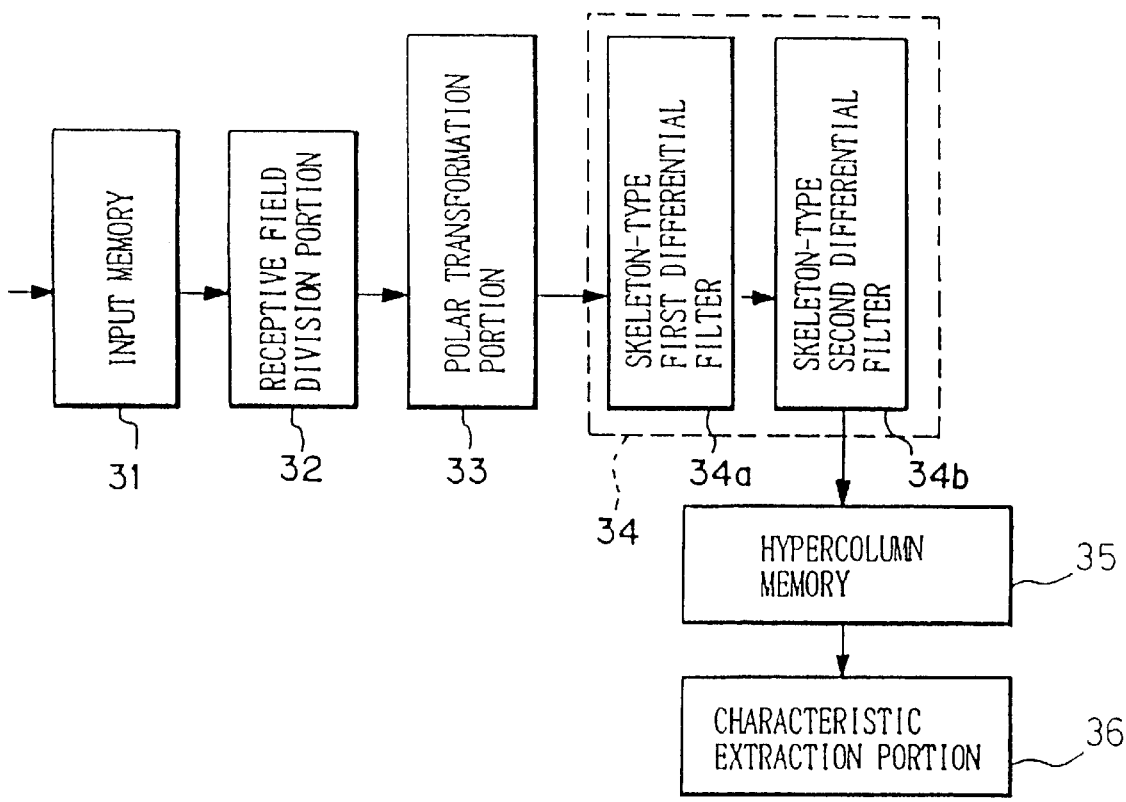
FIG. 40 is a diagram indicating a one-dimensional filter using a skeleton filter.

A line segment can be precisely extracted by such a simple skeleton filter. FIG. 40 is a diagram of a construction wherein the one-dimensional filter is constituted by a skeleton filter. In FIG. 40: reference numeral 31 denotes an input memory for storing an image of an object, having a size of N×N pixels; 32 denotes a receptive field division portion for dividing the input image into receptive fields; 33 denotes a polar transformation portion for applying predetermined polar transformation to the receptive field image; 34 denotes a one-dimensional filter comprised of a skeleton-type first differential filter 34a and a skeleton-type second differential filter 34b; 35 denotes a hypercolumn memory for storing hypercolumn images; and 36 denotes a characteristic feature extracting portion.

The skeleton-type first differential filter 34a has a characteristic expressed as $$G(\rho)=\delta(\rho-1)-\delta(\rho+1),$$

and the skeleton-type second differential filter 34b has a characteristic expressed as $$G(\rho)=2\delta(\rho)-\delta(\rho-2)-\delta(\rho+2).$$

A result of extraction of an "edge of a line segment" by the skeleton filter of FIG. 40, is indicated in FIGS. 41A, 41B, 41C and 41D. FIG. 41A is a contour map of an edge as a real image, where the hatched portion corresponds to a dark portion, and the portion not hatched corresponds to a bright portion. FIG. 41B indicates a response (brightness) of the hypercolumn by contour lines. The edge EDG in the round receptive field CRC is extracted as a prominent peak PK on the hypercolumn plane of FIG. 41B. Thus, it is understood that the function of extracting an edge is sufficiently realized by the skeleton filter. FIGS. 41C and 41D are cross-sectional views of the contour maps of FIGS. 41A and 41B, respectively.

2.7.3.4 Skeleton Filter as Basic Function of Differentiation

The reason why the skeleton filter has a sufficient function of the edge extraction, is considered below. For example, a first differential filter can be expressed as below, $$H(\rho)=\Gamma(\rho-a)-\Gamma(\rho+a)$$

where $\Gamma(\rho)$ is a mountain-shaped function, and the function is deformed as follows.

$$=\int \Gamma(\rho-\xi)\{\delta(\xi-a)-\delta(\xi+a)\}d\xi$$
$$=\int \Gamma(\rho-\xi)G(\xi)d\xi$$

Namely, the usual filter is a "filter generated by synthesizing a skeleton filter $G(\rho)$ with a low-pass filter $\Gamma(\rho)$". Analyzing the function thereof, the operation of the first differentiation, which is the object, is performed by the skeleton-type first differential filter $G(\rho)$, and $\Gamma(\rho)$ has an auxiliary function to reduce a high frequency noise.

Thus, the skeleton filter has a basic function of the differential operation, and is a basic filter for extracting an edge. This is the reason why the skeleton filter has a sufficient function of the edge extraction.

2.7.3.5 Advantage of Skeleton Filter

The width of a mountain-shaped function $\Gamma(\rho)$ for a filter usually used is 3 to 5 pixels, and the amount of processing is larger than that of the skeleton-type filter, by the multiple corresponding to the width. Therefore, the amount of processing is reduced by a factor 3 to 5 by use of the skeleton filter.

2.7.3.6 Skeleton Filter is Impossible to Realize by Conventional Two-Dimensional Filter The one-dimensional skeleton filter cannot be made by a two-dimensional filter. The reason is explained below.

Due to the requirement for isotropy as explained before, the two-dimensional filter becomes a concentric circular filter, and is constituted by a combination of ring filters having a zero width. This element ring filter is the sharpest filter in two dimensions. However, a skeleton filter, i.e., a filter which is equal to zero at locations other than the filter point, cannot be realized by the element ring filter even when the element ring filter is mapped into one dimension, because the ring is continuous, and a discontinuous filter which is equal to zero at locations other than the filter point, cannot be generated by projection. Therefore, there is no two-dimensional filter which requires as small a processing amount as that required by the skeleton filter.

2.7.3.7 Summary

The above explanations are summarized as follows.

The skeleton filter is possible only for "polar transforation+one-dimensional filter" (which is expressed by Dirac's δ functions).

The skeleton filter can reduce the amount of convolution calculation by a factor ⅓~⅕ compared with the two-dimensional filter.

The convolution calculation of the sharpest two-dimensional filter (having a zero width ring) can be reduced to calculation of three pixels of the center pixel and pixels at both ends. The reduced amount of processing is $3/(\rho N_r)$ when the diameter of the ring filter is $N_r$, and contribution to the speed-up is great. For example, $N_r \geq 6$ is required for processing an obscure image, and the amount of processing is reduced by a factor of ½ρ.

2.7.4 Multi-filter

Since, according to "receptive field method+one-dimensional filter" in the present invention, the operation of a large mask can be performed with a high speed as described above, simultaneous application of a plurality of filters respectively having different widths at the same time (multi-filter) is possible. Thus, "simultaneous extraction of sharp portions and obscure portions in an image", which is impossible by the conventional method, can be performed, and working and moving operations based on recognition of the whole image becomes possible. In the visual cortex of a mammalian, simultaneous application of a plurality of types of filtering respectively corresponding to different widths are performed to ensure the recognition of characteristic features.

Figure 42:
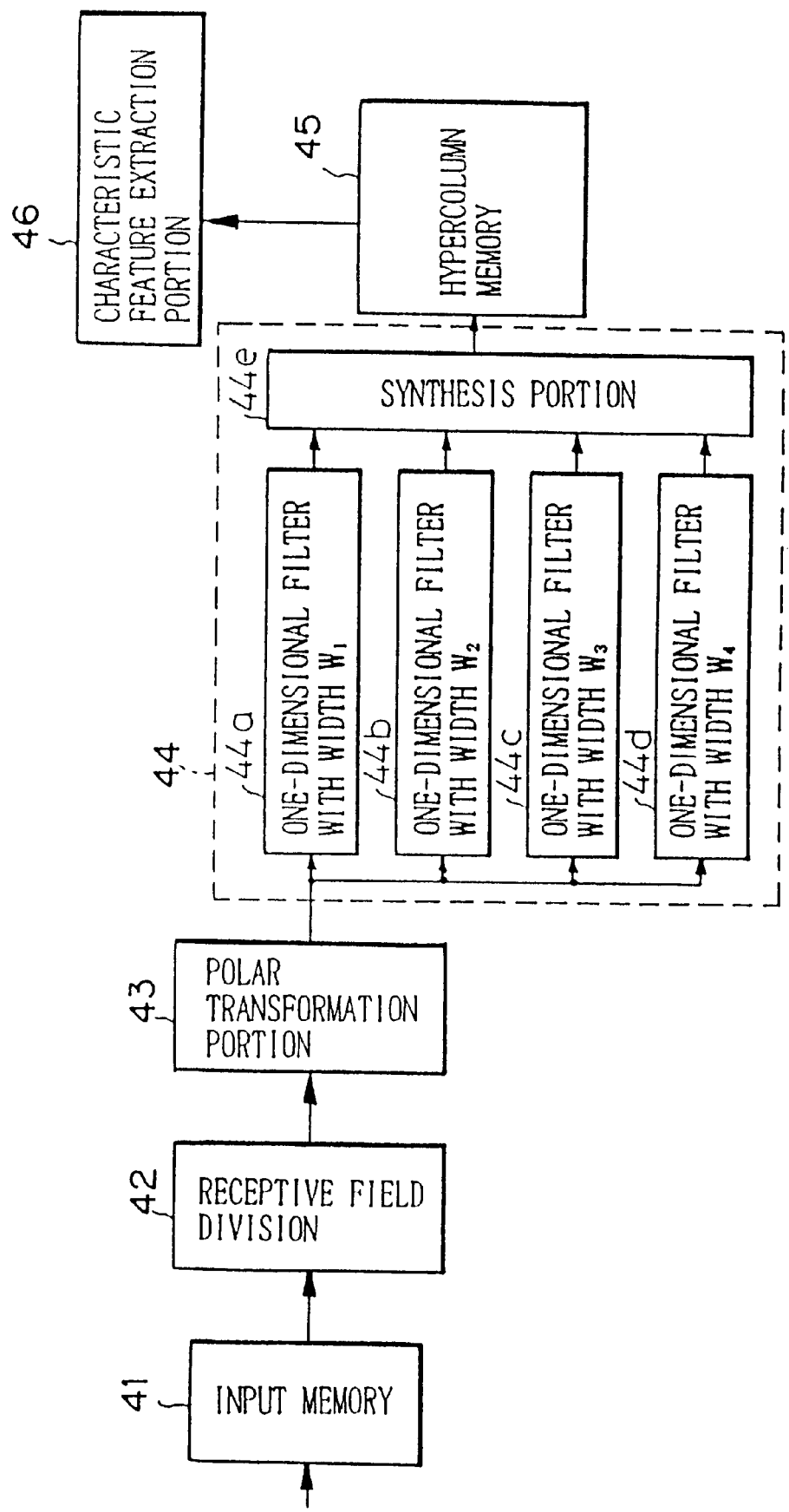
FIG. 42 is a diagram illustrating a construction using a multi-filter.

FIG. 42 is a diagram illustrating a construction of the three-dimensional measurement system using a multi-filter. In FIG. 42: reference numeral 41 denotes an input memory for storing an input image of N×N; 42 denotes a receptive field division portion for dividing the input image into receptive fields to output the divided image; 43 denotes a polar transformation portion for performing predetermined polar transformation on the receptive field images; 44 denotes a one-dimensional multi-filter comprising: a one-dimensional filter 44a with a width $W_1$, a one-dimensional filter 44b with a width $W_2$, a one-dimensional filter 44c with a width $W_3$, a one-dimensional filter 44d with a width $W_4$, ..., and a synthesis portion 44e for synthesizing outputs of the one-dimensional filters to output the synthesized output; 45 denotes a hypercolumn memory for storing a hypercolumn image; and 46 denotes a characteristic feature extraction portion.

In this system, an input image stored in the input memory 41 is divided into receptive fields by the receptive field division portion 42, and the polar transformation portion 43 is performed on the receptive field images. Next, the one-dimensional filter processing in the ρ-direction in the hypercolumn plane, including a plurality of types of filtering with a plurality of different filter widths in parallel, is performed on the polar-transformed output. Then, outputs of the plurality of one-dimensional filtering are synthesized to obtain a one-dimensional multi-filter output, and lines, edges, and gaps are extracted by the characteristic feature extraction portion 46 based on the one-dimensional multi-filter output. By the above construction, it is possible to "extract simultaneously sharp to obscure line segments" by synthesizing the multi-filter with widths $W_1$~$W_4$, based on the multi-filter output. This is one of the techniques which is first realized by the high speed filtering according to the present invention.

Although the widths $W_1$~$W_4$ in the above multi-filter may be arbitrary, a multi-filter having an exponential form (normally, n=2 is sufficient) as described below is preferable since it is not necessary to provide fine width steps for relatively larger widths considering efficiency in processing.

$$W_i=(W_{i-1})^n$$

The "two-dimensional filter+receptive field method" using the conventional two-dimensional filter, has the following problems which make realization of the multi-filter impossible.

The amount of processing increases greatly. When the number of filters in the multi-filter is $\mu$, the amount of processing increases by a factor $\mu \times (m/2)$, compared with the one-dimensional filter method according to the present invention, and therefore the multi-filter cannot be used from the view point of engineering.

The differentiation of an odd order is impossible. The two-dimensional convolution filter is limited to a ring filter, which cannot perform the differentiation of an odd order, and cannot detect an "edge". Therefore, it is impossible to form a multi-filter by the conventional two-dimensional filter.

2.7.5 Positive-Negative-Separation-Type One-Dimensional Multi-Stage Filtering

Figure 43:
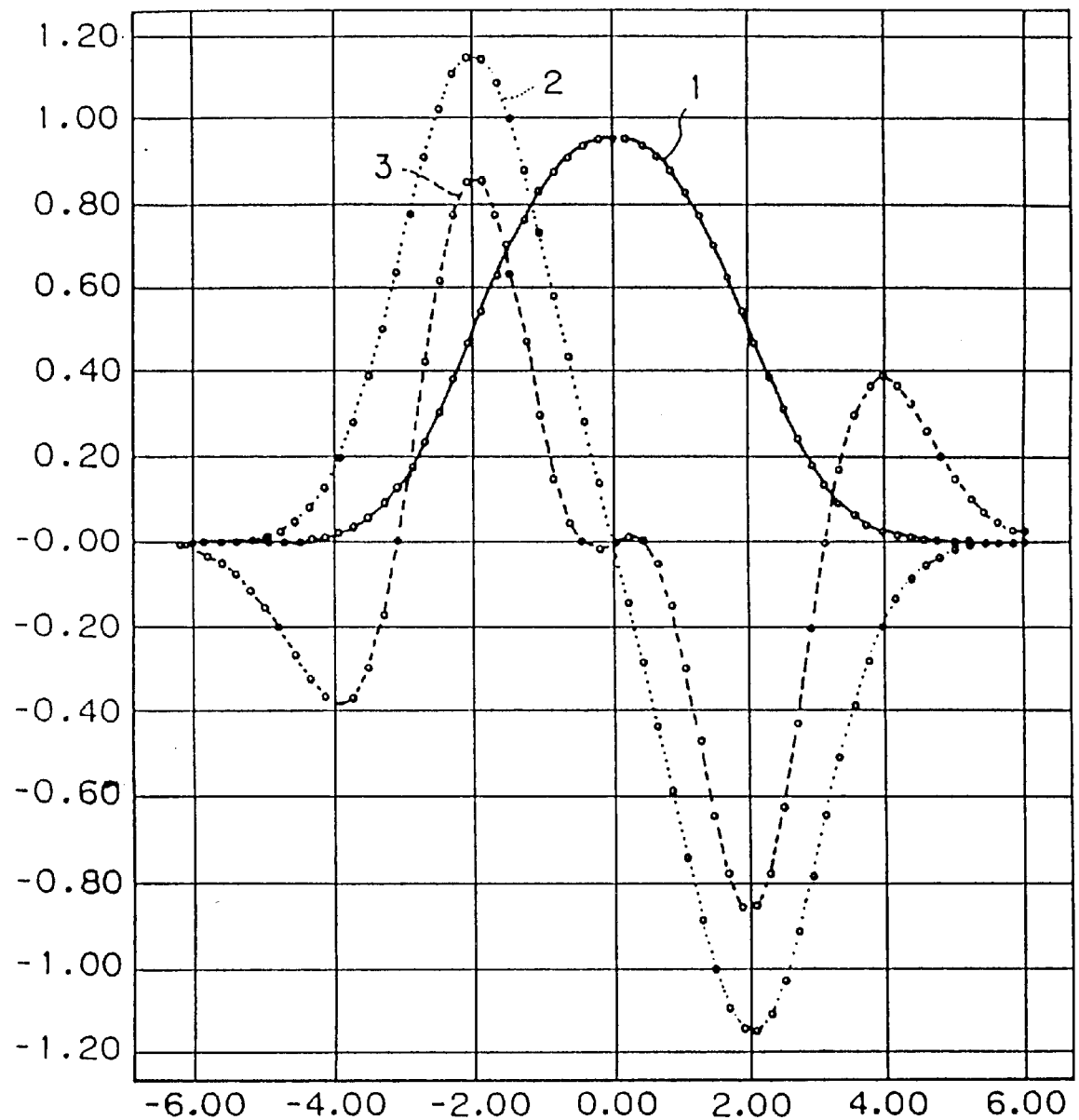
FIG. 43 is a diagram for explaining interference.

The above-mentioned edge extraction filter, i.e., a filter with a construction of "division into receptive fields→polar transformation→one-dimensional differential filter→second differential filter". However, this type of edge extraction filter still has a problem. This is because the extraction of an edge becomes impossible due to interference of outputs from borders on both sides of a luminous "band" when a width of the luminous "band" is small. The cause is that, as indicated in FIG. 43, positive and negative peaks corresponding to borders on both sides of the band, output from the first differential filter 2, come close together when the width of the band becomes small, and interference occurs due to further second differentiation. In FIG. 43, reference numeral 1 denotes an image of an edge, 2 denotes a result (first differentiation output) of the first differentiation applied on the image of the edge, and 3 denotes a second differentiation output.

Figure 44:
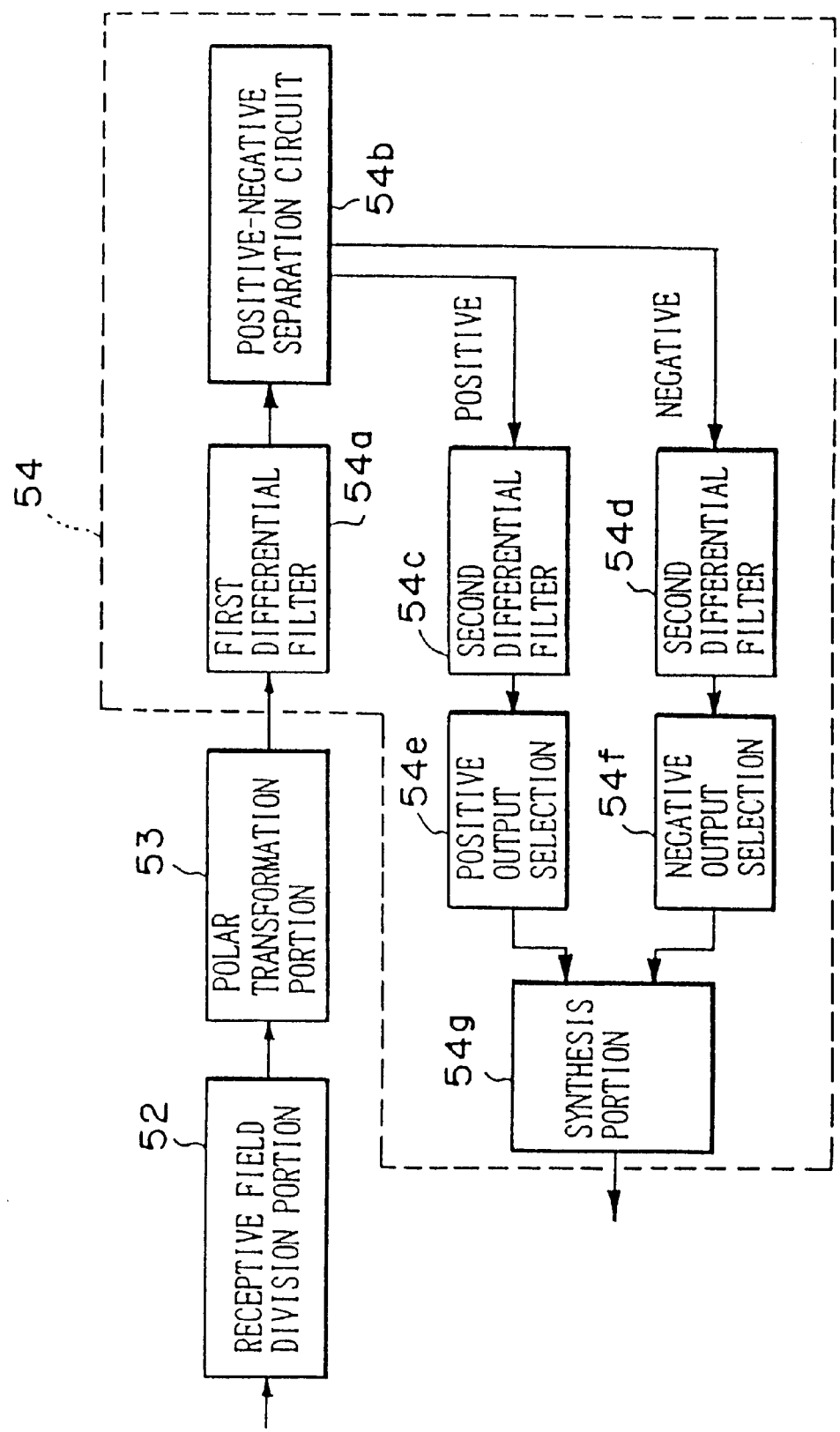
FIG. 44 is a diagram illustrating a construction of a positive-negative-separation-type one-dimensional multi-stage filter.

To suppress the interference, the positive and negative peaks in the first differentiation output are separated, and second differentiation is performed independently. FIG. 44 is a diagram illustrating the construction of a positive-negative-separation-type one-dimensional multi-stage filter. In FIG. 44: reference numeral 52 denotes a receptive field division portion for dividing an input image; 53 denotes a polar transformation portion for performing a predetermined polar transformation on the receptive field images; 54 denotes a positive-negative-separation-type one-dimensional multi-stage filter comprising a one-dimensional differential filter 54a, a positive-negative separation circuit 54b for separating positive and negative signals in the output of the one-dimensional differential filter, first and second differential filters 54c and 54d for applying second differential filtering to the positive and negative portions of the first differentiation output, respectively, a positive selecting portion 54e for selecting a positive signal from the output of the second differential filter 54c, a negative output selecting portion 54f for selecting a negative signal from the output of the second differential filter 54d, and a synthesis portion 54g for synthesizing the outputs of the positive and negative output selecting portions.

Figure 45:
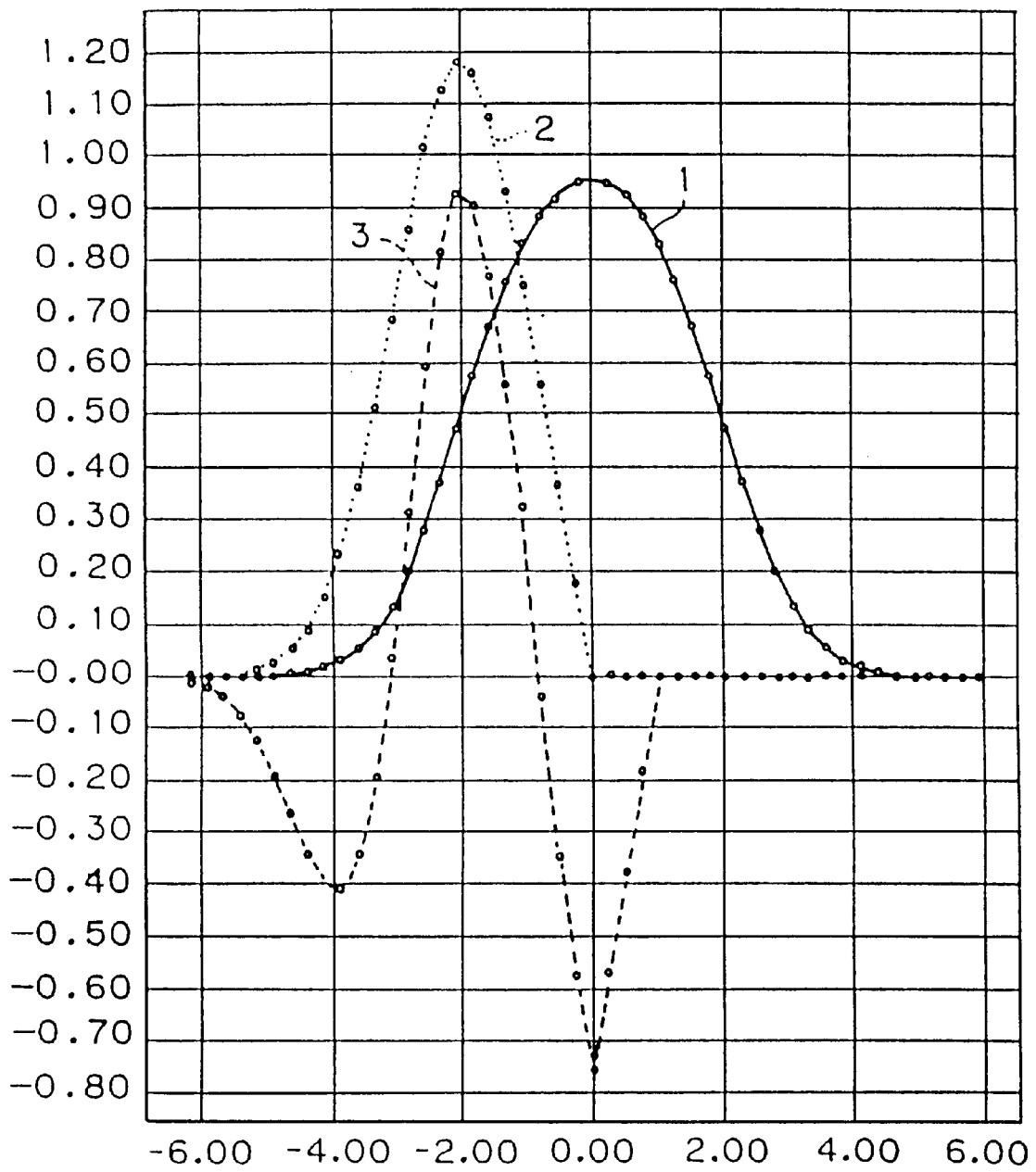
FIG. 45 is a diagram for explaining improvement in the interference.

FIG. 45 indicates a result of a simulation of the positive-negative-separation-type one-dimensional multi-stage filter. In FIG. 45, reference numeral 1 denotes an image of an edge, 2 denotes a positive output (first differentiation output) when the first differentiation is applied to the edge image, and 3 denotes an output (the output of the second differential filter 54c) when the second differentiation is applied to the positive first differentiation output. Compared with the case wherein positive-negative separation is not performed, interference of the peaks output corresponding to the edges is effectively suppressed. In the cerebrum, almost all processing is performed with positive and negative outputs being separated. This is because neurons cannot transmit a negative signal, and therefore the negative output components are transmitted through wiring (axon) for negative signals, provided in parallel to wiring for positive signals. According to this construction in the cerebrum due to the limitation in the neuronal system, interference can be suppressed.

Figure 46:
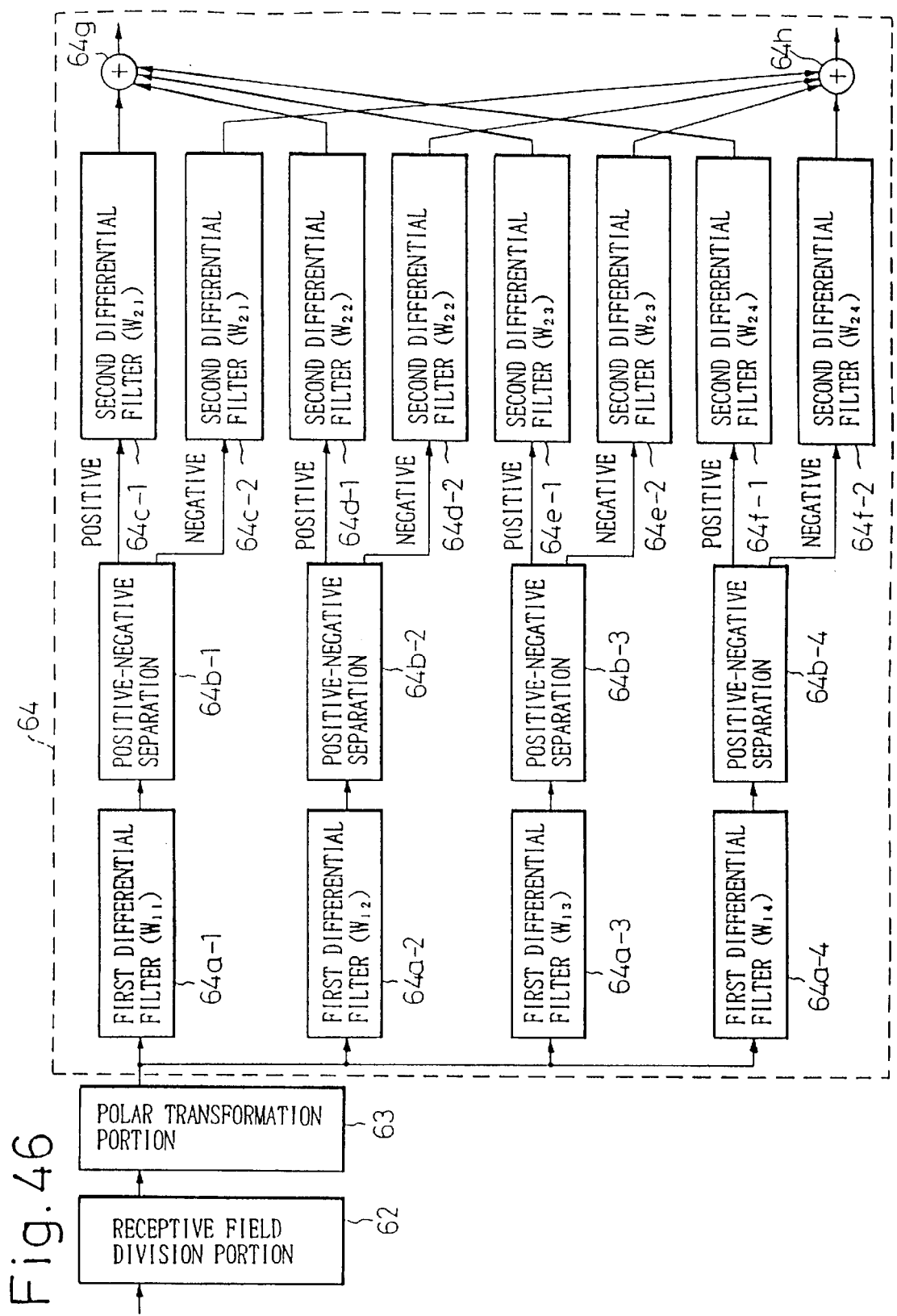
FIG. 46 is a diagram illustrating a construction of a positive-negative-separation-type one-dimensional multi-filter.

FIG. 46 is a diagram illustrating the construction of a positive-negative-separation-type multi-filter in the case where the above positive-negative separation system is adopted to the multi-filter. In FIG. 46: reference numeral 62 denotes a receptive field division portion for dividing an input image into receptive fields, and outputting the divided image; 63 denotes a polar transformation portion for performing predetermined polar transformation on the receptive field image; 64 denotes a positive-negative-separation-type multi-filter comprising a one-dimensional filter 64a-1 with a width $W_{11}$, a one-dimensional filter 64a-2 with a width $W_{12}$, a one-dimensional filter 64a-3 with a width $W_{13}$, a one-dimensional filter 64a-4 with a width $W_{14}$, positive-negative separation circuits 64b-1~64b-4 for separating positive and negative signals in the outputs of the respective one-dimensional differential filters, first and second differential filters 64c-1, 64c-2; 64d-1, 64d-2; 64e-1, 64e-2; 64f-1, and 64f-2 (respectively having widths $W_{21}$, $W_{22}$, $W_{23}$, $W_{24}$) for applying second differential filtering to the positive and negative portions of the first differentiation output, respectively and independently, a synthesis portion 64g for synthesizing positive signals from the second differential filters, and outputting the synthesized signal, and a synthesis portion 64h for synthesizing negative signals from the second differential filters, and outputting the synthesized signal.

In the above positive-negative-separation-type multi-filter, positive and negative signals in the output of each first differential filter are separated, and the second differential filtering is applied independently to each of the positive and negative signals. Then, the positive signals and negative signals are respectively synthesized. Thus, precise extraction of obscure portions and narrow bands in an image, suppressing interference, can be performed.

Figure 47B:
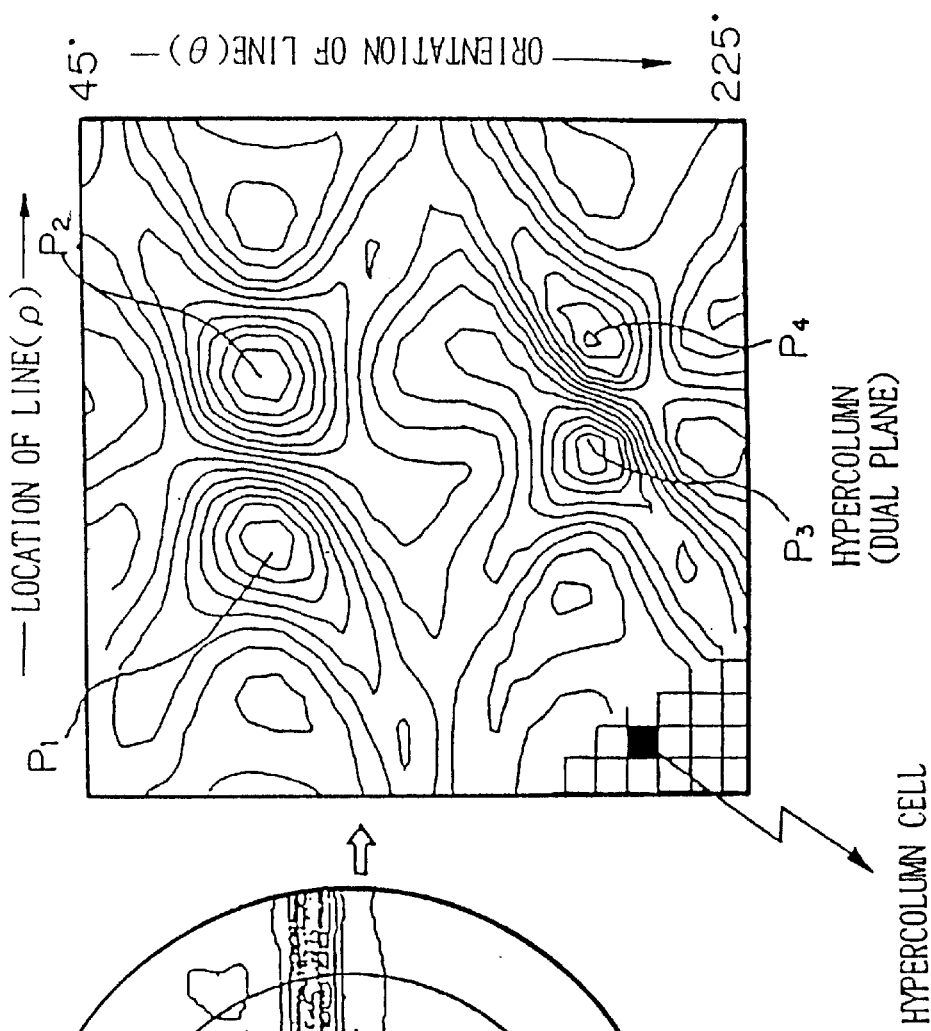
FIGS. 47A and 47B are diagrams for explaining a result of a simulation.
Figure 47A:
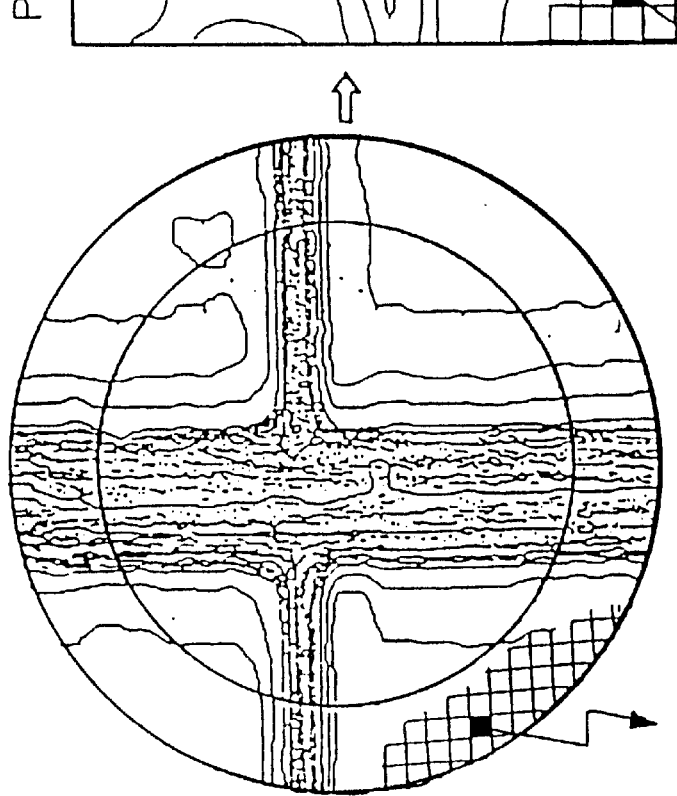
Figure 48:
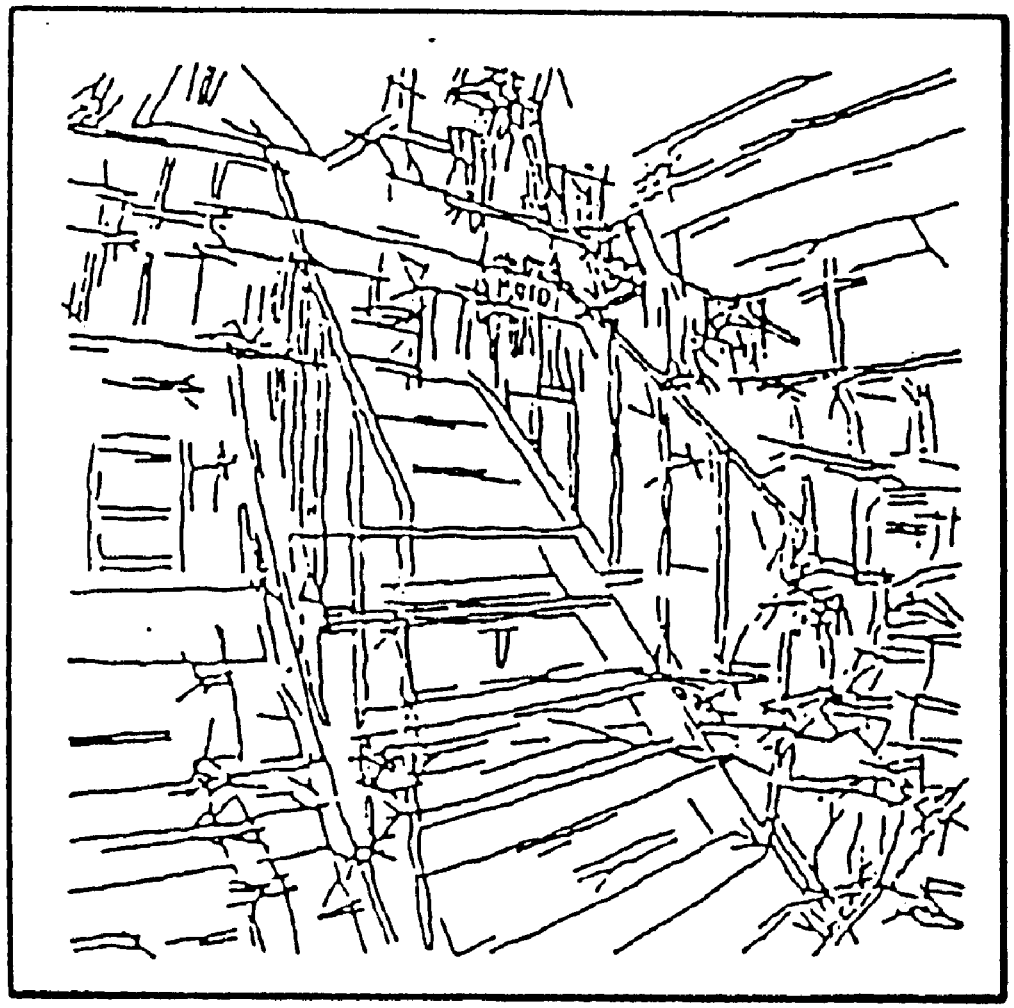
FIG. 48 is a diagram for explaining a regenerated image obtained by a simulation.

The simulation result of the positive-negative-separation-type multi-filter is indicated in FIGS. 47A, 47B and 48. FIG. 47B indicates a hypercolumn image by a contour map, where the hypercolumn image is obtained by applying the positive-negative-separation type multi-filtering to a receptive field image (the magnification of which is indicated in FIG. 47A) in the encircled area of the original image (FIG. 13). Four edges in the receptive field are extracted as four sharp peaks P1~P4. FIG. 48 indicates a regenerated image obtained by extracting peaks as above in all the hypercolumns to regenerate line segments based on an orientation, a location, and a length thereof. Due to the multi-filter and the positive and negative separation, obscure portions and narrow bands existing in the original image are extracted stably.

In the above simulation, the widths $W_{11}$~$W_{14}$ of the first differential filters 64a-1~64a-4 are set as equal to 1, 2, 4, and 8 pixels, respectively; the widths $W_{21}$, $W_{22}$, $W_{23}$ and $W_{24}$ of the second differential filters 64c-1, 64c-2; 64d-1, 64d-2; 64e-1, 64e-2; 64f-1, and 64f-2 are set as equal to 2, 2, 4, and 8 pixels, respectively; and a sum of the outputs of the synthesis portions 64g and 64h is indicated in the above figures.

As understood from the above explanation and simulation, according to "receptive field method+polar transformation+positive and negative separate processing", characteristic features such as narrow bands, high density stripes, and the like, can be extracted by suppressing interference. Not limited to the extraction of edges, the above separation process can be applied to general processing while suppressing interference.

2.7.6 One-Dimensional Filter Regarding Time

In the above explanation, a one-dimensional filter is applied spatially on the dual plane (the hypercolumn plane), and a one-dimensional filter may be operated regarding time by obtaining the difference between an image (image frame) at a timing and an image at a next timing. Thereby, characteristic feature amounts of a moving object, as explained below, can be recognized by using the one-dimensional filter for which the amount of processing is small.

When the filter is operated in the ρ-direction regarding time, characteristic quantities (movement direction and movement amount, and the like) of an object translating in the receptive field, can be extracted by one-dimensional processing.

When the filter is operating in the θ-direction regarding time, characteristic quantities (rotation direction and rotation amount, and the like) of an object rotating in the receptive field, can be extracted by one-dimensional processing.

In addition, due to the characteristic of the convolution integration filter, the one-dimensional filter is resistant to noise.

In the hypercolumn in the primary visual cortex of the cerebrum, cells (complex cell) for performing an operation of the one-dimensional differential filter regarding time, are provided to extract characteristic features of a moving object only. In addition, there is a feedback from the fifth layer in the hypercolumn to the superior colliculus which controls steady gaze operations, and movement direction and movement velocity are transmitted.

Although, up to now, extraction of the movement characteristic features has been tried, for example, by the gradient-type optical flow method, the optical flow method is not resistant to noise since a differential filter is used therein. On the other hand, according to the above one-dimensional filter regarding time, stable extraction is possible since the filter is an integration-type.

2.8 Embodiment of Each Type of Filter

2.8.1 Contour Line Extraction Filter

Contour lines are the most basic characteristic feature in images. The environment and almost all the working objects in industrial plants and factories are constructed in the form of straight lines and cylinders for ease in manufacturing, and these straight lines and cylinders are projected in an image (screen) as straight lines. Further, the remaining curves in the image can be approximated as straight lines when viewed from a short range, and these straight lines and cylinders can be extracted as a group of tangential lines (envelope curves).

Namely, the above tangential lines are detected by the receptive field method wherein the image is processed after being divided into small areas. Therefore, by the receptive field method, "extraction of an envelope curve of a curve" is possible, and almost all characteristic features except very small figures, can be extracted. In image processing, extraction of contour lines (tangential lines) by the receptive field method plays a basic role. In the primary visual cortex of the cerebrum (hypercolumn), the tangential line extraction by the receptive field division is performed first since it is important preprocessing.

The contour lines are extracted from three types of states of the original image, and filtering suitable for the respective types of states must be applied to the image. The three types of contour lines are a line, an edge, and a gap, where the "line" is a contour line segment in the form of a narrow band, the "edge" is a contour line segment in the form of a border line between a luminous portion and a dark portion, the "gap" corresponds to a "line" when the brightness of the line is inverted. Concrete filters suitable for extraction of the respective types, are explained below.

Figure 49A:
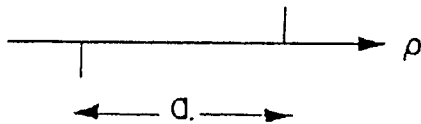
FIGS. 49A, 49B, and 49C are diagrams for explaining symbols representing filters.
Figure 49B:
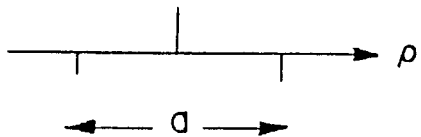
Figure 49C:
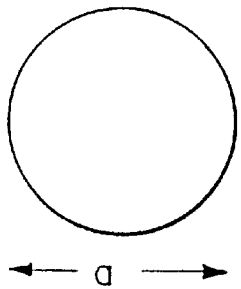

For simplicity of the explanations, abbreviations for various types of one-dimensional and two-dimensional filters are defined as follows. FIGS. 49A, 49B, and 49C are diagrams for indicating filter symbols, $gr_a$ (or gr), $gas_a$ (or gas), and $2gas_a$ (or 2gas). For one-dimensional filter, a skeleton-type first differential filter having a width a is indicated by $gr_a$ or gr (see FIG. 49A), a skeleton-type second differential filter having a width a is indicated by $gas_a$ or gas (see FIG. 49B). For two-dimensional filters, a second differential filter having a diameter a is indicated by $2gas_a$ or 2gas (see FIG. 49C). In the two-dimensional filter, no odd-function filter exists, and therefore no first differential filter can be defined. In the specification, the one-dimensional gr filter and the one-dimensional gas filter are not limited to the skeleton-type, and include a mountain-shaped gradient filter and a Gaussian filter.

2.8.2 "Line" Extraction Filter

FIGS. 50A, 50B and 50C are diagrams illustrating various constructions of "line" extraction filters, FIG. 50A is a diagram illustrating a construction of a basic filter which extracts a "line" by the receptive field method (receptive field division+polar transformation) only, FIG. 50B is a diagram illustrating a construction of a line extraction filter by the process of "receptive field method+one-dimensional gas filter", and FIG. 50C is a diagram illustrating a construction of a line extraction filter by "two-dimensional gas filter+receptive field".

2.8.2.1 The line extraction filter of FIG. 50A is a basic filter for line extraction, wherein an input image is divided into receptive fields by the receptive field division portion 71, and polar transformation is applied to each receptive field image by the polar transformation portion 72 to extract a line. The "line" can be extracted by using the output of the receptive field method only. However, when extracting a "line" by using the output of the receptive field method only, there is a drawback that outputs are also great in the other portions which do not correspond to the "line" and have uniform brightness, and therefore the filters of FIGS. 50B and 50C are desirable, where a positive peak corresponds to a "line", and the bottom of a valley corresponds to a "gap" in the output of the basic filter.

Figure 51B:
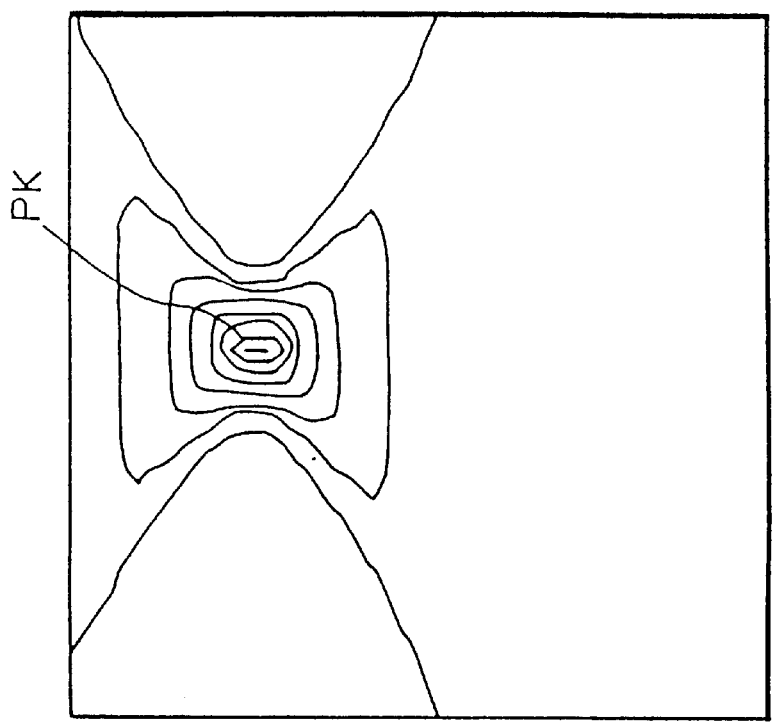
FIGS. 51A and 51B are diagrams for indicating a result of a simulation of line extraction by the receptive field division+the polar transformation.
Figure 51A:
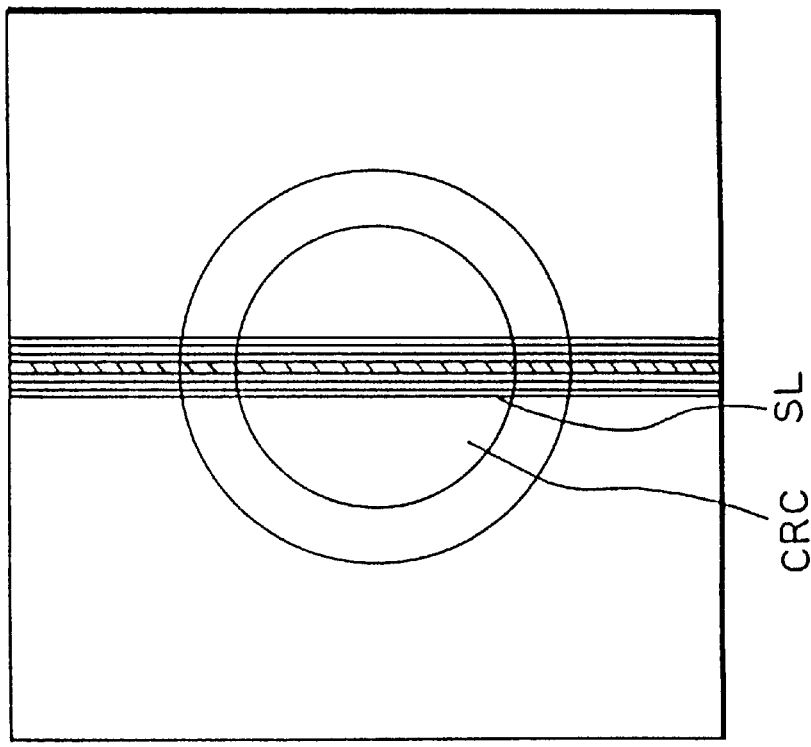

A simulation result wherein the "line" is extracted by using the basic filter is indicated in FIGS. 51A and 51B. Since only a "line" SL exists in the round receptive field CRC (FIG. 51A), the above drawback does not appear, and the line is extracted as a positive peak PK on the hypercolumn (FIG. 51B).

2.8.2.2 In the line extraction filter of FIG. 50B, an input image is divided into receptive fields by the receptive field division portion 71, polar transformation is applied to each receptive field image by the polar transformation portion 72, and one-dimensional second differential filter processing is applied to the polar transformation output by the one-dimensional gas filter 73 to extract a line segment. According to the line extraction filter, a main peak corresponding to a "line" is obtained together with sub-peaks having a polarity opposite to the main peak, on both sides of the main peak. The sub-peaks play an important role to emphasize the main peak in the processing following this operation. The above portions of the uniform brightness are eliminated through the differentiation by the filter. The positive peak corresponds to a "line". The amount of processing is small since the filter is a one-dimensional filter, and the filter is the most superior "line" extraction filter.

When the width of the gas filter is too small, a "line" may be deemed as a band having a width, so differentiation is performed on edges on both ends of the band, and therefore the output becomes zero at the main peak. To avoid this problem, the following condition is required.

The diameter (a) of the gas filter≧the width of the "line".

The optimum condition is the diameter (a) of the gas filter=twice the width of the "line".

A simulation result of the "line" extraction under optimum conditions is indicated in FIGS. 30A and 30B. A line corresponding to the positive main peak PK is detected accompanied by the negative sub-peaks PK1 and PK2.

2.8.2.3 In the line extraction filter of FIG. 50C, the two-dimensional second differentiation processing is first applied to an input image by the two-dimensional gas filter 74, then division into receptive fields is performed, and polar transformation is applied to each receptive field image to extract a line.

The above line extraction filter is equivalent to the filter of FIG. 50B. A peak corresponding to a "line" is obtained accompanied by sub-peaks having a height equal to half of the height of the main peak, and a polarity opposite to that of the main peak, on both sides of the main peak. However, as mentioned above, the amount of processing of the filter of FIG. 50B is much smaller than the filter of FIG. 50C. The positive peak corresponds to a line.

When the width of the 2gas filter is too small, a "line" may be deemed as a band having a width, so differentiation is performed on edges on both ends of the band, and therefore the output becomes zero at the main peak. To avoid this problem, the following condition is required.

The diameter (a) of the 2gas filter≧the width of the "line".

The optimum condition is the diameter (a) of the 2gas filter=twice the width of "line".

A simulation result of the "line" extraction under optimum conditions is indicated in FIGS. 29A and 29B. A line corresponding to the positive main peak PK is detected accompanied by the negative sub-peaks PK1 and PK2. Namely, the same output as the line extraction filter of FIG. 50B is obtained.

2.8.3 Edge Extraction Filter

First, the principle and the advantage of the "edge" filter are explained. Among the three types of line segments, the "edge" appears most frequently. The reason is because the numbers of the "lines" and "gaps" are relatively small since these are fine characteristic features, and because almost all characteristic features appearing in wide views of images are the "borders at which brightness varies", i.e., "edges". However, since filters of an odd order are not allowed as the conventional two-dimensional filter, the "edge" cannot be extracted.

On the other hand, an arbitrary filter is allowed according to the one-dimensional filter method, an "edge" can be extracted through the following basic flow. The hypercolumn in the primary visual cortex of the cerebrum contains cells for extracting the above important "edge". As explained in detail below, the basic flow of the "edge" extraction is "receptive field division→polar transformation→first differential filter→second differential filter", and the function is as follows. Namely, Function of First Differentiation Filter: the first differential filter transforms variations in brightness in an error function-like (blunt step-like) shape, to a mountain-shaped output at which a ratio of variation is maximum. Thus, the first differential filter is a filter which transforms an "edge" to a "line", and this is a basic filter for "edge" extraction. An "edge" can be extracted by this filter only.

Function of Second Differentiation Filter: a "line" which is transformed by the first differential filter is made sharp by the line extraction function of the second differential filter, and sub-peaks having a polarity opposite to the main peak, at both ends of the "line" are obtained. The function of the second differential filter is important for making the main peak prominent in the following processing, and is exactly the function of the aforementioned line extraction filter.

Based on the above explanation, the basic flow of the "edge" extraction can be expressed as, "receptive field division→polar transformation→"line" transformation filter→"line" extraction filter". Unless a non-linear operation is added, the order of the filter can be changed to an arbitrary order. Various types of "edge" filters are explained below.

FIGS. 52A, 52B, 52C, and 52D are diagrams illustrating constructions of the various types of "edge" extraction filters. FIG. 52A is a diagram illustrating the construction of the basic filter wherein the one-dimensional gr filter processing is applied to the output of the receptive field method (receptive field division+polar transformation) to extract the "edge", FIG. 52B is a diagram illustrating the construction of the edge extraction filter wherein the one-dimensional gas filter is connected in the stage following the construction of FIG. 52A, and FIG. 52C is a diagram illustrating the construction of the edge extraction filter wherein the two-dimensional gas filter is connected in the stage preceding the construction of FIG. 52A, and FIG. 52D is a diagram illustrating the construction of the edge extraction filter wherein the one-dimensional gr filter in the construction of FIG. 52C is replaced with a one-dimensional gr filter regarding time.

2.8.3.1 In the edge extraction filter of FIG. 52A, an input image is divided into receptive fields by the receptive field division portion 81, polar transformation is applied to each receptive field image by the polar transformation portion 82, and first differentiation processing is applied to the output of the polar transformation by the one-dimensional gr filter 83 to extract an "edge", since the "edge" can be extracted by the one-dimensional gr filter only. Namely the edge extraction filter of FIG. 52A is a basic filter for the "edge" extraction. However, since the main peak output from the edge extraction filter of FIG. 52A is not accompanied by the sub-peaks of a polarity opposite to the main peak, the processing following the operation cannot be performed sharply, and filters explained with reference to FIG. 52B and later are preferable.

Figure 53B:
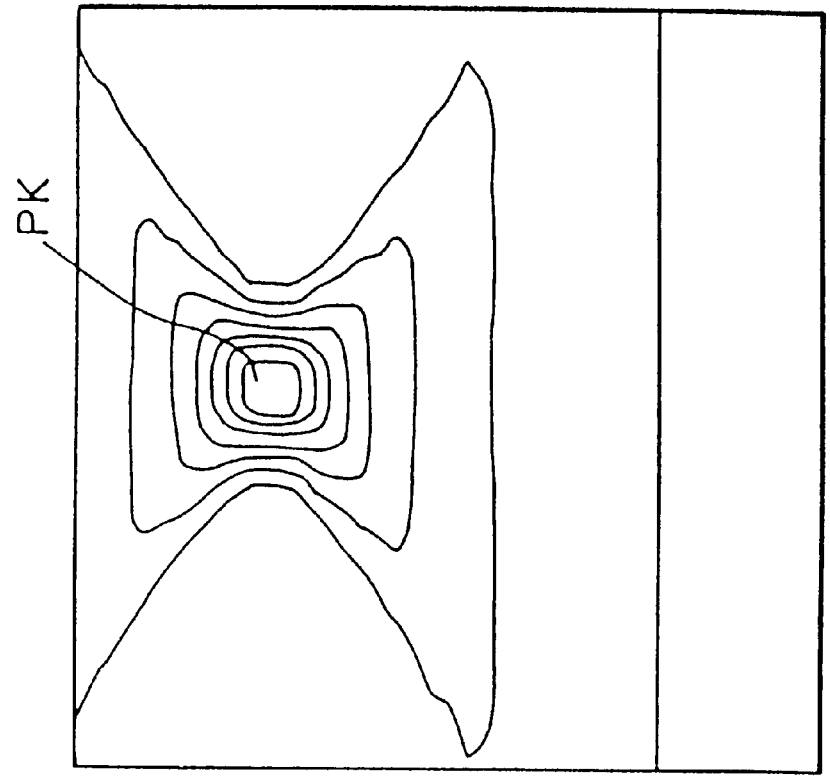
FIGS. 53A and 53B are diagrams indicating a result of a simulation of edge extraction by the receptive field division+polar transformation+one-dimensional gr-filter.
Figure 53A:
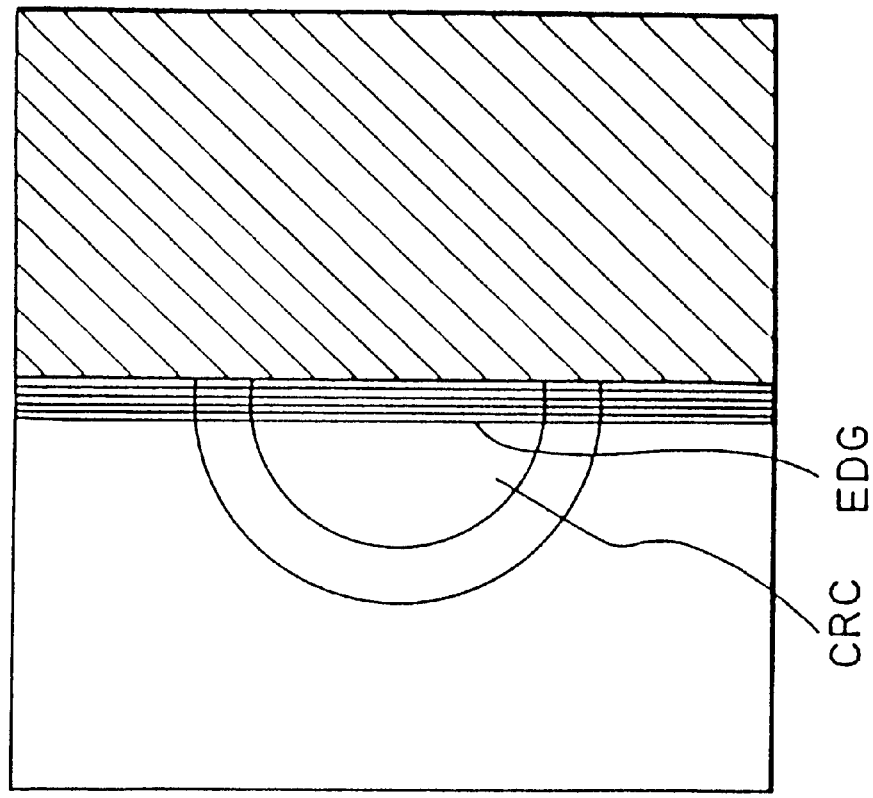

A simulation result of the "edge" extraction by using the basic filter is indicated in FIGS. 53A and 53B. The "edge" EDG in the round receptive field CRC (FIG. 53A) is extracted on the hypercolumn, as a main peak PK (FIG. 53B) which is not accompanied by sub-peaks.

2.8.3.2 In the edge extraction filter of FIG. 52B, an input image is divided into receptive fields by the receptive field division portion 81, polar transformation is applied to each receptive field image by the polar transformation portion 82, first differentiation processing is applied to the output of the polar transformation by the one-dimensional gr filter 83, and further one-dimensional second differentiation processing is applied to extract an "edge".

Due to the function of sharpening of the one-dimensional gas filter 84, the main peak corresponding to an "edge" is obtained accompanied by sub-peaks having a height equal to half of the height of the main peak, and a polarity opposite to that of the main peak, on both sides of the main peak. The sub-peaks play an important role to emphasize the main peak in the processing following this operation. The amount of processing is small since the edge extraction filter of FIG. 52B is a one-dimensional filter. Namely, the edge extraction filter of FIG. 52B is the most superior "edge" filter.

When the width of the gas filter is too small, the "line" transformed by the one-dimensional gr filter may be deemed as a band having a width, so differentiation is performed on edges on both ends of the band, and therefore the output becomes zero at the main peak. To avoid this problem, the following condition is required.

The diameter (a) of the gas filter ≧ the width (b) of the gr filter.

The optimum condition is the diameter (a) of the gas filter=twice the width (b) of the gr filter.

Figure 54B:
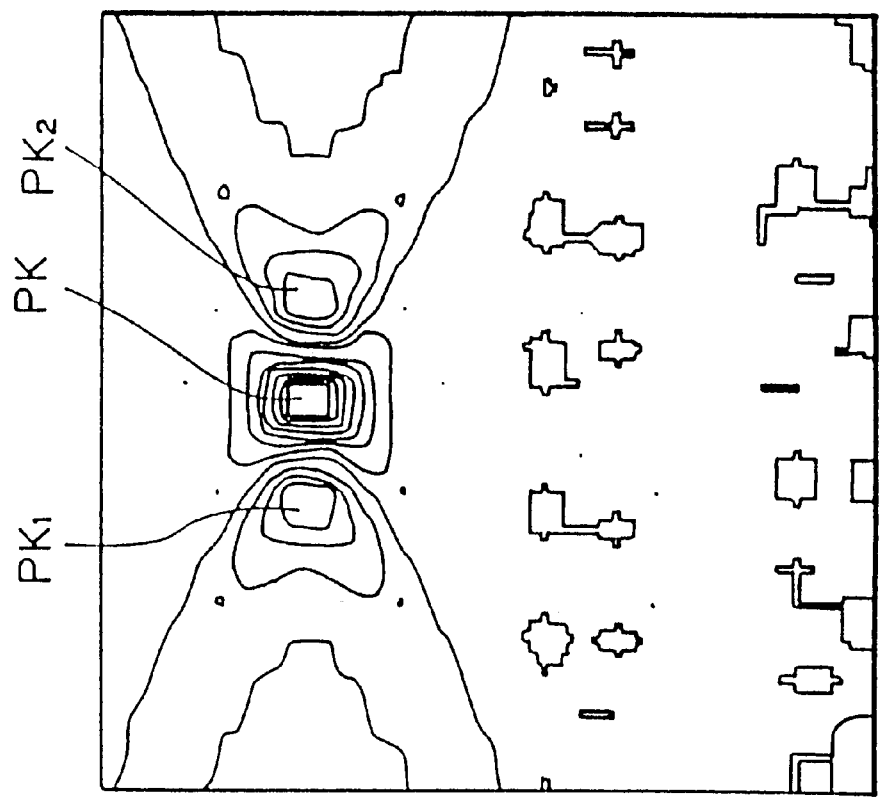
FIGS. 54A and 54B are diagrams for indicating a result of a simulation of edge extraction by the receptive field division+polar transformation+one-dimensional gas-filter.
Figure 54A:
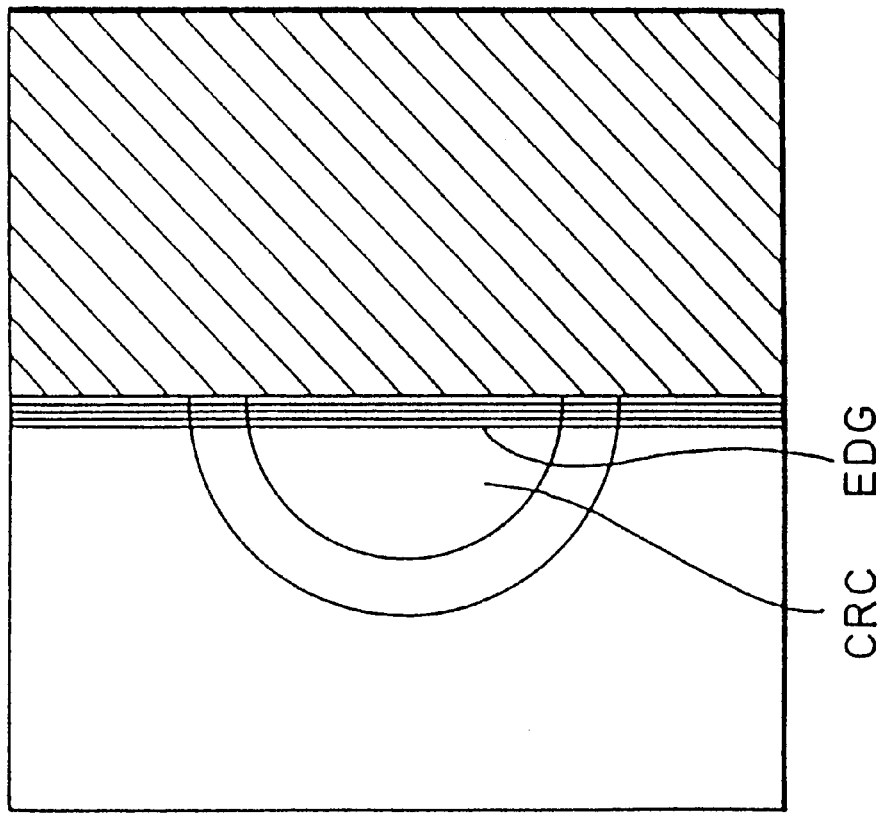

A simulation result of the "edge" extraction under optimum conditions is indicated in FIGS. 54A and 54B. The positive peak corresponding to the "edge" EDG in the round receptive field CRC (FIG. 54A) is extracted accompanied by negative sub-peaks PK1 and PK2 (FIG. 54B).

2.8.3.3 In the edge extraction filter of FIG. 52C, first, the two-dimensional gas filter 85 applies two-dimensional second differentiation processing to an input image, then the processed image is divided into receptive fields by the receptive field division portion 81, polar transformation is applied to each receptive field image by the polar transformation portion 82, and first differentiation processing is applied to the output of the polar transformation by the one-dimensional gr filter 83 to extract an "edge".

The edge extraction filter of FIG. 52C is equivalent to the edge extraction filter of FIG. 52B, the main peak corresponding to an "edge" is obtained accompanied by sub-peaks having a height equal to half of the height of the main peak, and a polarity opposite to that of the main peak, on both sides of the main peak. However, the amount of processing of the edge extraction filter of FIG. 52B, is much smaller than that of the edge extraction filter of FIG. 52C for the reason explained above.

When the diameter of the two-dimensional gas filter (2gas) is too small, the operation of the two-dimensional gas filter (2gas) is equivalent to deem the "line" transformed by the one-dimensional gr filter, as a band having a width, and to perform differentiation on edges on both ends of the band, and therefore the output becomes zero at the main peak. To avoid this problem, the following condition is required.

The diameter (a) of the 2gas filter ≧ the width (b) of the gr filter.

The optimum condition is the diameter (a) of the 2gas filter=twice the width (b) of the gr filter.

A simulation result of the "edge" extraction in the optimum condition is indicated in FIGS. 37C and 37D. The positive peak corresponding to the edge is extracted accompanied by negative sub-peaks PK1 and PK2.

2.8.3.4 When replacing the one-dimensional gr filter in FIGS. 52A~C with the one-dimensional gr filter regarding time (see, for example, FIG. 52D), the replaced filter does not respond to a figure standing still, and only a translating "edge" is extracted. Movement direction and movement amount are extracted, and thus, gazing and pursuit of an object, and avoiding an obstacle based on the whole movement pattern, are possible. The hypercolumn in the primary visual cortex of the cerebrum also contains cells having a function of "two-dimensional gas filter→receptive field division→polar transformation→one-dimensional filter regarding time", to extract a moving "edge".

2.8.3.5 Filter for Extracting "Edge" as Positive Signal

Figure 55:
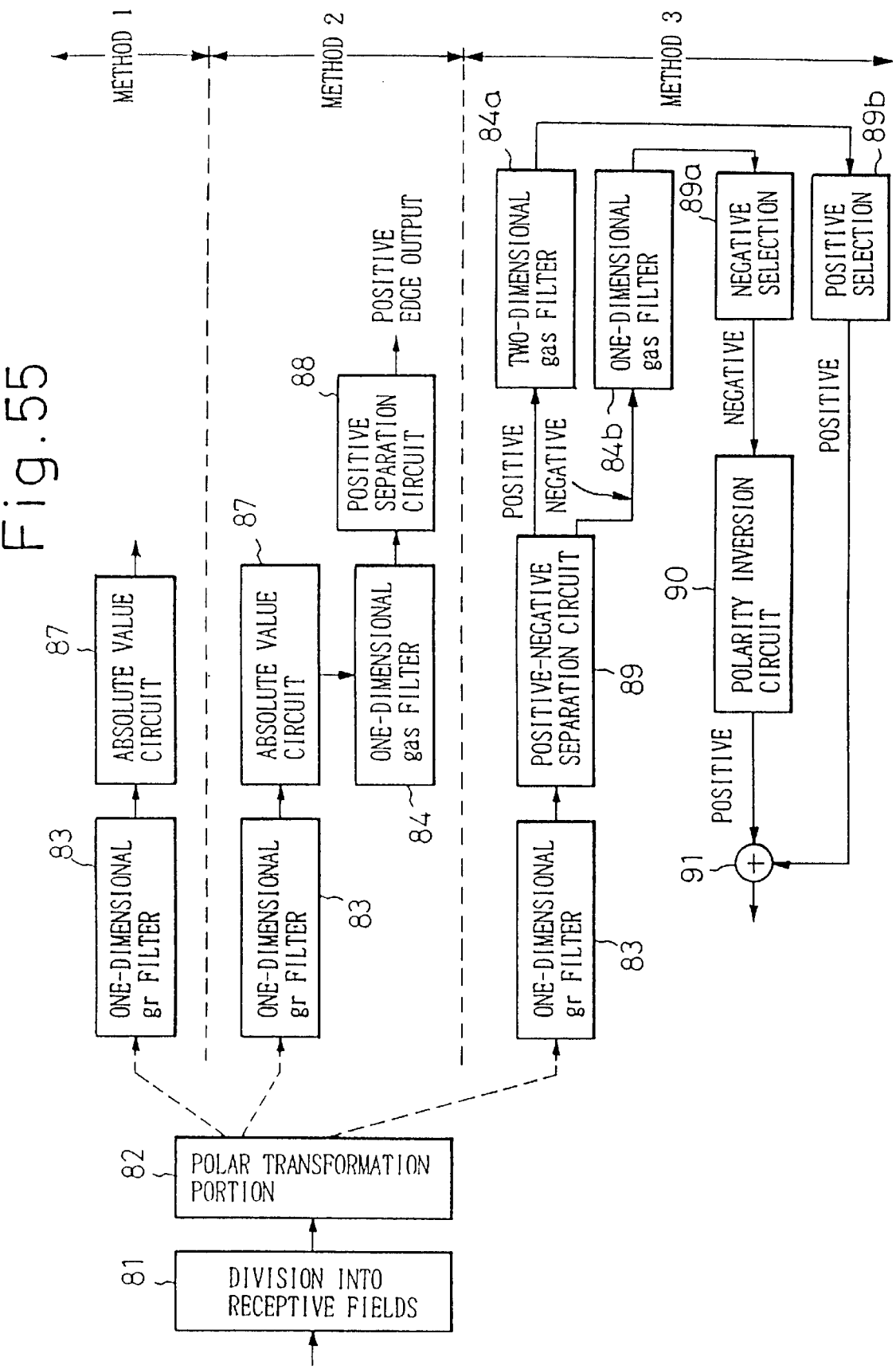
FIG. 55 is a diagram illustrating a first construction of a filter outputting an edge by a positive signal.

FIG. 55 is a diagram illustrating various types of constructions for extracting an "edge" as a positive signal, where the constructions correspond to the edge extraction filters indicated in FIGS. 52A and 52B, and the same elements bear the same reference numerals in FIGS. 52A, 52B, and 55.

In the edge extraction filter indicated as method 1 in FIG. 55, an absolute value circuit 87 is provided in the stage following the one-dimensional gr filter 83 in FIG. 52A, to extract an edge as a positive signal. In the edge extraction filter indicated as method 2 in FIG. 55, an absolute value circuit 87 is provided in the stage following the one-dimensional gr filter 83, and a positive separation circuit 88 is provided in the stage following the one-dimensional gas filter 84 in FIG. 52B, to extract an edge as a positive signal. In the edge extraction filter indicated as method 3 in FIG. 55, positive-negative separation circuit 89 is provided in the stage following the one-dimensional gr filter 83 in FIG. 52B, one-dimensional second differentiation processing is applied to positive and negative components in the output of the one-dimensional gr filter by the one-dimensional gas filters 84a and 84b, respectively and independently; positive and negative signals are selectively output through the positive select portion 89a and the negative select portion 89b, respectively; the polarity of the negative signal is inverted by the polarity inversion circuit 90; and the positive signals are synthesized by the synthesis portion 91 to output a positive edge signal.

Figure 56:
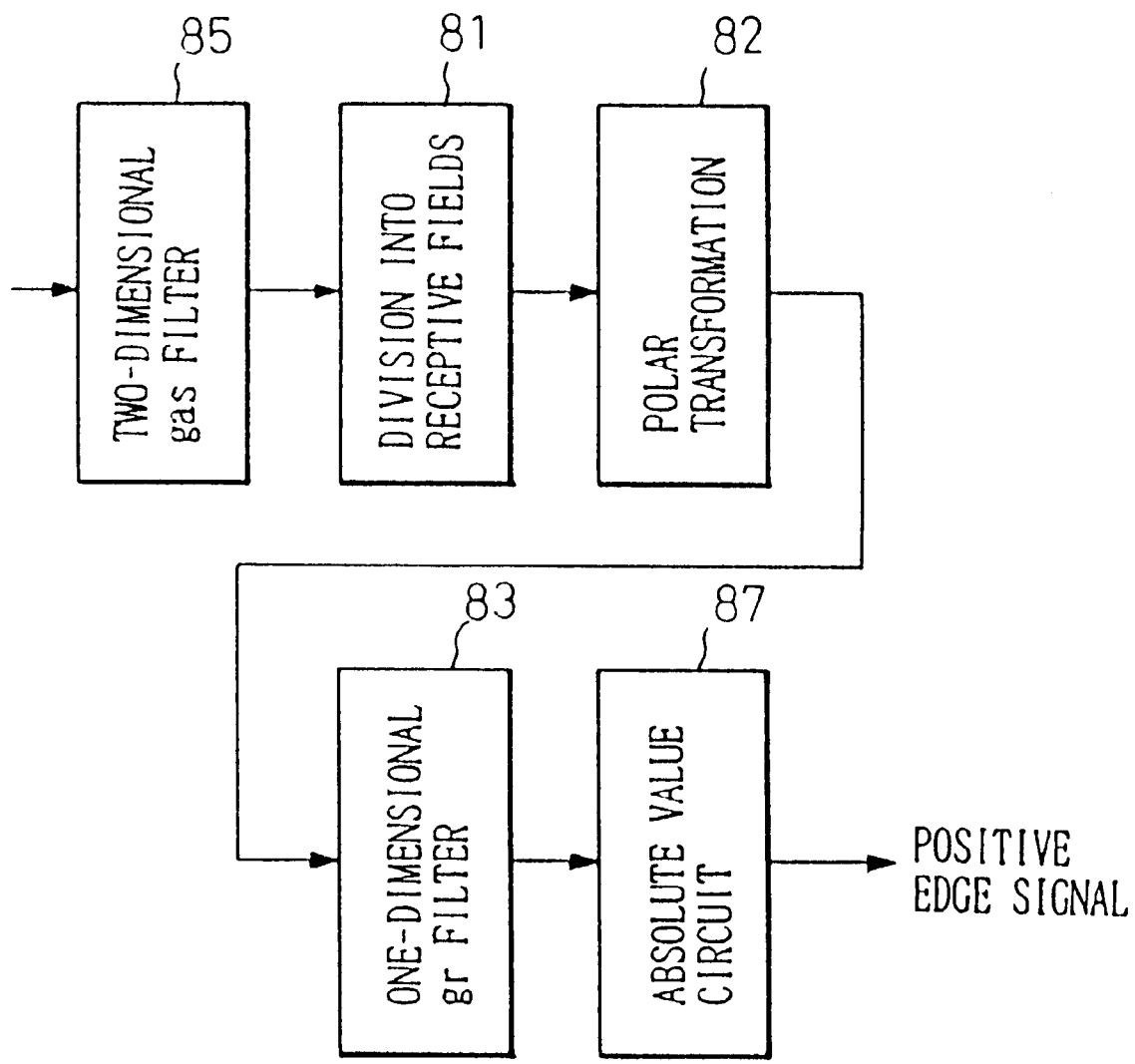
FIG. 56 is a diagram illustrating a second construction of a filter outputting an edge by a positive signal.

FIG. 56 is a diagram illustrating another construction of a filter which extracts an "edge" as a positive signal, and corresponds to the edge extraction filter indicated in FIG. 52C. An absolute value circuit 87 is provided in the stage following the one-dimensional gr filter 83 in FIG. 52C, to extract an edge as a positive signal. By extracting an edge as a positive signal, the output of the filter is not affected by line noise and the sub-peaks having a polarity opposite to the main peak.

2.8.4 Gap Extraction Filter

Figure 57A:
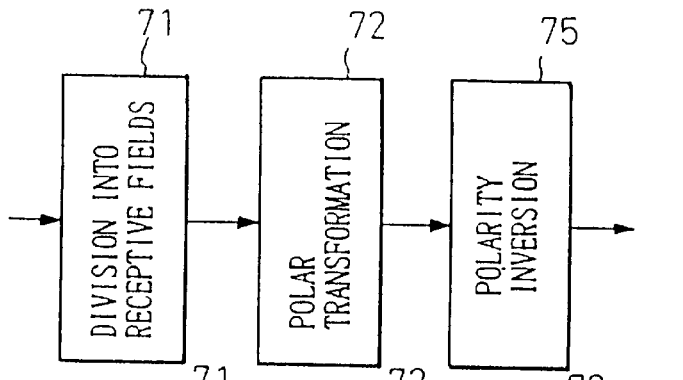
FIGS. 57A, 57B, and 57C are diagrams for illustrating the constructions of various gap extraction filters.
Figure 57B:
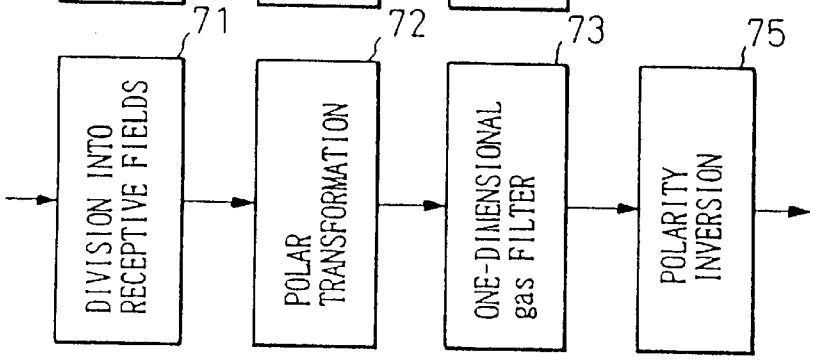
Figure 57C:
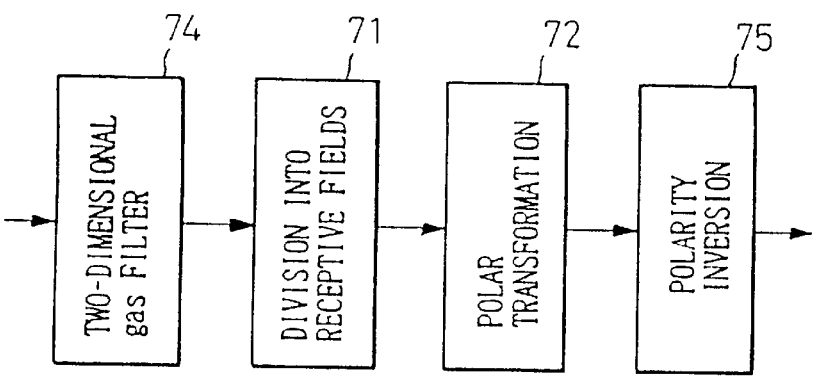

The gap extraction filter is constructed by inverting the polarity in the construction for the line extraction filter. Namely, a gap extraction filter is constructed by connecting a polarity inversion circuit in the stage following each line extraction filter in FIGS. 50A~50C. FIGS. 57A, 57B and 57C are diagrams illustrating the construction of a gap extraction filter, 75 denotes a polarity inversion circuit. In FIGS. 50A~50C and 57A~57C, the same reference numerals are affixed to the same elements.

2.8.4.1 Gap Extraction Filter Having Construction of "Receptive Field Division→Polar Transformation→Polarity Inversion"

In the gap extraction filter of FIG. 57A, a polarity inversion circuit 75 is provided in the stage following the line extraction filter in FIG. 50A. The "gap" can be extracted from the output of the receptive field method only. However, there is a problem that the output of the filter is large in uniformly dark portions, and therefore gap extraction filters as explained below are preferable. A positive peak in the output corresponds to a gap.

2.8.4.2 Gap Extraction Filter Having Construction of "Receptive Field Division→Polar Transformation→One-Dimensional gas Filter→Polarity Inversion"

In the gap extraction filter of FIG. 57B, a polarity inversion circuit 75 is connected in the stage following the construction of FIG. 50B. By the one-dimensional gas filter 73, a main peak corresponding to a "gap" is obtained accompanied by sub-peaks having a polarity opposite to the main peak, and a height equal to half of the height of the main peak, on both sides. The sub-peaks play an important role to emphasize the main peak in the processing following this operation. The uniformly dark portions are eliminated by the differentiation operation. The amount of processing is small since the filter is a one-dimensional filter, and the filter is the most superior "gap" extraction filter.

When the diameter of the gas filter is too small, a "gap" may be deemed as a band having a width, so differentiation is performed on edges on both ends of the band, and therefore the output becomes zero at the main peak. To avoid this problem, the following condition is required.

The diameter (a) of the gas filter≧the width of the "gap".

The optimum condition is the diameter (a) of the gas= twice the width of "gap".

2.8.4.3 Gap Extraction Filter Having Construction of "Two-Dimensional gas Filter→Receptive Field Division→Polar Transformation→Polarity Inversion"

In the gap extraction filter of FIG. 57C, a polarity inversion circuit 75 is connected in the stage following the construction of FIG. 50C. The gap extraction filter of FIG. 57C is equivalent to the gap extraction filter of 2.8.4.2. A main peak corresponding to a "gap" is obtained accompanied by sub-peaks having a height equal to half of the height of the main peak, and a polarity opposite to that of the main peak, on both sides of the main peak. However, as mentioned above, the amount of processing of the filter of 2.8.4.2 is much smaller than the filter of FIG. 57C.

When the diameter of the 2gas filter is too small, a "gap" may be deemed as a band having a width, differentiation is performed on edges on both ends of the band, and therefore the output becomes zero at the main peak. To avoid this problem, the following condition is required.

The diameter (a) of the 2gas filter≧the width of the "gap".

The optimum condition is the diameter (a) of the 2gas filter=twice the width of "gap".

2.8.5 Extraction Filter for "Line" and "Gap" Only

As explained above, although filters for extracting three types of line segments are obtained, there is a problem that an "edge" is included in the outputs of the "line" extraction filter and the "gap" extraction filter. The reason is because, in the line extraction filter, a "gap" is transformed to a pair of positive and negative peaks, and therefore a signal corresponding to a "gap" cannot be discriminated from a signal corresponding to a "line" based on the signal value only. FIG. 58 is a diagram illustrating a construction of an "only-line extraction filter" which eliminates noise corresponding to an "edge" to extract a "line" only. The "only-line extraction filter" is constructed based on the fact that the basic filter for extracting a "line" (FIG. 50A) does not respond to an "edge".

In FIG. 58, reference numeral 101 denotes a basic filter constructed by a receptive field division portion 71 and a polar transformation portion 72, 102 denotes a line extraction filter which is constructed by connecting a one-dimensional gas filter 73 to the basic filter (see FIG. 50B), 103 denotes a peak detect portion which detects a peak in the output of the basic filter, 104 denotes a line emphasis portion comprised as a gate for passing therethrough an output portion in the vicinity of a peak which is detected by the peak detection portion 103, in the output of the line extraction filter 102.

The basic filter 101 is a prototype filter for line extraction. Since the basic filter 101 does not comprise a first differential filter, when a variation in brightness is small, a portion at which the variation in brightness is maximum, is extracted as a peak, while no peak is extracted at a portion of an "edge". On the other hand, the line extraction filter 102 suppresses a portion where the variation of brightness is small by the first differential filter. However, "edge" noise is generated by the line extraction filter 102 as explained above. When a peak is detected from the output of the basic filter 101 by the peak detection portion 103, this peak is due to a "line" other than an edge. Therefore, only a portion in the vicinity of the peak of the output of the line extraction filter 102 passes through the line emphasis portion 104, and the other portion of the output of the line extraction filter 102 is stopped. Thus, a signal of "line only" is output.

Instead of the above "gate" construction, the line emphasis portion 104 may be constructed so that a peak detection output is multiplied by the output of the line extraction filter, or is added to the output of the line extraction filter, to emphasize a line portion.

In addition, since "only-gap" extraction is performed by obtaining a complementary signal of a "line" signal, processing similar to the above may be performed with inverting the polarity.

2.8.6 "Only-Edge" Extraction Filter

Although, by the edge extraction filter, a narrow band can be extracted by extracting both ends of the narrow band as "edges", signals representing the "edges" corresponding to both ends interfere with each other to lower the credibility, when the band is too narrow. Therefore, it is natural to extract such a narrow band by the above only-line extraction filter, and therefore it is desirable to eliminate the signals representing the "edges" from the output.

Figure 59:
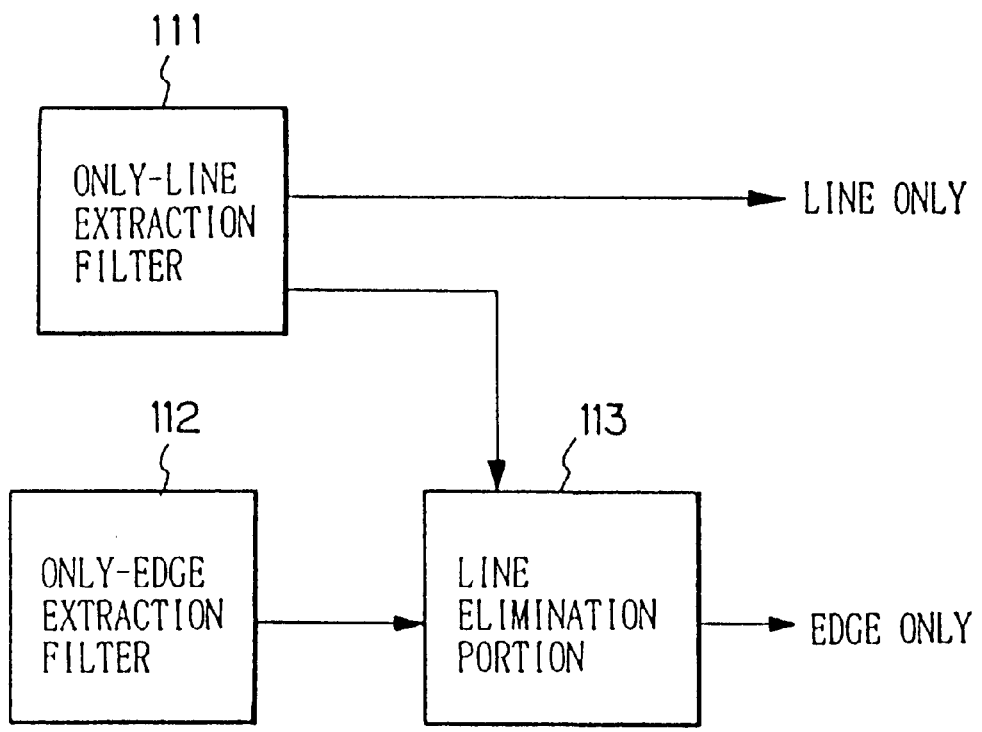
FIG. 59 is a diagram illustrating a construction of a line-edge extraction filter.

FIG. 59 is a diagram illustrating the principle of the only-edge extraction filter. In FIG. 59, reference numeral 111 denotes an only-line extraction filter, 112 denotes an only-edge extraction filter, 113 denotes a line elimination portion which subtracts the output of the only-line extraction filter from the output of the only-edge extraction filter, to output an "edge only" signal. Thus, signals representing a "line" and an "edge" are completely separated to be output. A threshold width, where a band having a width less than the threshold width is extracted as a line, can be preset by presetting the gas filter width in the only-line filter 111. Separation of "gaps" can be made in a similar manner.

Figure 60:
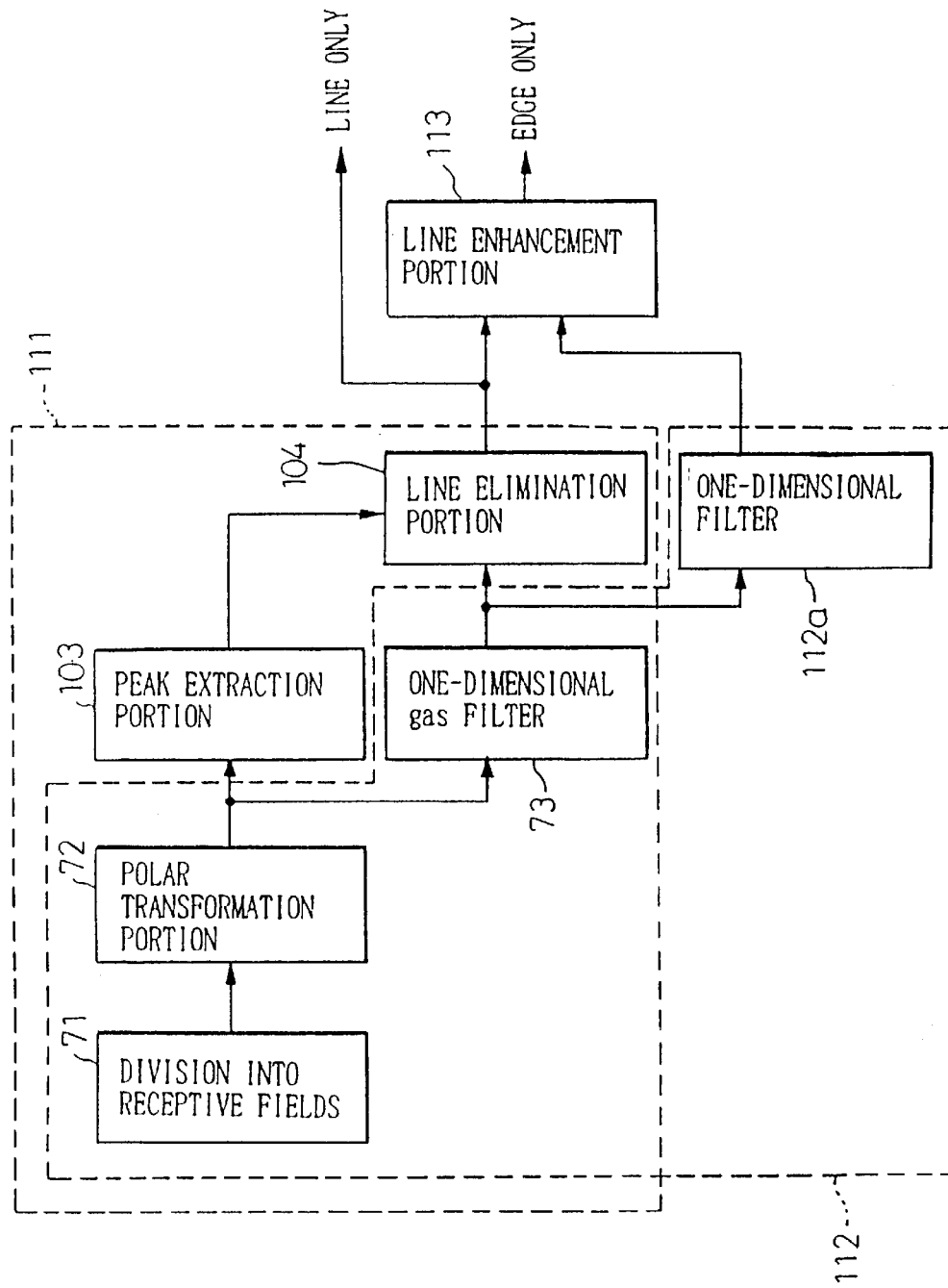
FIG. 60 is a diagram illustrating a concrete construction of a line-edge extraction filter.
Figure 113:
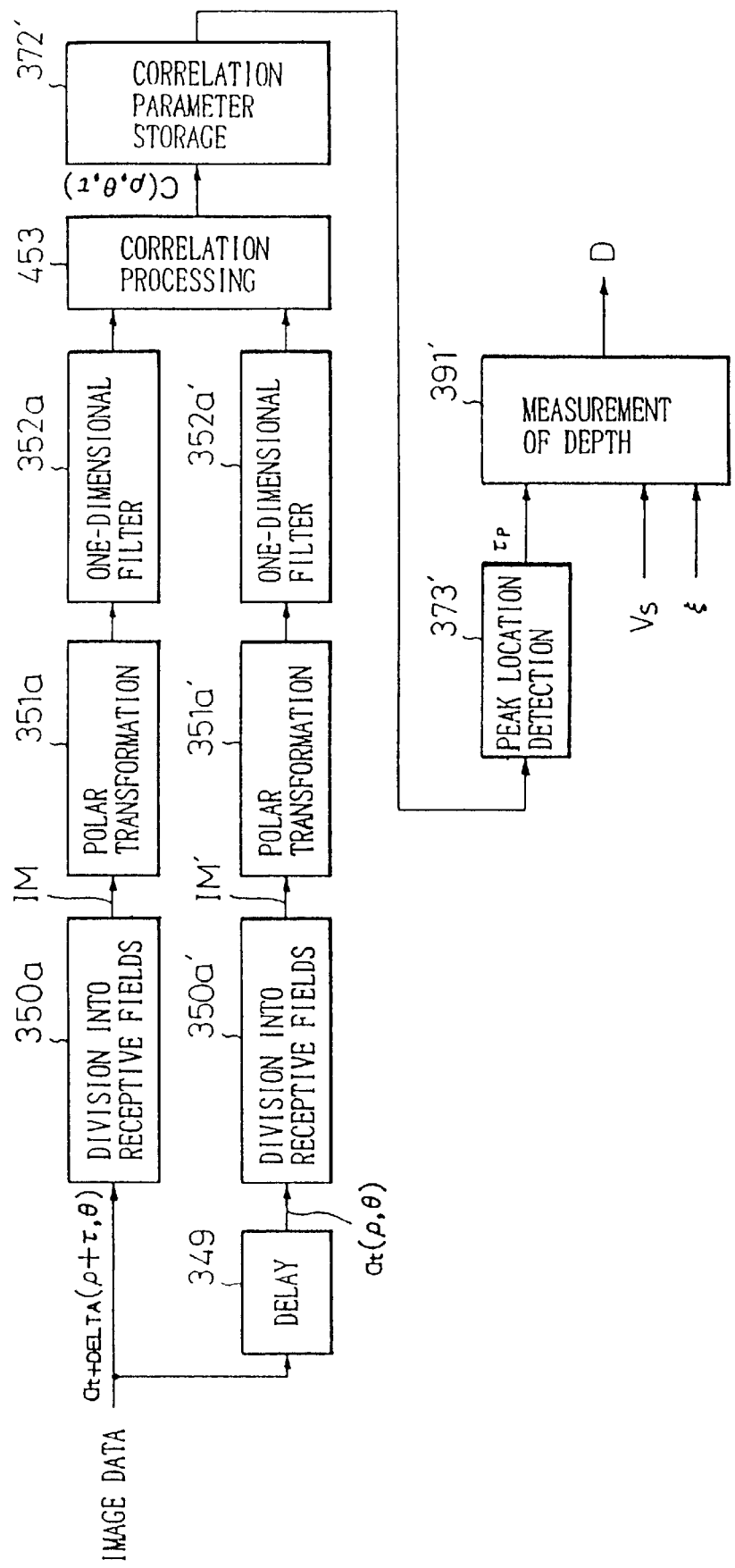
FIG. 113 is a block diagram of calculation of depth to a straight line by the kinetic stereopsis.

FIG. 60 is a diagram illustrating a concrete construction of an only-edge extraction filter. In FIG. 60, reference numeral 111 denotes an only-line extraction filter having a construction as indicated in FIG. 58, 112 denotes an edge extraction filter having a construction as indicated in FIG. 52B, and 113 denotes a line eliminate portion which subtracts the output of the only-line extraction filter 113 from the output of the only-edge extraction filter 112, to output an edge only signal. In addition, in the only-edge extraction filter 112, reference numeral 112a denotes a one-dimensional gr filter.

2.8.7 Multi-Filter

Since, according to the process of "receptive field method+one-dimensional filter" in the present invention, processing of a large mask can be performed with high-speed, simultaneous application of a plurality of filters with different widths (multi-filter) is possible, as explained before. Thus, the "simultaneous extraction of obscure portions and sharp portions contained in an image", which is impossible by the conventional method, can be performed, and working and movement with precise recognition of a whole image (screen) is possible. In the visual cortex of the cerebrum, a plurality of types of filtering with different widths are simultaneously applied, to ensure the extraction of a line segment.

Hereinafter, embodiments of multi-filters for the three types of line segments (a line, an edge, and a gap) are explained with their simulations.

2.8.7.1 Multi-Filter for Extraction of "Line" and "Gap"

The construction and advantage of the multi-filter are explained for one of the line extraction filters, which is the most superior multi-filter (FIG. 50B) among the three types of "line" extraction filters indicated in FIGS. 50A, 50B and 50C. The constructions and advantages of the other multi-filters will be understood from the explanation for the most superior multi-filter. In addition, "gap" extraction filters can be constructed in a similar manner by inverting the polarity.

2.8.7.1.1 Prototype Multi-Filter

The prototype of the multi-filter has the construction of FIG. 42, and the one-dimensional filters 44a~44d in FIG. 42 are one-dimensional gas filters of widths $W_1$~$W_4$. In the construction, an input image stored in the input memory 41, is divided into receptive fields by the receptive field division portion 42, and polar transformation is applied to the receptive field image by the polar transformation portion 43. Next, the above one-dimensional gas filters with different filter widths are applied to the output of the polar transformation in parallel in the ρ-direction of the hypercolumn plane. Then, the outputs of the one-dimensional gas filters are synthesized to obtain a multi-filter output, and the extraction of a line, an edge, and a gap is performed based on the multi-filter output. By the above multi-filter, "one-dimensional gas filters with widths $W_1$~$W_4$" are synthesized to "simultaneously extract line segments from a sharp line segment to an obscure line segment". Since the outputs of the filters are simply summed in the prototype multi-filter, the prototype multi-filter is equivalent to a filter which is made by synthesizing the filters.

2.8.7.1.2 Positive-Negative-Separation-Type Multi-Filter

In the prototype multi-filter, interference occurs when the density of lines becomes great. To avoid interference, it is effective to separate positive and negative components in each output, and synthesize positive components and negative components, respectively. FIG. 61 is a diagram illustrating a construction of the positive-negative-separation-type multi-filter wherein positive and negative components in each output are separated, and positive components and negative components are respectively synthesized. In the positive-negative-separation-type multi-filter, a positive component and a negative component in the output of each one-dimensional gas filter, which constitutes the prototype multi-filter, are separated, and positive components and negative components are respectively synthesized to be output. In the positive-negative-separation-type multi-filter, a positive-negative separation circuit 44e~44h, a positive signal synthesis portion 44i, and a negative signal synthesis portion 44 are provided in the stage following each one-dimensional gas filter 44a~44d in the prototype multi-filter.

Figure 62B:
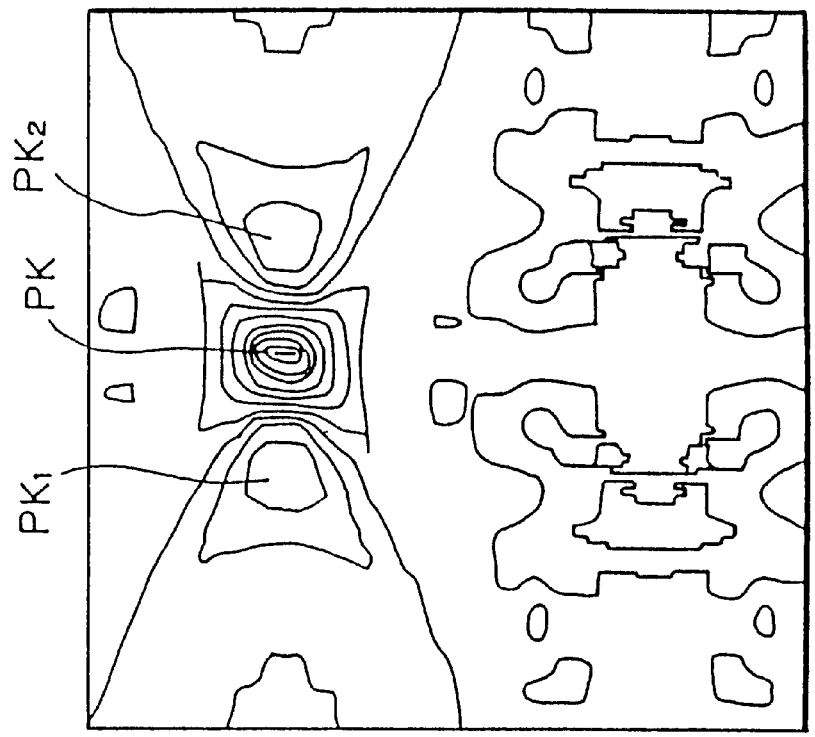
FIGS. 62A and 62B are diagrams indicating a result of a simulation of line extraction by the positive-negative-separation-type multi-filter.
Figure 62A:
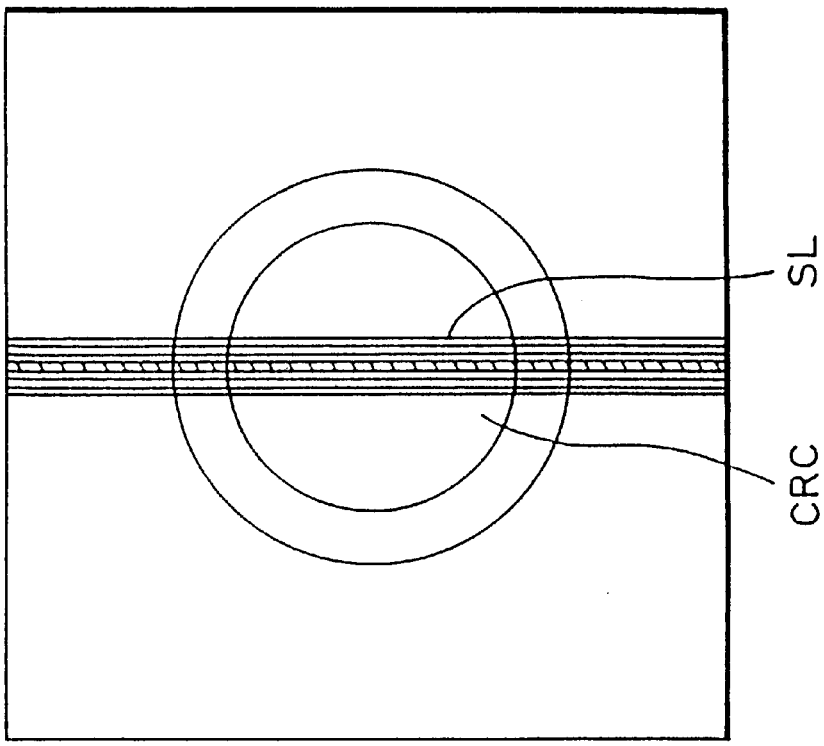

A simulation result of the positive-negative-separation-type multi-filter is indicated in FIGS. 62A and 62B, where a line segment SL (FIG. 62A) in the round receptive field CRC, is extracted as a positive main peak PK accompanied by negative sub-peaks PK1 and PK2 (See FIG. 62B).

2.8.7.2 Multi-Filter for "Edge" Extraction

The construction and advantage of the multi-filter are explained for one of the "edge" extraction filters, which is the most superior multi-filter (FIG. 50B) among the "edge" extraction filters as indicated in FIGS. 52A, 52B, 52C, and 52D. The constructions and advantages of the other multi-filters will be understood from the explanation for the most superior multi-filter (FIG. 52B) among the "edge" extraction filters as indicated in FIGS. 52A, 52B, 52C, and 52D. In addition, the other "edge" extraction filters can be constructed in a similar manner.

Figure 63:
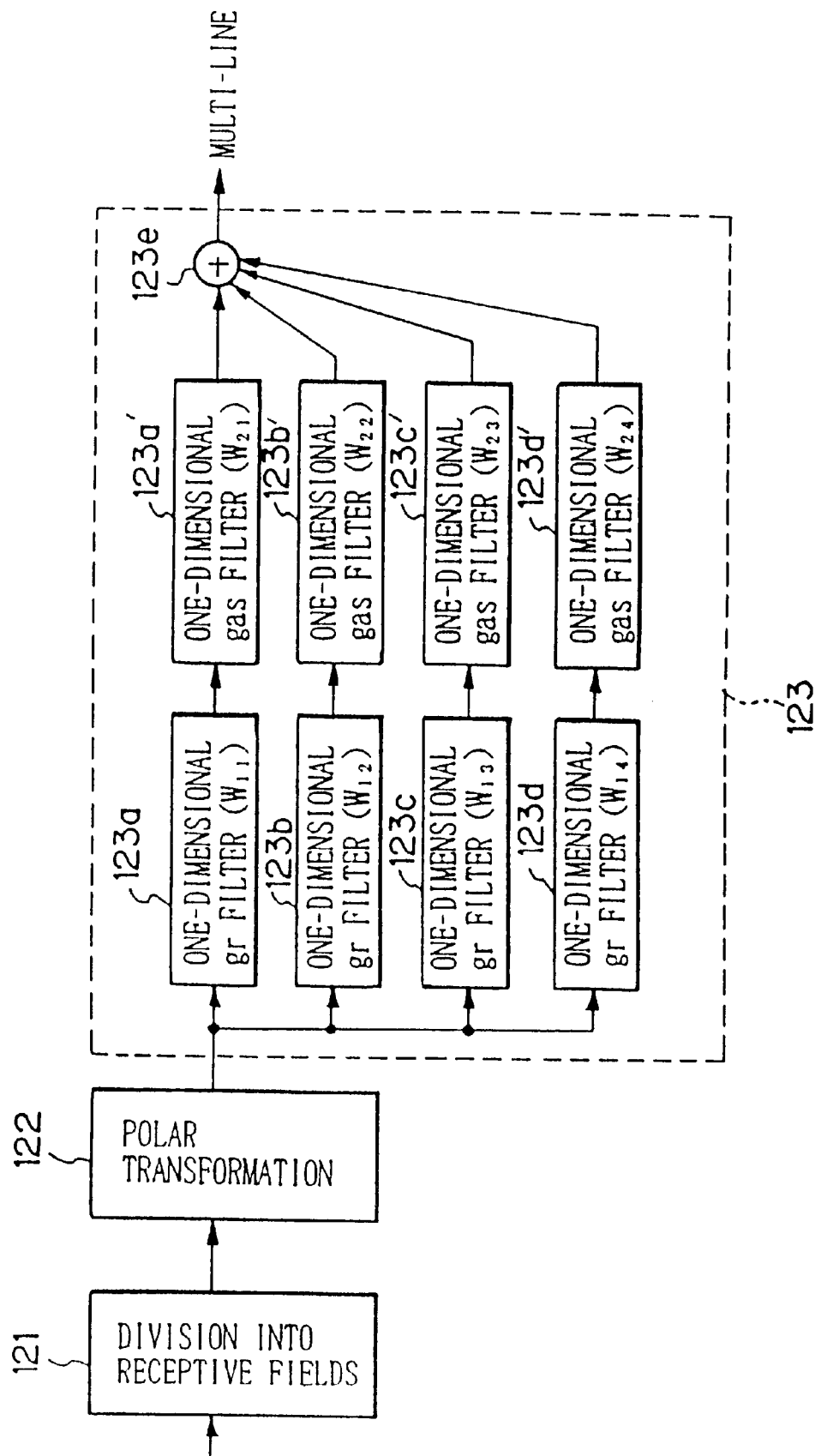
FIG. 63 is a diagram illustrating a multi-filter for extracting an edge.

FIG. 63 is a diagram illustrating the construction of the edge extraction multi-filter. In FIG. 63, reference numeral 121 denotes a receptive field division portion which divides an input image into receptive fields to output the divided images, 122 denotes a polar transformation portion which applies predetermined polar transformation to the receptive field image, 123 denotes a one-dimensional multi-filter portion comprising, one-dimensional gr filters 123a to 123d respectively having widths $W_{11}$ to $W_{14}$, each of the one-dimensional gr filter applying one-dimensional first differential filter processing to the output of the polar transformation, one-dimensional gas filters 123a'~123d' respectively having widths $W_{21}$, $W_{22}$, $W_{23}$, and $W_{24}$, independently applying one-dimensional second differential filter processing to the output of each one-dimensional gr filter, and a synthesis portion 123e for synthesizing the outputs of the one-dimensional gas filters 123a'~123d' to output the synthesized output.

According to the edge extraction multi-filter, the "simultaneous extraction of obscure portions and sharp portions contained in an image", which is impossible by the conventional method, can be performed, and working and movement with precise recognition of a whole image (screen) is possible. When the width of the gas filter is too small, the "line" transformed by the one-dimensional gr filter may be deemed as a band having a width, so differentiation is performed on edges on both ends of the band, and therefore the output becomes zero at the main peak. To avoid this problem, the following condition is required for each of the plurality of gas filters.

The diameter ($W_{21}$~$W_{24}$) of the gas filter≧the width ($W_{11}$~$W_{14}$) of the gr filter.

The optimum condition for each of the plurality of gas filters is the diameter ($W_{21}$~$W_{24}$) of the gas filter=twice the width of the gr filter.

In addition, to change the construction of the edge extraction filter indicated in FIG. 52A to a multi-filter construction, one-dimensional gr filter processing comprised of a plurality of types of filtering respectively having different widths ($W_1$~$W_4$) must be applied to the output of the polar transformation, and the synthesis of the outputs of the filtering must be obtained.

2.8.7.3 Positive-Negative-Separation-Type "Edge" Extraction Multi-Filter

Figure 64:
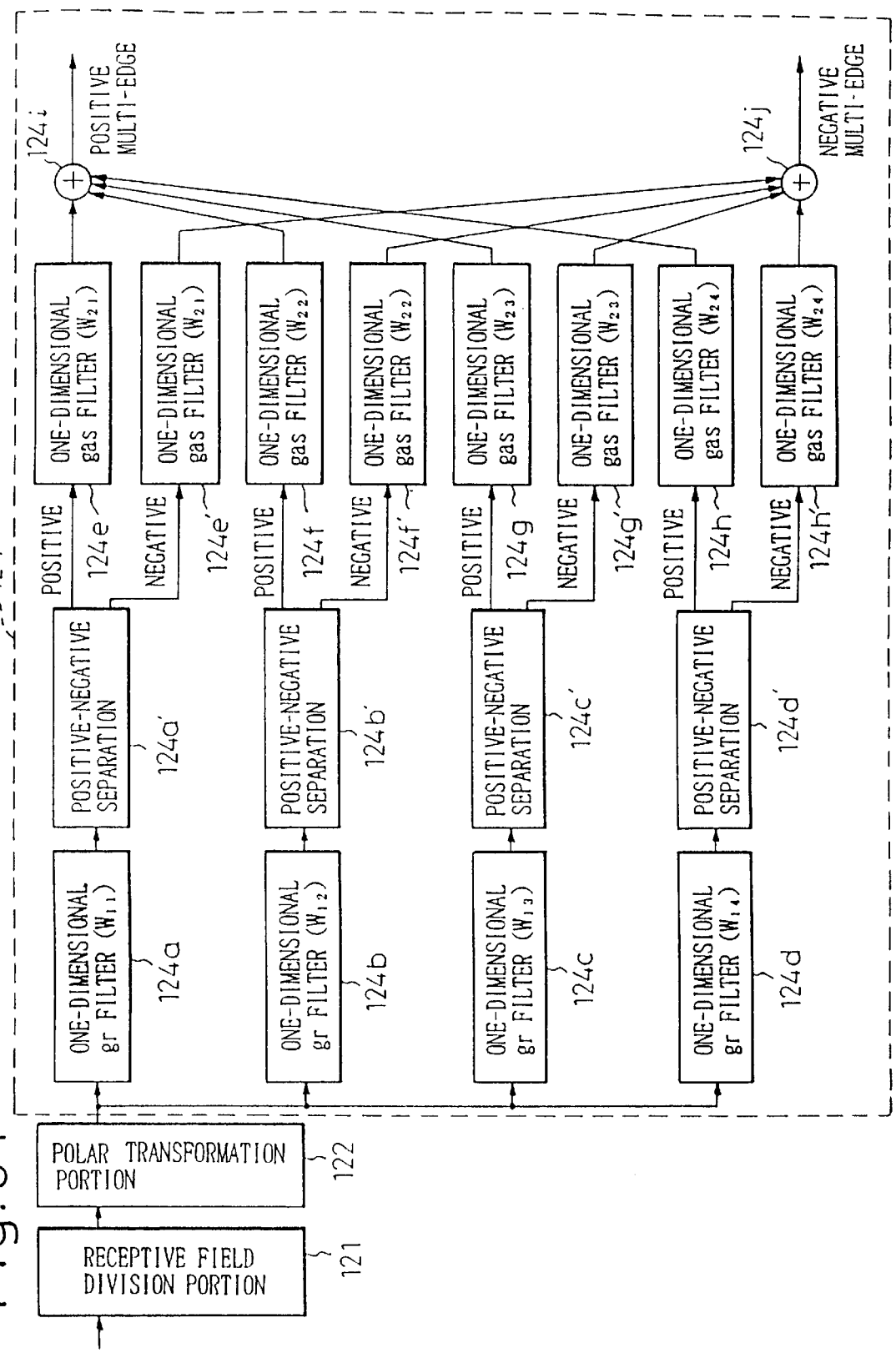
FIG. 64 is a diagram illustrating a construction of a positive-negative-separation-type multi-filter for extracting an edge.

When the density of the edges becomes great, interference may occur. To avoid the interference due to the high-density "edge" output, it is effective to separate positive and negative components in each output of the one-dimensional gr filter, apply one-dimensional gas filter processing independently to each of positive and negative components, and synthesize positive and negative components, respectively. FIG. 64 is a diagram illustrating the construction of the positive-negative-separation-type "edge" extraction multi-filter. In FIG. 64, reference numeral 121 denotes a receptive field division portion which divides an input image into receptive fields, and outputs the divided image, 122 denotes a polar transformation portion which applies predetermined polar transformation to each receptive field image, 124 denotes a positive-negative-separation-type one-dimensional multi-filter portion comprising one-dimensional gr filter 124a–124d respectively having widths $W_{11}$~$W_{14}$, and each one-dimensional first differential filter processing to the output of the polar transformation, positive-negative separation circuit 124a'~124d' which separates positive and negative components in the output of each one-dimensional gr filter output, four pairs of first and second one-dimensional gas filters 124e, 124e'; 124f, 124f'; 124g, 124g'; 124h, 124h', the one-dimensional gas filters in the respective pairs having widths $W_{21}$~$W_{24}$, and each one-dimensional gas filter independently applying one-dimensional second differential filter processing to the positive and negative portions in the output of each one-dimensional gr filter, a synthesis portion 124i which synthesizes positive outputs of the one-dimensional gas filters, and outputs the result, and a synthesis portion 124j which synthesizes negative outputs of the one-dimensional gas filters, and outputs the result.

Figure 65B:
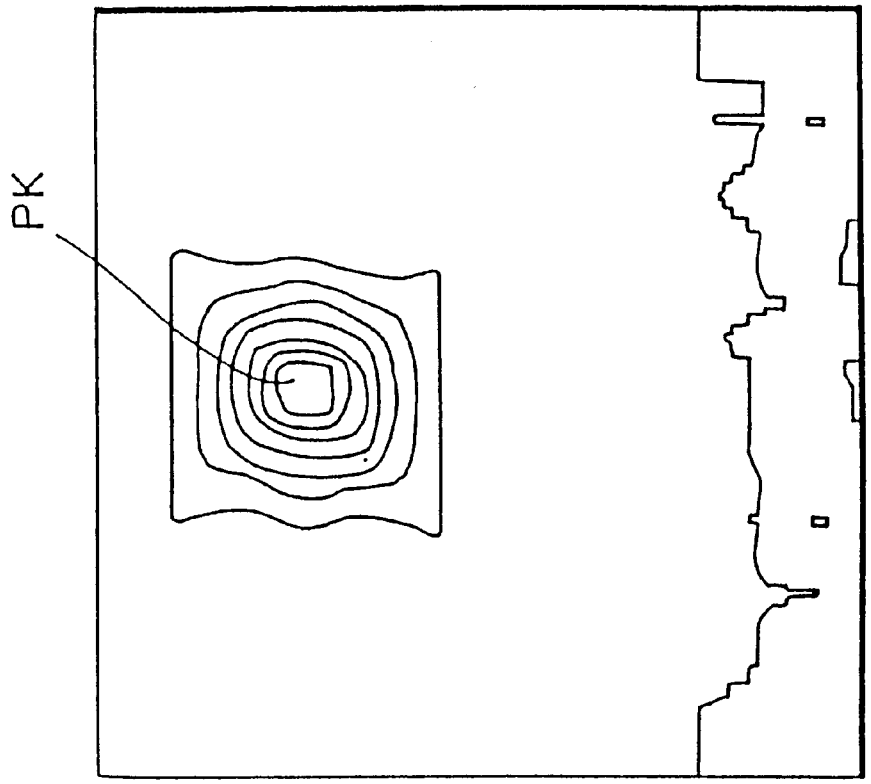
FIGS. 65A and 65B are diagrams indicating a result of a simulation of edge extraction by the positive-negative-separation-type multi-filter.
Figure 65A:
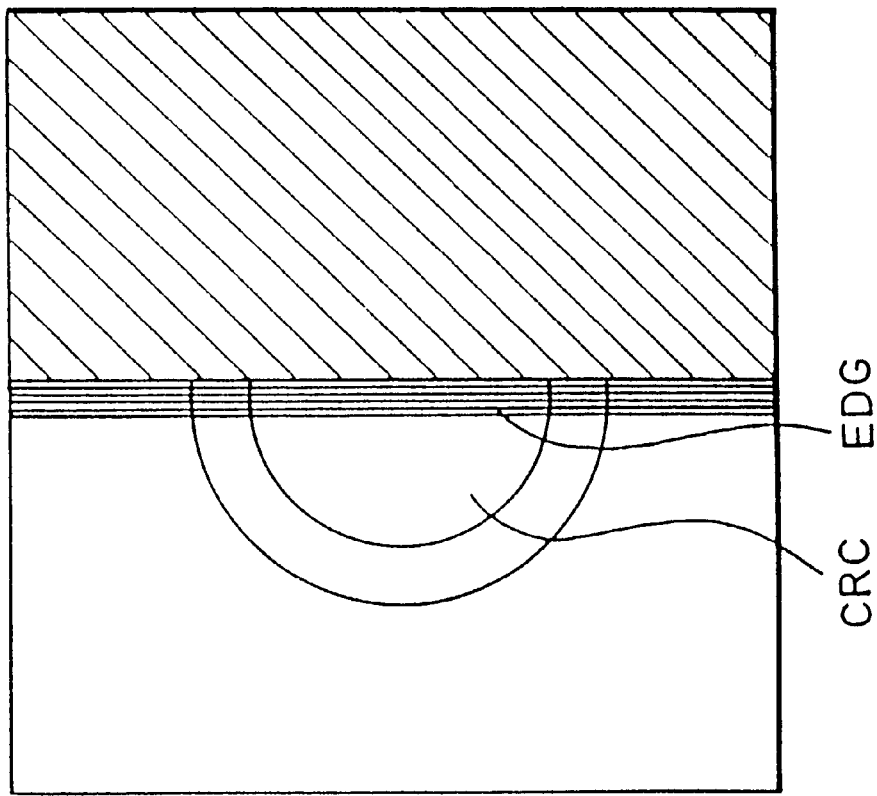

A simulation result of the positive-negative-separation-type "edge" extraction multi-filter is indicated in FIGS. 65A and 65B, where an edge EDG (FIG. 65A) in the round receptive field CRC, is extracted as a sharp peak PK (FIG. 65B).

2.8.8 Multi-Filter by "Two-Dimensional gas Filter+One-Dimensional gr Filter"

In the above, the "one-dimensional gas filter+one-dimensional gr filter"-type multi-filter is explained, wherein the amount of processing is remarkably reduced. Instead, the combination of a "two-dimensional gas filter+a one-dimensional gr filter" can be used. The function and advantage of the latter filter is the same as the former filter, and the construction of the latter filter is indicated in FIGS. 66A and 66B.

2.8.8.1 Line Extraction Multi-Filter

FIG. 66A is a diagram illustrating the construction of the "line" extraction multi-filter, which comprises a plurality of two-dimensional gas filters ($W_1 \sim W_4$), respectively applying two-dimensional second differential filter processing to an image, and the outputs of the respective filters are synthesized. The synthesized image is divided into receptive fields by the receptive field division portion, and polar transformation is applied to each receptive field image by the polar transformation portion to extract a line.

2.8.8.2 Gap Extraction Multi-filter

The gap extraction multi-filter is obtained by inverting the polarity in 2.8.8.1.

2.8.8.3 Edge Extraction Multi-Filter

FIG. 66B is a diagram illustrating the construction of the "edge" extraction multi-filter, which comprises a plurality of two-dimensional gas filters, respectively applying two-dimensional second differential filter processing to an input image. In the construction of FIG. 66B, further, the output of each two-dimensional gas filter is independently divided into receptive fields, polar transformation is applied to each receptive field image, one-dimensional gr filter processing is applied to each output of the polar transformation, and the outputs of the one-dimensional gr filters are synthesized to output an edge signal.

According to the above edge extraction multi-filter, although the output equivalent to the output of the "one-dimensional gas filter+one-dimensional gr filter"-type multi-filter is obtained, the amount of processing in the two-dimensional gas filter increases with a square of the filter size.

2.8.9 Example Variation of Edge Multi-Filter

Figure 67A:
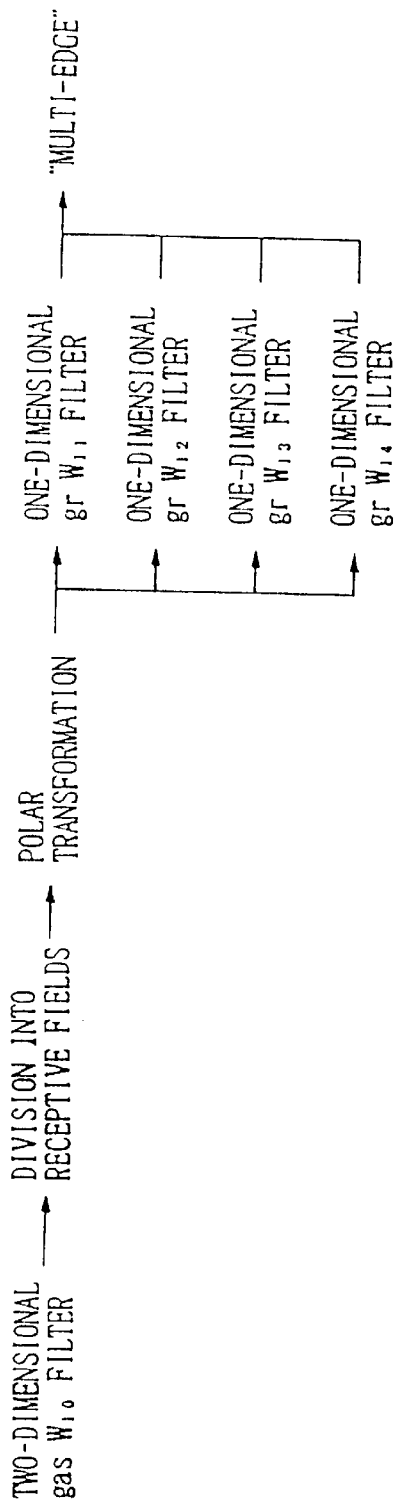
FIGS. 67A and 67B are diagrams for explaining examples of variations of the multi-filter.

As the edge multi-filters, the edge multi-filters indicated in FIGS. 63 and 64 are most superior, the multi-filter indicated in FIG. 67A wherein the gas filter is fixed, is the second superior. In the visual information processing of mammalian, this multi-filter is adopted since the output (the retina and the lateral geniculate nucleus) of the two-dimensional gas filter (diameter $W_{10}$) can serve for common use. In addition, for the above reason, it is necessary that the following condition exists:

the diameter ($W_{10}$) of two-dimensional gas filter$\geq$max (the width of one-dimensional gr filter).

Figure 67B:
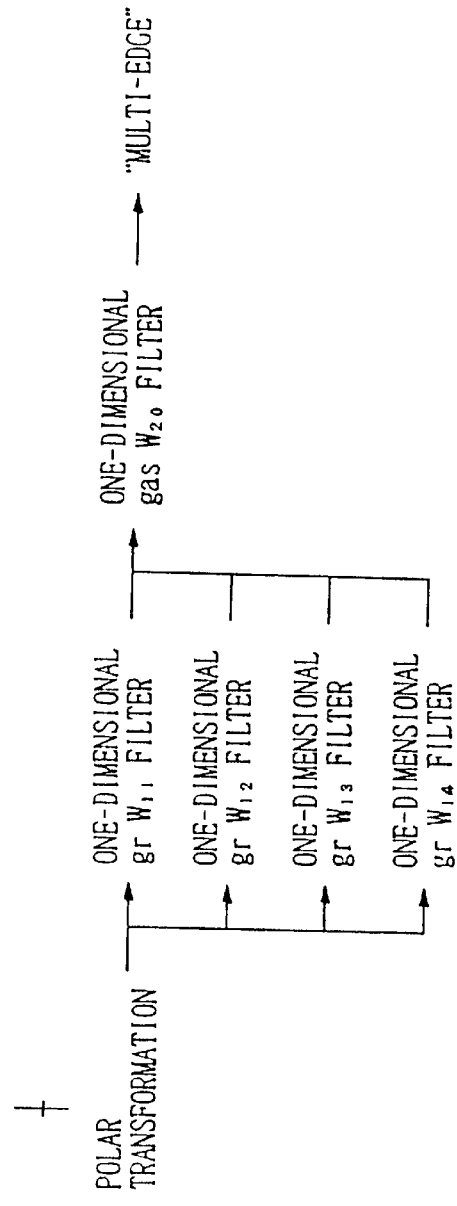

The amount of processing can be further reduced in the construction of FIG. 67B, wherein the above two-dimensional gas filter is modified to a one-dimensional form.

2.9 Extension of One-Dimensional Filter

Although the above explanations are made for the case of "polar transformation on a sphere" and "the mapping method as a portion thereof" for ease in understanding, the process and construction of "receptive field division→polar transformation→one-dimensional filter" according to the present invention, can operate for general polar transformation, for example, polar transformation on a cylinder, polar transformation on a plane, and the like, in the same way, and therefore high-speed filtering, which is difficult by the two-dimensional filter, and filtering of an arbitrary function form, which is impossible in the two-dimensional filter, are made possible. This is because, according to the receptive field method wherein an image is divided into small areas, a projection axis $\psi$ in a broad sense and an axis $\rho$ perpendicular to the axis $\psi$ can be locally defined for general polar transformation, and therefore a one-dimensional filter can be applied to obtain the advantage as explained above.

Although application of a one-dimensional filter in the direction of the "location axis $\rho$ of a line segment" is explained above, further filtering in the "angle orientation $\theta$ of a line segment" is also possible. Due to this filtering, extraction of a circle which has a common center with the receptive field, is possible. The reason is because, a trace generated by varying $\theta$ only on a dual plane, corresponds to an "envelope curve of a circle" in the receptive field. The above circle can be extracted by extracting a group of peaks in a row in the $\theta$-direction. In this special case, a group of radial lines passing through the center of the receptive field at $\rho=0$.

Although, in the above explanations, an image input through a camera and a lens is divided into small areas, polar transformation is applied to the image in each small area, one-dimensional filter processing is applied to the output of the polar transformation, and image processing is performed based on the result of the one-dimensional filter processing, the present invention can be applied to an arbitrary image other than the images input through a camera and a lens. For example, the hypercolumn image may be divided into small areas. Then, polar transformation is applied to the image in each small area, one-dimensional filter processing is applied to the output of the polar transformation, and image processing is performed based on the result of the one-dimensional filter processing.

Although the present invention is explained with the embodiments above, various types of variations are possible within the spirits of the present invention, as stated in the claims, and the scope of the present invention includes these types of variations.

2.10 Advantage of Second Aspect of Present Invention 2.10.1 Since the input image of a size equal to N×N pixels is divided into receptive field images of a size equal to m×m pixels, polar transformation is applied to the image in each small area, predetermined one-dimensional filter processing is applied to the output of the polar transformation to extract a characteristic feature, and only application of one-dimensional filter is required, so the amount of processing is remarkably reduced by about (2/filter diameter pixels), compared with the amount of processing in the application of the conventional two-dimensional filter, and thus high-speed processing becomes possible. Filtering of a large size whereby processing of an obscure image and fine filtering of line segments can be performed with the same amount of processing as the amount of conventional processing, can be realized, and line segments can be precisely extracted from the obscure image.

2.10.2 Since a one-dimensional filter is applied after the projection in all directions (polar transformation) is performed, and isotropic processing is completed by the projection, the one-dimensional filter applied after the projection may be the same for all the orientations, and therefore an arbitrary filter can be applied. Therefore, the one-dimensional filter can be the one-dimensional odd-function filter which is indispensable for the edge extraction, and thus extraction of edges becomes possible while it is impossible by the conventional filter.

2.10.3 The one-dimensional filter can be constructed by skeleton filters, and efficient differentiation processing can be performed by the skeleton filters. In addition to the above factor contributing to speed-up, processing speed can be made faster by a factor corresponding to "the number of pixels in the filter width". Namely, extraction of the characteristic feature, for example, lines, edges, gaps, and the like, can be performed with high-speed.

2.10.4 Since a plurality of types of one-dimensional filters respectively having different widths are simultaneously applied to the output of the polar transformation, and the outputs of the plurality of types of one-dimensional filters are synthesized (multi-filter), the simultaneous extraction of obscure portions and sharp portions contained in an image, and working and movement with precise recognition of a whole image (screen) is possible.

2.10.5 Since an object image is divided into receptive field images, polar transformation is applied to each receptive field image, one-dimensional gas (Gaussian) filter processing is applied to the output of the polar transformation, so extraction of a line can be performed based on the result of the one-dimensional gas processing, and extraction of a gap can be performed by inverting the polarity of the result of the one-dimensional gas processing. Further, since extraction of lines and gaps is performed by selecting a portion in the vicinity of a peak in the output of the one-dimensional Gaussian filter which is applied after the polar transformation, a sharp line segment and gap can be extracted.

2.10.6 Since an object image is divided into receptive field images, polar transformation is applied to each receptive field image, one-dimensional gr (gradient) filter processing is applied to the output of the polar transformation, or one-dimensional gr (gradient) filter processing and one-dimensional gas filter processing are applied to the output of the polar transformation (one-dimensional multi-stage filter processing), so extraction of an edge can be performed, while it is conventionally impossible. Further, since a plurality of types of one-dimensional gr filters respectively having different widths are simultaneously applied to the output of the polar transformation, or a plurality of types of one-dimensional gr filters respectively having different widths, and a plurality of types of one-dimensional gas filters respectively having different widths are applied, respectively and in turn, and then the outputs of the plurality of filters are synthesized to be output, simultaneous extraction of edges in obscure portions and sharp portions contained in an image, is possible.

2.10.7 Since positive and negative components in the output in each stage are separated with one-dimensional multi-stage filtering, fine characteristic features such as a narrow band and high density of lines and edges can be extracted while suppressing interference.

3. Third Aspect of The Present Invention 3.1 Basic Construction of Third Aspect of Present Invention FIG. 68 is a diagram illustrating the basic construction of the third aspect of the present invention (receptive field method).

In FIG. 68, reference numerals 15' and 25' each denote a polar transformation portion which applies polar transformation processing to first and second image data, 17' and 27' each denote a one-dimensional filter which applies one-dimensional filter processing to a result of the polar transformation, 18' and 28' each denote a $\rho\theta$ dual plane (hypercolumn memory) which stores a result of the filter processing (hypercolumn image), and 30 denotes a correlation processing portion which performs correlation processing between data mapped onto the respective dual planes.

The polar transformation portions 15' and 25' apply polar transformation processing to the first and second image data, and thus projection onto dual planes 18' and 28' is performed. The one-dimensional filters 17' and 27' apply one-dimensional filters 17' and 27' to the result of the polar transformation processing result, and thus mapping onto dual planes 18' and 28' is performed. The correlation processing portion 30 obtains a correlation amount (correlation parameter) by using as element parameters a location $(\rho,\theta)$ of the mapped data on the dual plane, and a shift amount between the mapped data to which correlation processing is to be performed. The correlation processing portion 30 further obtains a point at which a characteristic correlation parameter (for example, a local maximum value) is located, and measures a variable (a binocular parallax, a movement direction, a velocity, and the like) which determines relationship between characteristic features of the respective images based on values of the element parameters which provide the characteristic correlation parameter. Since a tangential line of a contour included in the first and second images (the tangential line is a straight line when the contour is a straight line) is transformed to a point decreasing the dimension by polar transformation, the two-dimensional problem of the tangential line is transformed to a one-dimensional problem, and thus, determination processing of corresponding portions in a plurality of figures by correlation processing can be made simple, and further the determination processing can be performed precisely with a smaller amount of processing to realize the function of the binocular stereopsis.

In addition, the amount of processing can be remarkably reduced by performing polar transformation processing, filter processing, and correlation processing on the receptive field images generated by dividing an image (screen) into receptive fields which are small areas.

Further, when the respective receptive field images belong to different images (screens) captured by two or three cameras, the function of the binocular stereopsis and the three-dimensional view by three eyes can be realized. When the respective receptive field images belong to different images captured at different images, the movement direction and movement velocity of a characteristic feature (a line, a corner, and the like) in each receptive field can be measured, and therefore it is possible to move while capturing an object at the center of the field of view, and this technique can be applied to a moving robot and an unmanned vehicle.

When the receptive field images are images in different receptive fields in the same image (screen), or when the receptive field images are images in the same receptive field image, texture analysis can be performed wherein, for example, a degree of repetition of the same design pattern in an image can be examined.

Further, the binocular stereopsis, the pursuit of a movement object, and the texture analysis can be performed more surely by performing correlation processing between a plurality of receptive field images for each color, for each color difference signal, or for each primary color.

When one-dimensional Gaussian filter processing is performed after the polar transformation, or two-dimensional Gaussian filter processing is performed before the polar transformation processing, corresponding lines or gaps in a plurality of figures can be obtained. Further, one-dimensional gradient filter processing and one-dimensional Gaussian filter processing are performed after the polar transformation processing; or two-dimensional Gaussian filter processing is performed before the polar transformation processing, and one-dimensional gradient filter processing is performed after polar transformation processing, corresponding edges in a plurality of figures can be obtained. Then, the location, an orientation, a binocular parallax, a movement direction, and a movement velocity of these figure elements can be obtained.

When a plurality of receptive field images belong to spatially different images, it is possible to extract a tangential line moving with changing its orientation by calculating correlation parameter $C(\rho,\theta,\sigma)$ in the θ-direction, or two-dimensional correlation parameter $C(\rho,\theta,\sigma_1,\sigma_2)$ on the $(\rho,\theta)$ plane.

When a plurality of receptive field images belongs to different image (screen) at different times, a location, an orientation, and a velocity of a translating tangential line can be quantitatively obtained by calculating correlation parameter $C(\rho,\theta,\tau)$ in the ρ-direction. In addition, a location, an orientation, a velocity, and the like of a tangential line passing through the center of the receptive field, by calculating correlation parameter $C(\rho,\theta,\tau)$ in the θ-direction. Further, it is possible to quantitatively measure a location, an orientation, a velocity, a rotation velocity, and the like of a line moving with changing its orientation by calculating two-dimensional correlation parameter $C(\rho,\theta,\tau_1,\tau_2)$ in the $(\rho,\theta)$ plane.

Further, the capacity of memory storing correlation parameters can be reduced by an amount corresponding to one or two axes: by projecting correlation parameter $C(\rho,\theta,\sigma)$ in a σ-axis direction, where σ denotes a spatial shift amount; projecting the correlation parameter $C(\rho,\theta,\sigma)$ in a ρ-direction, where σ denotes a tangential line location; projecting correlation parameter $C(\rho,\theta,\sigma)$ in a θ-direction, where θ denotes a tangential line orientation; or projecting correlation parameter $C(\rho,\theta,\sigma)$ in the orientations of arbitrary two of the above axes. In addition, a desired value among a location, a binocular parallax, and an orientation of a tangential line, can be obtained by selecting the projection direction.

Further, the capacity of memory storing correlation parameters can be reduced by an amount corresponding to one or two axes: by projecting correlation parameter $C(\rho,\theta,\tau)$ in a τ-axis direction, where τ denotes a time shift amount; projecting the correlation parameter $C(\rho,\theta,\tau)$ in a ρ-direction, where ρ denotes a tangential line location; projecting correlation parameter $C(\rho,\theta,\tau)$ in a θ-direction, where θ denotes a tangential line orientation; or projecting correlation parameter $C(\rho,\theta,\tau)$ in the directions of arbitrary two of the above axes. In addition, a desired value among a location, an orientation, a velocity of translation, and a rotation velocity of a tangential line, can be obtained by selecting the projection direction.

Further, by performing polar transformation processing on the receptive field image to map onto a ρ-θ dual plane, picking up a combination of mapped data $a(\rho,\theta)$ on the dual plane, and mapped data $b(\rho,\theta)$ on another dual plane, where the coordinate values are shifted in the ρ-direction by a predetermined amount, and calculating a sum of products of the combination data, precise filtering can be performed, and preferably, this technique is applicable to "extraction of a characteristic feature which can be seen by right and left eyes in the same way" and "pursuit of the same characteristic feature in the current and preceding images".

From mapped data $a(\rho,\theta)$ on a dual plane, mapped data $b(\rho,\theta)$ after the mapped data $(\rho,\theta)$ is shifted in the ρ-direction or the θ-direction, is subtracted. Then, the subtraction is repeated varying the shift amount to obtain the subtraction result as correlation parameters. Thus, the binocular stereopsis and trace of an object the contour of which is obscure, based on slow variation of brightness and hue, and the like.

3.2 Principle of Binocular Stereopsis

In the conventional binocular stereopsis, corresponding "figures" in images are searched. It is difficult to stably determine the correspondence by the conventional computers which are poor at the processing of figures. Therefore, determination of the correspondence is performed based on the simplest characteristic feature, i.e., "a tangential line" of a figure (an element of a contour when cutting the contour into very small lengths, and the element is a straight line when the contour is a straight line). According to this "tangential line method" comparison of tangential lines (straight line) projected onto two eyes should be performed. The procedure is simple, and thus stable determination of the correspondence can be performed. In the explanation hereinafter, when terms such as a tangential line, a contour tangential line, a contour line have the same meaning as long as consideration is made within a receptive field image in each receptive field as a small area.

Although the treated figure becomes simple due to the above comparison of tangential lines, it is necessary to determine the correspondence of a tangential line, and it takes time for the processing. When performing polar transformation on an input image, and mapping the polar-transformed image onto a dual plane which has an orientation θ and a location ρ as coordinate-axes, "tangential lines" in the right and left images are transformed to "a point" with reducing the dimension. Therefore, the two-dimensional problem of the correspondence of tangential lines, can be processed as a one-dimensional problem to remarkably reduce the amount of processing.

Figure 69:
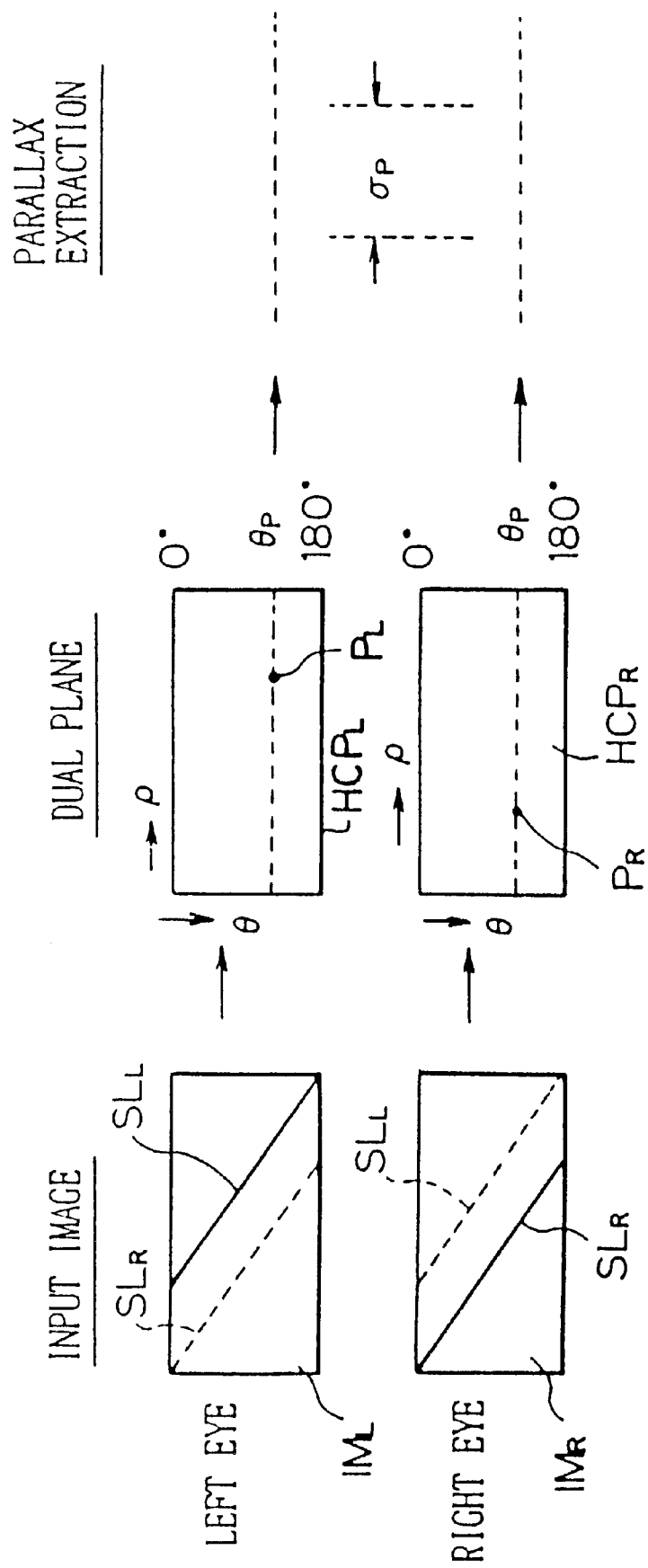
FIG. 69 is diagrams for explaining the principle of the binocular stereopsis.

FIG. 69 is a diagram for explaining the principle of the binocular stereopsis according to the present invention.

(1) An image $SL_L$ of a "tangential line" in a space in the input image $IM_L$ seen by the left eye is offset in parallel from an image $SL_R$ of the "tangential line" in the input image $IM_R$ seen by the right eye.

(2) On the other hand, in the ρ-θ dual planes $HCP_L$ and $HCP_R$ onto which a hypercolumn image is mapped, where the hypercolumn image is obtained by polar-transforming an input image, a group of parallel lines inclined by an angle $\theta_P$ is transformed to a series of points on the ρ-axis, where $\theta = \theta_P$.

(3) Therefore, the "tangential lines" $SL_L$ and $SL_R$ seen with the offset in parallel in the input images $IM_L$ and $IM_R$ by the right and left eyes, are transformed to the points $P_L$ and $P_R$ on the dual planes $HCP_L$ and $HCP_R$ corresponding to the same $\theta_P$ on the ρ-axis.

(4) By obtaining a distance $\sigma_P$ between the two points, an amount of translation of the "tangential lines" $SL_L$ and $SL_R$ in the right and left images $IM_L$ and $IM_R$, i.e., a binocular parallax is determined.

(5) Based on the above distance $\sigma_P$ and the space between two eyes, the spatial depth of the "tangential lines" can be determined, and the function of the binocular stereopsis is realized.

Thus, by performing polar transformation on the input image, comparison of the "tangential lines" on the "two-dimensional space" can be simplified to the one-dimensional processing for comparing the "point" on the ρ-axis, the determination of the correspondence can be performed with small amount of processing.

3.3 Basic Principle of Third Aspect of Present Invention

Summarizing the above explanations, the basic construction of the binocular stereopsis is expressed as below.

Input image→polar transformation→one-dimensional correlation processing

As explained above, the polar transformation is an operation of transforming a "tangential line" to a "point" to perform the comparison in a one-dimensional space. The one-dimensional correlation processing is an operation of extracting corresponding "points" from "a series of points" corresponding to the same θ on the ρ-axis. When mapped data on polar-transformed dual planes of two eyes are respectively denoted by L(ρ,θ) and R(ρ,θ), and a spacing between mapped data (shift amount) is denoted by σ, the correlation amount (correlation parameter) is calculated by the following equation $$C(\rho,\theta,\sigma)=L(\rho,\theta)\cdot R(\rho+\sigma,\theta). \tag{101}$$

By obtaining values $(\rho_P,\theta_P,\sigma_P)$ of the element parameters ρ,θ,σ at which the correlation amount C(ρ,θ,σ) becomes locally maximum, corresponding tangential lines can be determined based on the values $(\rho_P,\theta_P,\sigma_P)$ of the element parameters, and a location, an orientation, and a binocular parallax of the tangential lines are quantitatively determined. In addition to the asymmetric-type correlation calculation by the equation (101), the correlation parameter can be obtained by symmetric-type correlation calculation as indicated by the equation (101)', $$C(\rho,\theta,\sigma)=L(\rho-\sigma,\theta)\cdot R(\rho+\sigma,\theta) \tag{101'}$$

Hereinafter, basically, explanations are given based on the assumption that the correlation parameter is calculated by the asymmetric-type correlation calculation according to the equation (101). In addition, terms such as correlation amount, correlation parameter, and correlation result, are used with the same meaning.

3.4 Embodiment of Correlation Processing Apparatus 3.4.1 Whole Construction

Figure 70:
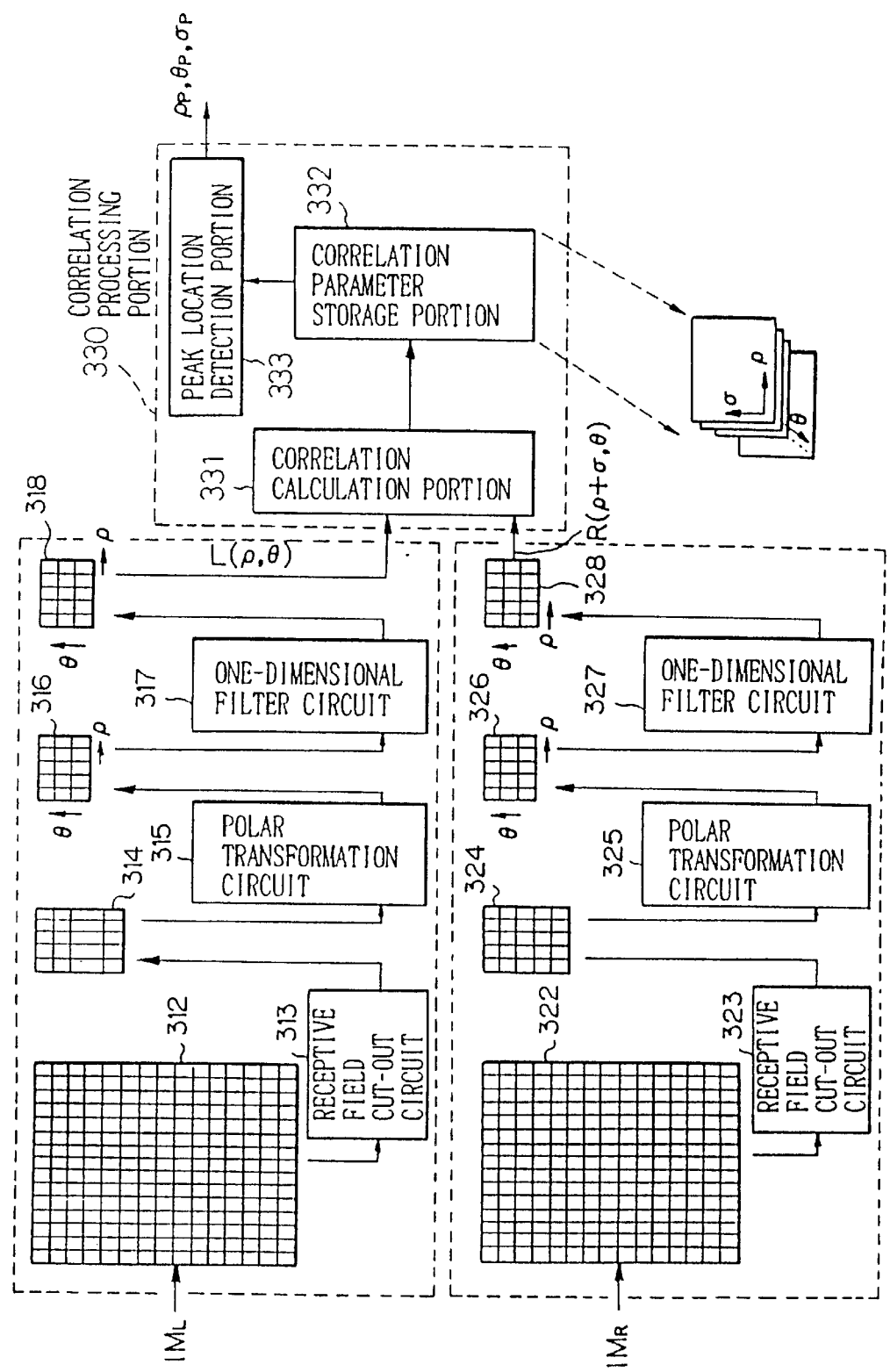
FIG. 70 is a diagram illustrating the construction of the embodiment of the third aspect of the present invention.

FIG. 70 is a diagram illustrating the construction of the embodiment of the third aspect of the present invention, wherein a location, an orientation, and a parallax of the corresponding tangential lines contained in two images are obtained by the procedure of: input image→receptive field division→polar transformation one-dimensional correlation processing. In FIG. 70, reference numerals 312 and 322 each denote an input memory for storing input images $IM_L$ and $IM_R$ seen by right and left eyes, 313 and 323 each denote a receptive-field cut-out circuit which cuts out and outputs an image (receptive field image) in each receptive field in turn when an input plane is divided into receptive fields which are small areas of a size m×m pixels, 314 and 324 each denote a receptive field memory for storing an image (receptive field image) in each receptive field, 315 and 325 each denote a polar transformation circuit for applying polar transformation to each receptive field image, 316 and 326 each denote a polar transformation hypercolumn memory for storing images (hypercolumn image) which is polar transformed onto dual planes (hypercolumn plane). The polar transformation hypercolumn memory 316 and 326 comprises storage areas (hypercolumn cells) containing $\rho_{max}$ areas in the ρ-direction and $\theta_{max}$ areas in the θ-direction, and $\rho_{max}\times\theta_{max}$ areas as a total.

In addition, reference numerals 317 and 327 each denote a one-dimensional filter circuit for applying one-dimensional filter processing to the hypercolumn images obtained by the polar transformation, 318 and 328 each denote a dual plane (hypercolumn memory) for storing hypercolumn images to which filter processing is applied, 330 denotes a correlation processing portion. In the correlation processing portion 330, reference numeral 331 denotes a correlation calculation portion for performing one-dimensional correlation calculation according to the equation (101), 332 denotes a correlation parameter storage portion for storing correlation values (correlation parameters) having a dimension of ρ-σ-θ, 333 denotes a peak detect portion for scanning the data stored in the correlation parameter storage portion to detect a local maximum point $(\rho_P,\theta_P,\sigma_P)$.

The polar transformation circuit 315, 325 applies polar transformation to each pixel in the receptive field, i.e., transforms each pixel to a corresponding great circle to store the transformed data in the polar transformation hypercolumn memory 316, 326. In practice, since the size of the receptive field is small, the polar transformation is approximated as a transformation of "pixels→sine wave", and each pixel in the receptive field is transformed to a corresponding sine curve on a hypercolumn to store the transformed curve in the polar transformation hypercolumn memory 316, 326.

The one-dimensional filter circuit 317, 327 is provided for extracting a line, an edge, and a gap with a small amount of processing. For emphasizing contours and extracting characteristic features, usually, two-dimensional convolution filter is applied to the image data, and then polar transformation is performed. However, according to this convolution method, an amount of processing is equal to $a^2$ is necessary for each input point when the filter size is equal to a, and therefore the amount of processing increases with the increase in the filter size. However, since the process of "two-dimensional convolution filter+polar transformation" is equivalent to the process of "one-dimensional filter processing in the ρ-direction after polar transformation", one-dimensional filter is applied after polar transformation in the embodiment of FIG. 70. According to this process, the amount of processing becomes small as a due to one-dimensional filtering, and the amount of processing is reduced by about 2/a compared with the convolution method.

3.4.2 Correlation Calculation

The correlation calculation portion 331 multiplies the mapped data L(ρ,θ) on the dual plane 318 by the left eye, by the mapped data R(ρ+σ,θ) on the dual plane 328 by the right eye, which is shifted by a in the ρ-direction from the mapped data L(ρ,θ), and stores the multiplication result in the correlation parameter storage portion 332. Then, the multiplication and storage are repeated with varying the shift amount σ as 0~$\sigma_{max}$, ρ as 0~$\rho_{max}$ (for a full width of the hypercolumn in the ρ-direction), θ as 0~$\theta_{max}$ (for a full width of the hypercolumn in the θ-direction).

Figure 71:
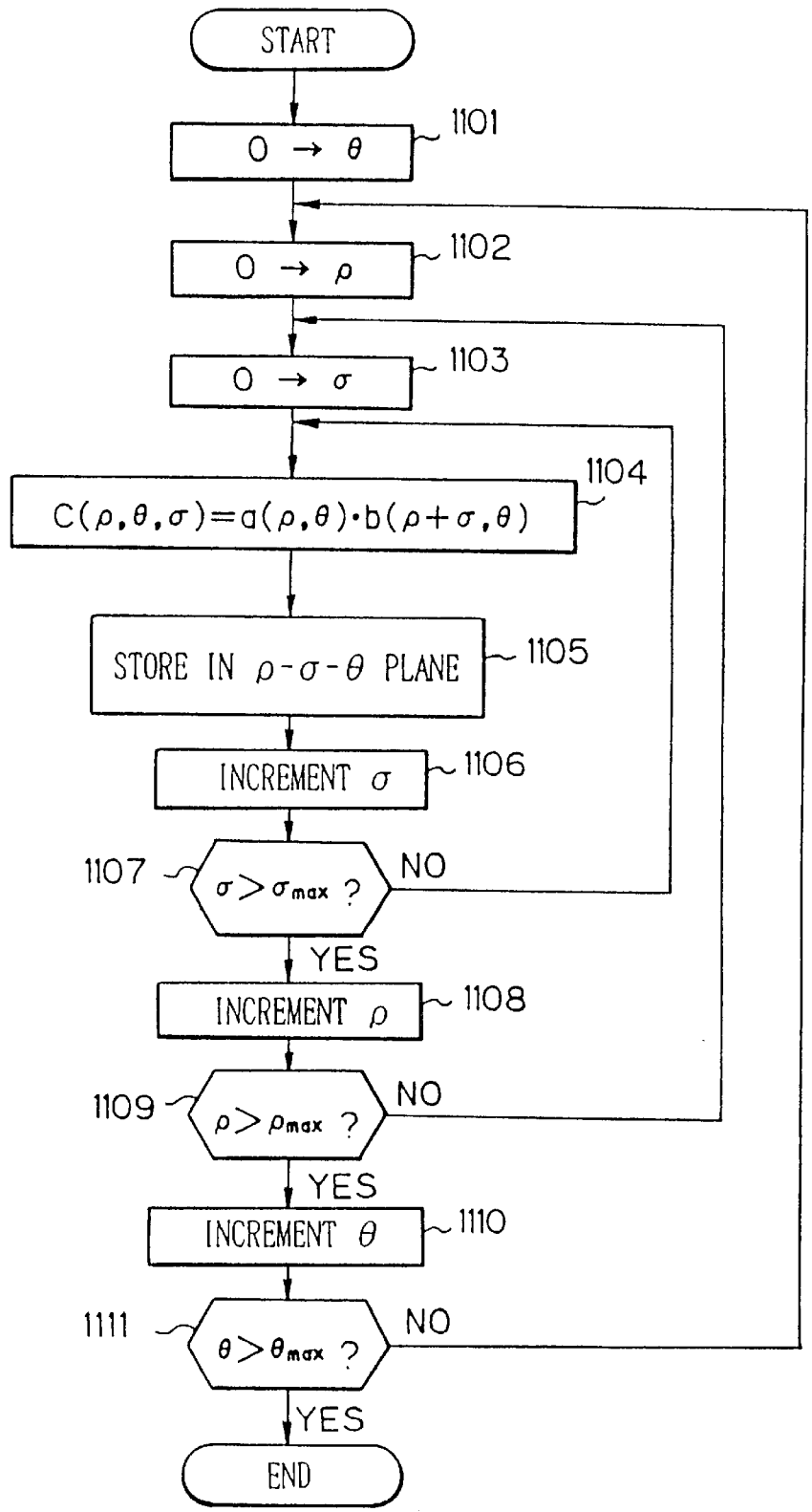
FIG. 71 is a flowchart of correlation processing.

FIG. 71 is a flowchart of the correlation calculation processing. In FIG. 71, for the correlation calculation, initially, parameters are set as 0→θ, 0→ρ, 0→σ (steps 1101~1103). Next, the correlation parameter is calculated according to the equation (101), and the calculated correlation parameter is stored in the correlation parameter storage portion 332 (steps 1104, 1105). Then, σ is incremented, and it is determined whether or not σ>$\sigma_{max}$ (steps 1106, 1107). When it is determined that σ≦$\sigma_{max}$, the operation goes back to step 1104 to repeat the above processing. When it is determined that $\sigma > \sigma_{max}$, $\rho$ is incremented, and it is determined whether or not $\rho > \rho_{max}$ (steps 1108, 1109). When it is determined that $\rho \leq \rho_{max}$, the operation goes back to step 1103 to repeat the above processing. When it is determined that $\rho > \rho_{max}$, $\theta$ is incremented, and it is determined whether or not $\theta > \theta_{max}$ (steps 1110, 1111). When it is determined that $\theta \leq \theta_{max}$, the operation goes back to step 1102 to repeat the above processing. When it is determined that $\theta > \theta_{max}$, the correlation calculation processing is completed.

The polar transformation circuit 315 (as well as the polar transformation circuit 325) is the same as the polar transformation circuit indicated in FIG. 33.

The one-dimensional filter circuit 317 (as well as the one-dimensional filter circuit 327), similar to the one-dimensional filter circuit indicated in FIG. 34, comprises: a reading control portion 17a for reading amplitudes stored in the polar transformation hypercolumn memory 316 from $\rho_{max}$ addresses for a constant $\theta$ (for example, see the hatched portion), and outputting the same; a one-dimensional filter portion 17b for applying one-dimensional filtering processing to each amplitude read as above; and a writing control portion 17c for writing a result of the one-dimensional filtering processing in a storage area in the dual plane (hypercolumn memory) 18. The one-dimensional filter portion 17b has, for example, a FIR-type digital filter construction, and comprises a one-dimensional filter memory 17b-1 and a sum-of-products circuit 17b-2.

3.4.3 Simulation Result

Figure 73A:
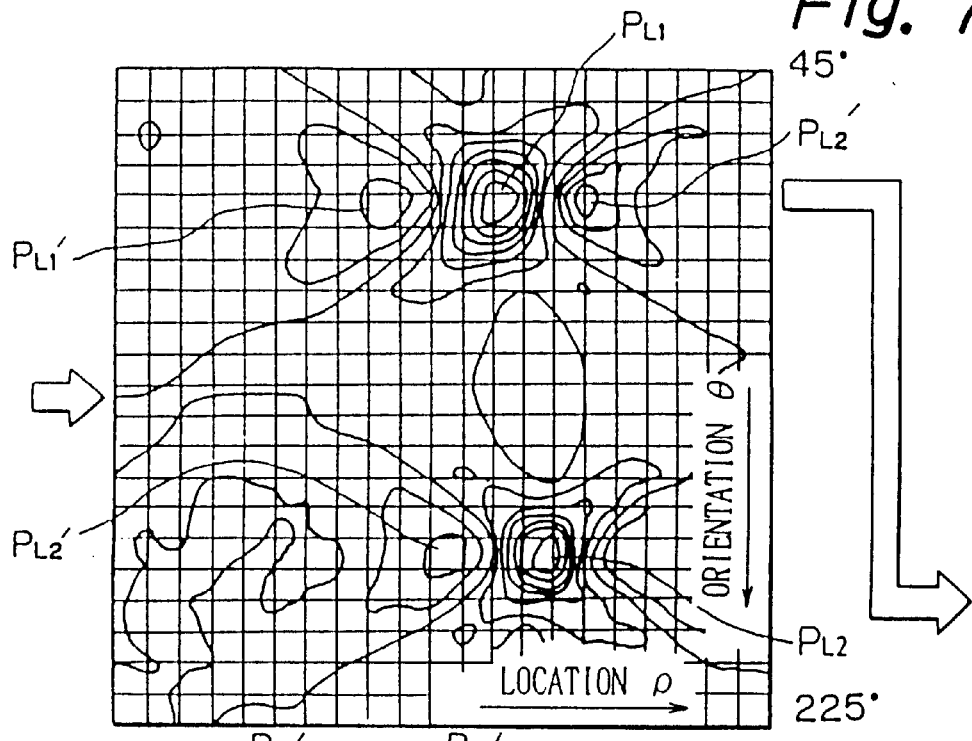
FIGS. 73A and 73B are second diagrams for explaining a result of a simulation.
Figure 73B:
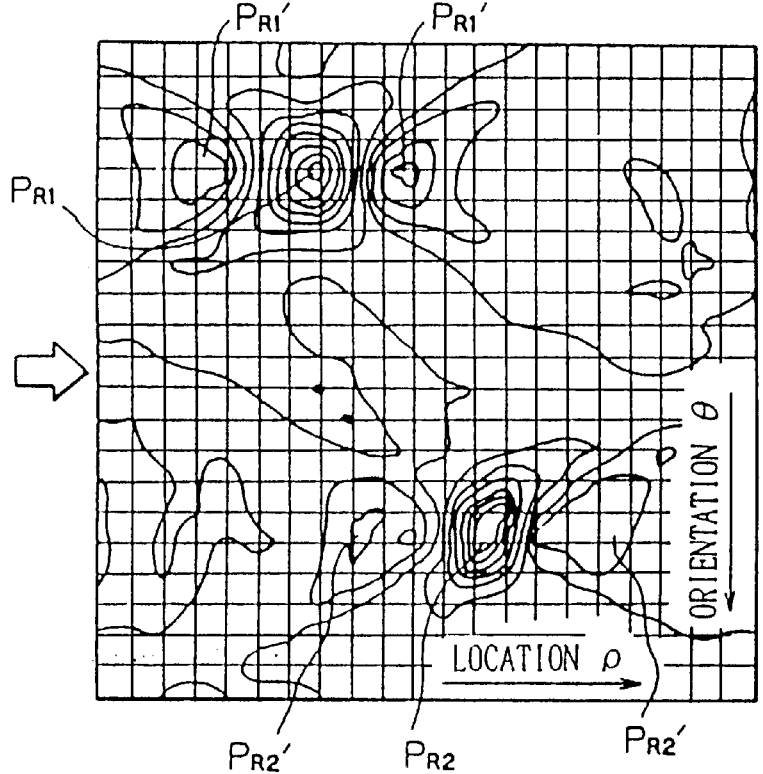
Figure 74:
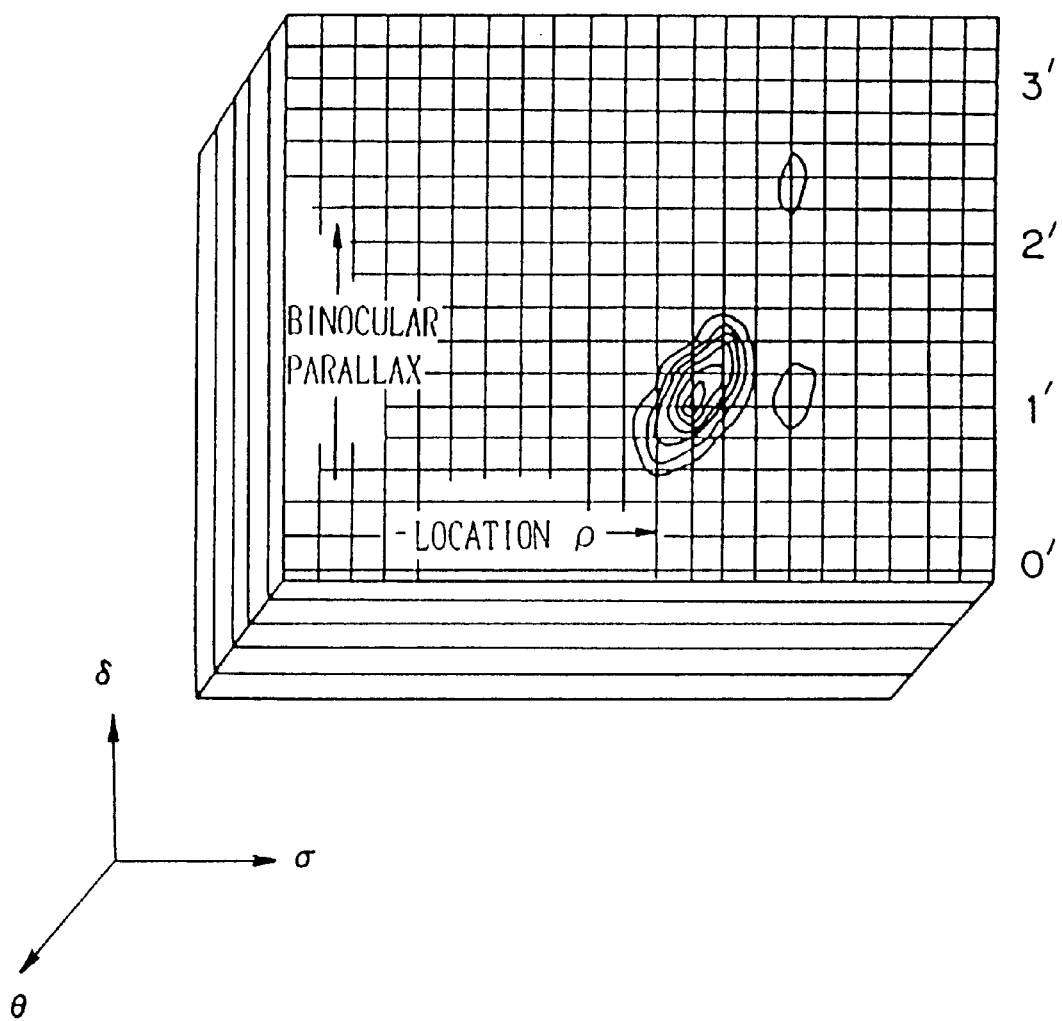
FIG. 74 is a third diagram for explaining a result of a simulation.

FIGS. 72 to 74 are diagrams for explaining a simulation result wherein a one-dimensional Gaussian filter is used as the one-dimensional filter 317, 327 in FIG. 70 for extracting a line. By the polar transformation and the one-dimensional Gaussian filter processing, the "line" in the images $IM_L$ and $IM_R$, is transformed to a "point" in the dual plane which has a location $\rho$ and an orientation $\theta$ of the line as coordinate-axes line.

In FIGS. 72A and 72B, receptive fields seen by the right and left eyes are indicated in the circles $C_L$ and $C_R$, respectively. The image in each circle is an image projected on an eye, and a figure comprised of crossed lines, which is encircled in a rectangular in a scene of an industrial plant, is shot, where intensity of signals of all data is indicted by contour lines.

FIGS. 73A and 73B are diagrams illustrating a hypercolumn image on the $\rho$-$\theta$ dual plane, where the hypercolumn image is obtained by the above-mentioned processing of "polar transformation+one-dimensional Gaussian filter", and two lines constituting the crossed lines are transformed to two points $P_{L1}$, $P_{L2}$; $P_{R1}$, $P_{R2}$ respectively located on the $\rho$-axes at 90° and 180°. These peaks are sharpened by the one-dimensional filtering, and as the secondary effect thereof, are accompanied by negative (opposite to the polarity of the main peak) sub-peaks $P_{L1}'$, $P_{L2}'$; $P_{R1}'$, $P_{R2}'$ on both sides. These peaks are effective to sharpen a processing result of the next correlation.

FIG. 74 is a diagram illustrating a result of the correlation amount (correlation parameter) $C(\rho,\theta,\sigma)$ obtained from dual plane data of the right and left eyes according to the equation (101), where the result is developed on the $\rho$-$\sigma$-$\theta$ plane, the $\rho$-$\sigma$-$\theta$ plane which has the horizontal axis $\rho$ (location), the vertical axis $\sigma$ (binocular parallax), and the depth $\theta$ (orientation), the correlation values are indicated by contour lines, and the $\rho$-$\sigma$ plane of $\theta$=90° is indicated on the top of the $\rho$-$\sigma$-$\theta$ plane for convenience of explanation.

By obtaining $\rho_P, \theta_P, \sigma_P$ where the correlation parameter $C(\rho,\theta,\sigma)$ has a peak (local maximum), correspondence relationship between images of the crossed lines projected onto the right and left eyes is quantitatively obtained, where $\rho_P, \theta_P, \sigma_P$ indicate a location and orientations of lines, and binocular parallaxes, respectively. The parallax obtained from images of the vertical line ($\theta$=90°) of the crossed lines seen by the right and left eyes, is 1°, and the distance to the vertical line is calculated as 360 cm when the space between two eyes is equal to 6 cm. Thus, completion of precise binocular stereopsis is confirmed.

3.4.4 Evaluation

As explained above, according to the basic processing (polar transformation+one-dimensional filtering+one-dimensional correlation processing), the following advantages are obtained.

3.4.4.1 Advantage of Comparison of Characteristic Features of Figure by Tangential Lines It is difficult to find the same figure from the right and left images because the current image processing technique is poor at the processing of "a figure". The processing of obtaining correspondence of figures becomes simplest when the correspondence is obtained for tangential lines constituting contours of the figures, because correspondence of the figures is obtained as correspondence of straight lines.

3.4.4.2 Advantage of One-Dimensional Processing for Two-Dimensional Correspondence of Tangential Lines Conventionally, two-dimensional processing is necessary to determine correspondence between tangential lines in the right and left images. However, by performing polar transformation processing to map onto the dual plane, before the process for correspondence, a group of parallel lines are transformed to a series of points on the $\rho$-axis. Due to the characteristic of the polar transformation, the correspondence between tangential lines is transformed to processing for one-dimensional correlation on the $\rho$-axis, and therefore the amount of processing is remarkably reduced, and the stability of the obtained correspondence is improved 3.4.4.3 Advantage of High-Degree Filtering The high-degree one-dimensional filtering processing, disclosed in the patent, can be performed after polar transformation. As the result of this processing, sure determination of the correspondence by the procedure of: polar transformation→one-dimensional filter→one-dimensional correlation processing, is possible, and thus respective types of correlation parameters can be measured finely. The types and functions of the one-dimensional filtering are as follows.

•Determination of correspondence between edges by odd-function filtering: The edge is the most important characteristic feature of an image. The extraction of an edge (a border of brightness) is possible by the above procedure while the extraction of an edge is difficult by the conventional two-dimensional convolution filter. This is because application of the odd-function filter is possible due to the application of the polar transformation before the odd-function one-dimensional filtering.

•Stable Determination of Correspondence by Multi-Filtering: A plurality of filters with different widths can be applied simultaneously to polar-transformed data (multi-filter). Thereby, the simultaneous extraction of "obscure characteristic features" and "fine characteristic features" in the image, and stable determination of correspondence becomes possible, while these are difficult by the conventional method.

•High-Speed Processing by Skeleton-Type One-Dimensional Filtering: To polar-transformed data, the most efficient skeleton-type one-dimensional filter can be applied. By use of the skeleton-type one-dimensional filter, the above odd-function filter and the multi-filter can be realized with high-speed.

3.5 Extension of Third Aspect of Present Invention

In the above explanations, the principle and the advantages of the correlation filtering are explained for the binocular stereopsis as an example. However, the essence of the third aspect of the present invention is to determine a degree of correlation between images, and there are many applications of the third aspect of the present invention, in addition to the correlation between two eyes, including pursuit of a moving object by correlation between images at different times, texture analysis wherein a degree of appearance of the same design pattern in the same image, and the like. Hereinafter, the extension of the correlation filtering according to the present invention is explained.

3.5.1 Basic Construction

Figure 75:
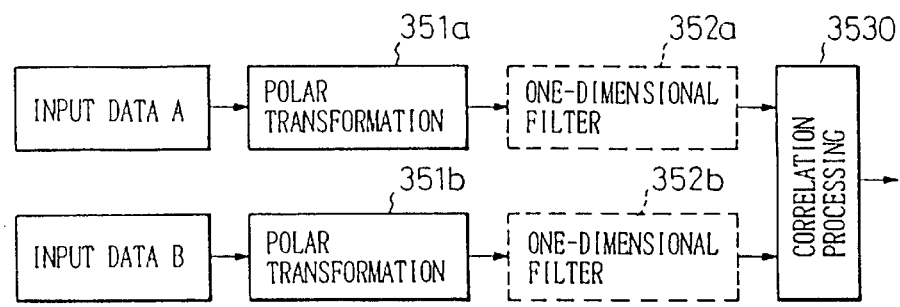
FIG. 75 is a basic block diagram of correlation filtering.

FIG. 75 is a basic block diagram of the correlation filtering, wherein polar transformation processing is applied to input data A and B (351a, 351b), one-dimensional filtering processing is applied to the result of the polar transformation to map the same onto correlation dual planes (351a, 352b), and correlation processing is performed between the mapped data on the respective dual planes (3530).

It is desirable to divide the input data into receptive fields, but the receptive field division is not necessary. The one-dimensional filter processing can be applied as needed, where the types of the filters explained before can be used. In addition, the input data is not limited to the image from the camera, for example, and the input data may be data which is generated by polar transformation is applied to the image from the camera. Further, the input data is not limited to two images, and may be three or more images.

Hereinafter, it is assumed that the receptive field division, and the one-dimensional filter processing, are applied.

3.5.2 Images to be Correlated

As the images which are to be correlated, i.e., as the input data A and B from which the above correlation is obtained in the basic construction, the following types are considered, and the correlation parameters respectively specific to the types of the input data A and B, can be measured.

3.5.2.1 Correlation between Different Images

3.5.2.1.1 Correlation between Spatially Different Images

In the case where input data A and B are spatially different images, for example, images taken by different cameras, and correlation filtering is performed on the input data, correlation parameter of a characteristic feature between spatially different images can be extracted. In particular, the binocular stereopsis and the three-eye three-dimensional view are useful examples.

Figure 76A:
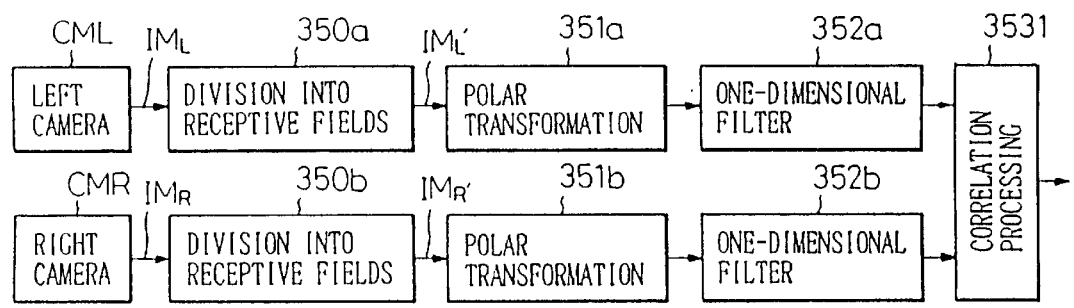
FIGS. 76A and 76B are block diagrams of correlation filtering between spatially different images.
Figure 76B:
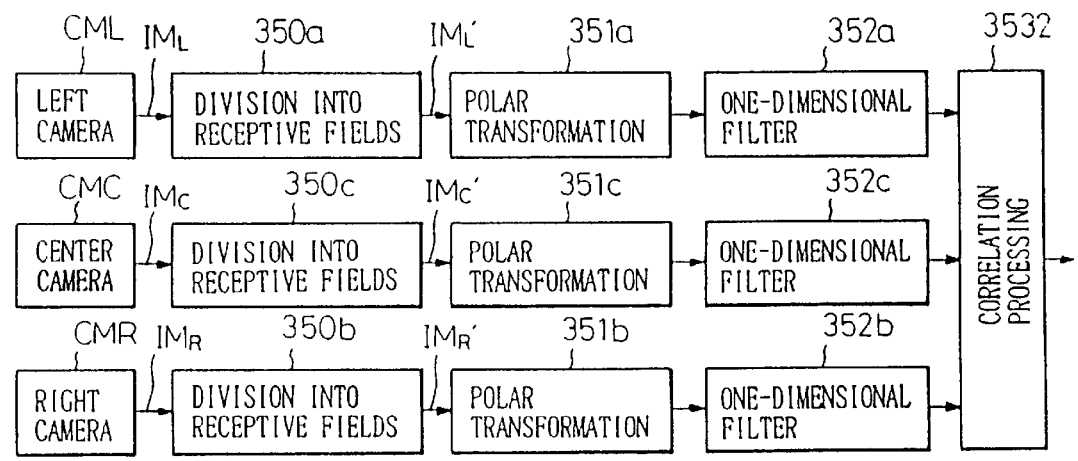

FIGS. 76A and 76B are block diagrams of the correlation filtering between spatially different images. FIG. 76A indicates the case wherein images are input from two cameras, and FIG. 76B indicates the case wherein images are input from three cameras.

• In the case of images input from two cameras (FIG. 76A)

In the case of two cameras, image data $IM_L$ and $IM_R$ of a frame taken by a left camera CML and a right camera CMR are respectively divided into receptive field images (350a, 350b), polar transformation processing is applied to each receptive field image $IM_L{'}$ and $IM_R{'}$ (351a, 351b), one-dimensional filtering processing is applied to the result of the polar transformation to map onto dual planes (352a, 352b), and correlation processing is performed between data mapped onto the respective dual planes (3531). The aforementioned binocular stereopsis corresponds to this operation.

• In the case of images input from three cameras (FIG. 76B)

Since there are two angles when seeing an object by the binocular stereopsis, the correspondence may be erroneously determined. From the point of view of engineering, use of three eyes is also possible. When seeing an object from three angles by three cameras, the possibility of an optical illusion is remarkably reduced. When arranging the three cameras at the apexes of a triangle, the optical illusion can be reduced in all directions. In the case of three cameras, image data $IM_L$, $IM_C$, and $IM_R$ of one frame taken by a left camera CML, a center camera CMC, and a right camera CMR, are respectively divided into receptive field images (350a~350c), polar transformation processing is applied to each receptive field image $IM_L{'}$, $IM_C{'}$, and $IM_R{'}$ (351a~351c), one-dimensional filtering processing is applied to the result of the polar transformation to map onto dual planes (351a~352b), and correlation processing is performed between data mapped onto the respective dual planes (3532). In this case, when data to which the polar transformation and the one-dimensional filtering processing are applied, corresponding to the left camera CML, the center camera CMC, and the right camera CMR, are denoted by $L(\rho,\theta)$, $C(\rho,\theta)$, and $R(\rho,\theta)$, respectively, the correlation amount is given by, for example, $L(\rho+\sigma_L,\theta)$ $C(\rho,\theta)$ $R(\rho+\theta_R,\theta)$, where $\sigma_L$ and $\sigma_R$ each denote a shift amount.

3.5.2.1.2 Correlation between Different Images Regarding Time

The case wherein the input data A and B in the above basic construction are images shot at different times, for example, images taken by a moving camera, and correlation filtering is applied to the input data, is explained below.

Since, according to the above correlation filtering, for example, a movement direction and a movement velocity of a characteristic feature (a corner and a contour line of an object, and the like) in a receptive field can be measured, it is possible to move while capturing the object in the center of the field of view, and this technique can be applied to a moving robot and an unmanned vehicle.

In the first visual field in the cerebrum, cells for detecting a movement direction of a tangential line in a receptive field exist, a signal is sent to a control portion (the superior colliculus) for controlling eyeball movement to capture an object in the center of the field of view, and another signal is sent to a higher order visual field to perform three-dimensional measurement of the movement of a scene projected on the field of view.

FIG. 77 is a block diagram illustrating a construction for the correlation filtering between images at different times. Image data $IM_L$ of one frame taken by a left camera CML is not delayed, while image data $IM_R$ of one frame taken by a right camera CMR is delayed in the delay portion (349), each of the image data $IM_L$ without delay, and the delayed image data $IM_R{'}$, is divided into receptive fields (350a, 350a'), polar transformation is applied to each receptive field image $IM_L$, $IM_R{'}$ (351a, 351a'), one-dimensional filtering processing is applied to the result of the polar transformation to map onto dual planes (352a, 352a'), and correlation processing is performed between data mapped onto the dual planes (3534). Namely, the input image data is divided into delayed image data and non-delayed image data, and these image data are input into the basic construction of FIG. 75, and the correlation parameter regarding time is obtained. The operation of the construction of FIG. 77 operates in the same way as the aforementioned binocular stereopsis except that the delay portion is provided in the construction of FIG. 77.

3.5.2.1.3 Correlation between Different Images Regarding Space and Time

The case wherein correlation filtering is performed on images taken by a plurality of cameras while moving respective cameras, is explained below. When the number of the cameras is equal to two, this correlation filtering is equivalent to correlation filtering combining the binocular stereopsis space correlation filter and the time correlation filter.

FIG. 78 is a block diagram illustrating a construction for correlation filtering, between images which are different regarding time and space. Image data $IM_L$ of one frame taken by a left camera CML is delayed in the delay portion (349a), each of the image data $IM_L$ without delay, and the delayed image data $IM_L'$, is divided into receptive fields (350a, 350a'), polar transformation is applied to each receptive field image $IM_L$, $IM_L'$ (351a, 351a'), and one-dimensional filtering processing is applied to the result of the polar transformation to map onto dual planes (352a, 352a'). Parallel to the above, image data $IM_R$ of one frame taken by a right camera CMR is delayed in the delay portion (349b), each of the image data $IM_R$ without delay, and the delayed image data $IM_R'$, is divided into receptive fields (350b, 350b'), polar transformation is applied to each receptive field image $IM_R$, $IM_R'$ (351b, 351b'), and one-dimensional filtering processing is applied to the result of the polar transformation to map onto dual planes (352b, 35b'). Then, correlation processing is performed between data mapped onto the respective dual planes (3535).

When an object is pursued by extracting a parallax by the binocular stereopsis according to the correlation filtering between images different in time and space, complex functions as realized in the human body become possible. Although the existence of the filtering function wherein the time and space are fused, is known in psychology as "Spatiotemporal filter", according to the technique explained in this item, the above function is realized in the field of engineering.

Although correlation filtering between different images is explained above, correlation within the same image is also effective.

Figure 79:
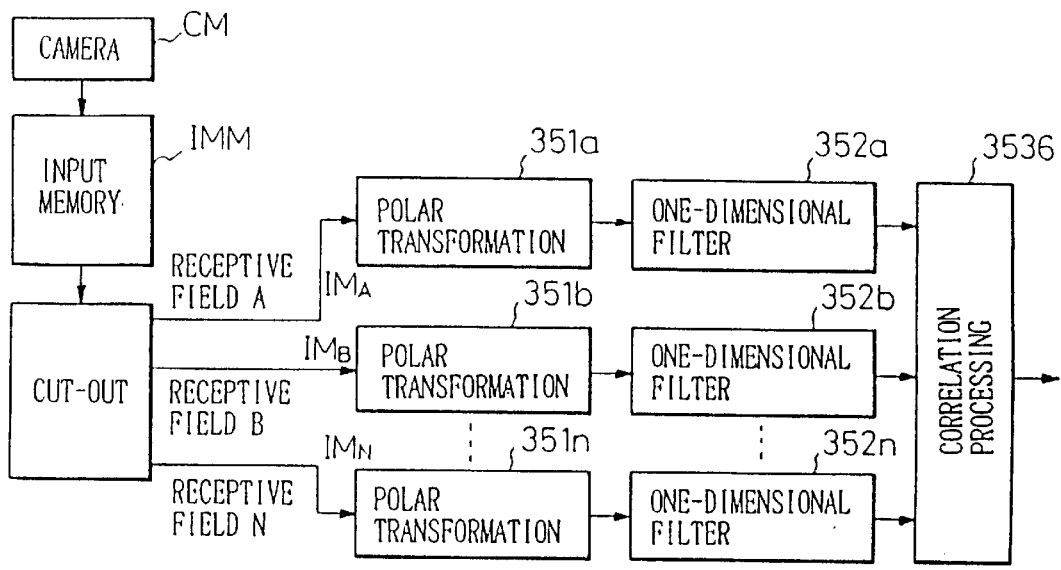
FIG. 79 is a block diagram illustrating the correlation filtering between receptive fields in the same image.

3.5.2.2 Correlation between Same Images
3.5.2.2.1 Correlation between Receptive Fields FIG. 79 is a block diagram illustrating a construction for correlation between respective receptive fields within the same image. An image of one frame taken by camera CM is stored in the input memory IMM, is cut out into receptive field images $IM_A$, $IM_B$, $IM_N$ corresponding to receptive fields A, B, . . . , N by the control portion (348), polar transformation is applied to each receptive field image $IM_A$, $IM_B$, . . . $IM_N$ (351a~351n), one-dimensional filtering processing is applied to the result of the polar transformation to map onto dual planes (352a~352n), and correlation processing is performed between data mapped onto the respective dual planes (3536).

In the case of the correlation between respective receptive fields within the same image, a characteristic feature in a receptive field image $IM_A$ can be compared precisely with characteristic features in receptive fields images $IM_B$, . . . $IM_N$, and texture analysis becomes possible. The processing of the above correlation is the same as the binocular stereopsis, wherein right and left eyes are replaced with the receptive fields, and is performed in the same way as the aforementioned simulation.

3.5.2.2.2 Correlation within Receptive Field

Figure 80:
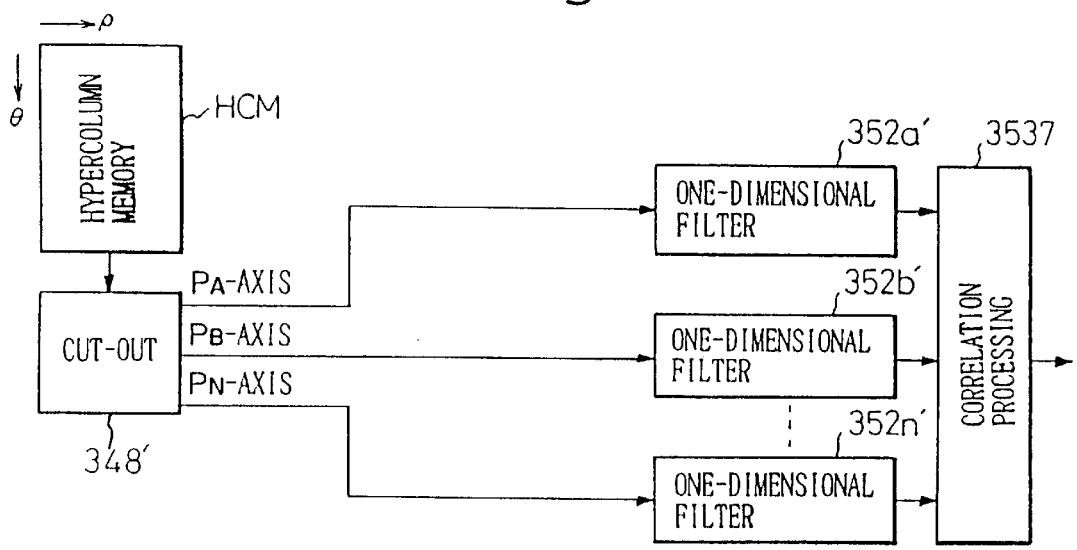
FIG. 80 is a block diagram illustrating the correlation filtering in the same receptive field in the same image.

Although correlation between receptive fields is explained as above, correlation within the same receptive field in the same image is possible. FIG. 80 is a block diagram illustrating a construction for correlation filtering within the same receptive field in the same image, which is the correlation filtering between the ρ-axes.

A receptive field image is polar-transformed, and the polar-transformed receptive field image is stored in the ρ-θ dual plane (hypercolumn memory) HCM. Then, the polar-transformed receptive field image is cut out by the cut-out control portion for each of ρ-axes of different orientations (348'), one-dimensional filtering processing is applied to respective outputs of the cut-out control portion to map onto dual planes, respectively (352a'~352n'), and correlation processing is performed between data mapped onto the respective dual planes (3537).

According to the correlation filter of this embodiment, further fine texture analysis within a receptive field becomes possible, a simulation of the binocular stereopsis can be performed in the same way as the binocular stereopsis for the same reason as the case of 3.5.2.2.1. Instead of the correlation between the ρ-axes as above, correlation between the θ-axes is also possible in the same way, and further correlation on the (ρ,θ) plane is effective as two-dimensional correlation.

3.5.2.3 Correlation between Different Color Images

Although the correlation filtering of intensity signals such as brightness and the like of an input image are explained as above, further fine correlation filtering by detecting a delicate shade of a color becomes possible when performing correlation filtering of FIG. 75 by inputting color information as input data. Although various types of color information which are processed can be input according to problems to be solved, the basic color information is as follows.

3.5.2.3.1 Correlation in Three Primary Colors

The most basic color correlation is correlation in the three primary colors. FIG. 81 is a block diagram illustrating a construction for color correlation filtering between different images in the three primary colors. A color image of one frame taken by a left camera CML is separated through red, blue, and green filters (RFL, BFL, and GFL) into red, blue, and green images, and then, the red, blue, and green images are respectively divided into red, blue, and green receptive field images $IM_R$, $IM_B$, and $IM_G$ (360a~360c), polar transformation is applied to each receptive field image $IM_R$, $IM_B$, and $IM_G$ (361a~361c), and one-dimensional filtering processing is applied to the result of the polar transformation to map onto dual planes (362a~362c). Similarly, although not shown, a color image of one frame taken by a right camera is separated through red, blue, and green filters into red, blue, and green images and then, the red, blue, and green images are respectively divided into red, blue, and green receptive field images $IM_R$, $IM_B$, and $IM_G$, polar transformation is applied to each receptive field image $IM_R$, $IM_B$, and $IM_G$, and one-dimensional filtering processing is applied to the result of the polar transformation to map onto dual planes. The, red correlation processing, blue correlation processing, and green correlation processing are performed between red data mapped onto the dual planes, between blue data mapped onto the dual planes, and between green data mapped onto the dual planes, respectively (363a~363c).

By the above color correlation filtering, correlation parameters for the three primary colors can be performed.

3.5.2.3.2 Correlation in Three Elements (Luminosity, Chroma, and Hue) of color.

In another basic color correlation, the physical three primary colors are transformed to brightness, chroma, and hue, which are amounts subjectively seen by human beings, and then correlation filtering is performed. According to this filter, color correlation parameters, which are psychologically arranged, can be measured.

FIG. 82 is a block diagram illustrating a construction for color correlation filtering between different images in the three elements. A color image of one frame taken by a left camera CML is separated through red, blue, and green filters into red, blue, and green images, and then, the color information by the three primary colors are transformed to the three elements comprised of brightness $IM_Y$, chroma $IM_S$, and hue $IM_H$ (359), the brightness, chroma, and hue images are respectively divided into brightness, chroma, and hue receptive field images $IM_Y'$, $IM_S'$, $IM_H'$ (360a'~360c'), polar transformation is applied to each receptive field image $IM_Y'$, $IM_S'$, and $IM_H'$ (361a'~361c'), and one-dimensional filtering processing is applied to the result of the polar transformation to map onto dual planes (361a'~362c'). Similarly, although not shown, a color image of one frame taken by a right camera is separated through red, blue, and green filters into red, blue, and green images, and then, the color information by the three primary colors is transformed to the three elements comprised of brightness, chroma, and hue. The brightness, chroma, and hue images are respectively divided into brightness, chroma, and hue receptive field images, polar transformation is applied to each receptive field image, and one-dimensional filtering processing is applied to the result of the polar transformation to map onto dual planes. Then, brightness correlation processing, chroma correlation processing, and hue correlation processing are performed between brightness data mapped onto the dual planes, between chroma data mapped onto the dual planes, and between hue data mapped onto the dual planes, respectively (363a'~363c').

3.5.2.3.3 Correlation in Color Difference Signals

For precisely measuring correlation parameters of a border portion of colors, such as a color at a transition stage of red and green, it is effective to apply correlation processing to color difference signals. In particular, it is effective to use difference signals between the three primary colors using complementary colors, instead of the three primary colors.

FIG. 83 is a block diagram illustrating a construction for color correlation filtering between different images in the color difference signals. A color image of one frame taken by a left camera CML is separated through red, blue, and green filters into red, blue, and green images, and then, difference signals between red and green, green and blue, and blue and red are calculated (358a~358c), the images of the difference signals are respective difference signals $IM_{R-G}$, $IM_{G-B}$, $IM_{B-R}$, polar transformation is applied to each receptive field image $IM_{R-G}$, $IM_{G-B}$, $IM_{B-R}$ (361a"~361c"), and one-dimensional filtering processing is applied to the result of the polar transformation to map onto dual planes (361a"~362c"). Similarly, although not shown, a color image of one frame taken by a right camera is separated through red, blue, and green filters into red, blue, and green images, and then, difference signals between red and green, green and blue, and blue and red are calculated, the images of the difference signals are respectively divided into receptive field images of the respective difference signals, polar transformation is applied to each receptive field image, and one-dimensional filtering processing is applied to the result of the polar transformation to map onto dual planes. Then, red-green correlation processing, green-blue correlation processing, and blue-red correlation processing are performed between red-green difference data mapped onto the dual planes, between green-blue difference data mapped onto the dual planes, and between blue-red difference data mapped onto the dual planes, respectively.

Alternatively, instead of the difference, division or difference after transformation to a logarithm, is also effective. In addition, the difference or division may be performed after the polar transformation or the one-dimensional filter. The division is effective when the intensities of three primary colors greatly vary, and the difference after transformation to a logarithm is effective to emphasize color difference in the dark portion.

Although the color correlation between different images is explained above, the color correlation method can be combined with each type correlation method explained in the above sub-sections 3.5.2.1 and 3.5.2.2, and the correlation filtering such as the binocular stereopsis, the grazing of a moving object, texture analysis, and the like, can be further surely performed.

3.5.3 Operating Direction of Correlation

Although, in the example of the binocular stereopsis (see FIG. 70), correlation is performed from the data in the $\rho$-direction, where the orientation $\theta$ in the dual plane is the same, the correlation is not necessarily limited to the $\rho$-axis, and the following generalization within the $\rho$-axis is possible.

3.5.3.1 Correlation in $\rho$-Axis Direction 3.5.3.1.1 $\rho$-Axis Correlation of Same $\theta$ This is the case of the above binocular stereopsis and the like. The meaning of the "$\rho$-axis correlation of the same $\theta$" is, as explained with reference to FIG. 69, to precisely measure the offset between the parallel lines in both images by the correlation method. FIG. 84 is a block diagram illustrating a construction for the $\rho$-axis correlation filtering for the same $\theta$. Each of input data A and B is divided into receptive field images (350a, 350b), polar transformation processing is applied to each receptive field image (351a, 351b), one-dimensional filtering processing is applied to the result of the polar transformation to map onto dual planes (351a, 352b), data in the $\rho$-direction is selected for each of $\theta_0, \theta_1, \ldots$ from each dual plane (354$a_0$, 354$a_1$, $\ldots$ ; 354$b_0$, 354$b_1$, $\ldots$ ), and correlation is performed between data of the same $\theta$ value (353$_0$, 353$_1$, $\ldots$ ). Although FIG. 84 indicates the construction wherein the correlation calculations for the respective $\theta$ values are performed in parallel, the correlation calculations for the respective $\theta$ values may be performed in turn by one correlation calculation portion. In the latter case, the construction is the same as the block diagram of FIG. 76A.

3.5.3.1.2 $\rho$-Axis Correlation for Different $\theta$'s

In this correlation, a correlation parameter between tangential lines each having a different orientation is measured. By this correlation, extraction of a moving tangential line the orientation of which varies during the movement is possible, in addition to the correlation between parallel lines in 3.5.3.1.1. This correlation is expected to be applied to cars running on a bad road. FIG. 85 is a block diagram illustrating the construction for the $\rho$-axis correlation filtering between different $\theta$'s.

Each of input data A and B is divided into receptive field images (350a, 350b), polar transformation processing is applied to each receptive field image (351a, 351b), one-dimensional filtering processing is applied to the result of the polar transformation to map onto dual planes (352a, 352b), data in the $\rho$-direction is selected for each of $\theta_i$, $\theta_{i+1}, \ldots$ ; $\theta_j$, $\theta_{j+1}, \ldots$ from each dual plane (354$a_0'$, 354$a_1', \ldots$ ; 354$b_0'$, 354$b_1', \ldots$ ), and correlation is performed between data of the different $\theta$ values (353$_0'$, 353$_1', \ldots$ ). The correlation can be performed, for example, between $\theta_i$ and $\theta_{i+1}$, $\theta_{i-1}$ and $\theta_i$ (adjacent angles).

3.5.3.2 Correlation in $\theta$-Direction

The meaning of the correlation parameter in the ρ-direction for the same ρ is explained with reference to FIGS. 86A, 86B, 86C and 86D. In the θ correlation for ρ=0 (FIGS. 86A and 86B), a rotation amount of a tangential line SL passing through a center C of a receptive field is extracted. In the θ correlation for ρ≠0, a rotation amount of a tangential line SL contacting a circle CIR of a radius ρ and having the center of the circle at the center of the receptive field, can be detected (FIGS. 86C and 86D).

FIG. 87 is a block diagram illustrating a construction for the θ-axis correlation filtering for the same ρ. Each of input data A and B is divided into receptive field images (350a, 350b), polar transformation processing is applied to each receptive field image (351a, 351b), one-dimensional filtering processing is applied to the result of the polar transformation to map onto dual planes (351a, 352b), data in the θ-direction is selected for each of $\rho_0, \rho_1, \ldots$ from each dual plane (355a₀, 355a₁, ...; 355b₀, 355b₁ ...), and correlation is performed between data of the same θ value ($353_0$", $353_1$" ...). Although FIG. 87 indicates the construction wherein the correlation calculation for the respective ρ values is performed in parallel, the correlation calculation for the respective ρ values may be performed in turn by one correlation calculation portion.

3.5.3.3 Correlation on (ρ,θ) Plane

Although one-dimensional correlation on the ρ-axis or θ-axis is explained, two-dimensional correlation on the (ρ,θ) plane is also possible. According to this correlation, precise correlation of a tangential line moving while varying their orientations is possible.

Figure 88:
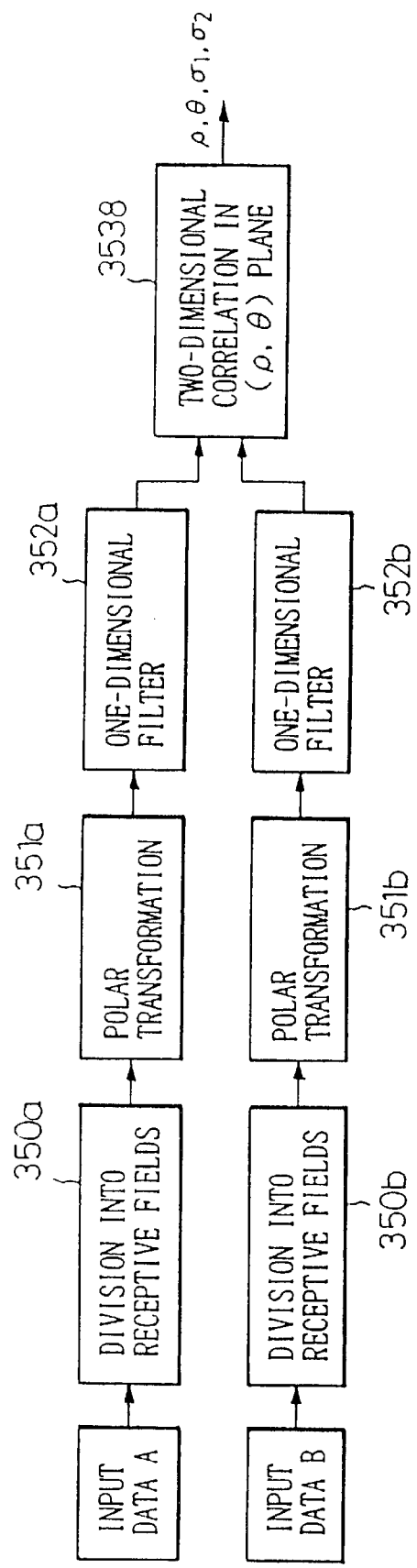
FIG. 88 is a block diagram of correlation filtering in the ρ-θ plane.

FIG. 88 is a block diagram illustrating a construction for the correlation filtering on the (ρ,θ) plane. Each of input data A and B is divided into receptive field images (350a, 350b), polar transformation processing is applied to each receptive field image (351a, 351b), one-dimensional filtering processing is applied to the result of the polar transformation to map onto dual planes (352a, 352b), and correlation processing for two-dimensional shift amount ($\sigma_1, \sigma_2$) is performed on each dual plane (3538). When data on each dual plane is denoted by $a(\rho,\theta)$ and $b(\rho,\theta)$, and shift amounts on the dual planes in the ρ-direction and the θ-direction are denoted by $\sigma_1, \sigma_2$, correlation amount $C(\rho,\theta,\sigma_1,\sigma_2)$ is expressed by the following equation.

$$C(\rho, \theta, \sigma_1, \sigma_2) = a(\rho,\theta) \cdot b(\rho+\sigma_1, \theta+\sigma_2) \quad (102)$$

3.5.4 Correlation Parameter

Although, to simplify the explanation, in the examples of the binocular stereopsis, the method for obtaining corresponding tangential lines based on the correlation amount (correlation parameter) according to the equation (101) is explained, various types of correlation parameters can be defined as explained below, and correlation processing characteristic to the respective types of correlation parameters can be performed.

3.5.4.1 Basic Correlation Parameter

Figure 89:
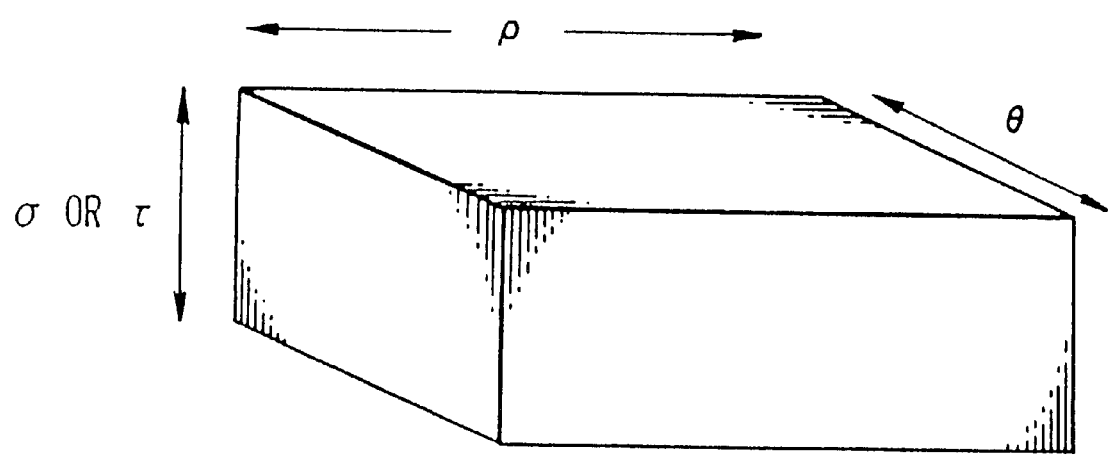
FIG. 89 is a diagram for explaining the correlation parameter space.

As indicated below, generally, the basic correlation parameter can be expressed by three-dimensional representation such as $C(\rho,\theta,\sigma)$, and three-dimensional space of ρ, θ, and σ is as indicated in FIG. 89. In FIG. 89, τ denotes a shift amount (movement velocity) between data, which is introduced in the correlation between images at different times, and is explained later. When a point $(\rho_P, \theta_P, \sigma_P)$ in the three-dimensional space, wherein the correlation parameter $C(\rho,\theta,\sigma)$ is a local maximum, is obtained, determination of correspondence in the binocular stereopsis, determination of correspondence of a pair of moving tangential lines, and the like, are performed. In addition, locations, orientations, parallaxes, and velocities of the respective tangential lines can be measured based on the respective coordinate values (values of the element parameters) which give the local maximum. In the two-dimensional correlation on the (ρ,θ) plane, correlation parameter is a parameter $C(\rho,\theta,\sigma_1,\sigma_2)$ in the four-dimensional space.

3.5.4.1.1 Spatial Correlation Parameter

In the case where images on which the correlation is performed, are spatially different images or spatially different receptive fields (as the cases explained in the sub-sections 3.5.2.1.1 and 3.5.2.2), a correlation amount indicating a degree of correspondence such as a parallax of corresponding tangential lines, can be measured based on a local maximum of a correlation parameter as explained below.

(1) Correlation Parameter $C(\rho,\theta,\sigma)$ in the ρ Direction

The correlation parameter $C(\rho,\theta,\sigma)$ in the ρ direction is a parameter indicating a degree of spatial correlation of a group of parallel lines. The correlation parameter in the aforementioned binocular stereopsis is an example. When $\rho_P, \theta_P$, and $\sigma_P$ where $C(\rho,\theta,\sigma)$ is a local maximum, are obtained, a tangential line is determined from a group of parallel lines, the location, orientation, and binocular parallax of the tangential line are quantitatively measured. When data on each dual plane is denoted by $a(\rho,\theta)$ and $b(\rho,\theta)$, and a shift amount on the dual planes in the ρ-direction is denoted by σ, two-dimensional correlation parameter $C(\rho,\theta,\sigma_1,\sigma_2)$ is expressed by the following equation.

$$C(\rho,\theta,\sigma) = a(\rho,\theta) \cdot b(\rho+\sigma,\theta)$$

(2) Correlation Parameter $C\theta(\rho,\theta,\sigma)$ in θ Direction

The correlation parameter $C\theta(\rho,\theta,\sigma)$ in the θ direction is a parameter indicating a degree of spatial correlation of a group of tangential lines contacting a circle CIR of a radius ρ and having the center of the circle at the center of the receptive field. In the θ correlation processing for ρ=0, corresponding tangential lines are determined among a group of the radial lines based on $\rho_P, \theta_P$, and $\sigma_P$ which make $C\theta(\rho,\theta,\sigma)$ a local maximum, and the location, orientation, and variation amount of the orientation of the tangential line are quantitatively measured. When a shift amount in the θ-direction is denoted by σ, the correlation parameter is expressed by the following equation.

$$C\theta(\rho,\theta,\sigma) = a(\rho,\theta) \cdot b(\rho,\theta+\sigma) \quad (103)$$

(3) Correlation Parameter $C(\rho,\theta,\sigma_1,\sigma_2)$ in (ρ,θ) Plane

The two-dimensional correlation parameter $C(\rho,\theta,\sigma_1,\sigma_2)$ in the (ρ,θ) plane is a parameter indicating a degree of spatial correlation of a group of tangential lines moving while varying their orientations, and thereby the degree of the two-dimensional correlation in the dual planes can be evaluated in more detail compared with the above one-dimensional correlation parameter. The correlation parameter is given by the equation (102), i.e., by the following equation.

$$C(\rho,\theta,\sigma_1,\sigma_2) = a(\rho,\theta) \cdot b(\rho+\sigma_1,\theta+\sigma_2)$$

3.5.4.1.2 Time Correlation Parameter

In the case images on which the correlation is performed, are images at different times or receptive fields at different times (as the case explained in the sub-section 3.5.2.1.2), a moving direction and a movement velocity of a moving tangential line can be measured based on a local maximum of a correlation parameter.

(1) Correlation Parameter $C(\rho,\theta,\tau)$ in $\rho$-Direction

The correlation parameter $C(\rho,\theta,\tau)$ in the $\rho$-direction is a parameter indicating a degree of correlation of a group of parallel lines regarding time. The correlation parameter in the embodiment explained later, i.e., in the case of pursuing a moving tangential line, is an example of this case. Based on $\rho_P$, $\theta_P$, and $\tau_P$ which make $C(\rho,\theta,\tau)$ a local maximum, a location, an orientation, and a velocity of a translating tangential line can be measured quantitatively. When the translating velocity in the $\rho$-direction is denoted by $\tau$, the correlation parameter is expressed by the following equation $$C(\rho,\theta,\tau)=a(\rho,\theta)\cdot b(\rho+\tau,\theta). \qquad (104)$$

When defining as $a(\rho,\theta)=a_t(\rho,\theta)$, $b(\rho+\tau,\theta)=a_{t+DELTA}(\rho+\tau,\theta)$, the correlation parameter is given by the following equation.

$$C(\rho,\theta,\tau)=a_t(\rho,\theta)\cdot a_{t+DELTA}(\rho+\tau,\theta) \qquad (104)'$$

Namely, in 3534 of FIG. 77, correlation processing of the equation (104)' is performed.

When DELTA in 349 of FIG. 77 denotes the delay time, V denotes a translating velocity of a tangential line, $\Delta\rho$ denotes a resolution in the $\rho$ direction, and $\tau_P$ is a value of $\tau$ at which $C(\rho,\theta,\tau)$ becomes a local maximum, the translating velocity V is obtained by $$V=(\tau_P\cdot\Delta\rho)/DELTA.$$

The above operation corresponds to a modeled function of the "directional selective simple cell" in the visual field of the cerebrum. The directional selective simple cell has a characteristic of responding to a stimulus moving in a specific direction, but not responding to a stimulus moving in the opposite direction. This function is realized by limiting the range of $\tau$ in the above equation to positive or negative. This characteristic is a reflection of the limitation that the organic nerve cannot transmit positive and negative information simultaneously. Precisely, the above directional selective simple cell is the B-type directional selective cell, which is a kind of the simple cell, and has a response independent of brightness/darkness of a stimulus.

The above time correlation parameter can be calculated according to the following equation (104)'', instead of the equation (104).

$$C(\rho,\theta,\tau)=a(\rho-\tau,\theta)\cdot b(\rho+\tau,\theta) \qquad (104)''$$

Hereinafter, it is assumed that the asymmetric-type correlation calculation is performed according to the equation (104).

(2) Correlation Parameter $C\theta(\rho,\theta,\tau)$ in $\theta$-Direction

The correlation parameter $C\theta(\rho,\theta,\tau)$ in the $\theta$-direction is a parameter indicating a degree of time correlation of a group of tangential lines contacting a circle of a radius $\rho$ and having the center of the circle at the center of the receptive field. In the $\theta$ correlation processing for $\rho=0$, corresponding tangential lines are determined among a group of the radial lines based on $\rho_P$, $\theta_P$, and $\sigma_P$ which make $C\theta(\rho,\theta,\sigma)$ a local maximum, and the location, orientation, and rotation velocity of the orientation of the tangential line are quantitatively measured. When a movement velocity in the $\theta$-direction is denoted by $\tau$, the correlation parameter is expressed by the following equation.

$$C\theta(\rho,\theta,\tau)=a(\rho,\theta)\cdot b(\rho,\theta+\tau) \qquad (105)$$

When defining as $a(\rho,\theta)=a_t(\rho,\theta)$, and $B(\rho,\theta+\tau)=a_{t+DELTA}(\rho,\theta+\tau)$, the correlation parameter is given by the following equation.

$$C\theta(\rho,\theta,\tau)=a_t(\rho,\theta)\cdot a_{t+DELTA}(\rho,\theta+\tau) \qquad (105)'$$

Namely, in 3534 of FIG. 77, correlation processing according to the equation (105)' is performed.

When the delay time is denoted by DELTA, and $\tau_P$ is a value of $\tau$ at which $C\theta(\rho,\theta,\tau)$ becomes a local maximum, the rotation velocity $\omega$ is obtained as $$\omega=(\tau_P\cdot\Delta\rho)/DELTA.$$

In the visual cortex of the cerebrum, there are cells for detecting the rotation, and the above operation corresponds to a modeled function of the cells.

(3) Correlation Parameter $C(\rho,\theta,\tau_1,\tau_2)$ in $(\rho,\theta)$ Plane The two-dimensional correlation parameter $C(\rho,\theta,\tau_1,\tau_2)$ in the $(\rho,\theta)$ plane is a parameter indicating a degree of time correlation of a group of tangential lines moving while varying their orientations. Based on $\rho_P$, $\theta_P$, $\tau_{1P}$, $\tau_{2P}$ which make $C(\rho,\theta,\tau_1,\tau_2)$ a local maximum, a location, an orientation, a movement velocity, and a rotation velocity of the tangential line passing through a center of a receptive field, can be measured in more detail compared with the one-dimensional correlation parameter. The correlation parameter is given by the following equation.

$$C(\rho,\theta,\tau_1,\tau_2)=a(\rho,\theta)\cdot b(\rho+\tau_1,\theta+\tau_2) \qquad (106)$$

Namely, in 3534 of FIG. 77, the correlation processing according to the equation (106) is performed. When defining $a(\rho,\theta)=a_t(\rho,\theta)$ and $b(\rho+\tau_1,\theta+\tau_2)=a_{t+DELTA}(\rho+\tau_1,\theta+\tau_2)$, the correlation parameter is given by the following equation.

$$C(\rho,\theta,\tau_1,\tau_2)=a_t(\rho,\theta)\cdot a_{t+DELTA}(\rho+\tau_1,\theta+\tau_2) \qquad (106)'$$

Namely, in 3534 of FIG. 77, the correlation processing according to the equation (106)' is performed. When the delay time is denoted by DELTA in 349 of FIG. 77 and $\tau_{1P}$ and $\tau_{2P}$ are values of $\tau_1$ and $\tau_2$, respectively, at which $C(\rho,\theta,\tau_1,\tau_2)$ becomes a local maximum, the translation velocity V and the rotation velocity $\omega$ are obtained as $$V=(\tau_{1P}\cdot\Delta\rho)/DELTA,$$

and $$\omega=(\tau_{2P}\cdot\Delta\rho)/DELTA.$$

3.5.4.2 Projection of Basic Correlation Parameter

Although, by the above basic correlation parameters, all the correlation parameters including a location ($\rho_P$), an orientation ($\theta_P$), and binocular parallax ($\sigma_P$) or movement velocity ($\tau_P$) of a tangential line, can be determined, the dimensions of a storage portion for storing correlation parameter is required to be three or four.

Hereinafter, definitions and characteristics of correlation parameters for reducing the capacity of the correlation parameter storage portion by suppressing the number of parameters for correlation decision as needed, are explained below.

Although the explanation is given for spatial correlation parameter $C(\rho,\theta,\sigma)$ and time correlation parameter $C(\rho,\theta,\tau)$, two-dimensional correlation parameters $C(\rho,\theta,\sigma_1,\sigma_2)$ and $C(\rho,\theta,\tau_1,\tau_2)$ on the $(\rho,\theta)$ plane can also be defined, and correlation measurement in more detail than the one-dimensional correlation parameter is possible.

3.5.4.2.1 Projection in $\sigma$ or $\tau$ Direction

In the case where the location $\rho$ and the orientation $\theta$ of corresponding tangential lines are important, and the direct measurement of the binocular parallax $\sigma$ or movement velocity $\tau$ is not required, the amount $C_{PRJ}\text{-}\sigma(\rho,\theta)$ or $C_{PRJ\text{-}}$ τ(ρ,θ) generated by accumulating the basic correlation parameter C(ρ,θ,σ) or C(ρ,θ,τ) in the σ- or τ-direction, and expressed by the following equation is effective, and thereby the correlation parameter storage portion is reduced to a two-dimensional memory of the same as the dimensions of the input dual plane.

$$C_{PRJ-\sigma}(\rho, \theta) = \sum_{\sigma} C(\rho, \theta, \sigma) \text{ (where } \sigma = 0, 1, 2, \ldots \sigma_{max}) \quad (107)$$

$$C_{PRJ-\tau}(\rho, \theta) = \sum_{\tau} C(\rho, \theta, \tau) \text{ (where } \tau = 0, 1, 2, \ldots \tau_{max}) \quad (108)$$

Figure 90:
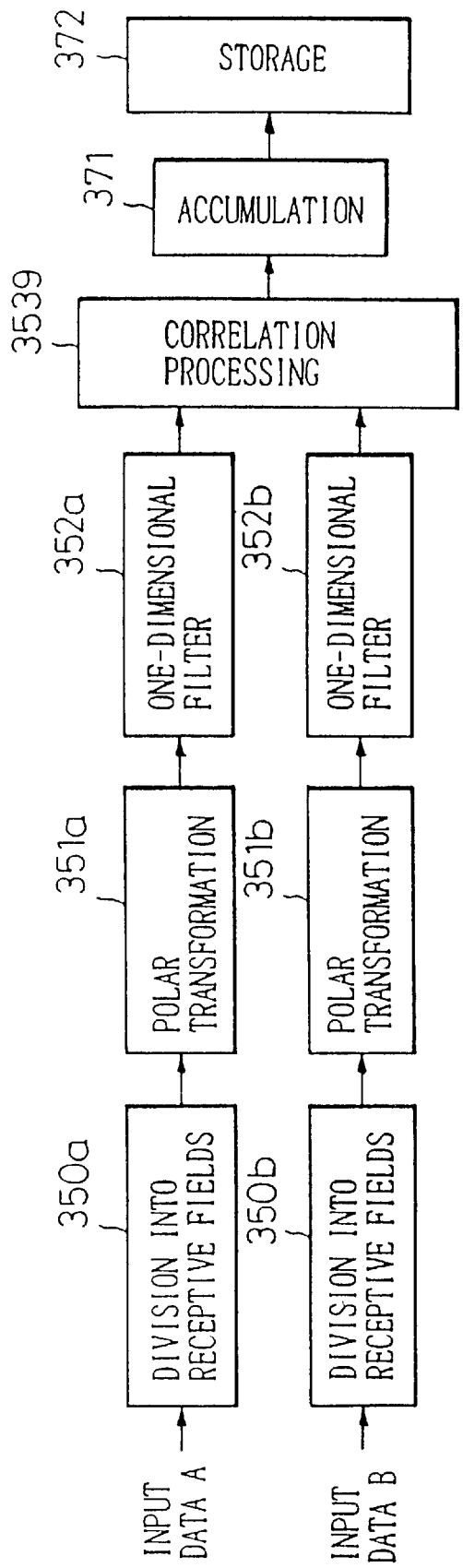
FIG. 90 is a block diagram illustrating a total filter processing wherein a correlation parameter is projected.

FIG. 90 is a block diagram illustrating a construction for the filtering process wherein the basic correlation parameter C(ρ,θ,σ) is projected in accordance with the equation (107). Each of input data A and B is divided into receptive field images (350a, 350b), polar transformation processing is applied to each receptive field image (351a, 351b), one-dimensional filtering processing is applied to the result of the polar transformation to map onto dual planes (352a, 352b), correlation processing is performed on data in the respective dual planes according to the equation (101) (3539), correlation parameter C(ρ,θ,σ) obtained by correlation processing is accumulated according to the equation (107) (371), and the accumulated result is stored in the ρ–θ correlation parameter memory (372).

Figure 91:
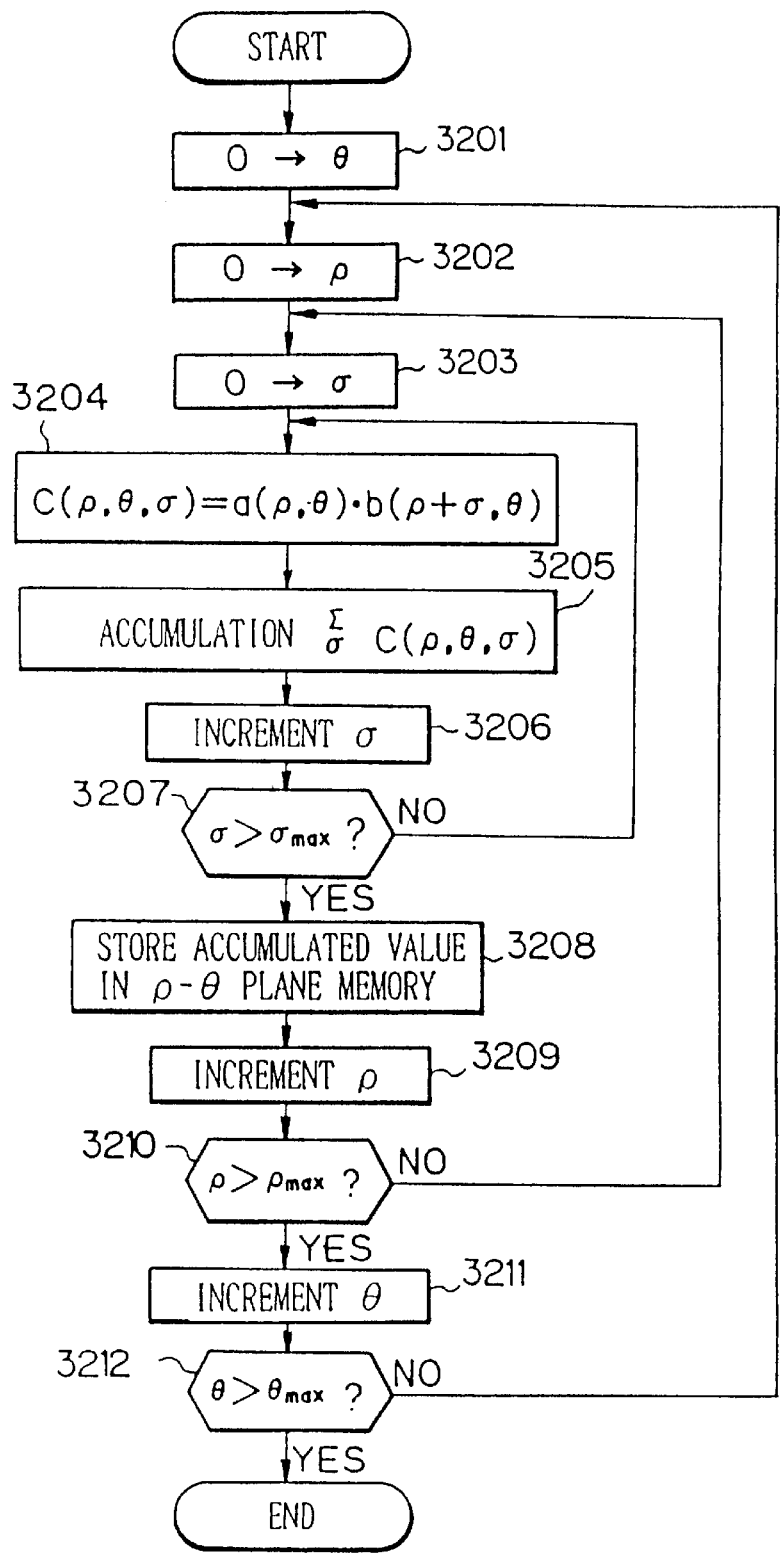
FIG. 91 is a flowchart of a process wherein a correlation parameter is projected in the σ-direction.

FIG. 91 is a flowchart of processing of calculating correlation parameters, and projecting the same in the σ direction.

When starting the correlation calculation, $0 \to \theta$, $0 \to \rho$, $0 \to \sigma$ (3201–3203). Next, correlation parameters C(ρ,θ,σ) are calculated according to the equation (101) (3204), the correlation parameters (107) are accumulated according to the equation (3205). Then, σ is incremented, it is determined whether or not $\sigma > \sigma_{max}$ (3206, 3207). When it is determined that $\sigma \leq \sigma_{max}$, the operation goes to step 3204, and the following processing is repeated. When it is determined that $\sigma > \sigma_{max}$, the accumulated value is stored at the matrix intersecting point, indicated by ρ and θ, in the correlation parameter storage portion (3208). Thereafter, ρ is incremented, and it is determined whether or not $\rho > \rho_{max}$ (3209, 3210). When it is determined that $\rho \leq \rho_{max}$, the operation goes to step 3203, and the following processing is repeated. When it is determined that $\rho > \rho_{max}$, θ is incremented, and it is determined whether or not $\theta > \theta_{max}$ (3211, 3212). When it is determined that $\theta \leq \theta_{max}$, the operation goes to step 3202, and the following processing is repeated. When it is determined that $\theta > \theta_{max}$, the correlation calculation and the projection processing are completed 3.5.4.2.2 Projection in ρ Direction In the case where the binocular parallax σ (movement velocity τ) and the orientation θ of corresponding tangential lines are important, and the direct measurement of the location ρ is not required, the amount $C_{PRJ-\rho}(\rho,\theta)$ or $C_{PRJ-\rho}(\rho,\tau)$ generated by accumulating the basic correlation parameter C(ρ,θ,σ) in the ρ-direction, and expressed by the following equation is effective, and thereby the correlation parameter storage portion is reduced to two dimensions which are the same as the dimensions of the input dual plane.

$$C_{PRJ-\rho}(\theta,\sigma) = \Sigma C(\rho,\theta,\sigma) \quad (109)$$

(where $\rho=0, 1, 2, \ldots \rho_{max}$)

$$C_{PRJ-\rho}(\theta,\tau) = \Sigma C(\rho,\theta,\tau) \quad (110)$$

(where $\rho=0, 1, 2, \ldots \rho_{max}$)

These correlation parameters are effective to detect contour lines moving in a field of view, an orientation θ and a movement velocity τ of a moving contour tangential line, can be measured independent of the location ρ of the tangential line.

Cells operating as above exist in the hypercolumn in the primary visual cortex of the cerebrum. The cells are known as "velocity selective complex cells", which are strongly excited while capturing when a straight line in a field of view translates, and does not output a signal when the straight line stops. The equation (110) plays an important role in "measurement of an optical flow", and the equation (109) plays an important role in "binocular stereopsis from random-dots" explained later.

3.5.4.2.3 Projection in θ Direction

In the case the binocular parallax σ (movement velocity τ) and the location ρ of corresponding tangential lines are important, and the direct measurement of the orientation θ is not required, the amount $C_{PRJ-\theta}(\rho,\sigma)$ or $C_{PRJ-\theta}(\rho,\tau)$ generated by accumulating the basic correlation parameter C(ρ, θ,σ) in the θ-direction, and expressed by the following equation is effective, and thereby the correlation parameter storage portion is reduced to two dimensions which are the same as the dimensions of the input dual plane.

$$C_{PRJ-\theta}(\rho,\sigma) = \Sigma C(\rho,\theta,\sigma) \quad (111)$$

(where $\theta=0, 1, 2, \ldots \theta_{max}$)

$$C_{PRJ-\theta}(\rho,\tau) = \Sigma C(\rho,\theta,\tau) \quad (112)$$

(where $\theta=0, 1, 2, \ldots \theta_{max}$)

The above accumulated correlation parameter is effective to pursuing a moving contour line. The distance ρ of the contour line from the center of the receptive field and the movement velocity τ of the contour line can be measured independently of the orientation θ of the line. A function similar to the above is realized in the cells existing in the retina of a frog for pursuing game such as a fly.

3.5.4.2.4 Projection in ρσ- or ρτ-Direction

In the case the orientation θ of corresponding tangential lines is important, and the direct measurement of the binocular parallax σ (or a movement velocity τ) and the location ρ is not required, the amount $C_{PRJ-\rho\sigma}(\theta)$ or $C_{PRJ-\rho\tau}(\theta)$ generated by accumulating the basic correlation parameter C(ρ,θ,σ) in the ρσ-direction (or ρτ-direction), and expressed by the following equation is effective, and thereby the correlation parameter storage portion is reduced to one dimension.

$$C_{PRJ-\rho\sigma}(\theta) = \Sigma\Sigma C(\rho,\theta,\sigma) \quad (113)$$

(where $\rho=0, 1, 2, \ldots \rho_{max}$, $\sigma=0, 1, 2, \ldots \sigma_{max}$)

$$C_{PRJ-\rho\tau}(\theta) = \Sigma\Sigma C(\rho,\theta,\tau) \quad (114)$$

(where $\rho=0, 1, 2, \ldots \rho_{max}$, $\tau=0, 1, 2, \ldots \tau_{max}$)

The above accumulated correlation parameter is effective to detect that a contour line in an orientation moves in a receptive field. The orientation θ of a moving contour line can be measured independently of the location and movement velocity of the contour line.

3.5.4.2.5 Projection in ρθ Direction

In the case the parallax a (or a movement velocity τ) of corresponding tangential lines is important, and the direct measurement of the location ρ and the orientation θ is not required, the amount $C_{PRJ-\rho\theta}(\sigma)$ or $C_{PRJ-\rho\theta}(\tau)$ generated by accumulating the basic correlation parameter $C(\rho,\theta,\sigma)$ in the $\rho\theta$-direction, and expressed by the following equation is effective, and thereby the correlation parameter storage portion is reduced to one dimension.

$$C_{PRJ\text{-}\rho\theta}(\sigma)=\Sigma\Sigma C(\rho,\theta,\sigma) \qquad (115)$$

(where $\rho=0, 1, 2, \ldots \rho_{max}, \theta=0, 1, 2, \ldots \theta_{max}$)

$$C_{PRJ\text{-}\rho\theta}(\tau)=\Sigma\Sigma C(\rho,\theta,\tau) \qquad (116)$$

(where $\rho=0, 1, 2, \ldots \rho_{max}, \theta=0, 1, 2, \ldots \theta_{max}$)

The above accumulated correlation parameter is effective: to "determine whether or not there are contour lines seen by the right and left eyes in the receptive field, and corresponding to each other, and detect the binocular parallax"; or to "determine whether or not there is a contour line moving in a receptive field, and detect the movement velocity of the contour line". In the case of the equation (116), the velocity $\tau$ of the moving contour line can be measured independently of the location and orientation of the contour line.

3.5.4.2.6 Projection in $\theta\rho\sigma$- or $\theta\rho\tau$-Direction

In the case where the only important thing to know is to determine whether or not corresponding contour lines exist in the receptive fields the parallax $\rho$ (movement velocity $\tau$) of a corresponding tangential lines is important, and the direct measurement of the location $\rho$ and the orientation $\theta$ is not required, the amount $C_{PRJ\text{-}\theta\rho\sigma}$ or $C_{PRJ\text{-}\theta\rho\tau}$ generated by accumulating the basic correlation parameter $C(\rho,\theta,\sigma)$ in the $\rho\theta\sigma$-direction (or $\rho\theta\tau$-direction), and expressed by the following equation is effective, and thereby the correlation parameter storage portion is reduced to zero dimensions corresponding to only one cell.

$$C_{PRJ\text{-}\theta\rho\sigma}=\Sigma\Sigma\Sigma C(\rho,\theta,\sigma) \qquad (117)$$

(where $\rho=0, 1, 2, \ldots \rho_{max}, \theta=0, 1, 2, \ldots \theta_{max}, \sigma=0, 1, 2, \ldots \sigma_{max}$)

$$C_{PRJ\text{-}\theta\sigma\tau}=\Sigma\Sigma\Sigma C(\rho,\theta,\tau) \qquad (118)$$

(where $\rho=0, 1, 2, \ldots \rho_{max}, \theta=0, 1, 2, \ldots \theta_{max}, \tau=0, 1, 2, \ldots \tau_{max}$)

For example, in the case of the equation (118), the above accumulated correlation parameter is effective to detect existence only of a contour line moving in a receptive field, and the detection can be performed independently of the location, orientation, and the movement velocity of the contour line. A function similar to the above is realized in the cells commonly existing in the retinas of lower animals such as a frog for quickly detecting that game such as a fly is in a receptive field, with a small number of cells. The intelligence of nature wherein a processing system is constructed with an extremely small number of cells, can be appreciated. From the point of view of engineering, the above technique is effective to recognize an outline of information on movement for each receptive field, for example, in an unmanned vehicle for surveying a planet.

3.5.4.2.7 Projection in Oblique Direction in $(\rho,\tau)$ or $(\rho,\sigma)$ Plane In the above embodiments, the basic correlation parameters $C(\rho,\theta,\sigma)$, $C(\rho,\theta,\tau)$, and the like are projected directly in the directions of the element parameters, i.e., directly in the directions of the location $\rho$, the orientation $\theta$, the binocular parallax $\sigma$, and the movement velocity $\tau$ of the contour line, to reduce the capacity of the correlation parameter storage portion. Here, a method for reducing the capacity of the correlation parameter storage portion with maintaining the characteristics of the above element parameters, is explained.

When the basic correlation parameters $C(\rho,\theta,\sigma)$ and $C(\rho,\theta,\tau)$ are projected in an arbitrary oblique direction in the $(\rho,\tau)$ or $(\rho,\sigma)$ plane of FIG. 89, the correlation parameter storage portion can be reduced to two dimensions while maintaining the characteristics of $\rho$, $\tau$, and $\sigma$. This oblique projection is explained for an example wherein the projection is performed in the 45° direction in the $(\rho,\sigma)$ plane. When an axis perpendicular to the projection direction is denoted by $\xi$, the correlation parameter $C_{PRJ\text{-}45\sigma}(\theta,\xi)$ projected in the 45° direction, is expressed by the following equation.

$$C_{PRJ\text{-}45\sigma}(\theta, \xi) = \sum_i C(\rho + i, \theta, \sigma + i) \text{ (where } i = 1, 2 \cdots) \qquad (119)$$

When $\theta_P$ and $\xi_P$ where the correlation parameter $C_{PRJ\text{-}45\sigma}(\theta,\xi)$ is a local maximum, is obtained, the orientation $\theta_P$ of the corresponding contour lines and the "parameter $\xi_P$ which is generated by combining the location $\rho$ and parallax $\sigma$" are calculated.

3.5.4.3 Natural Filter of Convolution Filter $C_1(\rho,\theta)$ 3.5.4.3.1 When output data on the dual planes are denoted by $a(\rho,\theta)$ and $b(\rho,\theta)$, the following projection correlation parameter $C_1(\rho,\theta)$ constitutes an interesting filter.

$$C_1(\rho, \theta) = \sum_i a(\rho + i, \theta) \cdot b(i, \theta) \text{ (where } i = 1, 2 \cdots) \qquad (120)$$

On the other hand, the convolution calculation output $C_2(\rho,\theta)$ by the one-dimensional filter in the aforementioned second aspect of the present invention is given by the following equation, where the one-dimensional filter function is denoted by $g(\rho)$.

$$C_2(\rho, \theta) = \sum_i a(\rho + i, \theta) \cdot g(i) \text{ (where } i = 1, 2 \cdots) \qquad (121)$$

Comparing the above two equations, the filter function $g(\rho)$ in the convolution output $C_2(\rho,\theta)$ is replaced with the correlation data $b(i,\theta)$ in the correlation parameter $C_1(\rho,\theta)$. Therefore, the correlation parameter $C_1(\rho,\theta)$ can be considered to be a "natural filtering" result wherein convolution calculation is performed with natural data $b(i,\theta)$ instead of the artificial filter function $g(\rho)$.

The functions of the above two types of filtering are considered below. When the filter function $g(\rho)$ is fixed, the "artificial filtering" according to the equation (121) can be adopted, where the operation such as differentiation is determined in advance. However, when extracting a "characteristic feature seen in the same way by the right and left eyes", or pursuing "the same characteristic feature as the previous image", the convolution calculation with the natural data is necessary. Namely, these operations are impossible by the "artificial filtering". On the other hand, by the "natural filtering" according to the equation (120), precise filtering can be performed in the cases the filter patterns cannot be determined in advance.

Figure 92:
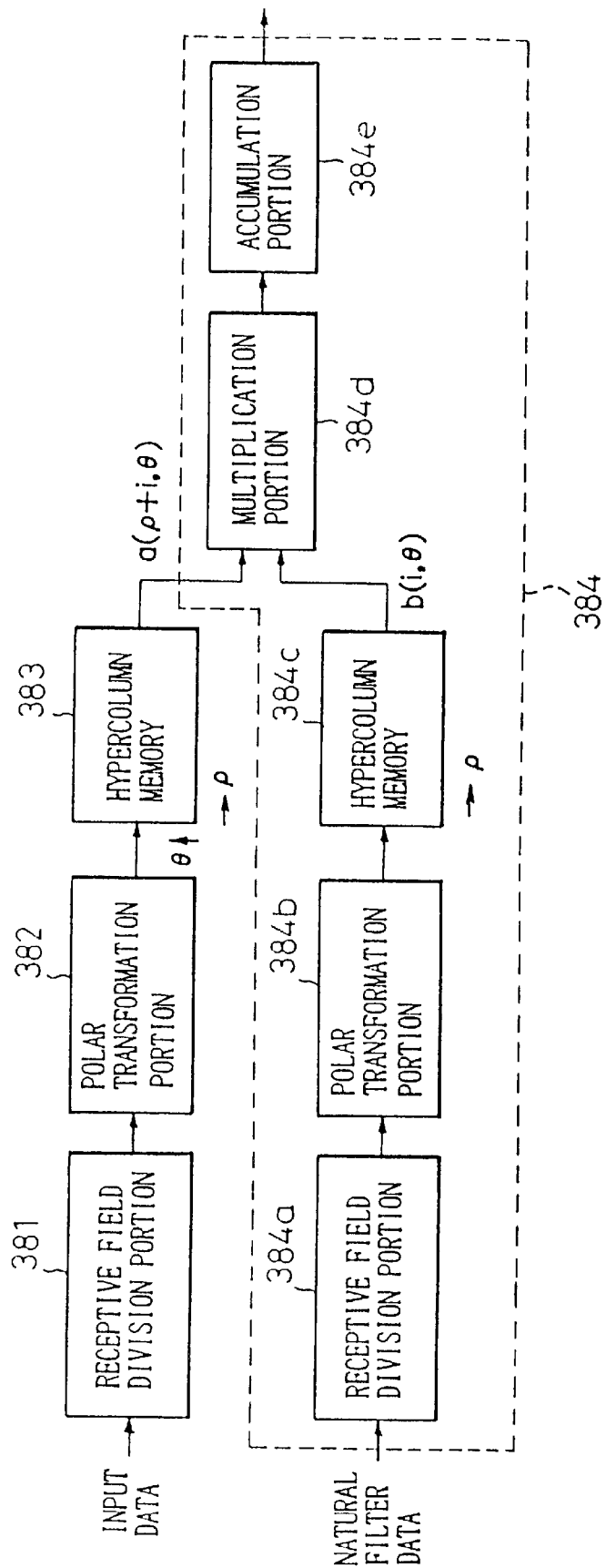
FIG. 92 is a diagram illustrating the construction of a natural filter.

FIG. 92 is a diagram illustrating the construction of the natural filtering. In FIG. 92, reference numeral 381 denotes a receptive field division portion which divides an input image (of one frame) into receptive fields to output the divided images, 382 denotes a polar transformation portion which applies predetermined polar transformation to the receptive field image, 383 denotes a $\rho$-$\theta$ dual plane (hypercolumn memory) for storing a result $a(\rho,\theta)$ of the polar transformation, and 384 denotes a natural filter according to the present invention. The natural filter comprising: a receptive field portion 384a for cutting out the natural filter data into receptive fields; a polar transformation portion 384b for applying polar transformation processing to each receptive field image; a ρ-θ dual plane 384c for storing a result b(ρ,θ) of the polar transformation, and a multiplication portion 384d and an accumulation portion 384e for performing the calculation according to the equation (120).

The multiplication portion 384d performs the multiplication σ(ρ+i, θ)·b(i,θ), and outputs the multiplied result to the accumulation portion 384e, where a(ρ+i,θ) and b(i,θ) (initial values ρ, θ, and i are 0) each denote data output from the dual planes 383 and 384c. Then, i is incremented, and a similar multiplication is repeated for the next data a(ρ+i,θ) and b(i,θ) until i>$i_{max}$ (where $i_{max}$ is a filter width, and is preset appropriately, for example, $i_{max}$=$ρ_{max}$). The accumulation portion 384e accumulates the results of multiplication, and stores the accumulated result in the ρ-θ plane memory (not shown) when i reaches i>$i_{max}$. Hereinafter, the sum of products is calculated for all values of (ρ,θ), and natural filtering processing is completed.

3.5.4.3.2 Application to Binocular Stereopsis

Although the correspondence of fine contour lines can be obtained in three dimensions by the basic correlation parameter C(ρ,θ,σ), the correspondence of contour lines can be obtained in the two-dimensional planes (ρ,θ).

Concretely, by obtaining a local maximum of the aforementioned $C_1$(ρ,θ), the location ρ and the orientation θ of the corresponding contour lines can be determined by two eyes independently of the parallax σ.

3.5.4.3.3 Application to Pursuit of Movement Contour Line

Although natural filters between spatially different receptive fields are explained above, the natural filter is effective regarding time. When input data at different times are denoted by $a_t$(ρ,θ) and $a_{t+DELTA}$(ρ,θ), respectively, the time correlation parameter $C_{time}$(ρ,θ) is expressed by the following equation.

$$C_{time}(\rho, \theta) = \sum_i a_t(\rho + i, \theta) \cdot a_{t+DELTA}(i, \theta) \text{ (where } i = 0, 1, \cdots) \quad (122)$$

As explained above, the location, the orientation, and the movement velocity of moving contour lines can be obtained in three-dimensional space by the basic time correlation parameter C(ρ,θ,σ). However, according to the above natural filter, the location ρ and the orientation θ of moving contour lines can be determined independently of the movement velocity τ, by obtaining a local maximum of $C_{time}$(ρ,θ).

3.5.4.4 Different Types of Basic Correlation

Although the basic correlation parameters are defined by multiplication as $$C(\rho,\theta,\sigma)=a(\rho,\theta)\cdot b(\rho+\sigma,\theta),$$

and $$C(\rho,\theta,\tau)=a_t(\rho,\theta)\cdot a_{t+DELTA}(\rho+\tau,\theta),$$

the multiplication may be replaced with addition to obtain a similar effect. In this case, linearity between signals is assured, and it is known that the "linear simple cell" in the visual cortex of the cerebrum has a similar function. Further, when the above multiplication in the above equations is replaced with subtraction, the binocular stereopsis and pursuit of an object having an obscure contour can be performed based on gradual variations of brightness, hue, and the like.

3.5.4.4.1 Spatial Correlation

Explaining for the case of the ρ-direction correlation, the basic correlation parameter is given by $$C'(\rho,\theta,\sigma)=a(\rho,\theta)-b(\rho+\sigma,\theta). \quad (123)$$

In the above correlation, C'(ρ,θ,σ) is zero where input data are equal. Due to this characteristic, the binocular stereopsis and pursuit of an object having an obscure contour becomes possible. For example, when seeing a large round cylinder, no clear contour will be seen except at both their ends. However, brightness will gradually vary according to a relationship with the incident angles. By searching for a location where brightness by the right and left eyes is the same based on the characteristic that C'(ρ,θ,σ) is zero where input data are equal, correspondence between two eyes can be obtained, and a surface condition of the cylinder can be measured by stereopsis.

Figure 93:
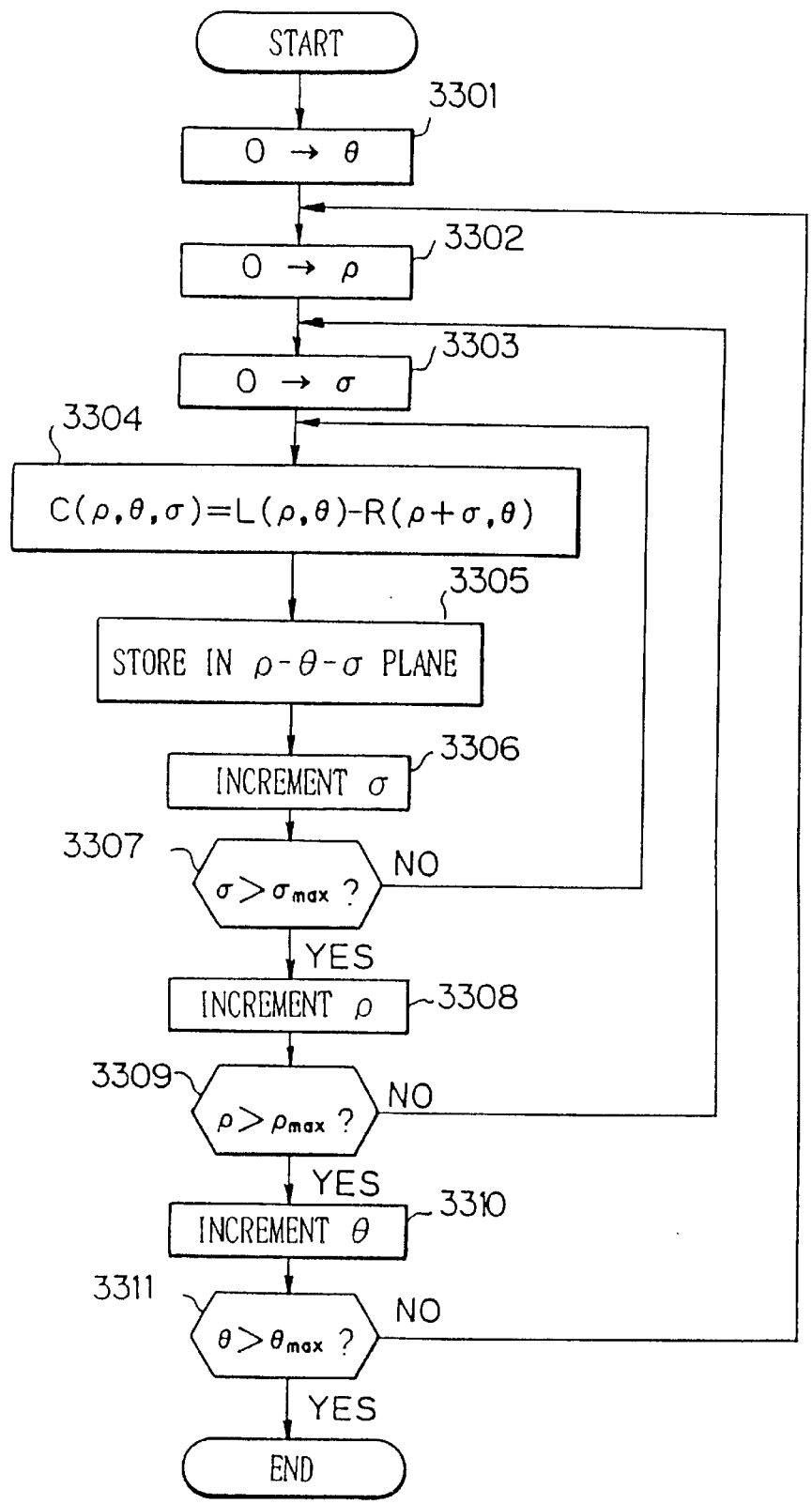
FIG. 93 is a flowchart of the difference-type correlation process explaining an address in the mapping memory.
Figure 94A:
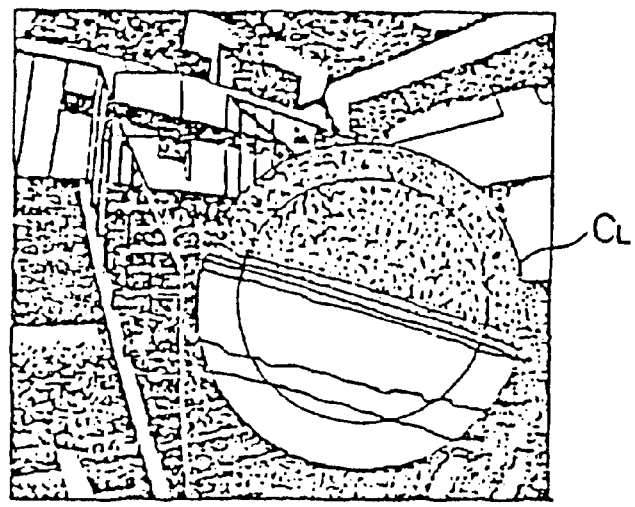
FIGS. 94A and 94B are first diagrams indicating a result of a simulation (the three-dimensional view of an edge by two eyes)
Figure 94B:
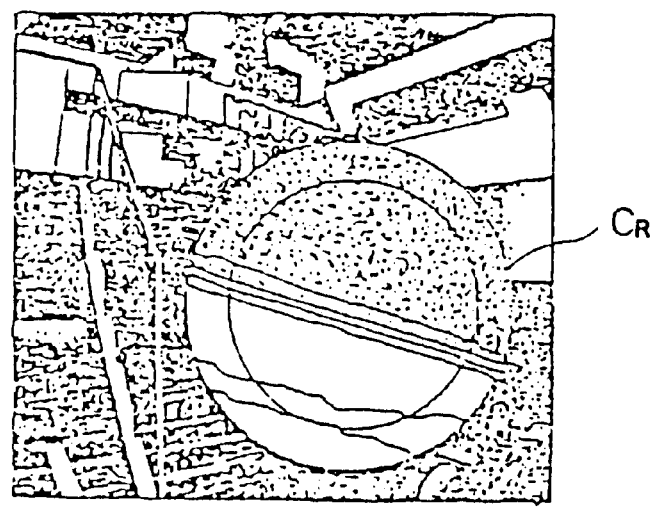

FIG. 93 is a flowchart of correlation processing of the difference type, where the whole process basically corresponds to the basic block diagram of FIG. 75 except that the calculation of correlation parameters is performed according to the equation (123). When starting the correlation calculation, 0→θ, 0→ρ, 0→σ (3301~3303). Next, correlation parameters are calculated according to the equation (123), and the calculated correlation parameters are stored in the correlation parameter storage portion (3304, 3305). Then, σ is incremented, and it is determined whether or not σ>$σ_{max}$ (3306, 3307). When it is determined that σ≦$σ_{max}$, the operation goes to step 3304 to repeat the following operations. When it is determined that σ>$σ_{max}$, ρ is incremented, and it is determined whether or not ρ>$ρ_{max}$ (3308, 3309). When it is determined that ρ≦$ρ_{max}$, the operation goes to step 3303 to repeat the following operations. When it is determined that ρ>$ρ_{max}$, θ is incremented, and it is determined whether or not θ>$θ_{max}$ (3310, 3311). When it is determined that θ≦$θ_{max}$, the operation goes to step 3302 to repeat the following operations. When it is determined that θ>$θ_{max}$, the processing of correlation calculation is completed.

3.5.4.4.2 Time Correlation

Explaining for the case of ρ direction, the basic correlation parameter is given by the following equation.

$$C'(\rho,\theta,\tau)=a(\rho,\theta)-b(\rho+\tau,\theta) \quad (123)'$$

When defining as a(ρ,θ)=$a_t$(ρ,θ) and b(ρ+τ,θ)=$a_{t+DELTA}$(ρ+τ,θ), the correlation parameter is given by the following equation.

$$C'(\rho,\theta,\tau)=a_t(\rho,\theta)-a_{t+DELTA}(\rho+\tau,\theta) \quad (123)''$$

In this correlation, C'(ρ,θ,τ) is zero where input data are equal. Due to this characteristic, the pursuit of an object having an obscure contour becomes possible. According to a method similar to the above case of 3.5.4.4.1, by searching for a location where brightness by the right and left eyes is the same based on the characteristic that C'(ρ,θ,σ) is zero where input data are equal, a stable pursuit of a portion where a clear contour line cannot be detected, such as the surface of a cylinder or a portion of a human face, becomes possible. Cells having a similar function are "directional selective simple cells" which belong to "linear response-type cells".

3.6 Embodiment of Concrete System 3.6.1 Binocular Stereopsis

As a concrete example of the case of spatially different images, a system and a simulation example of the binocular stereopsis are explained. Characteristic features of tangential lines include a line, a gap, and an edge. The "line" is a luminous band, the "edge" is a border line between a luminous portion and a dark portion, and the "gap" is inversion of a line, i.e., a dark narrow band. Although the correspondence of "lines" by the binocular stereopsis is explained for explaining the principle of the correlation filter in the sub-section 3.4, the binocular stereopsis is explained here.

3.6.1.1 Various Filter Construction

Although, in the explanation of the second aspect of the present invention, the line extraction filter, the edge extraction filter, and the gap extraction filter are disclosed, by using these filters, the binocular stereopsis of lines and gaps, and the binocular stereopsis of edges becomes possible. That is, the filter indicated in FIGS. 50A, 50B and 50C can be used as a line extraction filter. The filter indicated in FIGS. 52A, 52B, 52C and 52D can be used as an edge extraction filter. The filter indicated in FIGS. 57A, 57B and 57C can be used as a gap extraction filter.

3.6.1.2 Binocular Stereopsis of Line and Gap 3.6.1.2.1 Binocular Stereopsis of Line and Gap by One-Dimensional Filter When replacing the process of "polar transformation+one-dimensional filter processing" according to the basic block diagram of FIG. 75, with the procedure of "receptive field division+polar transformation+one-dimensional Gaussian filter (or one-dimensional Gaussian filter+polarity inversion) processing" indicated in FIGS. 50B and 57B, respectively, and inputting images of the right and left eyes, the binocular stereopsis of lines and gaps becomes possible. The simulation result of the above process is already explained in FIGS. 72A~74. The sharp peak of $C(\rho,\theta,\sigma)$ in FIG. 74 corresponds to corresponding points of perpendicular lines, and precise measurement that the binocular parallax is equal to five pixels, is performed based on the values on the σ-axis.

3.6.1.2.2 Binocular Stereopsis of Lines and Gaps by Two-Dimensional Filter (Binocular Stereopsis in the Visual Cortex of the Cerebrum)

When replacing the process of "polar transformation+one-dimensional filter processing" according to the basic block diagram of FIG. 75, with the procedure of "two-dimensional Gaussian filter+receptive field division+polar transformation (or polar transformation+polarity inversion) processing" indicated in FIGS. 50C and 57C, respectively, and inputting images of the right and left eyes, the binocular stereopsis of lines, and gaps becomes possible. In this system, two-dimensional second differentiation processing (two-dimensional convolution filter processing) is applied to the input images of the right and left eyes by the two-dimensional gas filter. Next, the filtered input images are respectively divided into receptive field images, and polar transformation is applied to each receptive field image. The "two-dimensional gas filter processing+polar transformation" is equivalent to the process of "one-dimensional filter processing after polar transformation", the simulation result is the same as FIGS. 72A~74. This system is the same as the stereopsis in the visual cortex of the cerebrum, and the contour-emphasized result of the two-dimensional gas filter can be also utilized for recognition of a shape, eyeball control, and the like.

3.6.1.3 Binocular Stereopsis of Edge 3.6.1.3.1 Binocular Stereopsis of Edge by One-Dimensional Filter When replacing the process of "polar transformation+one-dimensional filter processing" according to the basic block diagram of FIG. 75, with the process of "receptive field division+polar transformation+one-dimensional gradient filter+one-dimensional Gaussian filter processing" indicated in FIG. 52B, and inputting image s of the right and left eyes, the binocular stereopsis of edges becomes possible. The simulation result of the above process is indicated in FIGS. 94A, 94B, 95A and 95B. The circles portions $C_L$ and $C_R$ in FIGS. 94A and 94B indicate receptive field images by the right and left eyes, wherein a figure of edges in a portion encircled by a rectangular SQ is a scene of an industrial plant. In FIGS. 95A and 95B, signal intensity of all data is indicated by contour lines, the results of the polar transformation and the intensity distribution of the basic correlation parameter $C(\rho,\theta,\sigma)$ at θ=175° are indicated by contour lines. The sharp peak of $C(\rho,\theta=175°, \sigma)$ is a point corresponding to an edge, and precise measurement that the parallax is equal to one pixel, is performed based on the values on the σ-axis.

3.6.1.3.2 Binocular Stereopsis of Edge wherein Two-Dimensional Filter is Mixed (Binocular Stereopsis in the Visual Cortex of the Cerebrum)

When replacing the process of "polar transformation+one-dimensional filter processing" according to the basic block diagram of FIG. 75, with the process of "two-dimensional Gaussian filter+receptive field division+polar transformation+one-dimensional gradient filter processing" indicated in FIG. 52C, and inputting image s of the right and left eyes, the binocular stereopsis of edges becomes possible. In this system, two-dimensional second differentiation processing (two-dimensional convolution filter processing) is applied to the input images of the right and left eyes by the two-dimensional gas filter. Next, the filtered input images are respectively divided into receptive field images, and polar transformation is applied to each receptive field image. The "two-dimensional gas filter processing+polar transformation" is equivalent to the process of "one-dimensional gas filter processing after polar transformation", the simulation result is the same as FIGS. 94A and 94B. This system is the same as the stereopsis in the visual cortex of the cerebrum, and the contour-emphasized result of the two-dimensional gas filter can be also utilized for recognition of a shape, eyeball control, and the like.

3.6.1.4 Binocular Stereopsis of Polygon Figure, Curve Figure, Random-Dot, and Texture Since the binocular stereopsis is related to the explanations of measurement of movement direction and velocity, given below, the binocular stereopsis of polygon figure, curve figure, random-dot, and texture is explained in the sub-section 3.6.3 after the above explanation of measurement of movement direction and velocity.

3.6.2 Measurement of Movement Direction and Movement Velocity

As a concrete example of images at different times, a system for measuring the movement direction Φ and the velocity V of a moving object for pursuing the object, is explained.

3.6.2.1 Measurement of Movement Direction and Velocity of Contour Tangential Line The contour of an object is approximated as a straight line (tangential line), the movement direction and the velocity of the tangential line can be measured by the following method.

From data $a_t(\rho,\theta)$ of an image at the current time after the processing of "division into receptive fields+polar transformation+one-dimensional filter processing" is applied thereto, and data $a_{t+DELTA}(\rho,\theta)$ of an image at the next time after the processing of "polar transformation+one-dimensional filter processing" is applied thereto, the basic correlation parameter $C(\rho,\theta,\tau)$ is given by the following equation.

$$C(\rho,\theta,\tau)=a_t(\rho,\theta)\cdot a_{t+DELTA}(\rho+\tau,\theta) \quad (124)$$

Then, a point $(\rho_P,\theta_P,\tau_P)$ where $C(\rho,\theta,\tau)$ is a local maximum is obtained. From the element parameters, movement direction of tangential line $\Phi=\theta_P+90°$ movement velocity of tangential line $V=(\tau_P\cdot\Delta_\rho)/\text{DELTA}$ (125)

are obtained, and the tangential line can be pursued based on the data, where $\Delta_\rho$ is a resolution in the $\rho$ direction and DELTA is the delay time, as indicated by reference numeral 349 in FIG. 77.

Errors are generated in the orientation and velocity of a tangential line when the orientation and the movement direction $V_0$ of the tangential line do not cross at a right angle. The reason is explained with reference to FIG. 96. The movement direction and the velocity of a tangential line L, measured according to the equation (125), are "direction perpendicular to the orientation of the tangential line" and "velocity V in the perpendicular direction", respectively, and therefore the direction of the velocity V does not accord with the true direction vector $(V_0,\Phi_0)$. Although the method for measuring the correct movement direction and the correct velocity, generated by correcting the errors, is explained next, the system is enough to pursue an object, since the pursuit is performed at a short time interval, and therefore the error in the above equation at each pursuit is small enough.

Figure 97:
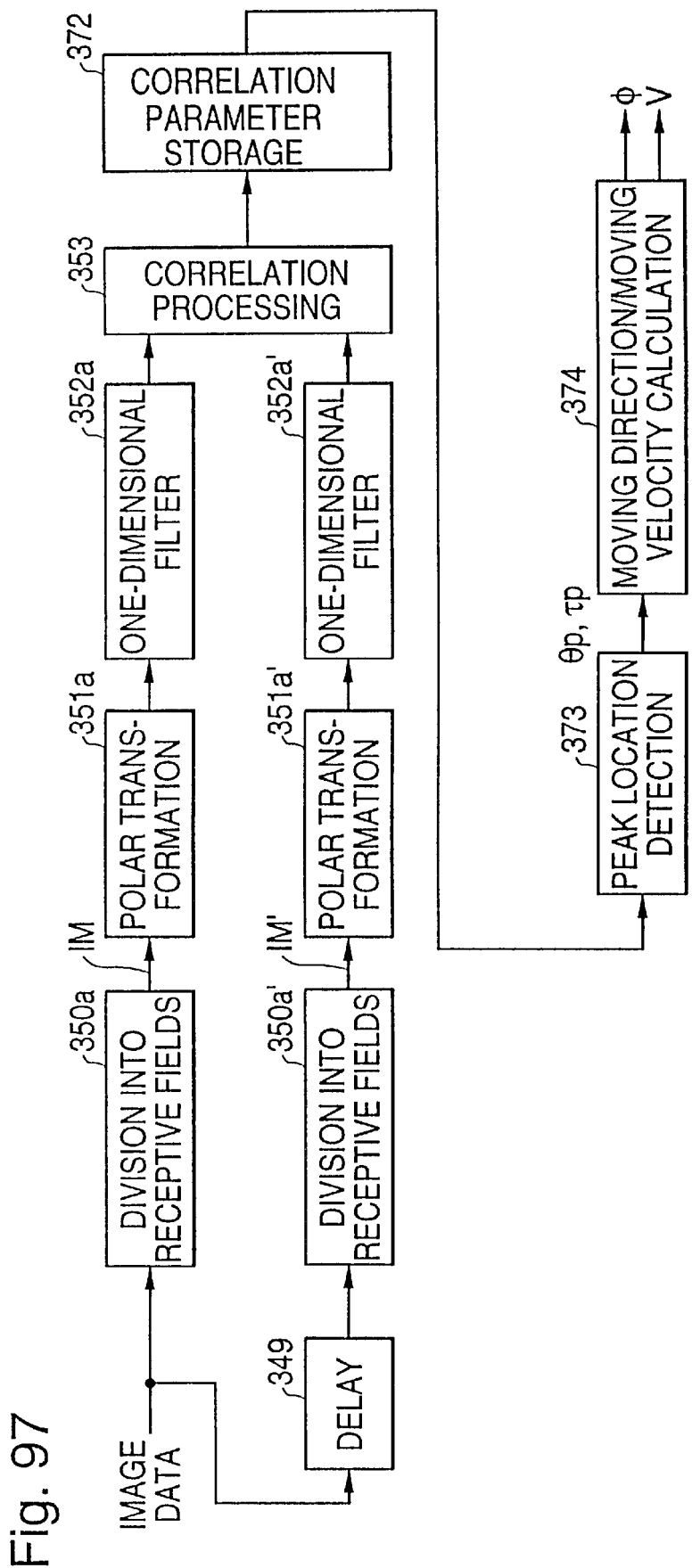
FIG. 97 is a block diagram for measuring a moving direction and velocity.

FIG. 97 is a block diagram of a construction for measuring a movement direction $\Phi$ and a movement velocity V of a tangential line. Image data is delayed by DELTA (349), image data of one frame at the current time, and image data of one frame and predetermined time before, obtained by the delay, are respectively divided into receptive field images (350a, 350a'), polar transformation processing is applied to each receptive field image IM and IM' (351a, 351a'), one-dimensional filtering processing is applied to the result of the polar transformation to map onto dual planes (352a, 352a'), correlation processing is performed between data mapped onto the respective dual planes according to the equation (124) (353), the calculated correlation parameter $C(\rho,\theta,\tau)$ is stored in the correlation parameter storage portion (372), after the correlation calculation is completed, the correlation parameter storage portion is scanned to detect $(\rho_P,\theta_P,\tau_P)$ at which $C(\rho,\theta,\tau)$ is a local maximum (373), finally, the movement direction $\Phi$ and the movement velocity V of the tangential line are calculated according to the equation (125) (374).

3.6.2.2 Measurement of Movement Direction and Velocity of Corner

Figure 98A:
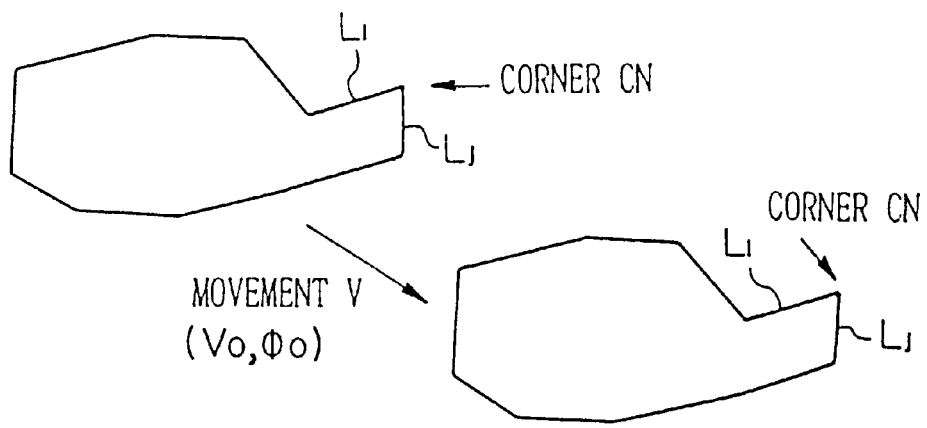
FIGS. 98A and 98B are diagrams for explaining detection of a moving direction and velocity of a corner.

For precisely measuring the movement direction $\Phi_0$ and velocity $V_0$ of the object, more than one contour line is necessary in a receptive field. As indicated in FIG. 98A, generally, an object has a corner CN constituted by two contour tangential lines $L_i$ and $L_j$, and therefore precise measurement of the movement direction $\Phi_0$ and the velocity $V_0$ is possible by the correlation processing of the corner.

In the same way as the case of sub-section 3.6.2.1, correlation processing is performed according to the equation (124). Namely, tangential line can be measured by the following method.

From data $a_t(\rho,\theta)$ of an image at the current time after the processing of "polar transformation+one-dimensional filter processing" is applied thereto, and data $a_{t+DELTA}(\rho,\theta)$ of an image at the next time after the processing of "polar transformation+one-dimensional filter processing" is applied thereto, the basic correlation parameter $C(\rho,\theta,\tau)$ is calculated according to the equation (124), and a point $(\rho_P,\theta_P,\tau_P)$ at which $C(\rho,\theta,\tau)$ is a local maximum is obtained. Next, local maximum points $(\rho_i,\theta_i,\tau_i)$ and $(\rho_j,\theta_j,\tau_j)$, corresponding to two tangential lines $L_i$ and $L_j$ extracted by the above method of local maximum value search, are obtained, and precise movement of the direction $\Phi_0$ and the velocity $V_0$ are given by the following equations $$\Phi_0=\arctan[(\tau_i \sin\theta_j-\tau_j \sin\theta_i)/(\tau_i \cos\theta_j-\tau_j \cos\theta_i)], \quad (126)$$

and $$V=(\Delta_\rho\cdot\tau_i)/(\sin(\Phi-\theta_i)\cdot\text{DELTA}) \quad (127)$$

where DELTA is a time interval between the current time and the next time.

Figure 96:
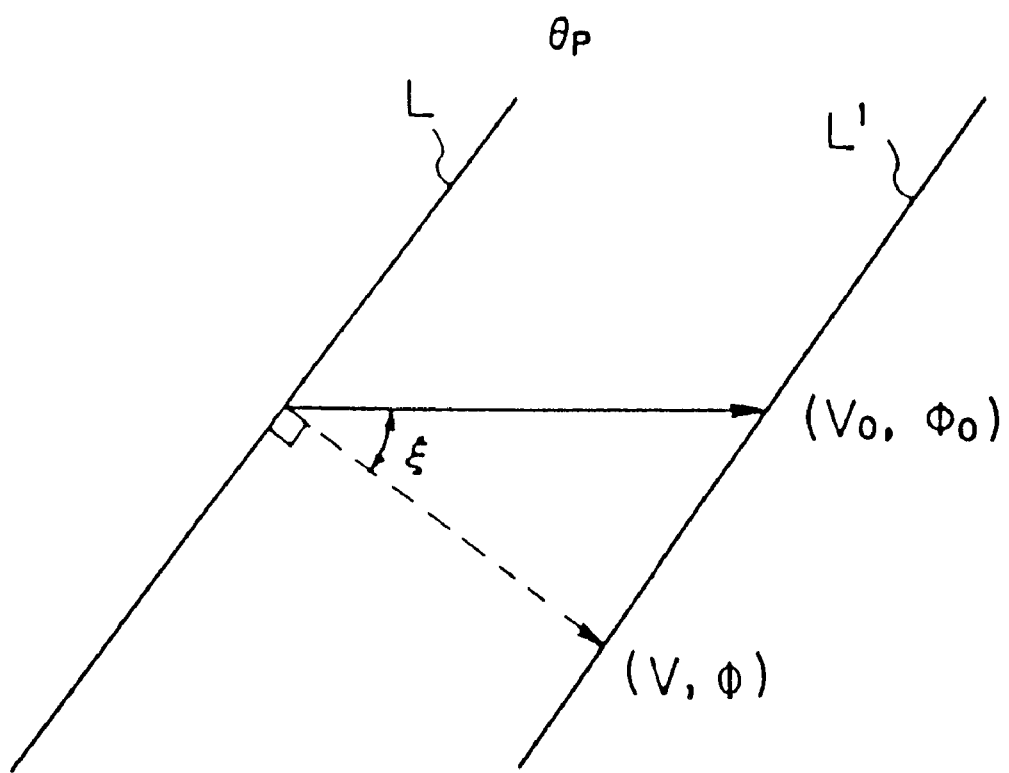
FIG. 96 is a diagram for explaining a moving direction and a true velocity vector of a tangential line.

The equations (126) and (127) are derived as below. Namely, the direction $\Phi$ and the velocity V of a tangential line L, measured according to the equation (125) (see FIG. 96) are "direction perpendicular to the orientation of the tangential line L" and "velocity V in the perpendicular direction", respectively. Therefore, when moved in the direction $\Phi_0$ of FIG. 96, the velocity measured by the equation (125) is equal to $V_0\cos\xi$. Thus, $$V_0 \cos\xi=(\tau_P\cdot\Delta_\rho)/\text{DELTA}, \quad (128)$$

where the angle $\xi$ is given by the following equation, when the clockwise direction is positive in FIG. 96, $$\xi=90°-(\Phi_0-\theta_P) \quad (129)$$

where $\theta_P$ indicates the orientation of the tangential line L. By substituting the equation (129) into the equation (128), $$V_0 \cos[90°-(\Phi_0-\theta_P)]=(\tau_P\cdot\Delta_\rho)/\text{DELTA} \quad (130)$$

is obtained, and the equation (129) is deformed to $$V_0 \sin(\Phi_0-\theta_P)=(\tau_P\cdot\Delta_\rho)/\text{DELTA}. \quad (130)'$$

Figure 98B:
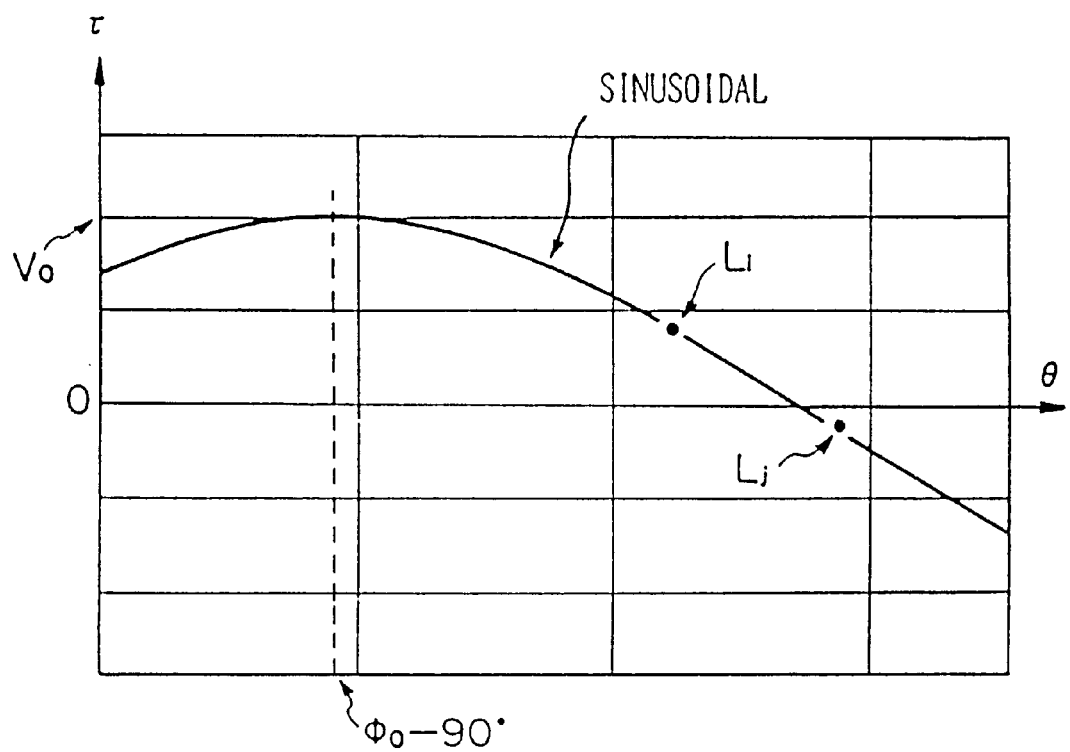

Then, $V_0$ is obtained by putting $\tau_P=\tau_i$ and $\theta_P=\theta_i$ to derive the equation (127). Further, when replacing $\tau_P$ with $\tau$, and $\theta_P$ with $\theta$, and substituting $k=\text{DELTA}/\Delta\rho$ into the equation (130), the following equation $$\tau=k\cdot V_0\cos[90°-(\Phi_0-\theta)] \quad (131)$$

is obtained. When drawing the above relationship of the equation (131) on the $\theta-\tau$ plane, a sine wave (sinusoidal excitation pattern) is obtained as indicated in FIG. 98B. Namely, each side $L_i$ and $L_j$ of a figure is transformed into one point on a sine wave on the $\theta-\tau$ plane.

Deforming the equation (131), $$\tau=k_0\cdot V_0\sin(\Phi_0-\theta) \quad (132)$$

is obtained. When substituting $(\theta,\tau)=(\theta_i,\tau_i)$ and $(\theta,\tau)=(\theta_j,\tau_j)$ into the equation (132), the following equations $$\tau_i=k\cdot V_0\sin(\Phi_0-\theta_i), \quad (132)'$$

and $\tau_j = k \cdot V_0 \cdot \sin(\Phi_0 - \theta_j)$ (132)"

are obtained. From the equations (132)' and (132)", $\tau_i/\tau_j = \sin(\Phi_0 - \theta_i)/\sin(\Phi_0 - \theta_j)$ is obtained, and $\tan \Phi_0 (\tau_i \sin \theta_j - \tau_j \sin \theta_i)/(\tau_i \cos \theta_j - \tau_j \cos \theta_i)$ is derived. That is, the equation (126) is derived.

Although a corner is constituted by two contour lines, a sine wave of FIG. 98B can be determined more precisely when a characteristic feature is constituted by more than two contour lines, and therefore accuracy of ($\Phi_0, V_0$) can be improved.

3.6.2.3 Measurement of Movement Direction and Velocity of Polygon and Curve

Although the measurement of movement direction and movement velocity from two lines (corner) is explained, further credible measurement of movement direction and movement velocity is possible when taking into consideration to "polygon and curve" which are constituted by many lines and tangential lines. The aforementioned correlation parameter $C_{PRJ\text{-}\rho}(\theta,\tau)$, which is generated by the projection in the $\rho$ direction, and given by the following equation, plays an important role.

Figure 99:
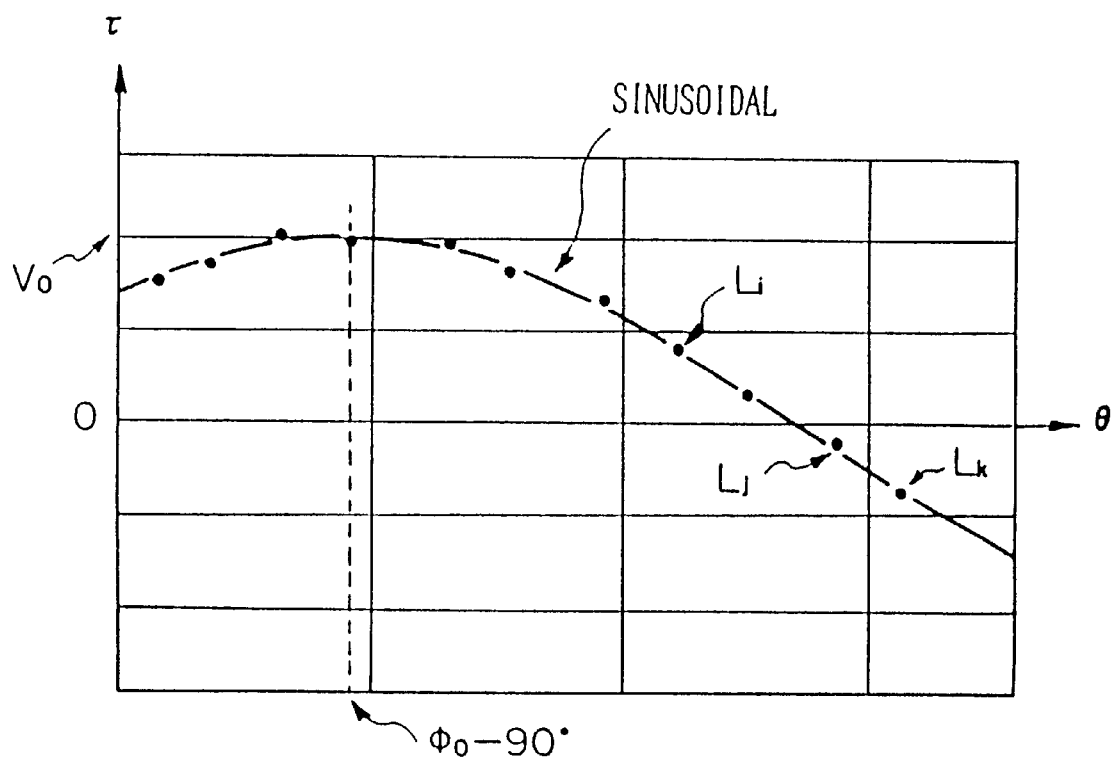
FIG. 99 is a diagram for explaining a response of $C_{PRJ}$-$\rho(\theta,\tau)$ to a polygon.

$C_{PRJ\text{-}\rho}(\theta,\tau) = \Sigma C(\rho,\theta,\tau) = (\rho = 1, 2, \ldots)$ 3.6.2.3.1 Measurement of Movement Direction and Velocity by Polygon A parameter response to a polygon figure is, as indicated in FIG. 99, responses to respective sides of the polygon distributes in a sinusoidal form in the $\theta$–$\tau$ plane. In the case of an N-sided polygon, N peaks line up in the form of a sine wave. A polygon moving with a large velocity provides a sine wave having a large amplitude. Thus, the movement direction and the velocity of the whole polygon can be measured precisely.

When an angle made by a normal to a straight line and the true movement direction is denoted by $\xi$ as indicated in FIG. 96, $\tau_P$ at which the correlation parameter $C(\rho,\theta,\tau)$ has a peak, is given from the equation (128) as below.

$\tau_P = (V_0 \cdot \text{DELTA}/\Delta\rho) \cdot \cos \xi$ $C_{PRJ\text{-}\rho}(\theta,\tau)$ generated by projecting the correlation parameter $C(\rho,\theta,\tau)$ in the $\rho$ direction, gives a sine wave (sinusoidal excitation pattern) of FIG. 99. By obtaining the maximum point $(\theta_{max}, \tau_{max})$, movement direction $\Phi_0 = \theta_{max} - 90°$, (133a)

and true movement velocity $V_0 = (\tau_{max} \cdot \Delta\rho)/\text{DELTA}$ (133b)

are obtained. Comparing this method with the aforementioned corner method (FIG. 98B), the basic principles are the same. However, since many points (N points) are distributed on a sine wave, this method has a remarkable characteristic feature that the peak (a point at which the sine wave has a maximum amplitude) of the sine wave can be calculated precisely.

The extraction of the sine wave can be performed by using polar transformation. Namely, according to the polar transformation on a cylinder (Hough transformation), points are transformed to sine waves. Inversely, when inverse polar transformation is applied to each point on the sine wave (such inverse polar transformation is equivalent to the inversion Hough transformation), the respective points are transformed (inverse polar transformation) to a group of straight lines intersecting at a point. Therefore, from the point, the sine wave can be extracted. Concretely, respective points on the $C_{PRJ\text{-}\rho}(\theta,\tau)$-plane are transformed to straight lines satisfying the following relationship $\tau = V_y \cdot \cos \theta + V_x \cdot \sin \theta$. (134)

Figure 100A:
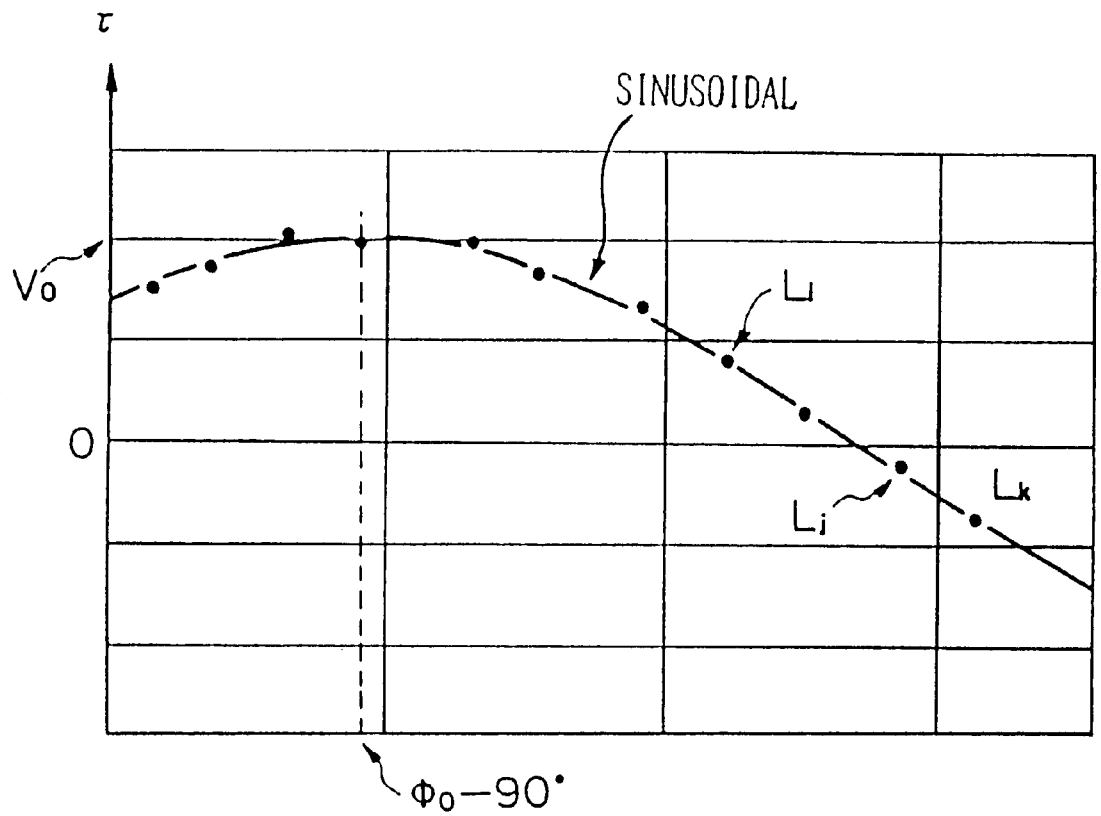
FIGS. 100A and 100B are diagrams for explaining extraction of a sine wave by the inverse polar transformation.
Figure 100B:
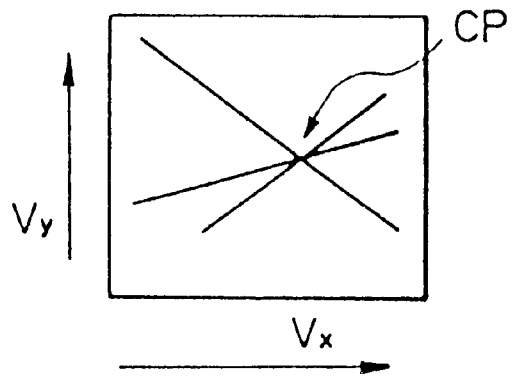

When the intersecting point $CP(V_x, V_y)$ of the straight lines is obtained (see FIGS. 100A and 100B), the direction and the distance from the origin of the $V_x$-$V_y$ coordinate system to the intersecting point CP give $\Phi_0$ and $V_0$ in the equations (133a) and (133b). The reason why the direction and the distance from the origin of the $V_x$-$V_y$ coordinate system to the intersecting point CP give $\Phi_0$ and $V_0$ in the equation (133a) and (133b), is as follows.

When deforming the equation (134) with the true velocity $V_0$ and direction $\Phi_0$, $\tau = \left(\sqrt{(V_x^2 + V_y^2)}\right) \cdot \sin(\theta - \Phi_0)$, and (134)'

$= V_0 \cdot (\text{DELTA}/\Delta\rho) \cdot \sin(\theta - \Phi_0)$, where $\Phi_0 = \arctan(V_y/V_x)$.

Therefore, the peak of the sine wave on the $C_{PRJ\text{-}\rho}(\theta,\tau)$-plane is given by $\tau_{max} = V0 \cdot (\text{DELTA}/\Delta\rho)$ or $= \sqrt{(V_x^2 + V_y^2)}$ $\theta_{max} = \Phi_0 - 90°$.

Therefore, the true velocity $V_0$ and direction $\Phi_0$ are calculated by the following equations true velocity $V_0 = (\Delta\rho/\text{DELTA}) \cdot \sqrt{(V_x^2 + V_y^2)}$, and (135a)

true direction $\Phi_0 = \arctan(V_y/V_x)$. (135b)

This method corresponds to the "inversion Hough transformation".

FIG. 101 is a block diagram illustrating the construction for the measurement of a movement direction and a movement velocity. Image data of one frame at each of the current time and the next time is divided into receptive field images (350a, 350a'), polar transformation processing is applied to each receptive field image IM, IM' (351a, 351a'), one-dimensional filtering processing is applied to the result of the polar transformation to map onto dual planes (352a, 352a'), correlation processing is performed between data mapped onto the respective dual planes according to the equation (124) (3539'), and the calculated correlation parameter $C(\rho,\theta,\tau)$ is stored in the correlation parameter storage portion (472). Then, the correlation parameter $C_{PRJ\text{-}\rho}(\theta,\tau)$, projected in the $\rho$ direction, is calculated by the following equation (375).

$C_{PRJ\text{-}\rho}(\theta, \tau) = \sum_{\rho} C(\rho, \theta, \tau) \ (\rho = 1, 2, \cdots)$ The calculated correlation parameter $C_{PRJ\text{-}\rho}(\theta,\tau)$ is stored in the $\theta$–$\tau$ plane the correlation parameter storage portion (376). Then, polar transformation processing is applied to the correlation parameter $C_{PRJ\text{-}\rho}(\theta,\tau)$ according to the equation (134) (377), and the peak point (intersecting point) on the $V_x$-$V_y$ plane (velocity plane) is obtained (378). The direction and the distance from the origin of the coordinate system to the intersecting point are obtained, and the true velocity $V_0$ and the true direction $\Phi_0$ are calculated based on the equations (135a) and (135b) (379).

3.6.2.3.2 Measurement of Movement of Direction and Velocity from Curve Figure

Although the above explanations are given for a polygon, the above measurement can be performed from a curve figure in a similar way. According to the process of "receptive field method+polar transformation", tangential lines of the curve can be precisely extracted, and $C_{PRJ\text{-}\rho}(\theta,\tau)$ can be calculated from the data of the tangential lines in the same way as above.

Figure 102A:
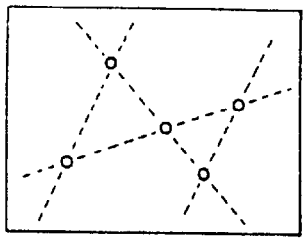
FIGS. 102A and 102B are diagrams for explaining a polar transformation from a random dot image.
Figure 102B:
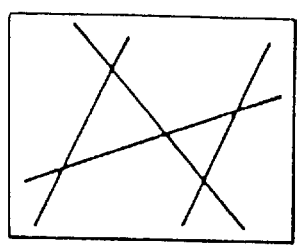
Figure 103A:
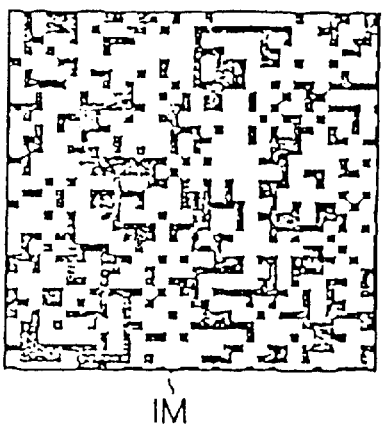
FIGS. 103A, 103B, 103C, and 103D are diagrams for explaining a result of a simulation in measurement of a moving direction and velocity of a random dot image.
Figure 103B:
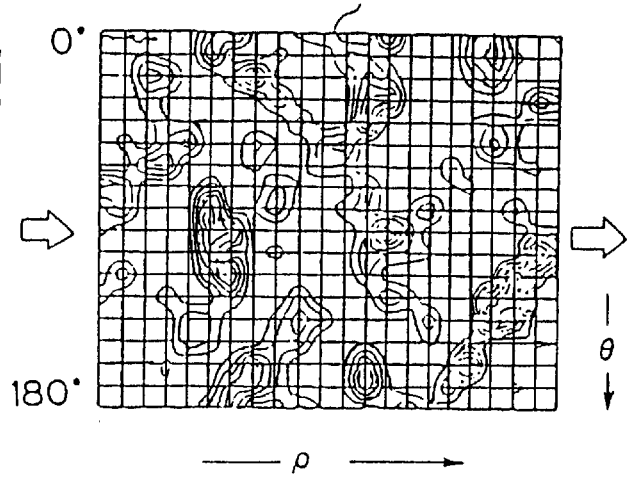
Figure 103C:
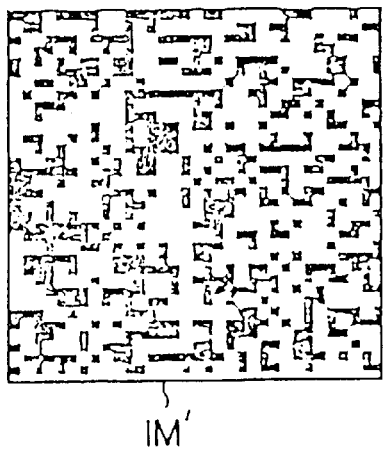
Figure 103D:
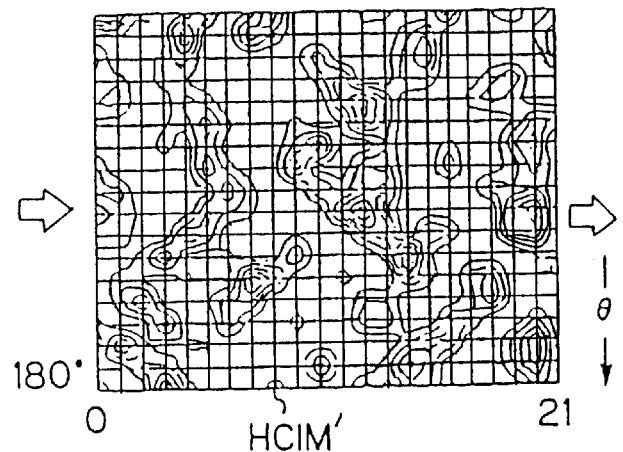

3.6.2.4 Measurement of movement of Direction and Velocity from Random-Dot and Texture In the above explanations, it is described that the movement direction and the velocity can be measured from a figure (a polygon and a curve) which are constituted by straight lines and tangential lines. Next, the figure (a polygon and a curve) can be extended to a figure constituted by random points. From such a figure, the movement direction $\Phi_0$ and the velocity $V_0$ can be measured in the same processing as that in the sub-section 3.6.2.3. The reason is because, according to the process of "receptive field method+one-dimensional filter", "a pair of points" can be extracted "as a straight line", and therefore the measurement from the figure constituted by random points can be performed in the same way as the measurement from the polygon (see FIGS. 102A and 102B). According to this method, a random-dot figure is naturally constituted by fine design patterns, and therefore the movement direction and the velocity of a "texture" figure can be measured. This extension has a great advantage.

FIGS. 103A, 103B, 103C 103D, 104A and 104B are diagrams for explaining a simulation result of the measurement of the movement direction and the velocity of a random-dot figure, and indicate a result in the case where an object moves by $6\sqrt{2}$ pixels per second in the 45° direction, where the delay DELTA is set equal to one second. The random-dot figure of FIGS. 103A, 103B, 103C, 103D, 104A and 104B is a random-dot stereogram generated by a computer, where 1 dot=1 pixel, and the density is 50%.

Figures 104A, 104B:
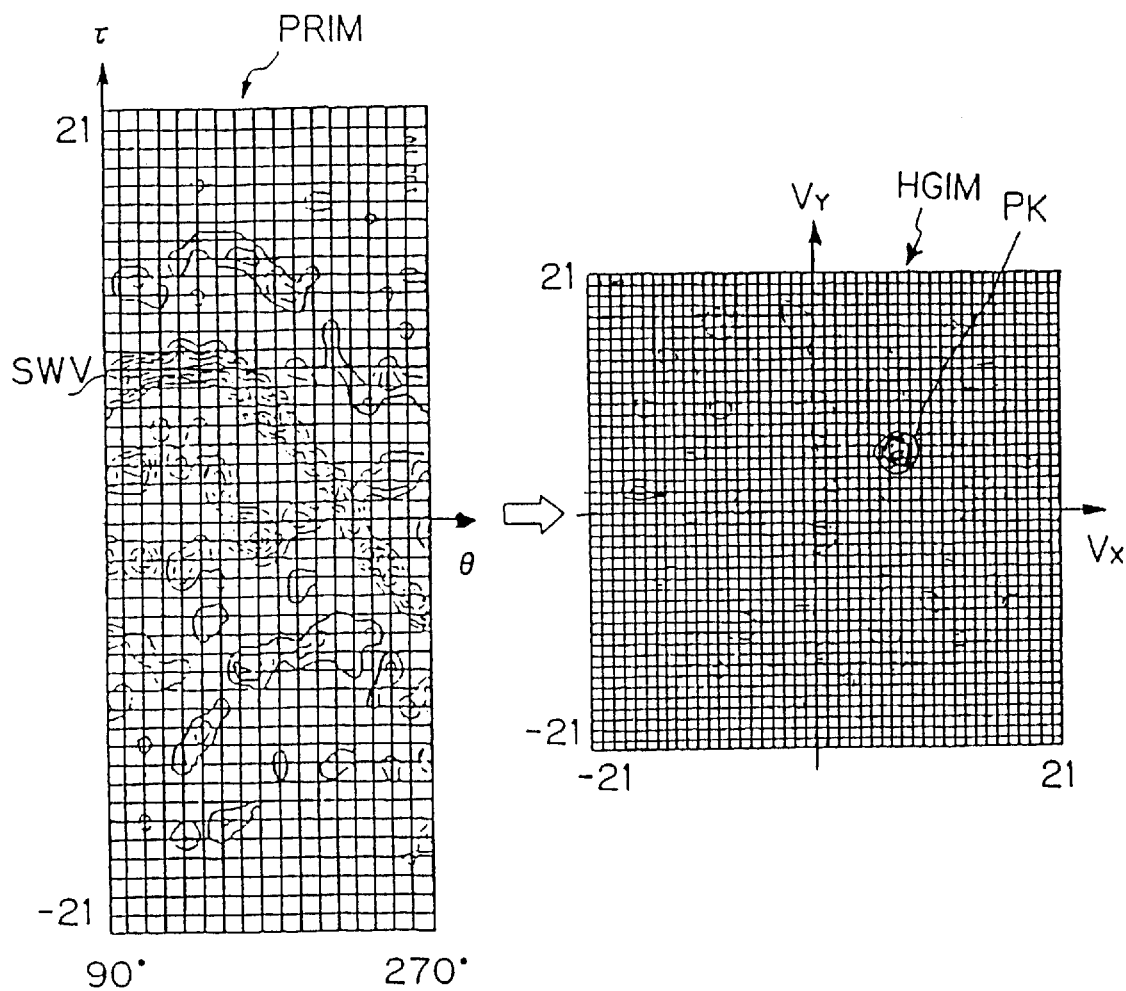
FIGS. 104A and 104B are diagrams for explaining a result of a simulation in measurement of a moving direction and velocity of a random dot image.

In FIGS. 103A, 103B, 103C and 103D, IM and IM' are receptive field images at the current time (without delay) and the next time (with delay), respectively, and HCIM and HCIM' are hypercolumn images obtained by performing polar transformation on the respective receptive field images IM and IM', applying one-dimensional filtering processing to the polar transformation results, and mapping the filtered result on to the $\rho$–$\theta$ dual plane. In FIGS. 104A and 104B, PRIM indicates a correlation parameter $C_{PRJ\text{-}\rho}(\theta,\tau)$ obtained by performing correlation processing in accordance with the equation (104) between the hypercolumn images, and projecting a correlation parameter $C(\rho,\theta,\tau)$ obtained by the correlation processing, in the $\rho$ direction onto the $\theta$–$\tau$ plane; and HGIM indicates an inverse polar transformation result on the $V_x$-$V_y$ plane, obtained by applying inverse polar transformation processing in accordance with equation (134) to the correlation parameter $C_{PRJ\text{-}\rho}(\theta,\tau)$. A sinusoidal excitation pattern SWV appears on the $\theta$–$\tau$ plane, and a sharp peak PK is extracted at 45° direction and $6\sqrt{2}$ pixels location on the velocity plane. A true velocity $V_0$ and a movement direction $\Phi_0$ can be calculated from the peak point $(V_x, V_y)$ based on the equations (135a) and (135b).

Cells called "directional selective simple cells" or "directional selective complex cells" exist in the hypercolumn in the primary visual cortex of the cerebrum, where the cells detect a moving direction and a moving velocity of a contour line, and the visual cortex (MT area) contains cells having a function of synthesizing information from the complex cells to detect the true velocity and the direction. The function of the cells resembles the system according to the present invention. In particular, the fifth layer of the hypercolumn contains cells which feedback signals to the superior colliculus, and the cells play an important role to control eyeballs so as to capture the object at the center of the field of sight by measurement data of the true movement direction $\Phi_0$ and the moving velocity $V_0$ of the contour line. Since the operation of capturing an object at the center of the field of sight to access or avoid the object, is required for moving robot and the like, the method of measurement according to the present invention is effective.

Recently, studies have been made regarding measurement methods of the moving direction $\Phi_0$ and the moving velocity $V_0$. The studied methods are divided into "methods for obtaining a moving direction and a moving velocity based on a time variation of brightness" and "methods for obtaining a moving direction and a moving velocity based on a variation accompanied by movement of the characteristic features of a figure". However, the former method has a problem in practice in that the method is sensitive to variation and vibration of lighting due to use of differentiation in the processing and there is a limit in application of the latter method to image processing techniques since current image processing techniques are weak in "processing of a figure".

Regarding the above optical flow problem, the method of measurement according to the present invention is advantageous, compared with the former method, in that the method of measurement according to the present invention is strong against noise since an integral operation is used in the method, in the manner that a group of points constituting a figure are transformed to straight lines by polar transformation, and accumulation is performed. The method of measurement according to the present invention is advantageous, compared with the latter method, in that measurement of a complicated figure can be performed accurately, since the complicated figure is decomposed to the simplest figures, i.e., contour tangential lines, and the contour tangential lines can be processed in the one-dimensional space due to polar transformation. Namely, the method of measurement according to the present invention can be a new optical flow method which is an integral type and in which one-dimensional processing is possible.

3.6.2.5 Measurement of Movement of Direction and Velocity of Line and Gap

The processing for measuring a movement direction and a velocity of a line and a gap is explained below with a simulation result. Although, in the following explanation, the method of 3.6.2.1 is used as a concrete measurement method of a movement direction and a velocity, the methods of 3.6.2.2~3.6.2.4 can be performed as well. 3.6.2.5.1 Measurement of Movement Direction and Velocity Using One-Dimensional Filter The measurement of a moving direction $\Phi$ and a velocity $V$ of a line and a gap becomes possible by replacing the processing of "receptive field division+polar transformation+one-dimensional filter processing" of FIG. 97, with the processing of "receptive field division+polar transformation+one-dimensional Gaussian filter (or one-dimensional Gaussian filter+polarity inversion) processing"

indicated in FIGS. 50B and 57B, respectively. The simulation result of the operation is indicated in FIGS. 105A to 105E. In FIGS. 105A to 105E, an intensity of a correlation parameter $C(\rho,\theta,\tau)$ obtained by inputting an original image and an image obtained by shifting a perpendicular line ($\theta \approx 92°$) by seven pixels in the horizontal direction, is indicated by contour lines. The sharp peak of the basic correlation parameter $C(\rho,\theta=92°,\sigma)$ indicates a point indicating correspondence between the perpendicular lines. When the point is denoted by $(\rho_P,\theta_P,\tau_P)$, the correct result is obtained as the movement direction=$\theta_P$+90°=182°, and (movement velocity/DELTA)=$\tau_P$=6 image.

3.6.2.5.2 Measurement (Similar to the Visual Cortex of the Cerebrum) of Movement Direction and Velocity Using Two-Dimensional Filter The measurement of a movement direction and a velocity of a line and a gap becomes possible by replacing the processing of "receptive field division+polar transformation+one-dimensional filter processing" of FIG. 97, with the processing of "two dimensional Gaussian filter+receptive field division+polar transformation (or polar transformation+polarity inversion) processing" indicated in FIGS. 50C and 57C, respectively. In this processing, two-dimensional second differentiation processing (two-dimensional convolution filter processing) is performed on an input image with a two-dimensional gas filter, then the processed image is divided into receptive fields, and polar transformation is performed on each receptive field image. The processing of the "two-dimensional gas filter+polar transformation" is equivalent to the processing of "one-dimensional gas filter after polar transformation". Although the simulation result is not shown, the same measurement result of the movement direction and the velocity as FIGS. 105A to 105E is obtained. This processing is the same as the stereopsis in the visual cortex of the cerebrum, and it is advantageous that the contour-emphasized result by the two-dimensional gas filter can be commonly used for recognition of a figure, eyeball control, and the like.

3.6.2.6 Measurement of Movement Direction and Velocity of Edge

The processing for measuring a direction $\Phi$ and a velocity V of an edge is explained below with a simulation result. The edge is the most frequently appeared image characteristic feature. Although, in the following explanation, the method of 3.6.2.1 is used as a concrete measurement method of a movement direction and a velocity, the methods of 3.6.2.1~4 can also be performed as well.

3.6.2.6.1 Measurement of Movement Direction and Velocity of Edge Using One-Dimensional Filter The measurement of a moving direction and a velocity of an edge becomes possible by replacing the processing of "receptive field division+polar transformation+one-dimensional filter processing" of FIG. 97, with the processing of "receptive field division+polar transformation+one-dimensional Gaussian filter (+polarity inversion) processing" indicated in FIG. 52B. The simulation result of the operation is indicated in FIGS. 106A to 106E. In FIG. 106E, an intensity of a correlation parameter $C(\rho,\theta,\sigma)$ obtained by inputting an original image and an image obtained by shifting an edge at the direction of 120° by seven pixels in the horizontal direction, is indicated by contour lines. The sharp peak of the basic correlation parameter $C(\rho,\theta=120°,\sigma)$ indicates a point indicating correspondence between the edges. When the point is denoted by $(\rho_P,\theta_P,\tau_P)$, the correct result is obtained as the movement direction=$\theta_P$+90°=210°, and (movement velocity·DELTA)/$\Delta_\rho$=$\tau_P$=7 image, where $\Delta_\rho$ is a resolution of $\rho$ direction, and DELTA is a delay time.

3.6.2.6.2 Measurement of Movement Direction and Velocity of Edge Using Two-Dimensional Filter (Detection of Movement in Visual Cortex of Cerebrum)

The measurement of a moving direction $\Phi$ and a velocity V of an edge becomes possible by replacing the processing of "receptive field division+polar transformation+one-dimensional filter processing" of FIG. 97, with the processing of "two-dimensional Gaussian filter+receptive field division+polar transformation+one-dimensional gradient filter processing" indicated in FIG. 52C. The processing of the two-dimensional gas filter+polar transformation is equivalent to the processing of "one-dimensional gas filter after polar transformation". Although the simulation result is not shown, the same measurement result of the movement direction and the velocity as FIG. 106E is obtained. This processing is the same as the detection of movement in the visual cortex of the cerebrum, and it is advantageous that the contour-emphasized result by the two-dimensional gas filter can be commonly used for recognition of a figure, eyeball control, and the like.

3.6.3 Binocular Stereopsis of Polygon Figure, Curve Figure, and Random-Dot Texture

3.6.3.1 Binocular Stereopsis of Polygon Figure and Curve Figure

Similar to sub-section 3.6.2 "Measurement of Movement Direction and Velocity", the binocular stereopsis of a polygon figure and a curve figure, becomes possible by using a projected correlation parameter $C_{PRJ\text{-}\rho}(\theta,\rho)$ which is obtained by projecting a correlation parameter $C(\rho,\theta,\sigma)$ in the $\rho$-direction, as $$C_{PRJ\text{-}\rho}(\theta,\sigma) = \sum_\rho C(\rho,\theta,\sigma) \quad (\rho = 1, 2, \cdots).$$

This processing can be performed by replacing the time correlation $C_{PRJ\text{-}\rho}(\theta,\tau)$ in sub-section 3.6.2 with the two-eye correlation $C_{PRJ\text{-}\rho}(\theta,\sigma)$. According to this method, credibility is improved because a polygon contains a plurality of sides.

Figure 107:
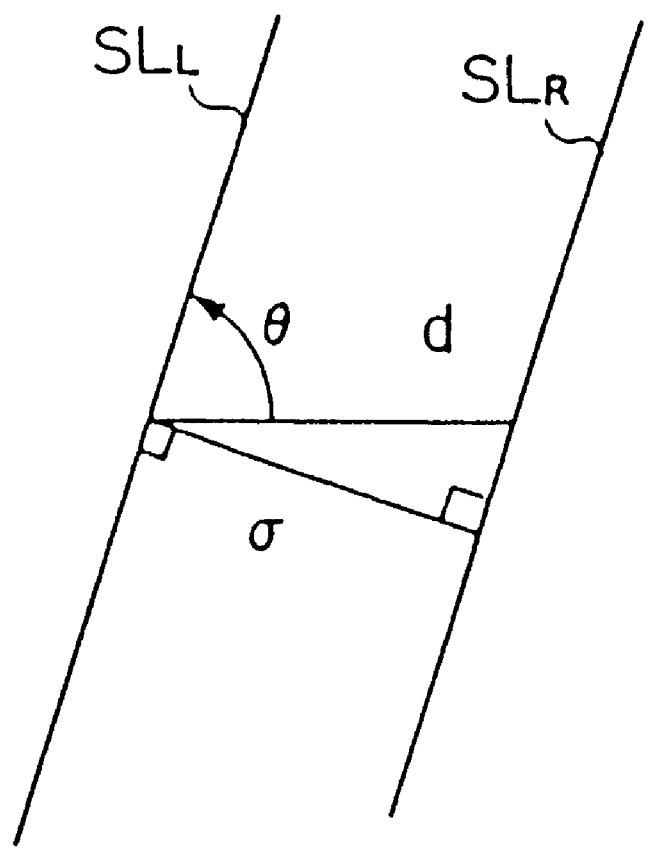
FIG. 107 is a diagram for explaining a relationship between an offset of a line and a binocular parallax.

A straight line is seen in input images of the right and left eyes, offset from each other as indicated by $SL_L$ and $SL_R$ in FIG. 107. The difference in the locations of the straight line location is obtained as a displacement (minimum distance) $\sigma$ in the $\rho$-direction perpendicular to the orientation $\theta$ of the straight line, on the $\rho$-$\theta$ hypercolumn plane. Therefore, the binocular parallax d in the horizontal direction (minimum distance between $SL_L$ and $SL_R$ is expressed by the equation $d = \sigma / \sin \theta$.

Namely, when the horizontal parallax (binocular parallax) is denoted by d, the displacement $\sigma$ in the $\theta$-direction of the straight line is expressed by the following equation $\sigma = d \cdot \sin \theta$. \hfill (136)

When drawing the relationship of the above equation on the $\theta$-$\sigma$ plane, a sine wave as indicated in FIG. 108B is obtained.

Namely, each side $L_i$, $L_j$, and $L_k$ in each of the images captured by right and left eyes as indicated in FIG. 108A, are polar-transformed, correlation processing is performed between hypercolumn images obtained by the polar transformation based on the equation (101) to calculate a correlation parameter $C(\rho,\theta,\sigma)$, the correlation parameter $C(\rho,\theta,\sigma)$ is projected in the $\rho$ direction according to the equation (109) to obtain a correlation parameter $C_{PRJ-\rho}(\theta,\sigma)$ and display on the $\theta$-$\sigma$ plane. Each side $L_i$, $L_j$, and $L_k$ are transformed to points $L_i'$, $L_j'$, and $L_k'$ on the sine wave.

Similar to the processing in sub-section 3.6.2.3, when $C_{PRJ-\rho}(\theta,\sigma)$ is calculated from the two eyes input images, and inverse-polar-transformed according to the equation (134), respective points on the sine wave are transformed to a group of straight lines passing through a point PK on the $V_x$-$V_y$ plane as indicated in FIG. 108C. When this peak point PK($V_x$,$V_y$) is obtained, the true parallax $\sigma 0$ is calculated by the equation $$\sigma_0 = (\Delta\rho) \cdot \sqrt{(V_x^2 + V_y^2)}, \tag{137}$$

where the direction of the parallax is always the same as the direction (horizontal direction) connecting two eyes.

Figure 109:
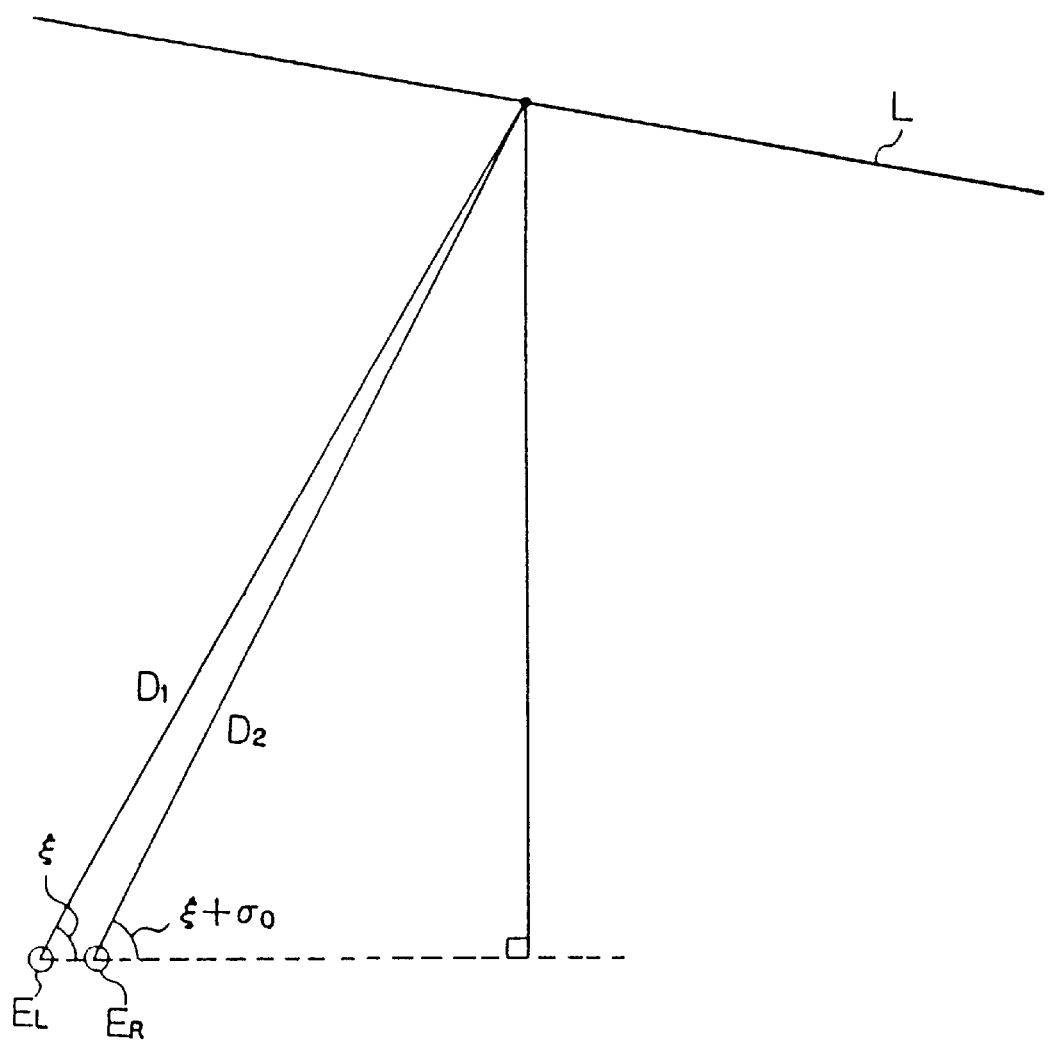
FIG. 109 is a diagram for explaining a method for calculating a distance by the binocular stereopsis.

When a direction in which an arbitrary figure is seen is denoted by $\xi$, as indicated in FIG. 109, and the space between two eyes is denoted by d, the distance D to the arbitrary figure is calculated by the equation $$D = d \cdot \sin(\sigma_0 + \xi)/\sin(\sigma_0) \tag{138}$$

FIG. 109 is a diagram for explaining a method of calculating a distance to an arbitrary figure by the binocular stereopsis, where L is a straight line, and $E_L$ and $E_R$ denote right and left eyes. When the above obtained parallax is denoted by $\sigma_0$, the direction in which the arbitrary figure is seen is denoted by $\xi$, the space between two eyes is denoted by d, distances from the right and left eyes to the arbitrary figure are denoted by $D_1$ and $D_2$, respectively, the equations $$D_1 \sin\xi = D_2 \sin(\xi+\sigma_0)$$
$$D_1 \cos\xi - D_2 \cos(\xi+\sigma_0) = d$$

are obtained. By obtaining $D_1$ from these simultaneous equations, the equation (138) is obtained.

Figure 110:
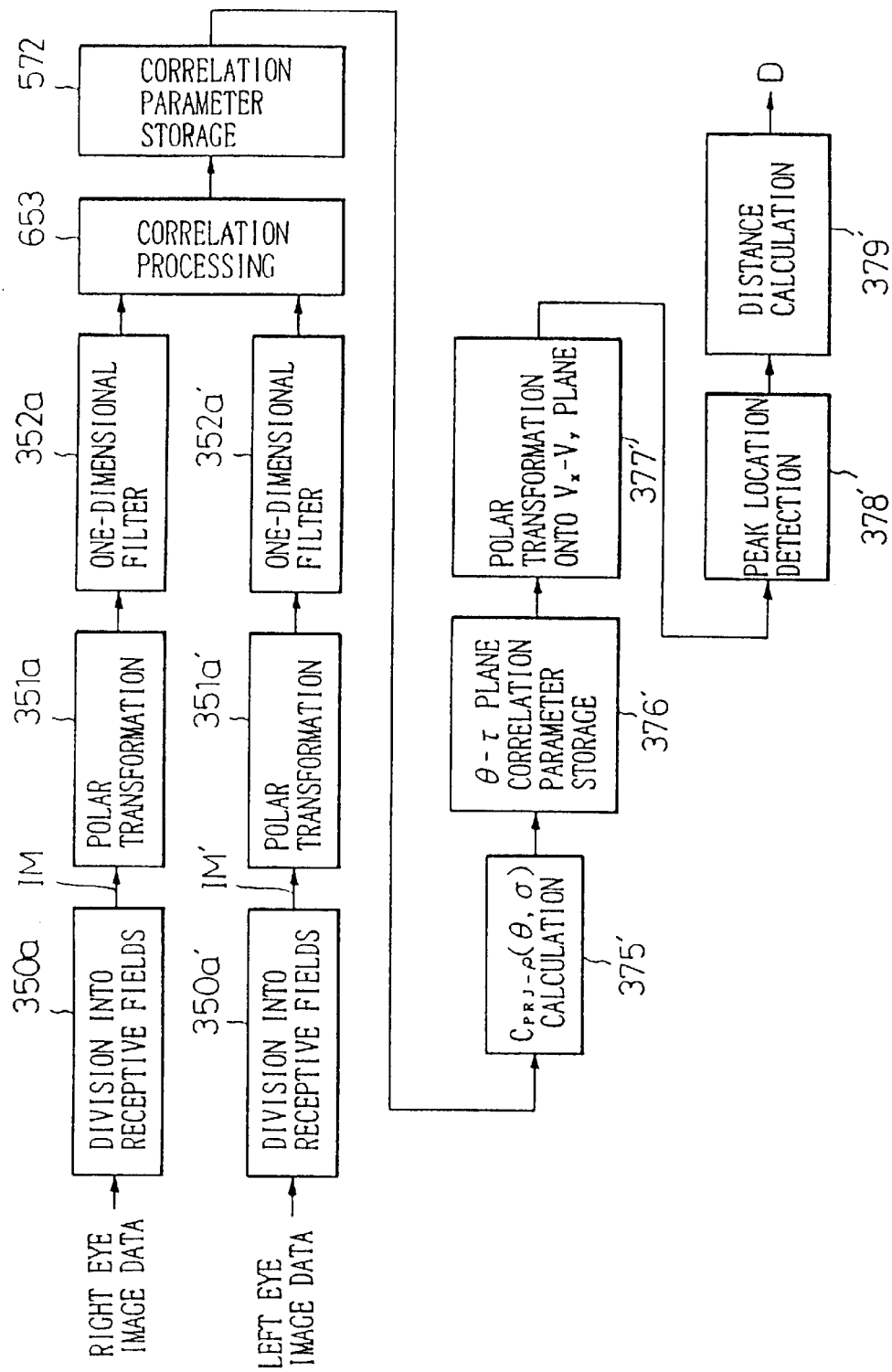
FIG. 110 is a block diagram of calculation of a parallax and a distance by the binocular stereopsis.

FIG. 110 is a block diagram for measurement of a parallax and a distance to an arbitrary figure by the binocular stereopsis. Image data by each of the right and left eyes is divided into receptive field images (350a, 350a'), each receptive field image IM and IM' is polar-transformed (351a, 351a'), one-dimensional filtering processing is applied to the polar transformation result to map on a dual plane (352a, 352a'), correlation processing of the equation (101) is performed between data mapped on the respective dual planes (653), and the calculated correlation parameter $C(\rho,\theta,\sigma)$ is stored in the correlation parameter storage portion (572). Next, a correlation parameter $C_{PRJ-\rho}(\theta,\sigma)$ is obtained by projection in the $\rho$-direction according to the equation (109) (375') to be stored in the correlation parameter storage portion of the $\theta$-$\sigma$ plane (376'). Then, inverse polar transformation processing is performed on the correlation parameter $C_{PRJ-\rho}(\theta,\sigma)$ according to the equation (134) (377'), a peak point (intersecting point) on the $V_x$-$V_y$ plane is obtained (378'), a distance from the coordinate origin to the intersecting point is obtained, and the binocular parallax $\sigma_0$ is obtained based on the equation (137), and the distance D to the arbitrary figure is calculated based on the equation (138) (379').

3.6.3.2 Binocular Stereopsis of Random-Dot Texture

By the same method as 3.6.3.1, binocular stereopsis of "a random-dot figure and a texture figure" becomes possible. Thereby, binocular stereopsis of a plane containing a fine design pattern can be performed easily. This is a model at a level of cell, of a fact proved first by a psychologist, Julesz, that "even a random-dot figure which itself cannot be recognized as a figure, can be recognized by the binocular stereopsis".

FIGS. 111A to 111D and 112A to 112C are diagrams for explaining a simulation result of binocular stereopsis of a random-dot figure, in the case where random-dot figures different (displaced in the horizontal direction) by six pixels from each other are input into right and left eyes, respectively. These random-dot figures are random-dot stereograph generated by a computer, where 1 dot=1 pixel, and the density is 50%. In FIGS. 111A to 111D, 1M and 1M' respectively denote receptive field images of the right and left eyes, and HCIM and HCIM' respectively denote hypercolumn images generated by applying polar transformation to the receptive field images IM and IM', applying one-dimensional filtering processing to the polar transformation result to map onto the $\rho$-$\theta$ dual planes. In FIGS. 112A to 112C, PRIM denotes a correlation parameter $C_{PRJ-\rho}(\theta,\sigma)$ on the $\theta$-$\sigma$ plane, obtained by performing correlation processing according to the equation (101), between hypercolumn images, and projecting the correlation parameter $C(\rho,\theta,\sigma)$ in the $\rho$ direction according to the equation (109), HGIM denotes a result of inverse polar transformation applied to the correlation parameter $C_{PRJ-\rho}(\theta,\sigma)$ on the $V_x$-$V_y$ plane according to the equation (134), generated by applying polar transformation processing to correlation parameter $C_{PRJ-\rho}(\theta,\sigma)$. A sine wave pattern SWV appears on the $\theta$-$\sigma$ plane, and a sharp peak PK is extracted at a location apart from the origin by six pixels in the horizontal direction on the $V_x$-$V_y$ plane. The binocular parallax $\sigma_0$ and a distance D to the arbitrary figure is calculated from the peak point ($V_x$,$V_y$) based on the equations (137) and (138).

3.6.4 Kinetic Stereopsis

3.6.4.1 Kinetic Stereopsis of Straight Line

In sub-section 3.6.2, the method for obtaining a velocity and a movement direction of a moving object is explained. Using the same processing, a distance (depth) to a straight line in a space is measured by moving an image capture means (camera or the like). Namely, by obtaining correlation parameter $C(\rho,\theta,\tau)$ based on the equation (104)', and a peak point ($\rho_P,\theta_P,\tau_P$) of the correlation parameter, a motion parallax between the image without delay and the image with delay, is calculated as $\tau_P \cdot \Delta_{92}$. When the direction in which the straight line is seen is denoted by $\xi$, the movement velocity of the image capture means by $V_S$, the delay in the equation (104)' by DELTA, the distance to the straight line is calculated by the equation (138), by the equation $$D = (V_S \cdot DELTA) \cdot \sin(\tau_P \cdot \Delta_\rho + \xi)/\sin(\tau_P \cdot \Delta_P). \tag{139}$$

FIG. 113 is a block diagram of measurement of a depth to a straight line in a space by kinetic stereopsis. The image before the movement is delayed (349), each of the image without delay $a_t+(\rho,\theta)$ and the image with delay $a_t$+DELTA $(\rho+\tau,\theta)$ is divided into receptive field images (350a, 350a'), polar transformation processing is applied to each receptive field image IM and Im' (351a, 351a'), one-dimensional filtering processing is applied to the polar transformation results to map onto dual planes (352a, 352a'), correlation processing according to the equation (104)' is performed between the data mapped on the respective dual planes (453), and the calculated correlation parameter $C(\rho,\theta,\tau)$ is stored in the correlation parameter storage portion (372'). Next, a peak point $(\rho_P,\theta_P,\tau_P)$ of the correlation parameter $C(\rho,\theta,\tau)$ is obtained (373'), and a depth to a straight line in a space is calculated using the parallax $\tau_P \cdot \Delta_\rho$ according to the equation (139) (391).

3.6.4.2 Kinetic Stereopsis of Arbitrary Figure

A distance (depth) to an arbitrary figure in a space is measured by moving an image capture means (camera or the like). Namely, the same processing as explained in sub-section 3.6.2.3 is performed on the images before and after the movement of the image capture means to determine a peak point on the $V_x$-$V_y$ plane, and a true velocity $V_0$ and a movement direction is calculated according to the equations (135a) and (135b). When the direction in which the figure is seen is denoted by $\xi$, the movement velocity of the capture means by $V_S$, and the delay in the equation (104)' by DELTA, the distance to the arbitrary figure is calculated, in the same manner as the equation (138), by the equation $$D=(V_S \cdot \text{DELTA}) \cdot \sin(V_0 \cdot \text{DELTA}+\xi)/\sin(V_0 \cdot \text{DELTA}). \qquad (140)$$

Figure 114:
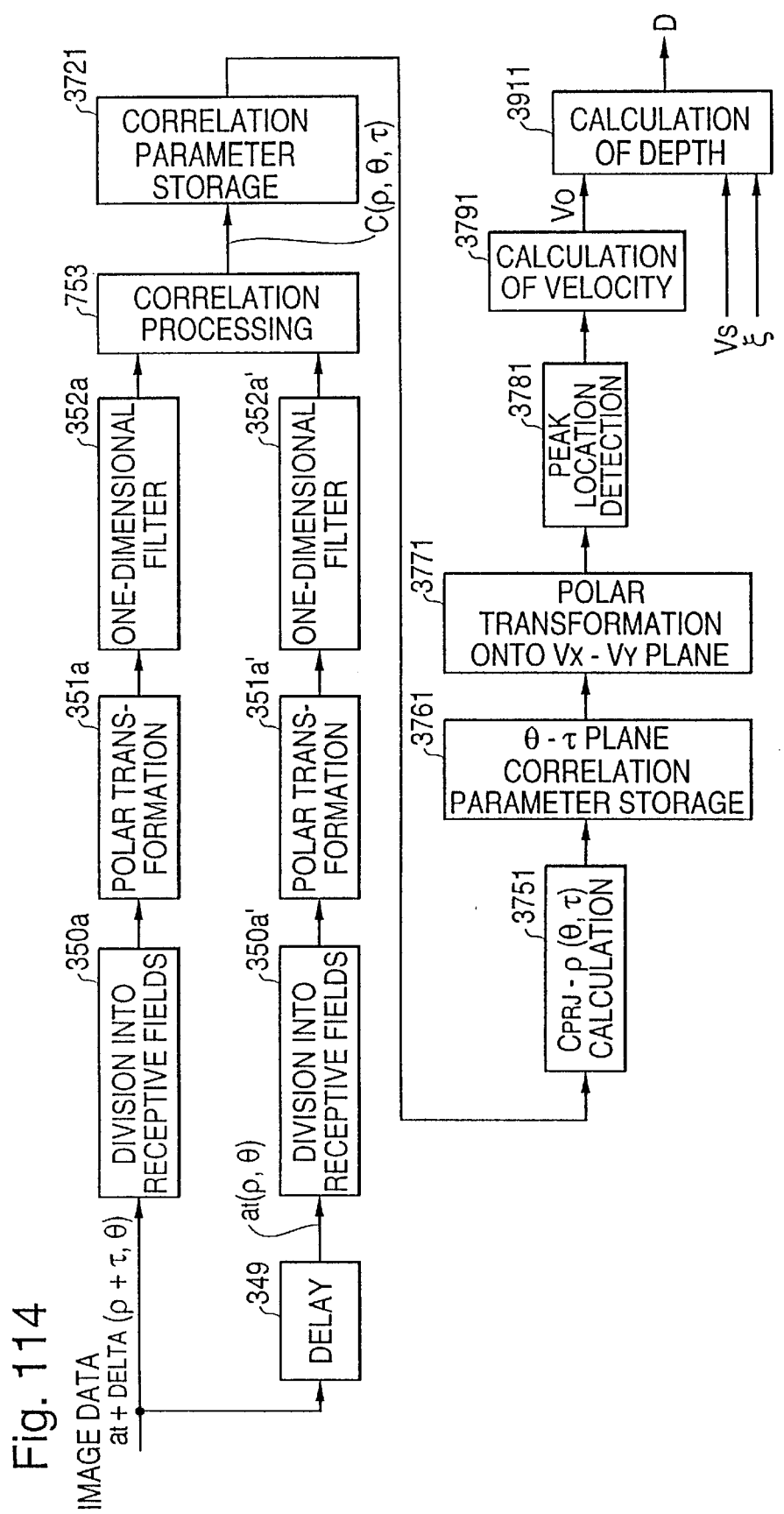
FIG. 114 is a block diagram of calculation of depth to an arbitrary figure by the kinetic stereopsis.

FIG. 114 is a block diagram of measurement of a depth to an arbitrary figure in a space by the kinetic stereopsis. The image is delayed (349), each of the image without delay $a_t(\rho,\theta)$ and the image with delay $a_{t+DELTA}(\rho+\tau,\theta)$ is divided into receptive field images (350a, 350a'), polar transformation processing is applied to each receptive field image IM and IM' (351a, 351a'), one-dimensional filtering processing is applied to the polar transformation results to map onto dual planes (352a, 352a'), correlation processing according to the equation (104)' is performed between the data mapped on the respective dual planes (753), and the calculated correlation parameter $C(\rho,\theta,\tau)$ is stored in the correlation parameter storage portion (3721). Next, a correlation parameter $C_{PRJ-\rho}(\theta,\tau)$ which is projected in the $\rho$-direction according to the equation (110) (3751) to store in the correlation parameter storing portion (3761), a peak point $(\rho_P,\theta_P,\tau_P)$ of the correlation $C(\rho,\theta,\tau)$ is obtained according to the equation (110) (373'), and a depth to the arbitrary figure in a space is calculated using the parallax $\tau_P \cdot \Delta_\rho$ according to the equation (140) (3991). Then, inverse polar transformation processing is applied to the correlation parameter $C_{PRJ-\rho}(\theta,\tau)$ according to the equation (134) (3771) to obtain a peak point (intersecting point) on the $V_x$-$V_y$ plane (3781), and a true velocity $V_0$ and a true orientation $\Phi_0$ are calculated according to the equations (135a) and (135b ) (3791). Finally, a depth to an arbitrary figure is calculated according to the equation (140) (3991).

3.6.5 Generalization

Figure 115:
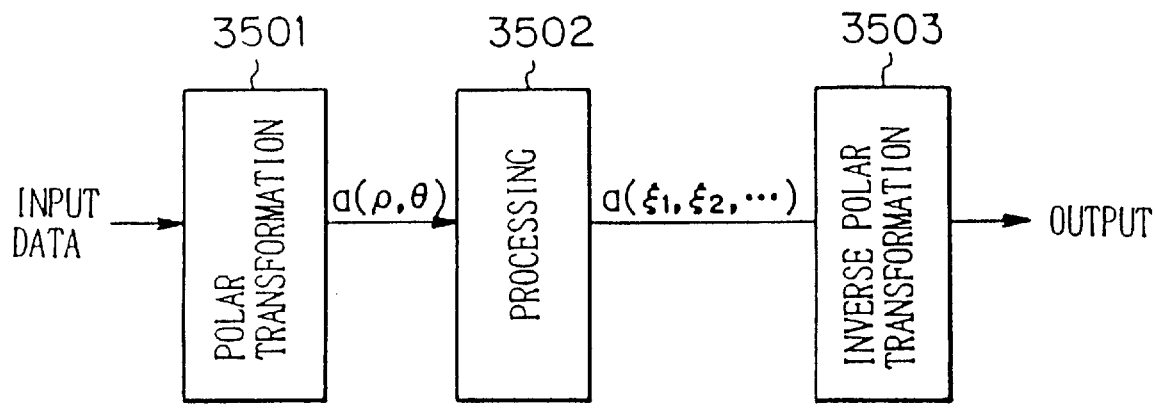
FIG. 115 is a block diagram in a generalized case.

The correlation processing system according to the present invention is generated as indicated in FIG. 115. Namely, polar transformation processing is applied to input data to map onto the $\rho$-$\theta$ dual plane (3501), processing (1) of adding a new parameter to the polar-transformed data $a(\rho,\theta)$, correlation processing (2), or projection with an arbitrary parameter or polar transformation processing (3) (projection in the direction of 0 or 90° is equivalent to polar transformation) is applied, thereby data $a(\xi_1,\xi_2,\ldots)$ including a sinusoidal excitation pattern on a plane, or data including an excitation pattern of a great circle on a sphere is obtained (3502), and the sinusoidal excitation pattern or the excitation pattern of the great circle included in the data, is extracted by inverse polar transformation processing to output useful data (3503).

In the equations (101) and (104), the "correlation processing" is performed with introducing a new parameter a or $\tau$. In the equations (109) and (110), the "projection along the parameter $\rho$" in performed. Further, in the equation (119), projection in the 45° direction on the $\rho\sigma$ plane is performed, where the projection is equivalent to the operation of "polar transformation of the $(\rho,\sigma)$ plane" and extraction of the components in the 45° direction.

In the measurement of the movement direction and the velocity explained in sub-sections 3.6.2.2 and 3.6.2.3, polar transformation processing is applied to data of two images at different time to obtain data $a(\rho,\theta)$ and $b(\rho,\theta)$ in the $\rho$-$\theta$ dual plane (3501), correlation processing is performed according to the equation (104) introducing the $\rho$-direction movement velocity parameter $\tau$, and projecting the correlation parameter $C(\rho,\theta,\tau)$ in the $\rho$ direction according to the equation (110) to obtain the projection data $C_{PRJ-\rho}(\theta,\tau)$ including the sinusoidal excitation pattern (see FIGS. 98A, 98B and 99) (3502). Then, inverse polar transformation processing is applied to the projection data $C_{PRJ-\rho}(\theta,\tau)$ to extract a sinusoidal excitation pattern (giving a local maximum point) and output useful data (movement direction and velocity) (3503).

The "inverse polar transformation" extracting the sinusoidal excitation pattern is expressed as $$\text{output }(\tau X, \tau Y) = \sum_\theta \sum_\tau \{C_{PRJ-\rho}(\theta,\tau) \cdot \delta(\tau + \tau_x\cos\theta + \tau_y\sin\theta)\}.$$

In the above equation, $\delta(\ )$ denotes a delta function, and $\tau_X$ and $\tau_Y$ denote velocity parameters in the X and Y-axis directions. Since the delta function $\delta(\ )$ is equal to one at the point of zero, and zero at the other points, the above equation is deformed to $$\text{output }(\tau X, \tau Y) = \sum_\theta \{C_{PRJ-\rho}(\theta - \tau_x\cos\theta - \tau_y\sin\theta)\}, \text{ and}$$

which makes clear the content of the inverse polar transformation. This calculation is carried out in the embodiment.

In the measurement by the binocular stereopsis explained in sub-section 3.6.3, polar transformation processing is applied to the data of two images captured by the two eyes to obtain data $L(\rho,\theta)$ and $R(\rho,\theta)$ on the $\rho$-$\theta$ dual plane (3501). Next, correlation processing is performed according to the equation (101) introducing the parallax $\sigma$ in the $\rho$-direction, the correlation parameter $C(\rho,\theta,\sigma)$ is projected in the $\rho$ direction according to the equation (109) to obtain the projection data $C_{PRJ-\rho}(\theta,\sigma)$ including the sinusoidal excitation pattern (see FIGS. 108A, 108B and 108C) (3502). Then, inverse polar transformation processing is applied to the projection data $C_{PRJ-\rho}(\theta,\sigma)$ to extract the sinusoidal excitation pattern (giving the local maximum point) and output useful data (parallax) (3503).

The "inverse polar transformation" extracting the sinusoidal excitation pattern is expressed as $$\text{output }(\sigma_X, \sigma_Y) = \sum_\theta \sum_\sigma \{C_{PRJ-\rho}(\theta,\sigma) \cdot \delta(\sigma + \sigma_X\cos\theta + \sigma_Y\sin\theta)\}.$$

where $\delta(\ )$ denotes a delta function, and $\sigma_X$ and $\sigma_Y$ denote parameters in the X and Y-axis directions. Since the delta function $\delta(\ )$ is equal to one at the point of zero, and zero at the other points, the above equation is deformed to $$\text{output } (\sigma_X, \sigma_Y) = \sum_{\theta} \{C_{PRJ-\rho}(\theta, -\sigma_X \cos\theta + \sigma_Y \sin\theta)\}.$$

This calculation is carried out in the embodiment.

Figure 116A:
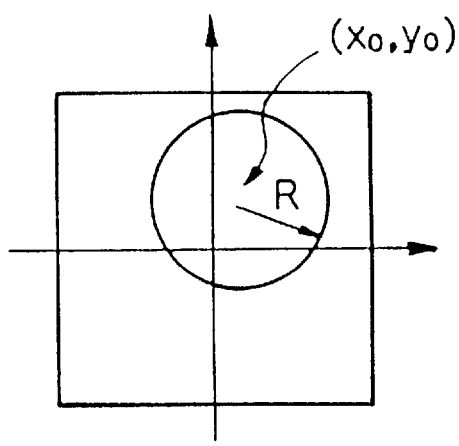
FIGS. 116A and 116B are diagrams for explaining detection of a circle.
Figure 116B:
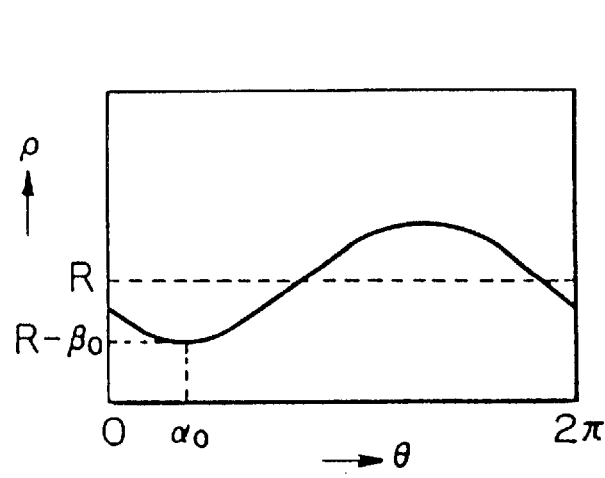

Although, in the above processing, the sinusoidal excitation pattern is obtained by performing the correlation processing and the like in step 3502 in FIG. 115, the sinusoidal excitation pattern can be obtained by polar transformation without correlation processing and the like. In the latter case, in step 3502, transformation processing such as a shift and a rotation is applied to the $(\rho,\theta)$ data obtained by the polar transformation in step 3501, and inverse polar transformation processing of step 3503 is applied to the $(\rho,\theta)$ data obtained by the transformation processing to extract the sinusoidal excitation pattern (giving the local maximum point) and output useful data. For example, when applying polar transformation to the circle of the radius R indicated in FIG. 116A, a sine wave, which is shifted by R in the $\rho$ direction is obtained as indicated in FIG. 116B. When the center of the circle in denoted by $(x_0, y_0)$, $$\rho = R - \beta_0 \cos(\theta - \alpha_0) \tag{141}$$

$$\beta_0 = \sqrt{(x_{02} + y_{02})}$$

$$\alpha_0 = \arctan(x_0 / y_0)$$

are obtained. Therefore, by shifting the data obtained by the polar transformation, by R in the $\rho$ direction, and applying inverse polar transformation processing to data $a(\theta,\sigma)$ obtained by the shift processing to extract a sinusoidal excitation pattern (giving a local maximum point), a circle center can be output (3503).

FIGS. 117A to 117D are diagrams for explaining of a simulation result of the circle detection. In the simulation, Laplacian filter processing is applied to a black circle drawn on a white paper to obtain input image data, the input image is divided into receptive field images, polar transformation processing is applied to the receptive field image to obtain $(\rho,\theta)$ data containing the sinusoidal excitation pattern on the $\rho$-$\theta$ plane, then the $(\rho,\theta)$ data is shifted by R in the $\rho$ direction, and inverse polar transformation is applied to the data obtained by the shift processing. In FIGS. 117A to 117D, intensities of the excitation are indicated by contour lines, and positive portions are indicated by hatching. In FIG. 117B, two parallel sine waves $SN_1$ and $SN_2$ are obtained by the polar transformation, since the range of $\rho$-$2\rho$ in the equation (141) is inverted to the negative side of $\rho$ based on the consideration of the physiological knowledge on the hypercolumn, that "the orientation $\theta$ of the straight line stimulus detected by the hypercolumn is limited to the range of 0~$\rho$". As understood from FIG. 117A, one sine wave is excited as a sharp "negative peak PK" corresponding to the center of the circle, and the other sine wave is excited as the weak ring RG of a radius 2R.

3.7 Advantage of Third Aspect of Present Invention

Since, according to the third aspect of the present invention, polar transformation processing is applied to input data to project onto a dual plane, or further filter processing is applied to the polar transformation processing result to project onto the dual plane, then correlation processing is performed between mapped data on the dual plane to measure a variable specifying relationship between figurative characteristic features (for example, tangential lines) of the input data, corresponding portions in a plurality of figures can be determined simply, and precisely with a small amount of processing, and thus the functions of the binocular stereopsis (measurement of a binocular parallax, a depth, measurement of optical flows, a movement velocity and a movement direction of an object, and the like) can be realized.

Since polar transformation processing, filter processing, and correlation processing are performed on each receptive field image generated by dividing one frame into receptive fields which are small areas, the amount of processing can be greatly reduced.

When the receptive field images belong to different images taken by two or three cameras, the functions of the binocular stereopsis and the stereopsis by three eyes can be realized. In addition, when the receptive field images belong to images at different times, the movement direction and the movement velocity of characteristic features (lines, corners, and the like) captured in the receptive fields, can be measured, and therefore movement while capturing an object at the center of the field of view, becomes possible, and application to movable robots, unmanned vehicles, and the like becomes possible. Further, when the receptive field images belong to images before and after the movement of an image capture means such as a camera, the function of the kinetic stereopsis can be realized and a depth to an object can be measured.

When the receptive field images belong to images in different receptive fields of the same image (screen), or images in the same receptive field image, texture analysis whereby a degree of the same design pattern in an image can be analyzed.

When correlation processing among a plurality of receptive field images is performed for each color, for each color difference signal, or for each primary color, and therefore, the binocular stereopsis, the pursuit of a movement object, and texture analysis can be performed more precisely.

When one-dimensional Gaussian filter processing is performed after polar transformation, or two-dimensional Gaussian filter processing is performed before polar transformation processing, corresponding lines and gaps in a plurality of figures can be obtained. When one-dimensional gradient filter processing and one-dimensional Gaussian filter processing are performed after polar transformation, or two-dimensional gradient filter processing before polar transformation processing and one-dimensional Gaussian filter processing after polar transformation are performed, corresponding edges in a plurality of figures can be obtained. Further, a location, an orientation, a parallax, a movement direction, and a movement velocity of the above figure elements can be obtained.

When a plurality of receptive field images belong to spatially different images, and the correlation parameter $C\theta(\rho,\theta,\sigma)$ in the $\theta$-direction is calculated, or correlation parameter $C(\rho,\theta,\sigma_1,\sigma_2)$ in the $(\rho,\theta)$ plane is calculated, extraction of a moving tangential line changing its orientation becomes possible.

When a plurality of receptive field images belong to images at different times, and the correlation parameter $C(\rho,\theta,\tau)$ in the $\rho$-direction is calculated, a location, an orientation, and a velocity of a translating tangential line can be quantitatively obtained. Further, the correlation parameter $C(\rho,\theta,\tau_1,\tau_2)$ in the $(\rho,\theta)$ plane is calculated, a location, an orientation, a movement velocity, and a rotation velocity of a tangential line moving with changing the orientation can be quantitatively obtained.

When the correlation parameter $C(\rho,\theta,\sigma)$ is projected in the $\sigma$-axis direction indicating a spatial shift amount $\sigma$, in the $\rho$-direction indicating a tangential line location, in the θ-direction indicating a tangential line orientation, or in an arbitrary two-axis direction, the memory capacity storing correlation parameters can be reduced by an amount corresponding to one or two axes. Further, when a projection direction is selected, a desired value of a location, a parallax, an orientation, and the like of a tangential line, can be obtained.

When the correlation parameter $C(\rho,\theta,\sigma)$ is projected in the τ-axis direction indicating a time shift amount (movement velocity) τ, in the ρ-direction indicating a tangential line location, in the θ-direction indicating a tangential line orientation, or in an arbitrary two-axis direction, the memory capacity storing correlation parameters can be reduced by an amount corresponding to one or two axes. Further, when a projection direction is selected, a desired value of a location, an orientation, a translation velocity, a rotation velocity, and the like can be obtained.

When polar transformation processing is performed on receptive field images to project onto the ρ-θ dual plane, picking up a combination of mapped data $a(\rho,\theta)$ in the dual plane and mapped data $b(\rho,\theta)$ in another dual plane, where the coordinate values of the data differ by a predetermined amount in the ρ-direction, and a sum of products is calculated, precise filtering can be performed, and it is preferable to apply the above processing to the "extraction of a characteristic feature seen as the same by the right and left eyes" and the "pursuit of the same characteristic feature as the previous image".

When shifting, with regard to mapped data $a(\rho,\theta)$ in the dual plane, another mapped data $b(\rho,\theta)$ in the ρ-direction or in the θ-direction, subtraction from the mapped data $a(\rho,\theta)$ is performed, and then the subtraction is repeated with varying the shift amount to supply the obtained subtraction result as the correlation parameter, the binocular stereopsis and the pursuit of an object the contour of which is obscure, based on a gradual variation of brightness or hue.

TABLE 1

Relationship between Lens and Projection Surface

|  | Projection Surface | Wideness of Sight | Resolution of Angle |
|---|---|---|---|
| Standard/Telephoto Lens | plane | X narrow | O high |
| Cylindrical Lens | cylindrical | D angular direction only | D axis direction only |
| Fisheye Lens | sphere | O wide | X low |

TABLE 2

Extraction of Line Segment from Standard/Telephoto Lens (Part 1)

(a-1) Polar Transformation on Plane
(processing on plane)
• processing is simple because of "transformation between straight line and point"
• processing is simplest due to drawing of straight line.

TABLE 2-continued

Extraction of Line Segment from Standard/Telephoto Lens (Vicinity of origin corresponds to infinity, and inversion transformation in (a-4) is more practical.)
(a-2) Polar Transformation on Cylinder
(processing on plane)
• Developing on a plane is possible, and "transformation between sine wave and point".
• Processing is second simplest due to drawing of sine wave.
• Same transformation as "Hough transformation" algebraically derived from parameter space method, and being considered as geometrical version of the parameter space method.
• Utilization in extraction of line segment from plane image (Part 2)

(a-3) Polar Transformation on Sphere
(processing on sphere)
• "transformation between great circle and point"
• process of drawing of great circle
• Suitable but wide field of view of spherical projection is mostly not utilized due to narrow field of view of Standard/Telephoto Lens.
• Equivalent to processing of (a-2) when range of sight is narrow.
(a-4) Synthetic Inversion Transformation on Plane
(processing on plane)
• "transformation between point and circle. passing through origin"; inverse transformation of (a-1)
• characteristic features
a. Real image and dual image are drawn in same plane
b. Dual image (hypercolumn) is representation by polar coordinate
c. Process of drawing circle is necessary

TABLE 3

Extraction of Line Segment from Cylindrical Lens (b-1) Polar Transformation on Plane
(processing on plane)
• "transformation between straight line and point"
• Not practical since wide field of view in angular direction of cylindrical input is damaged.
(b-2) Polar Transformation on Cylinder
(processing on plane)
• Developing on plane is possible, and "transformation between sine wave and point".
• Processing is relatively simple due to drawing of sine wave (Hough transformation)
• most suitable for cylindrical lens.
Note: Hough transformation is provided for cylindrical lens.
(b-3) Polar Transformation on Sphere
(processing on sphere)
• "transformation between great circle and point"
• Process of drawing of great circle is necessary.
• Suitable but wide field of view of spherical projection is not mostly utilized due to narrow field of view of cylindrical lens in axis direction of cylinder.

TABLE 4

Extraction of Line Segment from Fisheye Lens (c-1) Polar Transformation on Plane
(processing on plane)

TABLE 4-continued

Extraction of Line Segment
from Fisheye Lens

- "transformation between straight line and point"
- Not practicai since wide field of view in sphere input is damaged.
(c-2) Polar Transformation on Cylinder (processing on plane)
- Developing on a plane is possible, and "transformation between sine wave and point".
- Not practical since wide fieid of view in sphere input is damaged.
(c-3) Polar Transformation on Sphere (processing on sphere)
- "transformation between great circle and point"
- Processing of drawing of great circle is necessary.
- most suitable for fisheye lens
(c-4) Synthetic Inversion Transformation on Plane (processing on plane)
- "transformation between point and circle passing through fixed point on the sphere"; inversion transformation of (c-3)
- characteristic features
i. Real image and dual image are drawn in same sphere.
ii. Dual image (hypercolumn) is representation by polar coordinate.
- Process of drawing of great circle is necessary.

TABLE 5

Suitability of Polar
Transformation Surface with Lens

| | Surface for Polar Transformation and Transformation | Suitable Lens |
|---|---|---|
| Polar Transformation on Plane | processing on plane: straight line ←→ point | standard/telephoto lens |
| Polar Transformation on Cyiinder | processing on plane: sine wave ←→ point | cylindricallens, standard/telephoto lens, and fisheye lens |
| Polar Transformation on Sphere | processing on sphere: great circle ←→ point | fisheyelens, cylindrical lens, and standard/telephoto lens |
| Polar Transformation on Arbitrary Surface | Arbitrary surface: straight line in broad sense ←→ point | lensofsameshapeas PolarTransformation surface | underlined portion: optimum lens

TABLE 6

Synthetic Evaluation of
Various Types of Processing

| Type | Processing Time | | Hardware Size | | Index of |
|---|---|---|---|---|---|
| (FIG. No.) | Processing Time | Ratio | Hardware Size | Ratio | Synthetic Evaluation |
| 31A | $(m + m)N^2$ | 2 | $mN^2$ | 1 | 2 |
| 31B | $(m^2 + m)N^2$ | $m + 1$ | $m^2N^2$ | $m$ | $m(m + 1)$ |
| 31C | $mN^2$ | 1 | $(m + m)N^2$ | 2 | 1 |
| 31D | $m^2N^2$ | $m$ | $(m^2 + m)N^2$ | $m + 1$ | $m(m + 1)$ |

(Note)
Index of Synthetic Evaluation = (Processing Time) × (Hardware Size)

I claim:

1. An image processing process comprising:

a first step for dividing an original image into small areas;

a second step for applying polar transformation to the original image in each of the small areas, to obtain a polar-transformed image of the original image in each of the small areas, where the polar transformation is a transformation between an n-dimensional hyperplane containing an origin in an (n+1)-dimensional Affine space, and a vector passing through the origin and perpendicular to the n-dimensional hyperplane, at least one image element of each of the original images in each of the small areas corresponds to one of said n-dimensional hyperplane and said vector, and a polar-transformed image element which is polar-transformed from each of said at least one image element corresponds to the other of said n-dimensional hyperplane and said vector; and a third step for applying one-dimensional filtering on the polar-transformed image.

2. An image processing process according to claim 1, wherein the one-dimensional filtering is one-dimensional first differential filtering.

3. An image processing process according to claim 2, further comprising a fifth step for extracting a figure element corresponding to an edge existing in each of the small areas of the original image, based on the result of the processing of one-dimensional first differential filtering.

4. An image processing process according to claim 1, wherein, in the third step, a plurality of one-dimensional first differential filtering are applied at the same time to the result of the polar transformation, wherein the plurality of one-dimensional first differential filtering have different characteristics, respectively, and the fourth step comprises a sub-step for synthesizing results of the plurality of one-dimensional first differential filtering.

5. An image processing process according to claim 1, wherein the one-dimensional filtering is one-dimensional filtering by a skeleton filter the characteristics of which can be expressed by a δ-function.

6. An image processing process comprising:

a first step for dividing an original image into small areas;

a second step for applying polar transformation to the original image in each of the small areas, to obtain a polar-transformation image of the original image in each of the small areas, where the polar transformation is a transformation between an n-dimensional hyperplane containing an origin in an (n+1)-dimensional Affine space, and a vector passing through the origin and perpendicular to the n-dimensional hyperplane, at least one image element of each of the original images in each of the small areas corresponds to one of said n-dimensional hyperplane and said vector, and a polar-transformed image element which is polar-transformed from each of said at least one image element corresponds to the other of said n-dimensional hyperplane and said vector;

a third step for applying one-dimensional second differential filtering on the solar-transformed image; and a fourth step for extracting a figure element corresponding to a line existing in each of the small areas of the original image from the result of the one-dimensional second differential filtering.

7. An image processing process according to claim 6, wherein, in the third step, a plurality of one-dimensional second differential filtering are applied at the same time to the result of the polar transformation, wherein the plurality of one-dimensional second differential filtering have different widths, respectively, and the fourth step comprises a sub-step for synthesizing the results of the plurality of one-dimensional second differential filtering.

8. An image processing process according to claim 6 further comprising another step after the third step for dividing the results of the plurality of one-dimensional second differential filtering into positive signals and negative signals, respectively; and the fourth step comprises:

a first sub-step for synthesizing the positive signals obtained from the plurality one-dimensional second differential filtering to output the synthesized result, and a second sub-step for synthesizing the negative signals obtained from the plurality of one-dimensional second differential filtering to output the synthesized result.

9. An image processing process comprising:

a first step for dividing an original image into small areas;

a second step for applying polar transformation to the original image in each of the small areas, to obtain a polar-transformed image of the original image in each of the small areas, where the solar transformation is a transformation between an n-dimensional hyperplane containing an origin in an (n+1)=dimensional Affine space, and a vector passing through the origin and perpendicular to the n-dimensional hyperplane, at least one image element of each of the original images in each of the small areas corresponds to one of said n-dimensional hyperplane and said vector, and a polar-transformed image element which is polar-transformed from each of said at least one image element corresponds to the other of said n-dimensional hyperplane and said vector;

a third step for applying one-dimensional second differential filtering on the polar-transformed image;

a fourth step for inverting the polarity of the result of the one-dimensional second differential filtering; and a fifth step for extracting a figure element corresponding to a gap existing in each of the small areas of the original image from the result of the inverting.

10. An image processing process according to claim 9, wherein the third step comprises:

a first sub-step for applying a plurality of one-dimensional second differential filtering at the same time to the result of the polar transformation, wherein the plurality of types of one-dimensional second differential filtering have different widths, respectively, and a second sub-step for synthesizing the results of the plurality of first differential filtering.

11. An image processing process according to claim 9, further comprising:

another step before the third step for applying a plurality of one-dimensional first differential filtering at the same time to the result of the polar transformation, wherein the plurality of one-dimensional first differential filtering have different widths, respectively; and an additional step for synthesizing the results of the plurality of first differential filtering.

12. An image processing process comprising:

a first step for dividing an original image into small areas;

a second step for applying polar transformation to the original image in each of the small areas, to obtain a polar-transformed image of the original image in each of the small areas, where the polar transformation is a transformation between an n-dimensional hyperplane containing an origin in an (n+1)-dimensional Affine space, and a vector passing through the origin and perpendicular to the n-dimensional hyperplane, at least one image element of each of the original images in each of the small areas corresponds to one of said n-dimensional hyperplane and said vector, and a polar-transformed image element which is polar-transformed from each of said at least one image element corresponds to the other of said n-dimensional hyperplane and said vector;

a third step for applying one-dimensional first differential filtering on the polar-transformed image; and a fourth step for extracting a figure element corresponding to an edge existing in each of the small areas of the original image from the result of the third step.

13. An image processing process comprising:

a first step for dividing an original image into small areas;

a second step for applying polar transformation to the original image in each of the small areas, to obtain a polar-transformed image of the original image in each of the small areas, where the polar transformation is a transformation between an n-dimensional hyperplane containing an origin in an (n+1)-dimensional Affine space, and a vector passing through the origin and perpendicular to the n-dimensional hyperplane, at least one image element of each of the original images in each of the small areas corresponds to one of said n-dimensional hyperplane and said vector, and a polar-transformed image element which is polar-transformed from each of said at least one image element corresponds to the other of said n-dimensional hyperplane and said vector;

a third step for applying one-dimensional first differential filtering on the polar-transformed image;

a fourth step for applying one-dimensional second differential filtering on the result of the one-dimensional first differential filtering; and a fifth step for extracting a figure element corresponding to an edge existing in each of the small areas of the original image from the result of the fourth step.

14. An image processing process according to claim 13, further comprising an additional step, before the fourth step, for separating the result of the one-dimensional differential filtering into positive and negative signals; and the fourth step comprises:

a first sub-step for applying one-dimensional second differential filtering on the positive and negative signals, respectively, and a second sub-step for synthesizing the results of one-dimensional second differential filtering obtained from the positive and negative signals, for outputting the synthesized result.

15. An image processing process according to claim 13, wherein, in the third step, a plurality of one-dimensional first differential filtering are applied at the same time to the result of the polar transformation, where the plurality of types of one-dimensional first differential filtering have different widths, respectively, and in the fourth step, one-dimensional second differential filtering is applied on the results of the plurality of types of one-dimensional first differential filtering to obtain a plurality of results of the one-dimensional second differential filtering, and the fifth step comprises a sub-step for synthesizing the results of the plurality of one-dimensional second differential filtering.

16. An image processing process according to claim 15 further comprising another step for separating the results of the plurality of one-dimensional differential filtering into positive signals and negative signals, respectively;

in the fourth step, one-dimensional second differential filtering is applied to the positive signals and negative signals obtained from the plurality of one-dimensional differential filtering to output a plurality of positive signals and a plurality of negative signals, and the another step comprises:
a first sub-step for synthesizing the plurality of positive signals to output the synthesized result, and
a second sub-step for synthesizing the plurality of negative signals to output the synthesized result.

17. An image processing process comprising:
a first step for dividing an original image into small areas;
a second step for applying polar transformation to the original image in each of the small areas, to obtain a polar-transformed image of the original image in each of the small areas, where the polar transformation is a transformation between an n-dimensional hyperplane containing an origin in an (n+1)-dimensional Affine space, and a vector passing through the origin and perpendicular to the n-dimensional hyperplane, at least one image element of each of the original images in each of the small areas corresponds to one of said n-dimensional hyperplane and said vector, and a polar-transformed image element which is polar-transformed from each of said at least one image element corresponds to the other of said n-dimensional hyperplane and said vector;
a third step for applying one-dimensional second differential filtering on the polar-transformation image;
a fourth step for extracting a figure element corresponding to a line existing in each of the small areas of the original image based on the result of the third step and for producing a fourth step result;
a fifth step for applying one-dimensional first differential filtering on the polar-transformed image and for producing a fifth step result; and
a sixth step for extracting a line which does not coincide with the line obtained in the fourth step, from the fifth step result, as a figure element corresponding to an edge existing in each of the small areas of the original image.

18. An image processing process comprising:
a first step for dividing an original image into small areas;
a second step for applying polar transformation to the original image in each of the small areas, to obtain a polar-transformed image of the original image in each of the small areas, where the polar transformation is a transformation between an n-dimensional hyperplane containing an origin in an (n+1)-dimensional Affine space, and a vector passing through the origin and perpendicular to the n-dimensional hyperplane, at least one image element of each of the original images in each of the small areas corresponds to one of said n-dimensional hyperplane and said vector, and a polar-transformed image element which is polar-transformed from each of said at least one image element corresponds to the other of said n-dimensional hyperplane and said vector;
a third step for applying one-dimensional second differential filtering on the polar-transformed image;
a fourth step for extracting a candidate of a figure element corresponding to a line existing in each of the small areas of the original image from the result of the third step;
a fifth step for applying one-dimensional first differential filtering on the polar-transformed image;
a sixth step for extracting a candidate of a figure element corresponding to an edge existing in each of the small areas of the original image from the result of the fourth step; and
a seventh step for extracting figure elements corresponding to a line and an edge, respectively, existing in each of the small areas of the original image from the candidates of the figure elements corresponding to the line and the edge of the fourth and sixth steps.

19. An image processing process comprising:
a first step for dividing an original image into small areas;
a second step for applying polar transformation to each pixel in the original image in each of the small areas, and obtaining a curve on a predetermined dual plane as a polar-transformed image element of each pixel in the original image in each of the small areas, where the polar transformation is a transformation between an n-dimensional hyperplane containing an origin in an (n+1)-dimensional Affine space, and a vector passing through the origin and perpendicular to the n-dimensional hyperplane, each pixel of the original image in each of the small areas corresponds to said vector, and said curve as said polar-transformed image element which is polar-transformed from each pixel corresponds to said n-dimensional hyperplane;
a third step for obtaining an accumulated polar-transformed image on the dual plane by accumulatively storing in a memory having a storage area for each pixel on the dual plane, a value of each pixel in the original image, as a value of each pixel constituting said curve on the dual plane; and
a fourth step for applying one-dimensional filtering on the accumulated polar-transformed image in each of the small areas.

20. An image processing process according to claim 19, wherein, in the fifth step, a point at which a peak of the values accumulatively stored in the memory is located in the polar-transformed image on the dual plane, is recognized as a line existing in each of the small areas of the original image.

21. An image processing apparatus comprising:
a first means for dividing an original image into small areas;
a second means for applying polar transformation to the original image in each of the small areas, to obtain a polar-transformed image of the original image in each of the small areas, where the polar transformation is a transformation between an n-dimensional hyperplane containing an origin in an (n+1)-dimensional Affine space, and a vector passing through the origin and perpendicular to the n-dimensional hyperplane, at least one image element of each of the original images in each of the small areas corresponds to one of said n-dimensional hyperplane and said vector, and a polar-transformed image element which is polar-transformed from each of said at least one image element corresponds to the other of said n-dimensional hyperplane and said vector; and a one-dimensional filter for applying one-dimensional filtering on the polar-transforming image.

22. An image processing apparatus comprising:

first means for dividing an original image into small areas;

second means for applying polar transformation to each pixel in the original image in each of the small areas, and obtaining a curve on a predetermined dual plane as a polar-transformed image element of each pixel in the original image in each of the small areas, where the polar transformation is a transformation between an n-dimensional hyperplane containing an origin in an (n+1)-dimensional Affine space, and a vector passing through the origin and perpendicular to the n-dimensional hyperplane, each pixel of the original image in each of the small areas corresponds to said vector, and said curve as said polar-transformed image element which is polar-transformed from each pixel corresponds to said n-dimensional hyperplane;

a memory having a storage area for each pixel on the dual plane;

third means for obtaining an accumulated polar-transformed image on the dual plane by accumulatively storing in the memory, a value of each pixel in the original image, as a value of each pixel constituting said curve on the dual plane; and a one-dimensional filter for applying one-dimensional filtering on the accumulated polar-transformed image.

23. A computer readable product storing at least one program which, when executed by a processor, causes the processor and its associated hardware to carry out the steps of:

a first step for dividing an original image into small areas;

a second step for applying polar transformation to the original image in each of the small areas, to obtain a solar-transformed image of the original image in each of the small areas, where the polar transformation is a transformation between an n-dimensional hyperplane containing an origin in an (n+1)-dimensional Affine space, and a vector passing through the origin and perpendicular to the n-dimensional hyperplane, at least one image element of each of the original images in each of the small areas corresponds to one of said n-dimensional hyperplane and said vector, and a polar-transformed image element which is polar-transformed from each of said at least one image element corresponds to the other of said n-dimensional hyperplane and said vector; and a third step for applying one-dimensional filtering on the polar-transformed image.

24. A program executing machine containing a computer readable product storing at least one program which, when executed by the program executing machine, causes the program executing machine and its associated hardware to carry out the steps of:

a first step for dividing an original image into small areas;

a second step for applying polar transformation to the original image in each of the small areas, to obtain a polar-transformed image of the original image in each of the small areas, where the polar transformation is a transformation between an n-dimensional hyperplane containing an origin in an (n+1)-dimensional Affine space, and a vector passing through the origin and perpendicular to the n-dimensional hyperplane, at least one image element of each of the original images in each of the small areas corresponds to one of said n-dimensional hyperplane and said vector, and a polar-transformed image element which is polar-transformed from each of said at least one image element corresponds to the other of said n-dimensional hyperplane and said vector; and;

a third step for applying one-dimensional filtering on the polar-transformed image.

25. An image processing process comprising:

dividing an original image into small areas;

applying polar transformation to the original image in each of the small areas, wherein said polar transformation comprises an n-dimensional hyperplane containing an origin in an (n+1)-dimensional affine space and a vector passing through the origin and perpendicular to the n-dimensional hyperplane; and applying one-dimensional filtering to the result of the polar transformation.

* * * * *

UNITED STATES PATENT AND TRADEMARK OFFICE
CERTIFICATE OF CORRECTION

PATENT NO.:     6,005,984
DATED    :      December 21, 1999
INVENTOR(S):    Susumu KAWAKAMI et al.

It is certified that error appears in the above-identified patent and that said Letters Patent is hereby corrected as shown below:

On the title page, [75] Inventors, delete "Yusuke Yasukawa" and "Yasushi Inamoto".

Signed and Sealed this

First Day of August, 2000

Attest:

Q. TODD DICKINSON

*Attesting Officer*  *Director of Patents and Trademarks*